(12) United States Patent
Watanabe et al.

(10) Patent No.: US 10,177,923 B2
(45) Date of Patent: Jan. 8, 2019

(54) ELECTRONIC APPLIANCE AND NETWORK OF THE SAME

(71) Applicant: Hiroshi Watanabe, Kanagawa-ken (JP)

(72) Inventors: Hiroshi Watanabe, Kanagawa-ken (JP); Te-Chang Tseng, Hsinchu County (TW); Yukihiro Nagai, Hokkaido (JP); Riichiro Shirota, Kanagawa-ken (JP)

(73) Assignee: Hiroshi Watanabe, Yokohama-shi, Kanagawa-ken (JP)

( * ) Notice: Subject to any disclaimer, the term of this patent is extended or adjusted under 35 U.S.C. 154(b) by 4 days.

(21) Appl. No.: 15/643,617

(22) Filed: Jul. 7, 2017

(65) Prior Publication Data

US 2018/0019882 A1    Jan. 18, 2018

Related U.S. Application Data

(60) Provisional application No. 62/362,639, filed on Jul. 15, 2016.

(51) Int. Cl.
*H04L 9/08* (2006.01)
*H04L 9/32* (2006.01)
(Continued)

(52) U.S. Cl.
CPC ............ *H04L 9/3278* (2013.01); *G06F 7/588* (2013.01); *G06F 21/44* (2013.01); *G06F 21/602* (2013.01);
(Continued)

(58) Field of Classification Search
CPC ..... H04L 9/3278; H04L 41/12; H04L 9/0861; H04L 9/32; G06F 21/70; G06F 7/588;
(Continued)

(56) References Cited

U.S. PATENT DOCUMENTS 9,292,710 B2   3/2016 Kim et al.
9,985,959 B2 * 5/2018 Watanabe ........... H01L 27/1052
(Continued)

FOREIGN PATENT DOCUMENTS

JP    2013131868 A    7/2013

OTHER PUBLICATIONS

Fatemeh Tehranipoor, Nima Karimian, Kan Xiao, and John Chandy, DRAM based Intrinsic Physical Unclonable Functions for System Level Security, GLSVLSI '15 Proceedings of the 25th edition on Great Lakes Symposium on VLSI, May 20-22, 2015, pp. 15-20, ACM, New York, NY, USA.
(Continued)

*Primary Examiner* — Hassan Kizou
*Assistant Examiner* — Abdullahi Ahmed
(74) *Attorney, Agent, or Firm* — Alan D. Kamrath; Kamrath IP Lawfirm, P.A.

(57) ABSTRACT

A network of electronic appliances includes a plurality of network units of electronic appliances. The network units include a first network unit and a plurality of second network units. The first network unit is connected to at least one of the second network units. Each of the network units includes a stem server and a plurality of peripheral devices connected to the stem server. The stem server includes at least one passcode and at least one list of a plurality of registration codes. Each list is associated to a respective passcode. Each registration code of one list associating to one passcode corresponds to a respective peripheral device. Each registration code is generated in response to a respective passcode using physical randomness of a respective peripheral device in correspondence to the passcode. An address of each identification cell is defined by several word lines and bit lines.

21 Claims, 91 Drawing Sheets

(51) Int. Cl.
  *G06F 7/58*    (2006.01)
  *G06F 21/44*   (2013.01)
  *G06F 21/60*   (2013.01)
  *G06F 21/70*   (2013.01)
  *G06F 21/73*   (2013.01)
  *G06F 21/86*   (2013.01)
  *H01L 23/535*  (2006.01)
  *H01L 27/108*  (2006.01)
  *H04L 12/24*   (2006.01)
  *G11C 7/24*    (2006.01)
  *G11C 13/00*   (2006.01)
  *G11C 16/20*   (2006.01)
  *G11C 16/22*   (2006.01)
  *G11C 11/22*   (2006.01)
  *G11C 11/16*   (2006.01)
  *H04L 29/06*   (2006.01)
  *G11C 29/44*   (2006.01)

(52) U.S. Cl.
  CPC .............. *G06F 21/70* (2013.01); *G06F 21/73* (2013.01); *G06F 21/86* (2013.01); *G11C 7/24* (2013.01); *G11C 11/1695* (2013.01); *G11C 11/2295* (2013.01); *G11C 13/0059* (2013.01); *G11C 16/20* (2013.01); *G11C 16/22* (2013.01); *H01L 23/535* (2013.01); *H01L 27/10805* (2013.01); *H04L 9/0861* (2013.01); *H04L 9/0866* (2013.01); *H04L 9/32* (2013.01); *H04L 41/12* (2013.01); *G11C 2029/4402* (2013.01); *G11C 2213/79* (2013.01); *H04L 69/16* (2013.01); *H04L 2209/12* (2013.01); *H04L 2209/805* (2013.01)

(58) Field of Classification Search
  CPC ... H01L 27/10805; G11C 16/22; G11C 16/20; G11C 13/0059; G11C 7/24
  See application file for complete search history.

(56) References Cited

U.S. PATENT DOCUMENTS

| | | |
|---|---|---|
| 2013/0101114 A1 | 4/2013 | Kim et al. |
| 2014/0108786 A1* | 4/2014 | Kreft ........................ G06F 21/71 713/156 |
| 2015/0092777 A1* | 4/2015 | Watanabe ......... H01L 29/78696 370/392 |
| 2015/0207627 A1 | 7/2015 | Yamamoto et al. |
| 2016/0154979 A1 | 6/2016 | Kim et al. |
| 2016/0373264 A1* | 12/2016 | Katoh ..................... H04L 9/3278 |
| 2017/0242660 A1* | 8/2017 | Katoh ................. G11C 13/0059 |

OTHER PUBLICATIONS http://business.nikkeibp.co.jp/article/world/20140717/268842/), 4 pages, Jul. 22, 2014, Nikkei Business Publications, Inc.
http://www.ge.com/jp/industrial-internet, 3 pages, 2017, General Electric.
Technitium MAC Address Changer, 3 pages, https://technitium.com.
tsensorssummit.org, 1 page, GoDaddy.com.

* cited by examiner

| input code | registration code |
|---|---|
| RTSDEDDTAG!$&D(() | oq&\|QX5'Xj*LS]e{\|CY |
| | C(Y6;sHWLnp!L+5P[+@ |
| | p;A18;6Nd[ic8a"+.SO |
| | wG;x'5@/O(GM";ODS+K |
| | ... |
| OD$zD)X=Fpgd[_&x.*n | LJ/z5J@e$q9mhd0/9Mx |
| | _p]Q\|9ecbe{2Ieq=!?E |
| | u+x~53cvmJfyvZ"GzI# |
| | cb9KvCaB7p~uzUwM+Pb |
| | ... |
| ... | |

FIG. 19 input code: $(a(i), b(j))$ output code: $c(i,j) = mod(a(i) + b(j) + d(i,j), 2)$ random number → $d(i,j)$

| $a(i)$ | $b(j)$ | $d(i,j)$ | $c(i,j)$ |
|---|---|---|---|
| 0 | 0 | 0 | 0 |
| 0 | 0 | 1 | 1 |
| 0 | 1 | 0 | 1 |
| 0 | 1 | 1 | 0 |
| 1 | 0 | 0 | 1 |
| 1 | 0 | 1 | 0 |
| 1 | 1 | 0 | 0 |
| 1 | 1 | 1 | 1 |

FIG. 25

ELECTRONIC APPLIANCE AND NETWORK OF THE SAME

CROSS REFERENCE TO RELATED APPLICATIONS

The application claims the benefit of U.S. provisional application No. 62/362,639, filed on Jul. 15, 2016, and the entire contents of which are incorporated herein by reference.

BACKGROUND OF THE INVENTION

1. Field of the Invention

The present disclosure generally relates to a method of physical chip identification to be used during the communication between the electronic apparatuses in Ethernet.

2. Description of the Related Art

In general, the information communication by using internet may be the exchange of the properly-divided pieces of data (protocol data unit) shared among the information terminals (nodes) in the network. Those pieces of divided data may be attached with controlling information which is necessary to the management in the network. The configuration of those pieces of data and the controlling information may be called "format." The format itself and the usage of the format may be regulated with one of procedures called "protocol." Any two information terminals that exchange information with each other may have to deal with data under the format that has a certain degree of consistency among those terminals.

The terms that are generally used to describe the protocol data unit may be "frame," "packet," "segment," and so forth. These terms are separately used in different communication hierarchies.

The hierarchy structure (communication hierarchy) may be defined according to the design concept of the entire network system. The following structure may be a typical example. From the bottom layer up, there may be the physical layer (layer 1), the data link layer (layer 2), the network layer (layer 3), the transport layer (layer 4), and the upper layer (layer 5). However, this hierarchy is merely one of the examples. Under a different design concept, for example, the transport layer may be further divided into three layers and then the number of the total layers may be seven, as is well-known. Anyway, the protocol data unit may be generally called "frame" in the data link layer (layer 2), "packet" in the network layer (layer 3), and "segment" in the transport layer (layer 4).

Those five layers may be described below.

To constitute a network as a physical form, the information apparatuses which serve as network nodes and the signal transmission pathways that connect the nodes to each other are indispensable. The signal transmission pathways may be either wired or wireless. Moreover, there may be several kinds of signals. For example, it may be roughly divided into electrical signal and optical signal. In other words, the nodes may be physically connected each other via wired/wireless signal transmission pathways, or via electrical/optical signal transmission pathways. Such a physical connection and transmission may be carried out in the physical layer (layer 1).

Even though the connection structure of the network is generally complex, both ends of a signal transmission pathway may have to be terminated by two nodes, respectively. The protocol data unit may be a mass of data to transmit through a plurality of signal transmission pathways. Accordingly, the two nodes that respectively terminate the two ends of one signal transmission pathway (e.g., a first node and a second node) may be subject to protocols which may be consistent with each other to some extent. If the protocols to which these nodes are subject are inconsistent, this signal transmission pathway may not be regarded as connecting the first and second nodes.

FIG. 1 illustrates a concept of transmission method of a protocol data unit. An original data to be converted (coded) into a protocol data unit may be input to a first node 2001 constituting a part of the network. The first node 2001 may be, for example, a computational terminal having a console, such as a keyboard, a mouse, a display and so forth. The first node 2001 may also be a tablet, a mobile phone, a smart phone, a terminal with a card reader, a scanner, a digital camera with net connection function, a sensor, and so forth. All of those information apparatuses may obtain some kind of information, convert it into protocol data unit, and then send it to signal transmission pathway 1000. By this way, a node which may have some kind of connection to the exterior of the network may be regarded as a peripheral node. In the case of FIG. 1, the first node 2001 may be an example of a peripheral node.

In a peripheral node (e.g., the first node 2001), the information that input from the exterior of the network may be digitized. Subsequently, it may be converted into a protocol data unit according to a predetermined format. Alternatively, in the case that the information digitized in advance is input to a peripheral node, it may be converted into a protocol data unit according to a predetermined format. Anyway, the protocol data unit may be sent via the signal transmission pathway 1000 to another node whose format has a certain degree of consistency with the peripheral node (e.g., the first node 2001). In the example of FIG. 1, the second node 2002 may be the node to receive the signal.

The node in the opposite side of the signal transmission pathway 1000 (e.g., the second node 2002) may receive the above-mentioned protocol data unit and then converts it back into the digital data (i.e., decoding).

In the case that the above-mentioned first node 2001 is not a peripheral node, the first node 2001 may receive some kind of digital information from another node (e.g, a third node 2003) in the network. The digital data may be a protocol data unit coded by the third node 2003. The first node 2001 may decode this protocol data unit back to the original digital data according to a predetermined format. Hence, the predetermined format to which the first node 2001 is subject may have a certain degree of consistency with the format to which the third node 2003 is subject. However, in the case that this first node 2001 serves as a relay apparatus as described below, instead of decoding the protocol data unit, the first node 2001 may append the information related to the first node (e.g., the information indicating the protocol data unit that is transmitted via the first node) to the protocol data unit and then send the protocol data unit along the with appended information to the second node 2002 via the signal transmission pathway 1000. In this case, the format to which the second node is subject may have a certain degree of consistency with the format to which the third node 2003 is subject.

First of all, the information that is input from the exterior of the network or from the third node 2003 to the first node 2001 may be converted into a protocol data unit according to a predetermined format, which is then transmitted to the second node 2002 via the signal transmission pathway 1000. The second node 2002 may execute the inverse transformation (decode) of the received protocol data unit according to a predetermined format which may have a certain degree of consistency with the format to which the first node is subject. As a result, the original information before being input to the first node 2001 may be reproduced. This is a basic structure of the signal transmission of data. By doing so, mass of data converted (coded) into the protocol data unit may be sent and received in the network.

In the above, the data transmission has been described in one direction from the first node 2001 to the second node 2002, the usage of the protocol may be the same in the opposite direction of the transmission. For example, the first node 2001 and the second 2002 in FIG. 1 may swap their positions. In that event, first of all, the information that is input from the exterior of the network or from the third node 2003 to the second node 2002 may be converted into a protocol data unit according to a predetermined format, which is then be transmitted to the first node 2001 via the signal transmission pathway 1000. The first node 2001 may execute the inverse transformation of the received protocol data unit, and then reproduce the original data before being input to the second node 2002.

FIG. 2 illustrates the relationship between the layer hierarchy and the data structure. The original data before transmission may be divided into pieces with proper sizes. Hereinafter, these pieces of divided data may be simply called "data." At this moment, the layer in which data exists may be the upper layer (layer 5).

Next, a transmission control protocol header (TCP header) may be appended to this data. The TCP may be an abbreviation for Transmission Control Protocol and is a type of protocol. By doing so, the data with TCP header may be called "segment." The communication layer that deals with the segment may be the transport layer (layer 4).

In the case that the communication corresponding to FIG. 1 is that in the transport layer (layer-4), the protocol data unit may be segment and then the transformation protocol may be TCP. If the first node 2001 receives the data, then it may append a TCP header to the data according to the TCP format and then form a segment. This segment may be transmitted to the second node 2002 via the signal transmission pathway 1000. The second node 2002 may receive the segment and then decode it according to the TCP format to reproduce the original data. More specifically, the second node 2002 may remove the TCP header.

In the network layer (layer 3), an internet protocol header may be appended to segment. In this case, the protocol data unit may be called "packet" and the protocol may be IP. The IP protocol may be IPv4 and IPv6 according to the version.

In the case that the communication corresponding to FIG. 1 is that in the network layer (layer 3), the protocol data unit may be a packet and the transformation protocol may be IPv4, IPv6 and so forth. If the first node 2001 receives a data (segment in this case), it may append an IP header to the segment according to the format of IPv4 or IPv6 and then form a packet. This packet may be transmitted to the second node 2002 via the signal transmission pathway 1000. The second node 2002 may receive this packet and then execute the inverse transformation (decoding) of the packet according to the format of IPv4 or IPv6 to reproduce the original segment. More specifically, it may remove the IP header. Or it may further remove the TCP header to reproduce the original data.

In the data link layer (layer 2), an Ethernet protocol header (Ethernet header) may be appended to a packet. In this case, the protocol data unit may be called "frame" and the protocol may be Ethernet.

In the case that the communication corresponding to FIG. 1 is that in the data link layer (layer-2), the protocol data unit may be frame. If the first node 2001 receives the data (packet in this case), it may append an Ethernet header to the packet according to the format of Ethernet and then form a frame. In addition, a frame check sequence (FCS) may be appended in the format of Ethernet, in order to check whether or not the packet may have been appropriately received. By doing so, the formed frame may be transmitted to the second node 2002 via the signal transmission pathway 1000. The second node 2002 may receive the frame and then execute the inverse transformation of the frame (decode) to reproduce the original packet. More specifically, the second node 2002 may check the FCS to confirm if the packet has been appropriately transmitted or not. The second node 2002 may also execute the procedure of restoration or retransmission as necessary. If it is confirmed that the packet has been appropriately transmitted, the second node 2002 may remove the Ethernet header and the FCS.

In the Ethernet standardization, the conversion in the lowest layer, i.e., the physical layer (layer 1) may be also defined. Namely, the conversion to an optical or electrical signal is defined. The converted frame may be passed to the line such as 10BASE-T.

The communication hierarchies (which are referred to "communication layers" or "layers" hereinafter) may be completely independent from each other, because they have a nested relation. More specifically, as shown in FIG. 2, the format of segment (with only TCP header attached to data) in the layer 4 (transport layer) may include the format of layer 5 (upper layer), i.e., only the data with no conversion. This may be because that the segment is not formed by irreversibly combining TCP header with the original data but by simply attaching the TCP header to the original data. Similarly, the format of the packet (with only IP header attached to segment) in the layer 3 (network layer) may include the format of layer-4 (transport layer), i.e., the segment. This may be because that the packet is not formed by irreversibly combining IP header with the segment but by simply attaching the IP header to the segment. Furthermore, the format of frame (with only Ethernet header and FCS attached to the packet) in the layer-2 (data link layer) may include the format of layer-3 (network layer), i.e., the packet. This may be because that the frame is not formed by irreversibly combining the Ethernet header, FCS, and packet together, but by attaching the Ethernet header and FCS to the packet.

In other words, no change happens in the upper communication layers even by replacing or changing the protocols or formats in the lower communication layers. For example, in FIG. 2, the TCP header and the original data (i.e., segment) may be unchangeable even by replacing IPv4 to IPv6 in the IP header of the layer-3 (network layer). In other words, the layer 4 (transport layer) may be free from any change in the layer-3 (network layer). The layer 5 (upper layer) may be also free from any change in the layer 3 (network layer) subsequently to the layer 4.

In a similar way, the original data may be unchangeable even by replacing the TCP header to another one. That is, the layer 5 (upper layer) may be free from any change in the layer 4 (transport layer). Furthermore, the packet may also be unchanged even by replacing the Ethernet header with another one. For example, the packet may be unchangeable even by changing the protocol from Ethernet to point-to-point (PPP). Accordingly, the layer 3 (network layer) may be free from any change in the layer-2 (data link layer). The layer 4 (transport layer) may be also unchangeable subsequently to the layer 3 (network layer). The layer 5 (upper layer) may be unchangeable subsequently to the layer 4 (transport layer).

Furthermore, something may be changed in the layer 1 (physical layer). For example, the signal transmission pathway may be changed from optical fibers to wireless LAN. Even in this case, the contents of the information (e.g., frame) which are transmitted via wireless LAN may be the same as the contents of the information (frame) which is transmitted via optical fibers. In other words, the layer 2 (data link layer) may be free from any change in the layer 1 (physical layer).

The layer-3 (network layer) may be also unchangeable subsequently to the layer-2 (data line layer). No change happens in the layer 4 (transport layer) subsequently to the layer 3 (network layer). No change happens in the layer 5 (upper layer) subsequently to the layer 4 (transport layer).

By this way, it may be found that no change happens in any upper communication layers even by changing something in any lower communication layer. This is a design that will not hinder the development of the future technological innovations.

On the other hand, the present disclosure may be related to physical layer and data link layer in the bottom layers. Base on the reason like this, the present disclosure may not affect any data to be transmitted.

The protocols adopted in the same layer may have to be consistent with each other. However, they may not be necessary to be consistent with each other as long as they belong to different layers. In other words, to design layers is to design the relationship among a plurality of protocols. In the above, the physical layer and the data link layer (layer 1 and layer 2) are different from each other. However, in another concept of layers, they may be regarded as one layer by making them subject to a common Ethernet protocol. In this case, the number of the layers may decrease as 4 by 1. Moreover, the formats of the transport layer (layer 4) and the network layer (layer 3) may be also combined and then called "TCP/IP format." Or there may be an opposite concept to divide the layers. For example, in OSI reference model, the upper layers may be further divided into three, which may be a session layer (layer 5), a presentation layer (layer 6), and an application layer (layer 7) from the bottom up.

In the case that the information is input from the exterior of the network to the first node 2001 as shown in FIG. 1, the original data has been divided into pieces having a predetermined length. The data may be formatted according to the TCP/IP format and then converted to packets. A packet may be converted into a frame according to the Ethernet format. In the physical layer (layer 1), this frame may be sent and received as wired, wireless, optical or electronical signal via the signal transmission pathway 1000 having physical substance. Hence, the first node 2001 and the second node 2002 may be information apparatuses having physical substances.

Next, in the case that a packet is input from the third node 2003 in the network layer (layer 3) to the first node 2001, this packet may be converted into a frame according to the Ethernet format and then sent to the second node 2002 via the signal transmission pathway 1000. Hence, all of the first node 2001, the second node 2002, and the signal transmission pathway 1000 may have physical substances.

Subsequently, in the case that a segment is input from the third node 2003 in the transport layer (layer 4) to the first node 2001, this segment may be converted into a packet according to the IP format and then sent to the second node via the signal transmission pathway 1000.

Hence, all of the first node 2001, the second node 2002, and the third node 2003 may be logical substances and not related to any physical substances. For example, those may be virtual nodes allocated to operating systems. Thus, the signal transmission pathway 1000 may be also a virtual transmission pathway and not beyond and may have no relation to any physical substance.

In other words, in the network of the TCP/IP format (network layer), both nodes and signal transmission pathways may be logically defined, and then may be virtual substances and are not related to any physical substances. On the contrary, in the network of the Ethernet format (data link layer), both nodes and signal transmission pathways may have physical substances. For example, the answer to the question: "which terminal this node corresponds to?" or "which LAN cable the signal transmission pathway corresponds to" may be actually found.

In FIG. 3, there may be a fourth node 2004 between the first node 2001 and the second node 2002. Some kind of data may be input from the exterior of the network or from the third node 2003 to the first node 2001. The first node 2001 may connect to the fourth node 2004 via the first signal transmission pathway 1001. The fourth node 2004 may connect to the second node 2002 via a second signal transmission pathway 1002.

The connection of the first node 2001 and the fourth node 2004 via the first signal transmission pathway 1001 may be almost similar to that of the first node 2001 and the second node 2002 via the signal transmission pathway 1000 as illustrated in FIG. 1. However, the fourth node 2004 may work partially different. In other words, in the case that the fourth node 2004 may serve as a relay between any two nodes (e.g., a relay between the first node 2001 and the second node 2002), as shown in FIG. 3, the fourth node 2004 may be able to transfer a protocol data unit, which is input from the first node 2001 via the first signal transmission pathway 1001, to the second node 2002 via the second signal transmission pathway 1002 with no decode. Or, the fourth node 2004 may transfer the protocol data unit with some kind of editing.

By this way, the data that is input to the first node 2001 from the exterior of the network or the third node 2003 may be converted into a protocol data unit according to a predetermined format in the first node 2001. The protocol data unit may be then transmitted to the fourth node 2004 via the first signal transmission pathway 1001. The fourth node 2004 may not execute the inverse transformation (decoding) and then transmit the protocol data unit to the second node 2002 via the second signal transmission pathway 1002.

Alternatively, a part of the received protocol data unit (such as the header) may be edited and then transmitted to the second node 2002 via the second signal transmission pathway 1002. The second node 2002 may execute the inverse transformation of the received protocol data unit according to a predetermined format, and then reproduce the data before being input to the first node 2001. Hence, the predetermined format conformed by the second node 2002 may have a certain degree of consistency with that conformed by the first node 2001.

More specifically, in the case that the fourth node 2004 edits and then transmits a received protocol data unit to the second node 2002 via the second signal transmission pathway 1002, the header associated to the layer under consideration may be edited and then transmitted.

For example, in the case that the fourth node 2004 belongs to the data link layer (layer 2), a frame may be transmitted after editing the Ethernet header. More specifically, at least the identification of the fourth node 2004 serving as relay may be attached to the frame. Those relay locations may be regarded as the addresses having physical substances (physical addresses). Those physical addresses may be called, particularly, MAC address. The MAC addresses may be inherent to an Ethernet apparatuses (e.g., Ethernet cards).

Alternatively, in the case that the fourth node 2004 belongs to the network layer (layer 3), a packet may be transmitted after editing the TCP/IP header. For example, at least the identification corresponding to the system of the fourth node 2004 serving as the relay may be attached to the packet. Anyway, this may enable for tracing via which nodes this protocol data unit has been transmitted when the second node 2002 receives it. Those relay locations may be regarded as the addresses having no physical substances (logical address). This logical address may be called, particularly, IP addresses. The IP addresses may be, for example, inherent to the operating systems.

It may be self-evident that the physical address and the logical address differ from each other. For example, an electronic apparatus constituting the fourth node may be replaced. In this case, the operating system of the electronic apparatus constituting the fourth node before the replacement (old electronic apparatus) may have to be re-installed to the electronic apparatus constituting the fourth node after the replacement (new electronic apparatus). Thus, the physical address which is an intrinsic identification of the electronic apparatus having the physical substance may be changed. On the other hand, the IP address intrinsic to the operating system may be handed over by the fourth node after the replacement. This may be one of reasons that the logical network (TCP/IP network) is extensively adopted.

In the example of FIG. 1 and FIG. 3, the first node 2001 and the second node 2002 may be exchanged. In other words, the data that is input from the exterior of the network or from the third node 2003 to the second node 2002 may be converted into a protocol data unit according to a predetermined format, which is then transmitted to the fourth node 2004 via the second signal transmission pathway 1002. The fourth node 2004 may transfer the received protocol data unit to the first node 2001 with no inverse transformation (decoding) via the first signal transmission pathway 1001.

Or, the fourth node 2004 may edit the received protocol data unit according to a predetermined format and then transmit it to the first node 2001. The first node 2001 may execute the inverse transformation of the received protocol data unit (decoding) according to the predetermined format, and then reproduce the original data before being input to the second node 2002. Hence, the predetermined format that the first node 2001 conforms may have a certain degree of consistency with that the second node 2002 conforms. The figures to illustrate it may be self-evident from FIG. 3 and thus omitted. Hence, the edition with the predetermined method may imply, for example, that the physical address or the logical address of the fourth node is attached to the protocol data unit.

There may be more than one signal transmission pathways connecting to the nodes in the network. In other words, as shown in FIG. 3, the fourth node 2004 may connect to two signal transmission pathways (the first signal transmission pathway 1001 and the second signal transmission pathway 1002). FIG. 4 illustrates another example. In other words, the first node 2001 may connect to one ends of the four signal transmission pathways (the first signal transmission pathway 1001, the second transmission pathway 1002, the third signal transmission pathway 1003, and the fourth signal transmission pathway 1004). The other ends of those signal transmission pathways may connect to the second node 2002, the third node 2003, the fourth node 2004 and the fifth node 2005, respectively.

Furthermore, the fourth node 2004 may connect to the sixth node 2006 via the fifth signal transmission pathway 1005. Of course, FIG. 4 illustrates a part or one of the examples of the complex network structures. In general, a large scale and a complex network structure may be constructed by connecting a plurality of nodes to a plurality of other nodes.

However, referring to FIG. 5, no matter how large and complex the network structure is, the element of the network may be one signal transmission pathway, with the ends of which terminated by two nodes. This may definitely imply that the elements of the network include at least two nodes and one signal transmission pathways. The above mentioned protocols may be defined per element. Accordingly, an aggregation of elements provided with the same or similar protocols which are consistent with each other may belong to a same communication layer. A plurality of elements belonging to a same communication layer may be able to form a local area network (LAN). The first invented LAN is a network by Ethernet and bunches the data link layer (layer 2). From such a historical background, LAN and Ethernet may be regarded almost as synonymous words.

The information apparatuses connecting to the LAN as nodes may be respectively allocated with the intrinsic management numbers (MAC address) according to the Ethernet protocol. Hence, MAC is an abbreviation of media access controller. In other words, a frame may be formed by attaching the MAC addresses of the sender and receiver and the FCS to a packet as an Ethernet header or a part of its header. In other words, a network formed by the information apparatuses (having physical substance) that are connected to each other based on the MAC addresses may be a network in the data link layer, that is, LAN.

Referring to FIG. 5, the first node 2001 and the second node 2002 may be the information apparatuses that are connected to each other via Ethernet. Hence, the protocol data unit may be a frame. In the case that a frame is transmitted between those two information apparatuses, both the information apparatuses of the receiver (e.g., the second node 2002) and the sender (e.g., the first node 2001) may be subject to the Ethernet protocol. In other words, the management number of the first node 2001 may be the MAC address of the sender and the management number of the second node 2002 may be the MAC address of the receiver. FIG. 5 illustrates an element of a network and is a part of a much more complex network. For example, the first node 2001 may connect to $2^{nd}$-$5^{th}$ nodes (2002, 2003, 2004, 2005), as shown in FIG. 4.

Hence, it may be assumed that all nodes are subject to a same protocol. For example, the first node may send the above-mentioned frame via the first to fourth signal transmission pathways (1001, 1002, 1003 and 1004). It may be assumed that the MAC address of the receiver, which is included in the Ethernet header of the frame to be transmitted, is the MAC address of the second node 2002 for example. The third node 2003 may check the MAC address of the receiver of this frame and does not receive it. The fourth and fifth nodes (2004 and 2005) may not receive it, either. Only the second node 2002 may receive it. Furthermore, the second node 2002 may know that this frame was sent from the first node 2001 by checking the MAC address of the sender.

The case may be assumed that the first node 2001 codes a frame and sends it to the second node 2002, and that the second node 2002 receives the frame and decodes it to reproduce the original packet. Referring to FIG. 1 as example, the packet may be input from the exterior of the network or from the third node 2003 to the first node 2001. The first node 2001 may attach the MAC address of the first node as the sender and the MAC address of the second node as the receiver to this packet. Furthermore, FCS may be attacked to form the frame. The frame formed like this way may be transmitted to the second node 2002 via the first signal transmission pathway 1000.

If the frame arrives at an information apparatus of the receiver (the second node 2002) according to the MAC address, the receiver may decode the frame according to the Ethernet protocol and then reproduce the digital information before being input to the data link layer (packet). Hence, the receiver may be permitted to request the repairing or the retransmission as necessary according to the FCS. In the case of no retransmission, the transmission of the packet in the data link layer may be completed as a result. To decode in the data link layer may be to remove the excess codes attached to the original digital data (packet) such as MAC addresses and FCS according to the Ethernet protocol. The receiver (the second node 2002) may be able to check the controlling information of the sender with the received frame and then decide whether to decode or transmit it.

The reproduced digital information may be a piece of data in the TCP/IP format, that is, a packet. It may be called an IP packet which may be equivalent to the digital data before being coded by the first node 2001 as the sender. As mentioned above, packet may be a unit of communication data in the network layer (layer 3). The protocol in the network layer may be IP protocol (i.e., IPv4 or IPv6).

In the case that an element of the data link layer (layer 2) may be formed by FIG. 1 and FIG. 5, Ethernet header may be like an envelope. The MAC address of the receiver may be like an address of the destination written in the envelope. The MAC address of the sender may be like an address of the sender written in the envelope. The FCS may be like a contents-certification. Hence, the contents of the envelope may be a packet. Accordingly, to code a packet with the Ethernet may be to enclose the packet in the envelope in which the addresses of the sender and receiver are written. To decode a frame may be to open the envelope. The contents in the envelope and the items written in the envelope may be independent from each other. This may correspond to the independency of layers, which is mentioned above. For example, the contents of the envelope may be unchangeable, even though the house number or the name of the town is changed due to the land readjustment.

In the case that FIG. 1 and FIG. 5 may form an element of an upper layer by one (network layer), the envelope may be an IP header. The IP header may contain an IP address being the addresses of the sender and receiver in the network layer. The contents of the envelope may be a segment. To attach the IP header may be to enclose the segment. On the other hand, to remove the IP header may be to open the envelope. Actually, those IP addresses may be allocated with a certain relation to an upper layer by one (transport layer). In this case, the contents of the envelope may be a piece of divided data.

The MAC address may be called physical address since each MAC address may be allocated to an actual information apparatus (the node of physical substance). Any piece of the digital data linked to some kind of physical substance may be therefore allocated with MAC address. In contrast, IP addresses may not always be related to the physical substances. In other words, the IP address may be allocated to a node which the operating system logically defines, and then called logical address. By this way, MAC address as well as IP address may be attached to a piece of the digital data (protocol data unit) which goes through at least one information apparatus with physical substance while transmitting on the internet.

Thus, the MAC address which is a management number of the information apparatus may be used as like a backstage pass, in contrast to the IP address which is an address on the internet (e.g., destination of packet). In other words, information may be sent to the interior of a lump of the networks on the internet (e.g., LAN). Apparatuses inside this network, or stem nodes or routers which may manage the network may receive the frames from only the information apparatuses that have been registered in advance. The MAC address of the sender may be confirmed to distinguish whether or not the corresponding frame actually comes from the apparatuses registered in advance. Only by confirming that the sender is registered in advance can the envelope arriving at the receivers be opened (i.e., the frame is decoded) to receive the packet. Otherwise, the envelope may not be opened (i.e., the frame is not decoded).

MAC address may be allocated to an Ethernet card equipped in the information apparatus as an intrinsic management number. It is standardized by Institute of Electrical and Electronics Engineers (IEEE) with the length being 48 bits (6 bytes). Accordingly, it may be formed of sequences whose information volume is more than 280 trillion. One bit among them may be allocated to a so-called UL bit. In the case that the MAC address is a global address, UL bit is 1 and, otherwise, is 0. In other words, in the case of global address (UL bit=1), MAC addresses may have to be allocated with no duplication all over the world. It should be noted that the MAC addresses may have to be allocated with no duplication to not only the information apparatuses that are being used on active service but also those having been disposed or lost. It may be because that the MAC addresses may be respectively allocated to the information apparatus with physical substance.

Another bit among the 48 bits may be allocated to a so-called IG bit. In the case that the IG bit is 0, it may indicate a unicast communication and otherwise a multicast communication. The unicast communication may be that a frame is sent to a unique destination in the network of a plurality of information apparatuses. In contrast, the multicast communication may be that a frame is sent to a plurality of destinations in the network. By this way, 46 bits after removing those two bits of UL bit and IG bit from 48 bits may be the actual freedom of the MAC addresses to be allocated. It may be about 70 trillions in amount. The 48 bits including those two bits of UL bit and IG bit may be divided by six 8-bits and then each 8 bits (one byte) may be represented by hexadecimal.

In FIG. 6, a typical example of an Ethernet card may be illustrated. An Ethernet card 3000 may include mainly a nonvolatile memory 3010 storing MAC address and a chip of operational processing unit for media access controller (MAC) 3020. The Ethernet cards may be, in general, implemented into information apparatuses to be connected to each other via LAN and so forth.

Due to this, it may be called LAN board or LAN card. However, the standardization of LAN card or LAN board almost conforms with the Ethernet format, and the Ethernet card and the LAN card are synonymous. FIG. 6 illustrates an example where an Ethernet card is equipped in a printer, a router, or a desktop personal computer and so on. There may be an Ethernet connector at the backside of the Ethernet card. Thus, the connector may be exposed at the backside of the information apparatuses equipped with the Ethernet card. A LAN cable may be inserted into this Ethernet connector. Alternatively, an antenna may be attached to the Ethernet card and then the corresponding information apparatus may be connected by wireless LAN. A basic structure may be similar to this example in the case that the Ethernet card is connected to different information apparatuses.

In the case when the information apparatus boots or when the information apparatus is connected to the network in a wired/wireless manner, the operating system of the information apparatus may read the MAC address from a nonvolatile memory 3010 equipped on the Ethernet card. A main processing unit of the information apparatus may write this MAC address to a chip of the processing unit for media access controller (MAC), which is equipped in the Ethernet card. When a data is sent from the information apparatus (sender) to another information apparatus (receiver) connected to the network, the MAC address written into the chip of the processing unit for media access controller (MAC) may be attached to the frame as a MAC address of the sender. By this way, the operating system may allocate the MAC address to the information apparatus with physical substance (actually, Ethernet card). In this manner, the MAC address may not be defined regardless of the physical substance.

It may thus be found that the Ethernet card is an example of network cards to be used for connecting information apparatus to the network. In other words, an information apparatus may require at least one Ethernet card and at least one MAC address may be allocated to the Ethernet card. The number of the MAC addresses of the information apparatuses that have been used (spent MAC addresses) as well as being used on active service may be increased, as the number of the information apparatuses connecting to the internet is increasing.

On the other hand, the progress of the information and communication industry has been rapid since the beginning of the $21^{th}$ century. More recently, the vast market is being made. It may be expected that everything, such as home electric appliances, houses, cars besides information terminals, is connected to the network. It may be called Internet of Things (IoT) or Internet of everything (IoE), which may not belong to any existing market and then even change the social structure.

It may be regarded that, in such a super great Internet of Things, the number of the information apparatuses connecting to the network may be from several trillions to several ten trillions. Then, an era of trillion nodes may be coming soon. It may be expected in the concept of trillion nodes that the sensors connecting to the network are spread all over the world for collecting unpreceedingly detailed and great quantity of data. Thus, a plenty of social problems may be solved by analyzing the collected data with the advanced computing technology. This conceptual plan has been spread from an international conference called TSensors Summit held in 2013.

What may happen if the present Ethernet system is expanded to the Internet of Things with no revision? The MAC addresses may be allocated to the whole personal belongings as well as the conventional information apparatuses. Then, it may be spread all over the world. In other words, several trillions of MAC addresses may have to be allocated simultaneously with no duplication all over the world in the global mode (UL bit=1). However, this figure, i.e., several trillions, may be the number of the information apparatuses connecting to the network on active service. The number of the spent MAC addresses may become 10 trillions or more by the time the Internet of Things becomes popular, if the entire information apparatuses having been used in the past as well as out of use due to some kind of reason are considered. As mentioned above, the limit of the number of MAC addresses may be actually about 70 trillions. It may be just a matter of time that the MAC addresses are used up.

One of the solutions to avoid the depletion of MAC address may be the revision of the MAC address. For example, the MAC address may be deleted when the corresponding information apparatus is disposed, and those having not connected to the network for more than five years may be regarded as being disposed. Then, those MAC addresses may be reallocated to another information apparatuses. Indeed, the MAC addresses may be editable as necessary, as long as they are stored in nonvolatile memory chips. For example, in the operating system such as Widows VISTA, MAC address may be revised by the device manager. Also, there is also application tool in the network to revise the MAC address.

However, such a revision of MAC address may have to be executed with no duplication all over the world in the global mode (UL bit=1). Because it is concerned that the duplication of the MAC addresses will cause a malfunction of the network or make the network security vulnerable.

The nodes of the Internet of Things may include sensors to be used in trillion nodes as well as information apparatuses by which the personal end users uses to connect to the network. If the world population is seven billions, about 150 MAC addresses may surround a personal end user in average under the assumption that there are one trillion nodes all over the world. Among them, there may be less than 10 MAC addresses allocated to the information apparatuses by which a personal end user uses to connect to the network. The residual 140 MAC addresses may be out of management. Of course, the number of the nodes may be more than one trillion in the era of trillion nodes. In the developed countries, the average number of MAC addresses surrounding a person may be further much more than 150.

Some of those nodes may involve a system to control the apparatuses surrounding a person as well as personal information. Even while a trained expert tries to control the entire nodes spread all over the world, it may be extremely hard to simultaneously control more than several trillions nodes. If it was capable, then it would be a difficult problem who would control the central management system responsibly. It may not be preferable that one of private companies executes the central control selfishly. It may not be realistic at the present that the artificial intelligence having more ability than human beings executes the central control.

Which kind of problem may occur if none is able to control the entire nodes? For example, it may be possible for a malevolent hacker to hijack a node out of appropriate management and then to abuse the node as another person. If such a spoofing is rampant, it may be a big social problem. An expensive information apparatus may be protected by advanced security technology. However, as briefly explained in the above, the number of the information apparatuses under the control with the advanced security technology may be at most 10 per person in average. In contrast, the advanced security technology cannot be used to protect widespreasd sensors that are manufactured at as lower cost as possible. As mentioned above, the number of these sensors may be 140 per person in average, if the number of nodes reaches one trillion. In other words, a network user in near future may be surrounded by at least 140 incognita sensors while using 10 secure information apparatuses.

Briefly speaking, the sensors to be connected to the Internet of Things may be hacking devices themselves. Those may be used for social wellness in good faith, whereas the essence may be an endeavor to solve a social problem by using hacking technologies. It may be an opposite side of the same coin as malevolent hackers' attack.

Even though there is no malevolent hacker, the duplicate usage of the MAC address may cause a malfunction of the network. For example, two different sensors may collect different information and then send it to a server simultaneously. If those two different sensors accidentally have the same MAC address, the server may misunderstand that the two inconsistent information come from one sensor. For example, an object inspected by a first sensor is red and another object inspected by a second sensor is blue. If the first and second sensors' MAC addresses are overlapped, the information that this server receives may be that the color of the inspected object is simultaneously blue and red. If this is used for an auto-driving system, what may happen? A traffic light on a certain cross-point may be simultaneously red and blue.

It may be impossible for a logical address to fix such a problem. It may be because that the logical address is not related to any physical substance. In other words, as long as the Internet of Things is a network among nodes with physical substances, only the cumulative experience and effort of operating the network under TCP/IP format cannot appropriately manage the Internet of Things. By this way, it may be revealed that the problem to be solved for the industrial application of the Internet of Things (e.g., industry 4.0 and industrial internet) is essentially different from the expansion of the conventional information technology.

For example, there may be a plenty of manufacturing apparatuses in a production line in a factory. Those manufacturing apparatuses may cooperate with each other and then manufacture products. It may be indispensable to optimize the cooperation of the manufacturing apparatuses as well as to tune the setting of each manufacturing apparatus for improving the product yield. To improve such an optimization, the entire manufacturing apparatuses may be managed by a computer. For this purpose, all apparatuses may have to be connected to the factory network. There may be small and large apparatuses. Large apparatuses may be divided into a plurality of parts, and then each part may be connected to the factory network. The factory network may be enlarged as the factory is advanced and enlarged. In the conventional information technology, the computer program may execute the processes. In contrast, the cooperation control may be managed by the computer program, whereas the manufacturing processes may be executed by the equipment and apparatuses with physical substances.

Currently, the information terminals with such physical substances may be allocated with MAC addresses. Abovementioned duplication of MAC addresses may cause a malfunction of the manufacturing line. Optionally, a malevolent hacker may be capable of forcing the factory itself to stop the function by hacking. The breakdown of the factory of the main industry may be a national security issues. The damage cost may be equivalent to a large scale national disaster or direct attack by missiles.

On the other hand, the conventional security of the information communication on the internet may, for example, mainly aim at protecting the data transmitting through the signal transmission pathway 1000 in FIG. 5 and suppresses hacking a stem node by a combination of accounts and passcodes. Anyway, it may be regarded as encryption technology. It may be impossible for the encryption technology to matter which kind of physical substance is connected to the ends of the signal transmission pathway 1000 shown in FIG. 5. It may be because the conventional internet is actually a logical network. However, in the Internet of Things, the sender and receiver of the data may have to be identified as physical substances. Therefore, the physical identification may be necessary to identify the physical substances connecting to the ends of signal transmission pathway.

Briefly speaking, the MAC address may be an editable digital identification of an Ethernet card with physical substance. Then, there may be a method to regard the MAC address as digital identification for the Internet of Things. However, it may be a problem as previously shown that the MAC address is editable and will be used up soon. As shown in FIG. 6, the MAC address is essentially a code of 48 bits stored in a nonvolatile memory.

SUMMARY OF THE INVENTION

The present disclosure is therefore to provide a new physical address which may be allocated to the actual physical substance, and is non-editable and free of the problem of the limited number of identification.

The present invention adopts the following method in order to solve the above-mentioned problems.

A network of electronic apparatuses related to the present disclosure may include a plurality of network units of electronic apparatuses. A first network unit and a plurality of second network units are included. The first network unit may connect to at least one of the plurality of second network units by a topology. The network unit may include one stem node and a plurality of peripheral nodes connecting to the stem node. The stem node may store at least one passcode and a registration code list including a plurality of registration codes respectively corresponding to the peripheral nodes connected to the stem node. Each one of the registration codes may be generated by using the physical randomness intrinsic to each peripheral node in response to the passcode and then stored in the stem node in advance. In the first network unit, the plurality of peripheral nodes may include at least one chip as component and be respectively equipped with different chip identification devices. The chip identification devices may respectively send the stem server different output signals generated on the basis of physical randomness intrinsic to the chip identification devices in reply to the passcode received from the stem node. The stem node may inspect the validation of the peripheral nodes respectively corresponding to elements of the list of the registration codes by respectively comparing the output signals with the elements. In the first network unit, each of the plurality of chip identification devices may include a plurality of identification cells. The plurality of identification cells may respectively be semiconductor cells that are simultaneously manufactured in a manufacturing process of at least one same chip. In the first network unit, the chip may include at least one of module regions. The identification cells may be distributed over at least one of the module regions. The addresses of the identification cells may be defined by a word line group including a plurality of word lines and a bit ling group including a plurality of bit lines, which may include at least the one of module regions, respectively. In the first network unit, the identification cell may electrically output at least a first value and a second value in response to a predetermined electrical input and include at least two terminals. The first value may be regarded as being outputted if the value of the current flowing between the two terminals in response to a predetermined read voltage input is higher than a first threshold current. The second value may be regarded as being outputted if the value of the current is lower than a second threshold current. The first threshold current may be higher than the second threshold current. A third value may be regarded as being outputted if the value of the current is higher than the second threshold value and lower than the first threshold value. The addresses of the identification cells outputting the third value may be stored in a part of the memory region of the peripheral node. In the first network unit, the operating system booting the peripheral node may regard the output signal that the chip identification device may output in response to the passcode received from the stem node, or regard the password to be used for booting the operating system, as physically unclonable chip identification intrinsic to the peripheral node. In the first network unit, the physically unclonable chip identification attached to a predetermined format may be regarded as the physical address intrinsic to the peripheral node.

Alternatively, a network of electronic apparatuses related to the present disclosure may include a plurality of network units of electronic apparatuses. A first network unit and a plurality of second network units are included. The first network unit may connect to at least one of the plurality of second network units by a topology. The network unit may include one stem node and a plurality of peripheral nodes connecting to the stem node. In the first network unit, the stem node may store at least one passcode and a registration code list including a plurality of registration codes respectively corresponding to the peripheral nodes connected to the stem node. Each of the registration codes may be generated by using the physical randomness intrinsic to each peripheral node in response to the passcode and then stored in the stem node in advance. In the first network unit, the plurality of peripheral nodes may include at least one chip as component and are respectively equipped with different chip identification devices. The chip identification devices may respectively send the stem server different output signals generated on the basis of the physical randomness intrinsic to the chip identification devices in reply to the passcode received from the stem node. The stem node may inspect the validation of the peripheral nodes respectively corresponding to elements of the list of the registration codes by respectively comparing the output signals with the elements. In the first network unit, each of the plurality of chip identification devices may include a plurality of identification cells. The plurality of identification cells may respectively be semiconductor cells that are simultaneously manufactured in a manufacturing process of at least one same chip. In the first network unit, the chip may include at least one of module regions. The identification cells may be distributed over at least one of the module regions. The addresses of the identification cells may be defined by a word line group including a plurality of word lines and a bit ling group including a plurality of bit lines, which may include at least the one of module regions, respectively. In the first network unit, the identification cell may electrically output at least a first value and a second value in response to a predetermined electrical input and includes at least two terminals. The first value may be regarded as being outputted if the value of the current flowing between the two terminals in response to a predetermined read voltage input is higher than a first threshold current. The second value may be regarded as being outputted if the value of the current is lower than a second threshold current. The first threshold current may be higher than the second threshold current. A third value may be regarded as being outputted if the value of the current is higher than the second threshold value and lower than the first threshold value. The addresses of the identification cells outputting the third value may be stored in a part of the memory region of the peripheral node. In the first network unit, the addresses of the identification cells may be defined by the row numbers allocated to one of the word line group and the bit line group and the column numbers allocated to the other. If the irreversible errors happen in some of identification cells connected to the same row number, the corresponding row numbers may be selected and then stored in an inner memory of the peripheral node, the recorded contents may be regarded as physically unclonable chip identification of the peripheral node. In the first network unit, the physically unclonable chip identification attached to a predetermined format may be regarded as physical address intrinsic to the peripheral node.

Alternatively, a network of electronic apparatuses related to the present disclosure may include a plurality of network units of electronic apparatuses. A first network unit and a plurality of second network units are included. The first network unit may connect to at least one of the plurality of second network units by a topology. Each of the network units may include one stem node and a plurality of peripheral nodes connecting to the stem node. In the first network unit, the stem node may store at least one passcode and a registration code list comprising a plurality of registration codes respectively corresponding to the peripheral nodes connected to the stem node. Each of the registration codes may be generated by using the physical randomness intrinsic to each peripheral node in response to the passcode and then stored in the stem node in advance. In the first network unit, the plurality of peripheral nodes may include at least one chip as component and are respectively equipped with different chip identification devices. The chip identification devices may respectively send the stem server different output signals generated on the basis of physical randomness intrinsic to the chip identification devices in reply to the passcode received from the stem node. The stem node may inspect the validation of the peripheral nodes respectively corresponding to the elements of the list of the registration codes by respectively comparing the output signals with the elements. In the first network unit, each of the plurality of chip identification devices may include a plurality of identification cells. The plurality of identification cells may respectively be semiconductor cells that are simultaneously manufactured in a manufacturing process of at least one same chip. In the first network unit, the chip may include at least one of the module regions. The identification cells may be distributed over at least one of the module regions. The addresses of the identification cells may be defined by a word line group including a plurality of word lines and a bit ling group including a plurality of bit lines, which may include at least the one of module regions, respectively. In the first network unit, the identification cell may electrically output at least a first value and a second value in response to a predetermined electrical input and comprise at least two terminals. The first value may be regarded as being outputted if the value of the current flowing between the two terminals in response to a predetermined read voltage input is higher than a first threshold current and the second value may be regarded as being outputted if the value of the current is lower than a second threshold current. The first threshold current may be higher than the second threshold current, a third value may be regarded as being outputted if the current value is higher than the second threshold value and lower than the first threshold value. The addresses of the identification cells outputting the third value may be stored in a part of the memory region of the peripheral node. In the first network unit, the first and second values that the identification cells output in response to a predetermined electrical input may be subject to the Boolean algebra. In the first network unit, the addresses of the identification cells may be defined by the row numbers allocated to one of the word line group and the bit line group and the column numbers allocated to the other. An alternation cell may be allocated to each row number. In the first network unit, the first and second values that a plurality of identification cells connected to a same row number outputs may be processed with a predetermined operation on the basis of binary system. If the result is the first value, the alternation cell corresponding to the row number may be allocated with one of the first and second values, otherwise the alternation cell corresponding to the row number may be allocated with the other. The series of the data allocated to the alternation cells with regard to the row numbers may be regarded as physically unclonable chip identification intrinsic to the identification device. In the first network unit, the physically unclonable chip identification attached to a predetermined format may be regarded as physical address intrinsic to the peripheral node.

The present disclosure may be capable of producing non-editable physical addresses to be uniquely allocated to actual physical substances. The number of identification may not dry up even in the period of the Internet of Things.

BRIEF DESCRIPTION OF THE DRAWINGS

The present disclosure will become more fully understood from the detailed description given hereinafter and the accompanying drawings which are given by way of illustration only, and thus are not limitative of the present disclosure, and wherein:

FIG. 19 is an illustration describing an example of a correspondence chart of the input codes and the registration codes.

FIG. 25 is an illustration describing an example of a correspondence chart of the input code, the output code and the random number.

DETAILED DESCRIPTION OF THE INVENTION

Figure 7:
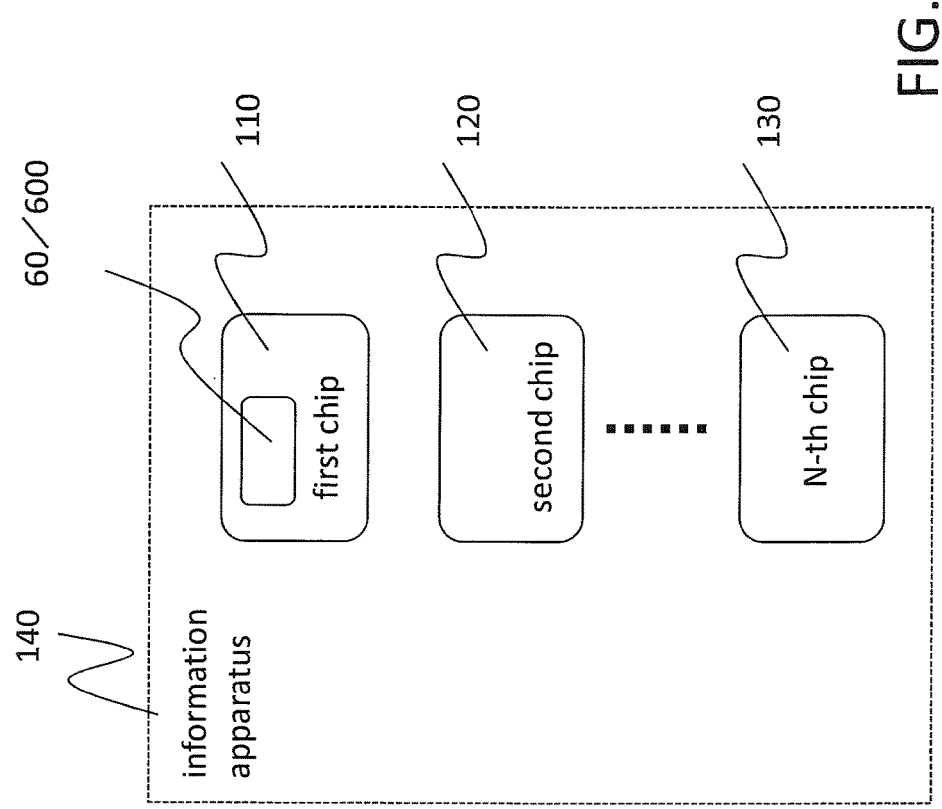
FIG. 7 is an illustration describing an example of a peripheral node comprising the chip identification device.
Figure 8:
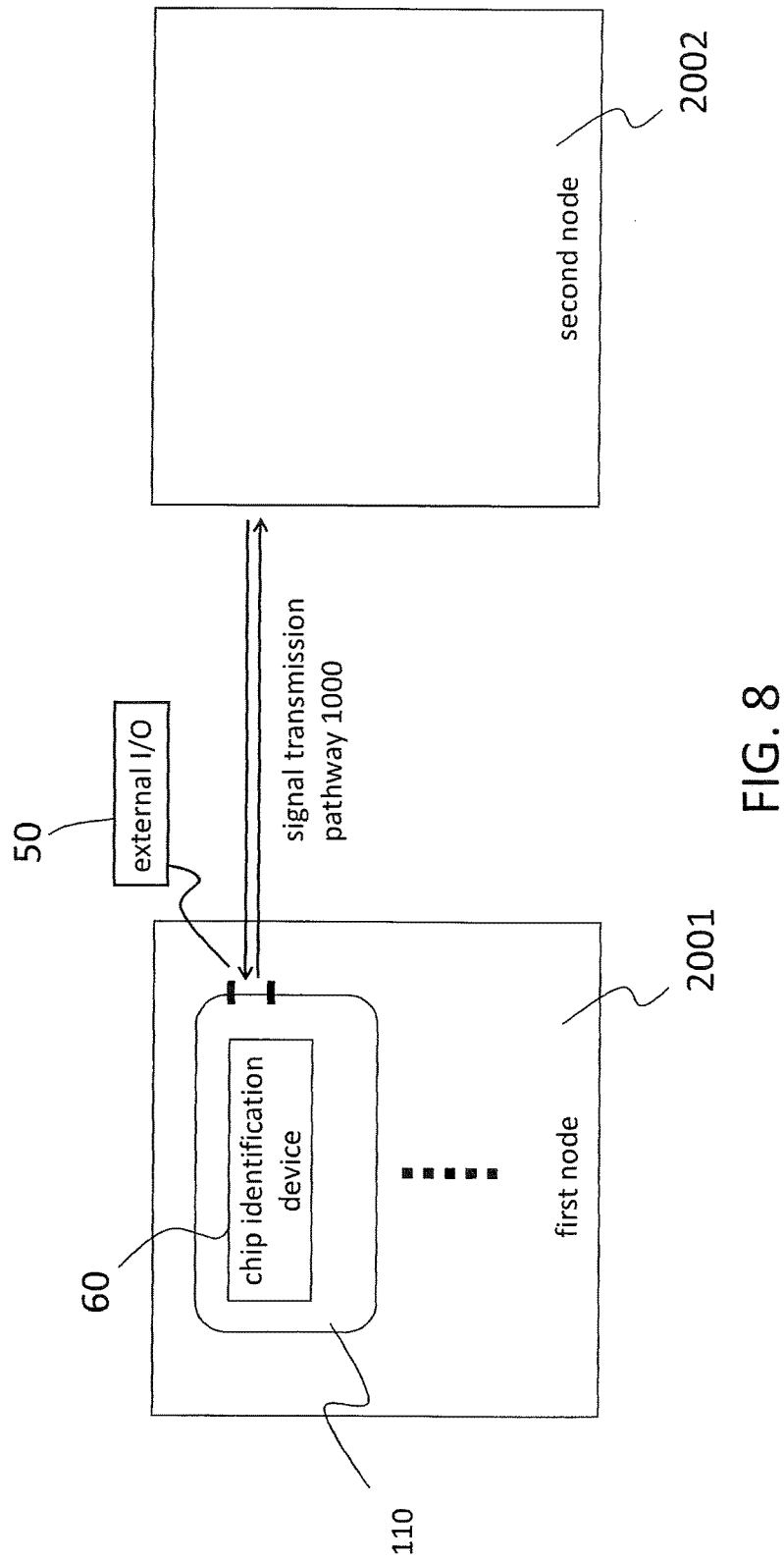
FIG. 8 is an illustration describing an example of an apparatus having a chip equipped with the chip identification device of the present disclosure.

FIG. 7 illustrates a basic structure of an information apparatus 140. For example, a plurality of semiconductor chips (e.g., N chips, the first chip 110, the second chip 120 . . . the $N^{th}$ chip 130) may be equipped in the information apparatus 140. In FIG. 8, this information apparatus 140 may be the first node 2001 which may connect to the second node 2002 via the signal tans mission pathway 1000. The chip 110 inside the first node 2001 may connect to the signal transmission pathway 1000 via the external input/output (I/O) 50. Hence, the first chip 110 may involve the chip identification device 60.

Figure 1:
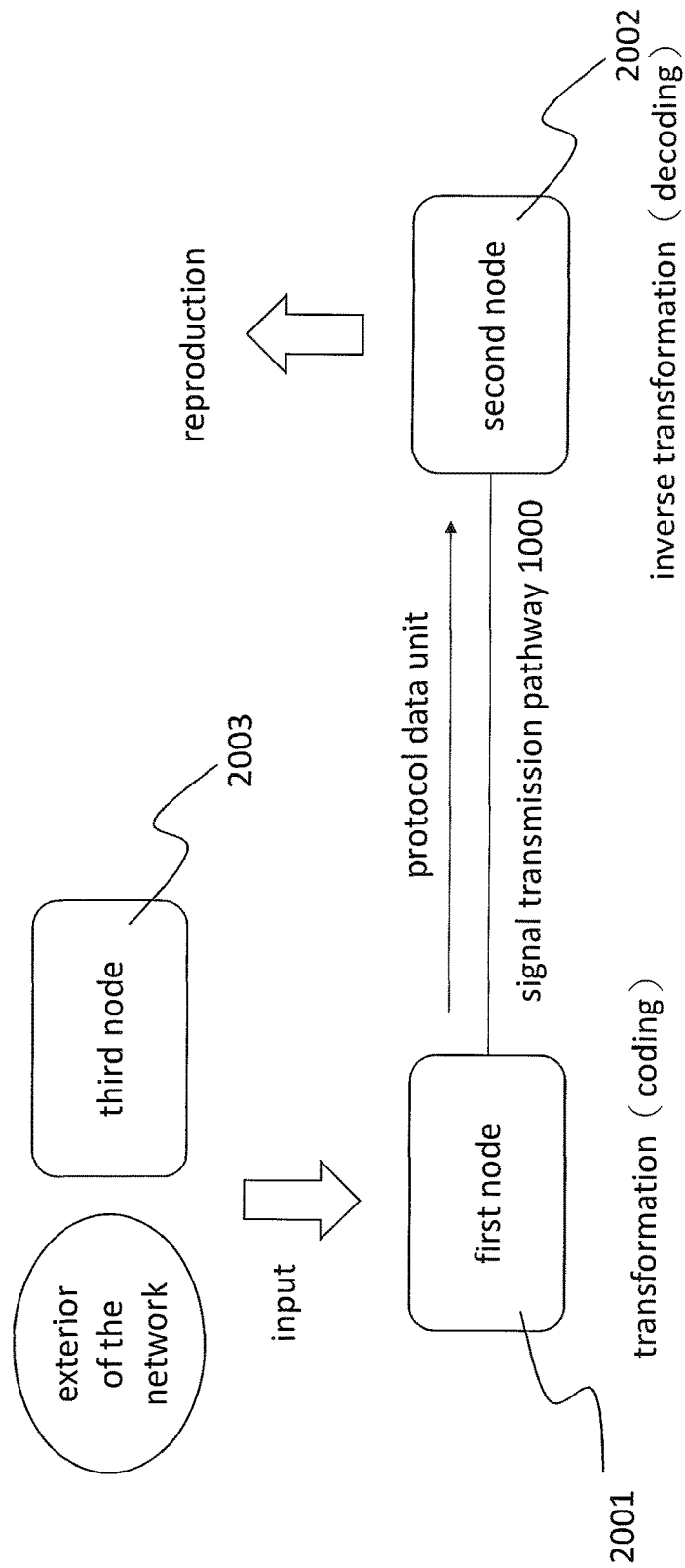
FIG. 1 is an illustration for describing an example of a transmission method of a protocol data unit.
Figure 2:
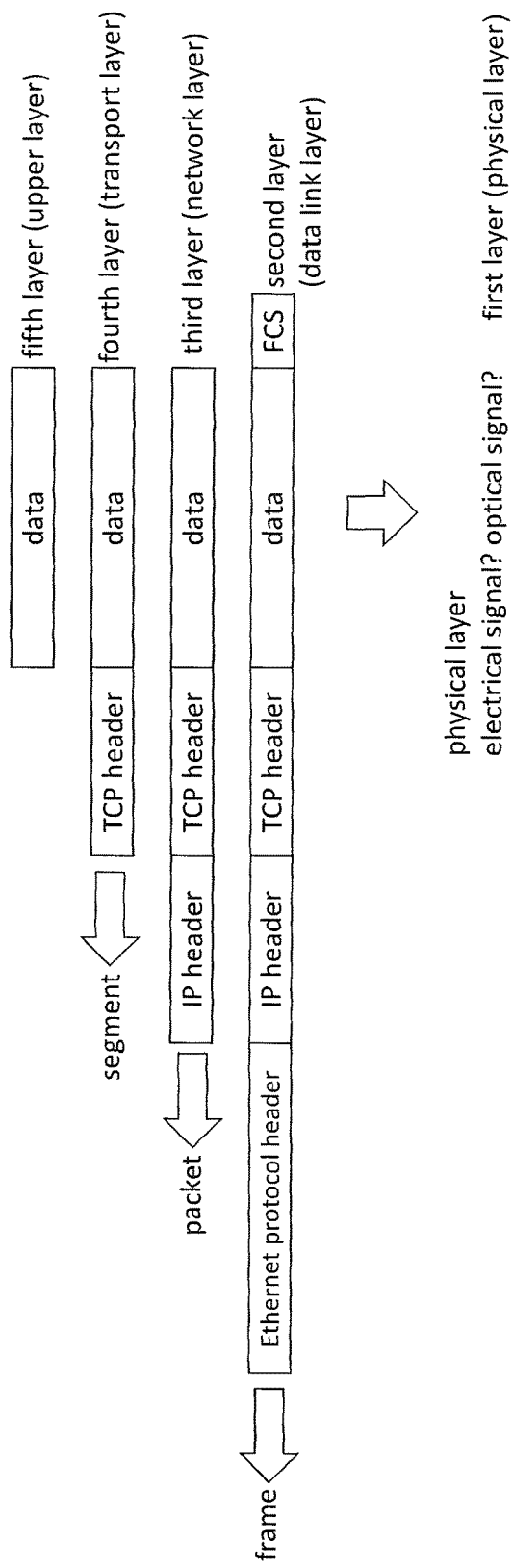
FIG. 2 is an illustration for describing communication layers.
Figure 3:
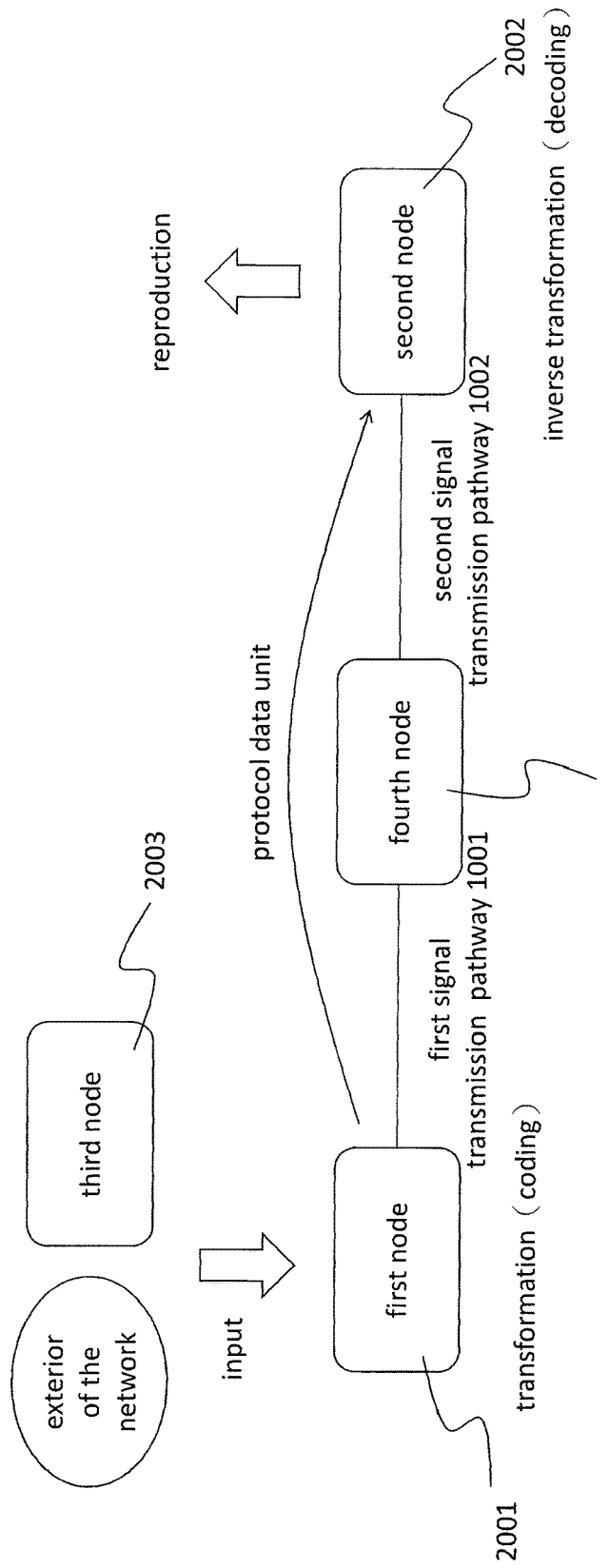
FIG. 3 is an illustration for describing an example of a transmission method of a protocol data unit.
Figure 4:
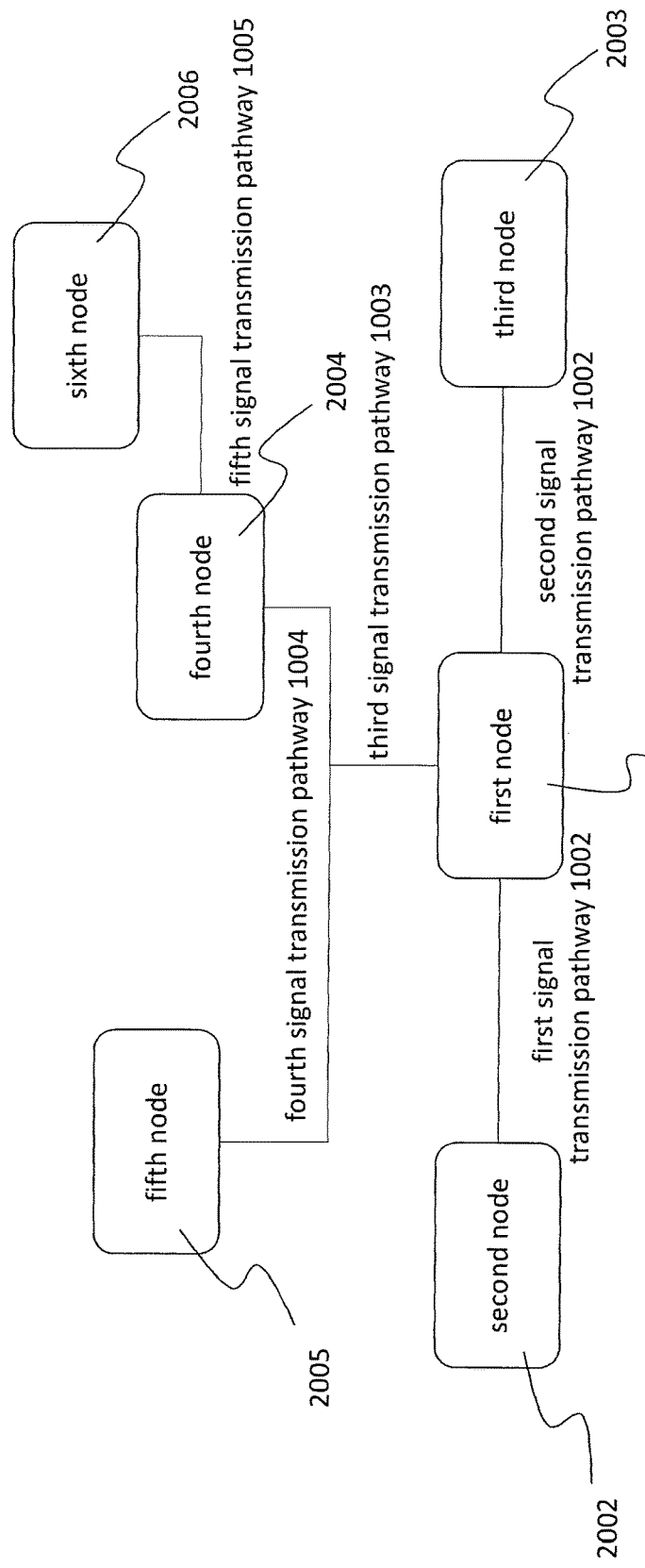
FIG. 4 is an illustration describing an example of the network comprising a plurality of communication nodes and a plurality of signal transmission pathways.
Figure 5:
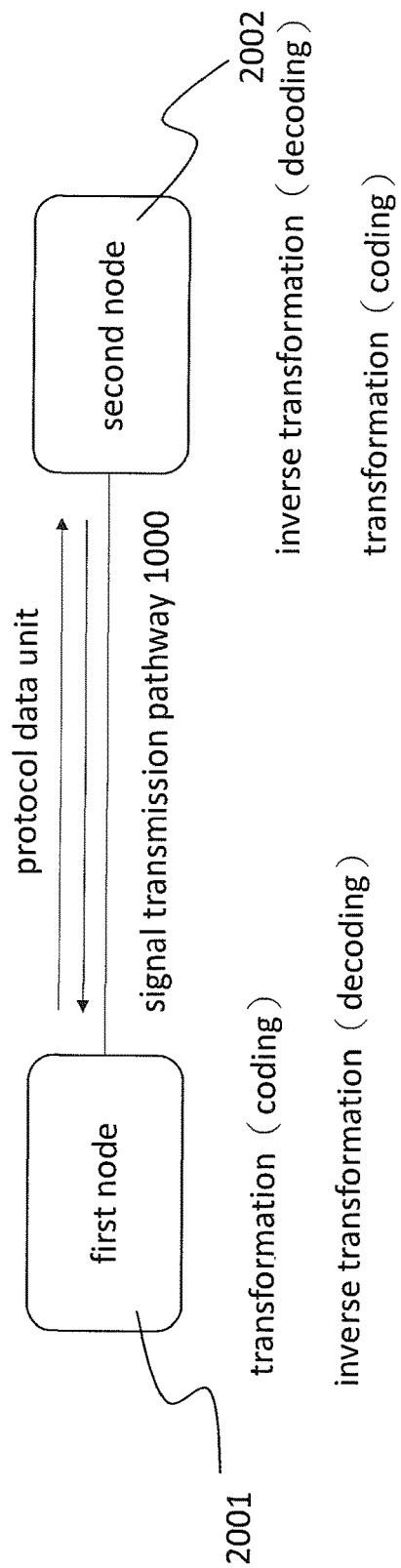
FIG. 5 is an illustration describing an example of smallest unit (element) of the communication network.
Figure 6:
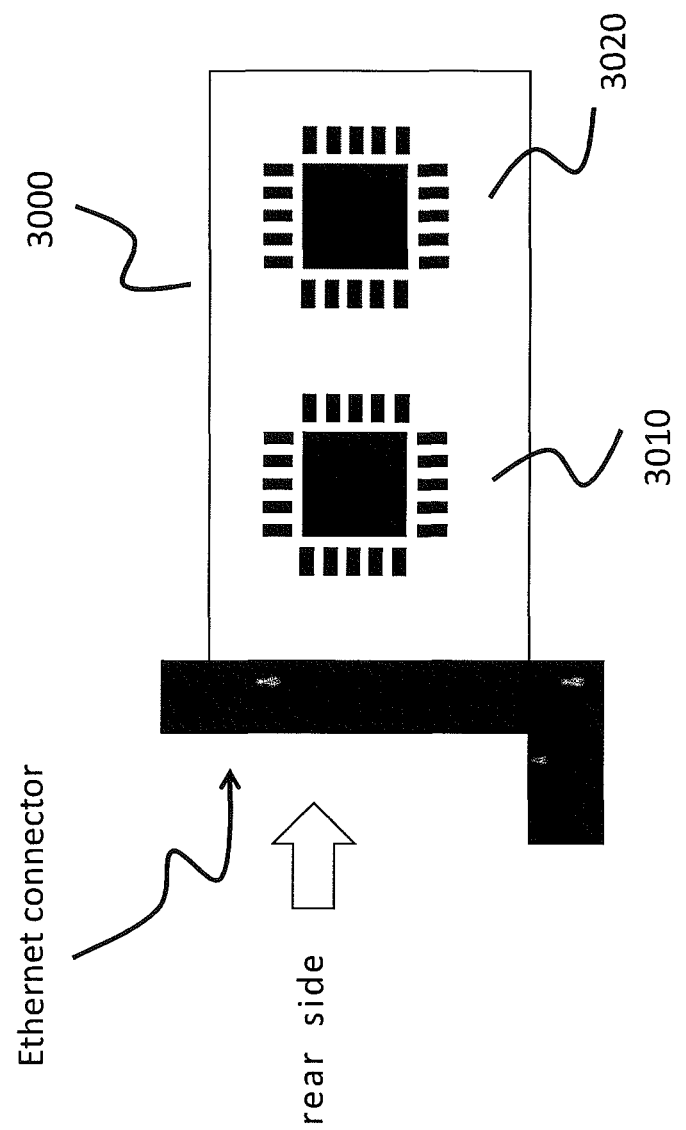
FIG. 6 is an illustration describing an example of a basic configuration of an Ethernet card.

The chip identification device 60 of the present disclosure may generate output signal in response to the call received from the external input-output (I/O) 50 (input signal). The generated output signal may be generated by using physical randomness. Moreover, the output signal may be changeable by input signal change. This property may decisively distinguish the present disclosure from MAC address described in FIG. 6. In other words, MAC address is a data stored in a nonvolatile memory chip 3010, and may not always change output in response to the input signal change.

A technology of such a function may have collected attention in recent years, which is called physically unlonable function (PUF). This may identify semiconductor chips using the physical properties intrinsic to different chips, similarly to the identification of human being using bio information such as finger prints and retina. The necessary requirements may be (1) different outputs may have to be output if different inputs are input to a same PUF. (2) Different PUFs may have to output different outputs even if a same input is input to them. (3) It may be impossible to predict an output in response to an unknown input even though a set of known inputs and outputs is theft. (4) The relation of input and output may have to be stable and reliable. Among them, the requirement (4) may be self-evident as long as PUF is a mass product.

In the case of IC products (products of semiconductor chip), there may be mainly two types of PUF, one may adopt opto-chemical properties of packaging agent (coating PUF) (please refer to JP2009-519473 as a patent literature 1), and the other may adopt PUF dependent to chip itself (chip PUF). Particularly in recent years, theft of the encryption key stored in chip and chip counterfeit command people's attention and then the latter, the technology how to equip PUF into chip may be more attractive. For example, the PUF data, which PUF outputs in response to the input code, and encryption key may be input to active code generating device, and then the generated active code may be stored in an inner memory. The active code may be generated only once, before the shipment of chip or at the registration in advance. After that, the active code stored in chip as well as PUF data may be input to a key generator as required to generate the encryption key in the chip. In this method, neither encryption key nor input code used for generating the encryption key may be stored in the inner memory. Accordingly, as long as the chip is not hacked while executing the encryption, it may be impossible to theft the encryption key. On the other hand, it may be possible that the active code is theft. However, even though stealing only the active code, it may be impossible to reproduce the encryption key without PUF data. In other words, as long as the input code used for generating PUF data is unknown, the above requirement (1) and (3) protects the copy of the encryption key. By this way, it may become very hard to copy encryption key, which is one of the merits of PUF.

However, the hottest usage of PUF may be the individual authenticate of IC chip. The requirement (2) may be indispensable for this aim. That is, PUF may be required to output an identification intrinsic to chip (PUF data) in response to input read signal (i.e., input code).

Furthermore, in the Internet of Things, it may be expected that the number of nodes is much larger than several trillions, and then the population to be identified by PUF may have to become incommensurably large. In other words, the following requirement may be added to the requirements (1)-(4). That is, (5) the number of output patterns per input may be limitlessly large. By this way, it may enable for using PUF to realize the physical identification of chips in the extremely great Internet of Things.

Hence, it may be supposed that a coating PUF satisfies the requirements (1)-(5). The read of the coating PUF may be executed by optically stimulating the package. This may just mean that the (electronic) chip identification is impossible via the network. By this way, it may be found that the following requirement should be added. That is, (6) the chip identification on the network should be required to be chip PUF.

There may be two types of PUFs satisfying the above requirement (6) in the literature. One may be a circuit PUF with using circuit variance. The other may use the variance of microstructures other than circuit (manufacturing PUF) (see U.S. Pat. No. 9,292,710 as patent literature 2). The circuit PUF may be further divided into two types; one may use the wiring delay of circuits (delay PUF) (see US 2013047209, US 2016154979 and U.S. Pat. No. 9,292,710 as patent literatures 3-5) and the other may use the circuit metastability (metastability PUF) (see JP 2013-131868 as patent literature 6). The delay PUF may use uncontrollable variance related to the operation time of a plurality of circuits which are integrated in an IC in the same design specification. Typical examples of used circuits here may be arbiter circuit, glitch circuit, ring oscillation circuit and so forth. A typical example adopted in the metastability PUF may be mainly static random access memory (SRAM hereinafter) and latch circuit (butterfly PUF).

The first disadvantage of circuit PUF may be a small individual difference. This may be against the requirement (5). In addition, the second disadvantage may be unstable output, which may be against the requirement (4). Furthermore, the third disadvantage may be that the circuit PUF is too sensitive to the external environment such as temperature change and then susceptible to fault attack. It may be then necessary to add an amplifier circuit and a temperature sensing circuit. This may increase a load on circuit design and limit the length of PUF data. Accordingly, this may be decisively against the requirement (5). If the length of PUF data is short, the number of chips to be identified may be limited, no matter how random output is.

In manufacturing PUF, the manufacturing variance of the interlayer via to be integrated on purpose may be adopted. This may be potential to resolve a plenty of the week points of the circuit PUF. However, since special structures unseen in the conventional semiconductor products is necessary to be integrated, the load on manufacturing process may be generally enlarged. By this way, it may be found that the widespread of the manufacturing PUF is not easy.

Moreover, the reliability of devices may be also adopted in another example (please see JP 2015-139010 as patent literature 5). However, the low reliability of devices is against the requirement (4). In addition, there may be others using the capacitor variance of dynamic random access memory (DRAM hereinafter) on power-on (please see "DRAM based Intrinsic Physical Unclonable Functions for System Level Security" as non-patent literature 5, published by Fatemeh Tehranipoor, Nima Karimian, Kan Xiao, John Chandy in GLSVLSI'15 Proceedings of the 25th edition on Great Lakes Symposium on VLSI, pp. 15-20, 2015). This may theoretically have a problem common with latch circuit PUF. In other words, the individual difference may be too small to be tough to the fault attack with the usage of the environment change.

As mentioned above, even while there may still be problems to be solved, it may be regarded that PUF is efficient to realize physical identification of the smallest element of nodes having physical substance (semiconductor chip) instead of MAC address in mutual connections on the network. For example, as shown in FIG. 8, it may be supposed that the first node 2001, equipping the first chip 110 with the chip identification device 60 of the present disclosure, may exchange data (communicate) with the second node 2002 via the signal transmission pathway 1000.

For example, the second node 2002 may give the signal A, B, C, . . . to the chip identification device 60 equipped into the first node 2001 via the signal transmission pathway 1000 as input codes to identify the first node 2001 in some kind of format. The chip identification device 60 may return the signal A1, B1, C1 . . . to the second node 2002 via the signal transmission pathway 1000. Hence, the second node 2002 may regard the first node 2001 as returning the signal A1, B1, and C1 in response to the input of the signal A, B, and C, respectively. In this case; the sequence represented by (A, B, C . . . : A1, B1, C1 . . . ) may be called communication series. Or in another case, the second node 2002 may regard the first node 2001 as returning the signal F1, A1 and K1 in response to the input of the signal F, A and K, respectively. The communication series in this case may be represented by (F, A, K . . . : F1, A1, K1 . . . ). However, such a communication may not be necessary to be executed on all possible input signals. Since the number of the patterns of input signals is limitless, it may be insufficient that all possible inputs are input to a same device. Rather, the limitless number of the input patterns may be convenient to make the number of apparatuses connecting to the first node 2001 on the network limitless. Thus, when connecting the first node 2001 to the second node 2002 at the first time, the second node 2002 may register the first node 2001. It may be preferable that this registration is executed by a regular user of the second node 2002 or a person authorized by the regular user of the second node 2002.

Figure 9:
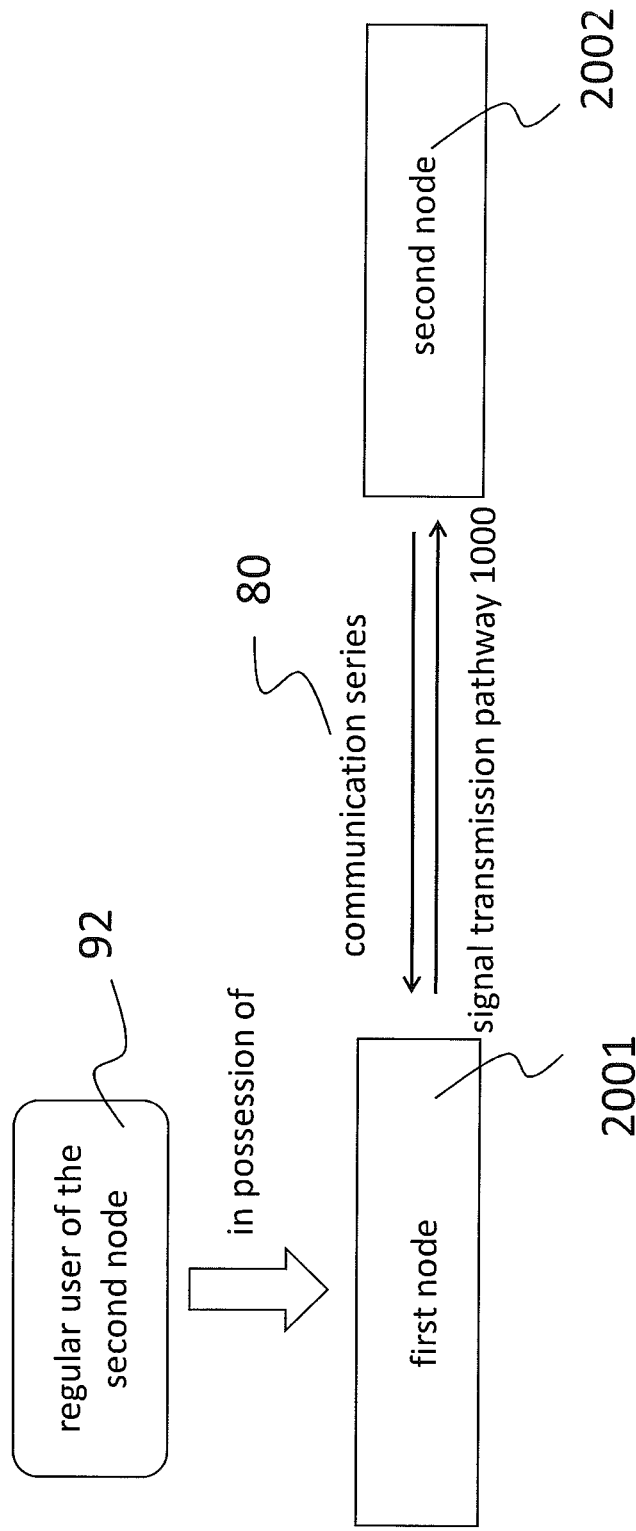
FIG. 9 is an illustration describing an example of a method that a regular user utilizes an apparatus having a chip equipped with the chip identification device of the present disclosure in the network.

In the example of FIG. 9, a regular user 92 of the second node 2002 may use the second node 2002 via the first node 2001 that the regular user 92 owns. The first node 2001 and the second node 2002 may communicate each other with communication series 80 via the first signal transmission pathway 1000 and then cooperate for executing what the regular user 92 of the second node 2002 wants to do. However, the regular user 92 of the second node 2002 may not commit the communication series 80. If he commits, the management and usage of the second node 2002 may be complicated so as to degrade the convenience of the Internet of Things.

If the first node 2001 has MAC address and the first and second nodes (2001 and 2002, respectively) are connected to each other in the Ethernet format, it might be supposed that the chip identification device 60 is unnecessary. However, if the mutual authentication of nodes having physical substances is executed by the Ethernet format, there may be two problems as follows: (i) MAC address may dry up soon. (ii) MAC address may be vulnerable to malevolent hacking. From such a view point, the necessity of the present disclosure may be noticed.

First, it may be supposed that a remote attacker attacks the first node 2001 shown in FIG. 9 by the remote. For example, the remote attacker may irregularly replace the first node 2001 with a fake node that he owns. Hence, it may be required that the fake node completely imitates the communication series 80 without using the chip identification device 60 equipped into the first node 2001. It may be inspected whether or not this is possible. If impossible, it may be proved that the chip identification formula of the present disclosure can protect the hijack of the apparatus. As a presumption for this, it may be assumed that one who irregularly tries to replace the first node 2001 with the fake node (remote attacker) cannot actually take the first node 2001 in his hand. This may be a natural requirement in the Internet of Things. In other words, the remote control is assumed by the hijack in the Internet of Things. The aim of the remote attacker may control the second node 2002 by remote with using the fake node that he owns at hand. To take the first node 2001 of FIG. 9 in his hand, he may be required to move to the location where there is the first node 2001 that regularly connects to the second node 2002 and then take it in secret. This clearly shows that this attack cannot be completed on the network. In other words, it may be the same that the remote control of the second node is impossible without being noticed by the regular user of the second node 92. When the fake node and the second node 2002 are linked to each other, the second node 2002 may input the input signal (R, L, A . . . ) to the fake node via the network, in order to identify the fake node. The fake node may then return the output signal (R3, L3, A3 . . . ) to the second node 2002 via the network. By doing so, a fake communication series (R, L, A . . . : R3, L3, A3 . . . ) may be formed. In other words, the remote attacker may be required to completely fit the fake communication series to the regular communication series 80, e.g., (R, L, A . . . : R1, L1, A1 . . . ). Accordingly, if (R3, L3, A3 . . . ) is successfully fitted to (R1, L1, A1 . . . ), the remote-attack may be succeeded. For example, the remote-attacker may fit (R3, L3, A3 . . . ) to a registration code recoded in the inner memory of the second node 2002.

By this way, it can be recognized that there are basically two methods of the remote-attack. The first method is to steal the input code and at least one of the registration codes, which are stored in the inner memory of the second node 2002. For example, it may be supposed that the remote attacker succeeds in stealing the (R1, L1, A1) and the input code (R, L, A). In this case, the remote attacker may be able to remote-control the second node 2002 illegally by replacing the first node 2001 with the fake node that he owns. To protect the system from such a remote-attack, the system administrator must strictly protect the inner memory of the second node 2002.

Figure 10:
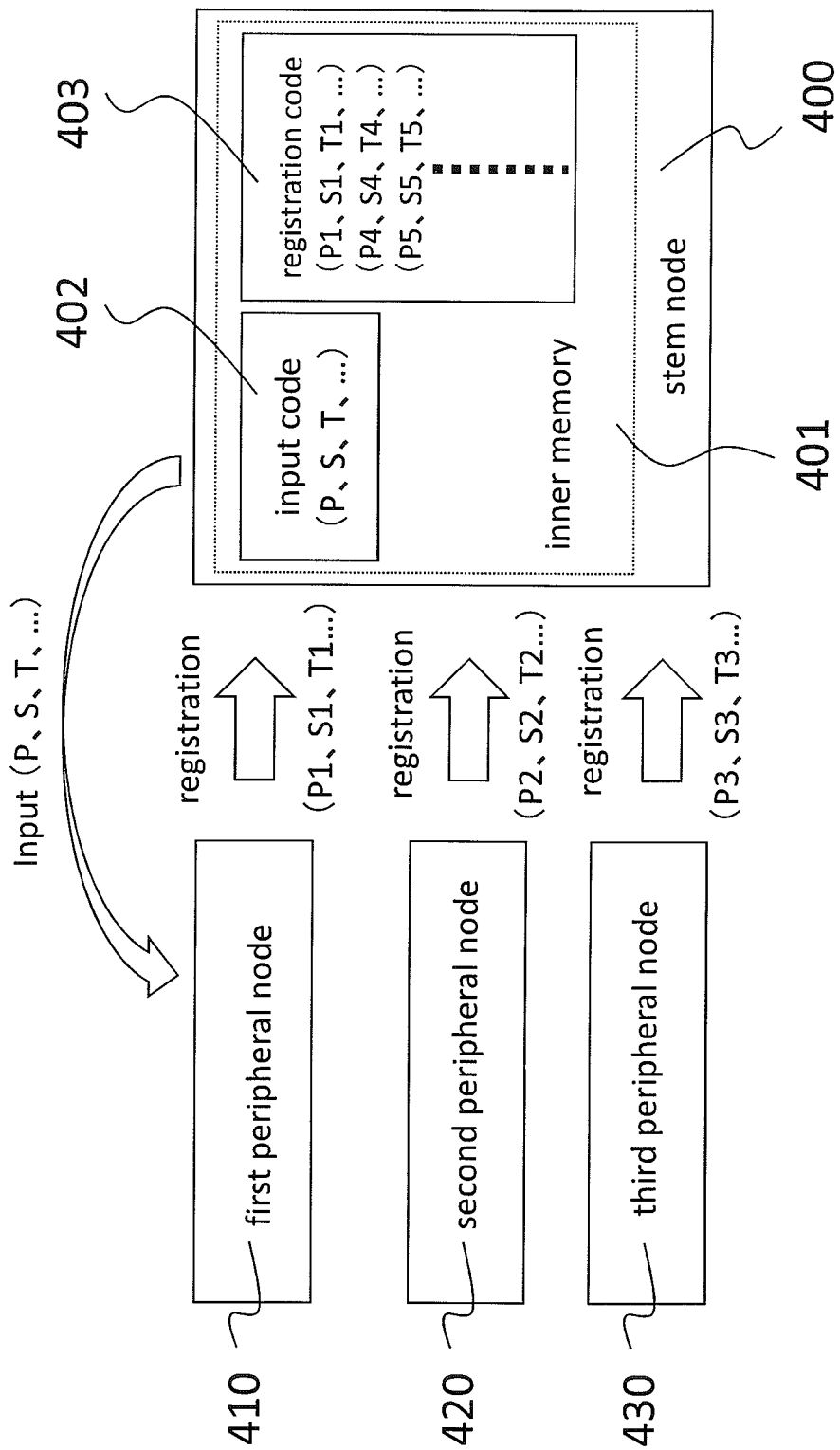
FIG. 10 is an illustration describing an example of a method that the peripheral nodes having a chip equipped with the chip identification of the present disclosure is connected to the stem node.

It may be preferable that a trained expert strictly protects the second node 2002 in which inner memory the input and registration codes are stored. Like this, the second node 2002 may be required to be centered, play a central role, and be under the central control by security administrators. This may be called stem node. In contrast, a node connecting to stem node and out of the central control by security administrators may be called peripheral node. In FIG. 10, three peripheral nodes (the first peripheral node 410, the second peripheral node 420, and the third peripheral node 430) may connect to the stem node 400. The stem node 400 may store the input code 402 and the list of registration codes 403 in the inner memory 401. In contrast, peripheral nodes may store neither registration codes nor input codes. Thus, it may be required that the peripheral nodes are equipped with chips respectively having different identification devices. For example, FIG. 7 may be an example of the basic configuration of peripheral node. Moreover, a set of input code 402 and element of the list of registration codes stored in the inner memory 401 of the stem node 400 may compose a communication series associated to each peripheral node.

As mentioned above, the first method of the remote attack may be blocked by protecting the stem node storing information about the communication series under the central control. However, in the case that the number of nodes connecting to the network is more than several trillions, it may be impossible to strictly protect and manage the entire apparatuses in a similar way to the stem node. This may expose the limitation of the central control. Then, the remote attacker may try to hijack an apparatus out of the central control, for example, at least one of the first peripheral node 410, the second peripheral node 420, the third peripheral node 430, . . . , as shown in FIG. 10. This is the second method of the remote attack. However, this attack may also fail since those peripheral nodes do not store the pair of input code and registration code (communication series 80) in the inner memory.

For example, the remote attacker may naively select and send a signal (X, Y, Z) to the first peripheral node 410 and then receive the response (X1, Y1, Z1). Hence, the first peripheral node 410 may be equipped with the chip identification device. In the case that the signal (X, Y, Z) differs from the input code 402 (P, S, T) that the stem node uses to connect to the first peripheral node, the response (X1, Y1, Z1) that the remote-attacker receives has to differ from the registration code 402 (P1, S1, T1) stored in the stem node. It may be presumed here that the chip identification device equipped in the peripheral node may have (the property of output independence) in which the chip identification device outputs a different output in response to a different input. Thus, as long as the chip identification device has (the property of output independence), the second method of the remote attack has to fail. Hence, what may happen if the peripheral nodes and the stem node adopt the mutual communication of the Ethernet format? The remote attacker may be able to easily get the MAC address from the inner memory of the Ethernet card (e.g., the nonvolatile memory chip 3010 in FIG. 6) which is equipped into the peripheral node. By this way, it may be turned out meaningful that the chip identification device of the present disclosure may replace the MAC address.

The residual problem here may be that the set of signals (X, Y, Z) naively selected by the remote attacker accidentally coincides with the input code 402 (P, S, T) stored in the inner memory 401 of the stem node 400. To avoid such an accident, the number of elements of input codes may be as large as possible and further should be confidential to other than the administrators of the stem node 400. Then, this information may have to be strictly protected by the administrators of the stem node 400. Moreover, it may be preferable to be occasionally changed. When this change is made, the stem node 400 may re-register the peripheral nodes. To reduce the frequency of re-registration like this, it may be required that the number of elements of input codes may be as large as possible. The input code may serve as passcode while satisfying those requirements.

In other words, the format of mutual communication with using the chip identification device of the present disclosure may govern the mutual communication among nodes having physical substances as with the Ethernet format. On the other hand, the nodes composing the network may be divided into nodes storing information related to mutual communication under the central control (stem nodes) and the others (peripheral nodes). The peripheral nodes may be equipped with the chip identification device of the present disclosure instead of storing information related to mutual communication and return output in response to a predetermined input. (The property of output independence) may be necessary to be satisfied, that is, a different input may cause a peripheral node to return a different output. (The property of output independence) may be described in detail below.

Hence, it may be preferable that an input code is used commonly to inspect the identification ID of various peripheral nodes. In this case, various input codes may not be particularly necessary to access aimed peripheral nodes independently. From such a condition, the input code described in the present disclosure may be called "common passcode" hereinafter. By this way, the above-mentioned stem node may have at least one common passcode.

In the case that the above-mentioned stem node 400 is a computer (personal computer and so son), the first, second, and third peripheral nodes connecting to this (410, 420, 430) may be peripheral devices to be used by connecting to the computer. For example, they may be a mouse, a keyboard, a microphone, and so forth. As mentioned above, the stem node that is the main body of the computer may be responsibly administrated by the administrators with the advanced anti-virus software. The invention related to the present disclosure may aim to prevent the irregular replacement of peripheral nodes (a mouse, a keyboard, a microphone and so on), and then protect the main body from the remote attack with the peripheral nodes that the anti-virus software protecting the main body cannot protect.

In the case that the above-mentioned stem node 400 is a server to play a central role of the network service, for example, the first, second, and third peripheral nodes (410, 420, and 430, respectively) may be terminals of end users to use this service. For example, they may be a smart phone, a tablet, a computing terminal, a remote controller of a smart electrical apparatus, a controlling panel of an auto-driving car, or other wearable terminals. As mentioned above, it may be presumed that the stem node is responsibly administrated by trained experts with the advanced security software. One of aims of the present disclosure may be to prohibit irregular access to server (stem node) by irregular replacement (hijack) of terminals of end users (a smart phone, a tablet, a computing terminal, other wearable terminals and so on). By this way, the entire system may be able to be protected from the remote attack with using innumerable information terminals on the network, which even trained experts cannot prevent with the advance security software.

In the case that the above-mentioned stem node 400 is a data center to play a central role of cloud-sensing service, for example, the first, second, and third peripheral nodes (410, 420, and 430, respectively) may be sensors to collect data that the data center requires. As mentioned above, the number of sensors may be innumerable and established widespreadly all over the world. The examples of those sensors may be innumerable, i.e., a GPS, a virus monitor, a thermometer, a socket-type visible light communication device, a biosensor, various smart meters and so on. Accordingly, it may be actually impossible to protect the entire sensors from the remote attack with the central control. As mentioned above, it may be presumed that the stem node is responsibly administrated by trained experts with the advanced security software. One of aims of the present disclosure may be to prohibit irregular access to stem node by irregular replacement of sensors (hijack). By this way, the innumerable sensors on the network for the cloud-sensing may be able to be protected from the remote attack that even trained experts cannot prevent with the advanced security software.

As one of characteristics of the present disclosure, peripheral nodes out of the central control (e.g., the first node 410, the second node 420, and the third node 430) may not store the input data such as the above-mentioned passcode and the registration code. It may be characteristic to divide the entire nodes into "stem node" which stores data required for authenticate communication (e.g., common passcode and registration code) and "peripheral code" which dose not store. Simultaneously, it may be characteristic that "stem node" which stores data required for authenticate communication (e.g., common passcode and registration code) is under central control and "peripheral node" which dose not store is equipped with the chip identification device of the present disclosure. However, a common nature with the Ethernet format may be to govern the mutual communication among nodes having physical substances.

Figure 11:
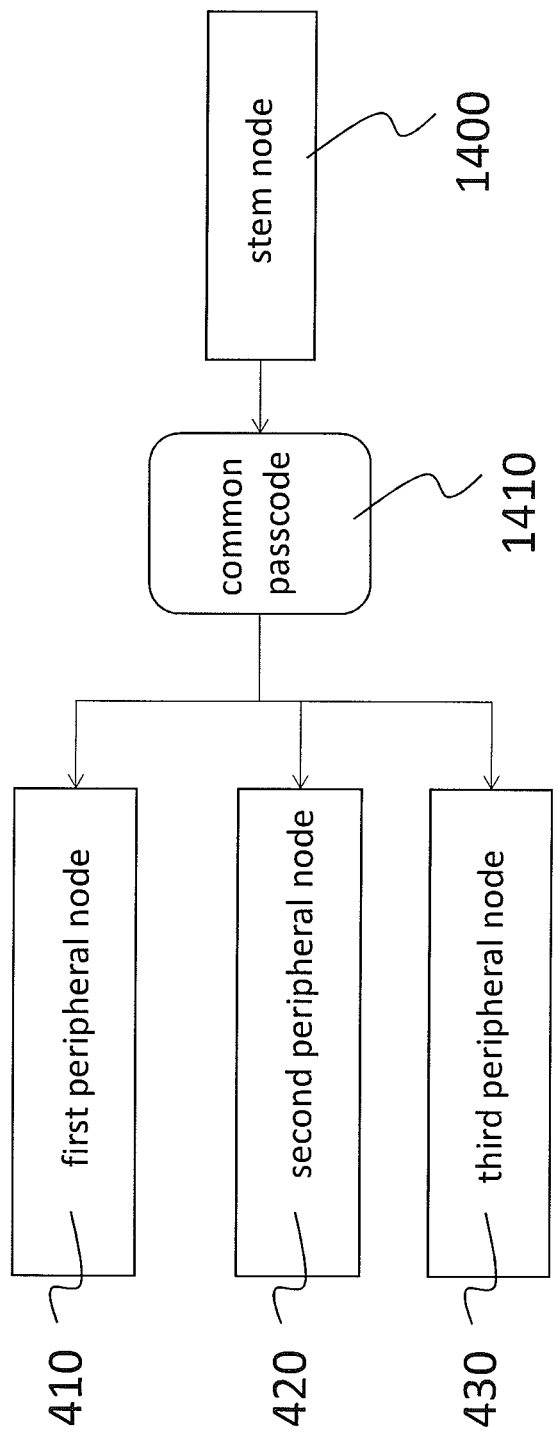
FIG. 11 is an illustration describing an example of a method that the stem node sends a common passcode to the peripheral nodes having a chip equipped with the chip identification device of the present disclosure.

As shown in FIG. 11, at least one of the above-mentioned common passcode may be stored in the first stem node 1400, and sent to peripheral nodes when identifying those peripheral nodes. For example, the first stem node 1400 may send the first common passcode 1410 to the first, second and third peripheral nodes (410, 420 and 430, respectively). Those peripheral nodes may regard the first peripheral node 1400 as "sending the first common passcode 1410 to them".

Figure 12:
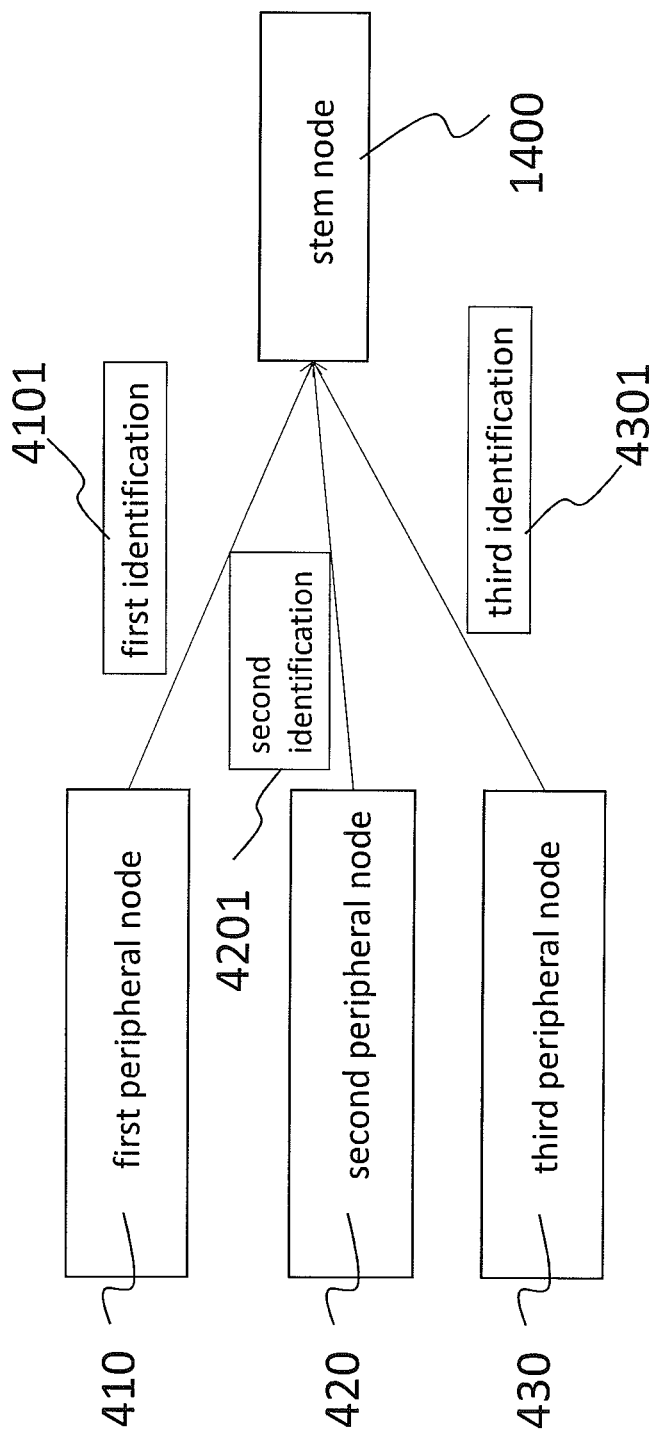
FIG. 12 is an illustration describing an example of a method that the identification code is sent from the peripheral node having the chip equipped with the chip identification device of the present disclosure to the stem node.

As shown in FIG. 12, the first peripheral node 410, the second peripheral node 420, and the third peripheral node 430 may return the first identification 4101, the second identification 4201, and the third identification 4301, respectively, to the first stem node 1400 in response to this input of the first common passcode 1410. The first stem node 1400 may regard the first peripheral node 410, the second peripheral node 420, and the third peripheral node 430 as "returning the first identification 4101, the second identification 4201, and the third identification 4301 in response to the first common passcode 1410", respectively. Hence, any two of the first, second and third identifications (4101, 4201 and 4301, respectively) may be different from each other. Furthermore, the first stem node 1400 may be capable of using another common passcode. This may be helpful for more advanced security administration. By this way, it may be preferable that each stem node uses a plurality of common passcodes.

Thus far, (the property of output independence) may be presumed that different chip identification devices output different outputs even to the same input code. The property of output independence may be described in detail bellow.

In actual network, there may be innumerable peripheral nodes and the number of stem nodes may be more than one. For example, FIG. 13 may illustrate an example of network comprising two stem nodes (the first stem node 1400 and the second stem node 2400) and five peripheral nodes (the first peripheral node 410, the second peripheral node 420, the third peripheral node 430, the fourth peripheral node 440, and the fifth peripheral node 450). A network unit may comprise the first stem node 1400 as central and the fourth peripheral node 440 and the fifth peripheral node 450. The other network unit may comprise the second stem node 2400 as central and the first peripheral node 410, the second peripheral node 420, and the third peripheral node 430. Hence, these network units may connect to each other via the connection of the first stem node 1400 and the second stem node 2400. Furthermore, in the network units, the fifth peripheral node 450 may connect to only the first stem node 1400, while the first peripheral node 410, the second peripheral node 420 and the third peripheral node 430 may connect to only the second stem node 2400. On the other hand, the fourth peripheral node 440 may connect to both the first stem node 1400 and the second stem node 2400.

In other words, in the network structure of the present disclosure, a topology to connect a plurality of network units may be defined by the connection of stem nodes belonging to different network units each other and the connection of a stem node and a peripheral node belonging to different network units each other. In particular, in the topology of network of the present disclosure, characteristic may be no direct connection of peripheral nodes, regardless of belonging to a same network unit or to different network units each other.

The connection used here may mean authenticate connection that nodes mutually authenticate each other by the above-mentioned authenticate procedure and not a simple link. Unless otherwise specially noted below, the connection may imply the term of authenticate connection to discuss the network of information apparatuses or electronic apparatuses having physical substances. Furthermore, the term of (authenticate) connection in this meaning may also involve the connection among devices (modules or chips) in one packaged system.

For example, the vehicles may comprise a plurality of controlling systems. it may be regarded as an integrated system that comprises a plurality of subsystems such as a driving system, a breaking system, a navigation system, an auto-driving system if auto-driving car, and so forth. Those subsystems may respectively correspond to above-mentioned network units, or, a set of a plurality of co-working network units. Thus, it may be found that a vehicle is a network comprising a plurality of network units. Furthermore, a smallest unit of peripheral and stem nodes comprising each network unit may be semiconductor chip. The peripheral nodes may, for example, be sensors to sense the temperature of engine, to sense the acceleration that some parts of the vehicle body feel, to sense residual quantity of gasoline, and more various sensors to be supposed. The stem server may be an arithmetric processing unit to analyze and use the information to be collected by those sensors. Other than vehicles, airplanes, trains, factories, and facilities and devices related to social infrastructure such as power plants, power transmission lines and so to forth may be regarded as one packaged system. Accordingly, there may be networks which may be targets of the present disclosure, as long as semiconductor chips are used as parts of apparatuses comprising the network.

As one of the characteristics of the present disclosure, in such a network comprising a plurality of stem nodes and a plurality of peripheral nodes, stem nodes may be permitted to directly connect to each other while the peripheral nodes are not allowed to directly connect to each other. This may be because that the peripheral nodes out of the central control do not store input data such as a common passcode. Instead, the peripheral nodes may be able to indirectly connect to each other via stem nodes.

For example, the first peripheral node 410 and the second peripheral node 420 may be able to indirectly connect to each other via the second stem node 2400. The fourth peripheral node 440 and the fifth peripheral node 450 may be able to indirectly connect to each other via the first stem node 1400. The third peripheral node 430 and the fourth peripheral node 440 may be able to indirectly connect to each other via the first stem node 1400 and the second stem node 2400 that are connected to each other. By this way, the data flowing through the whole peripheral nodes may be monitored by a plurality of stem nodes. Accordingly to the present disclosure, it may be turned out possible to concentrate resource for central control only on the stem nodes.

Figure 13:
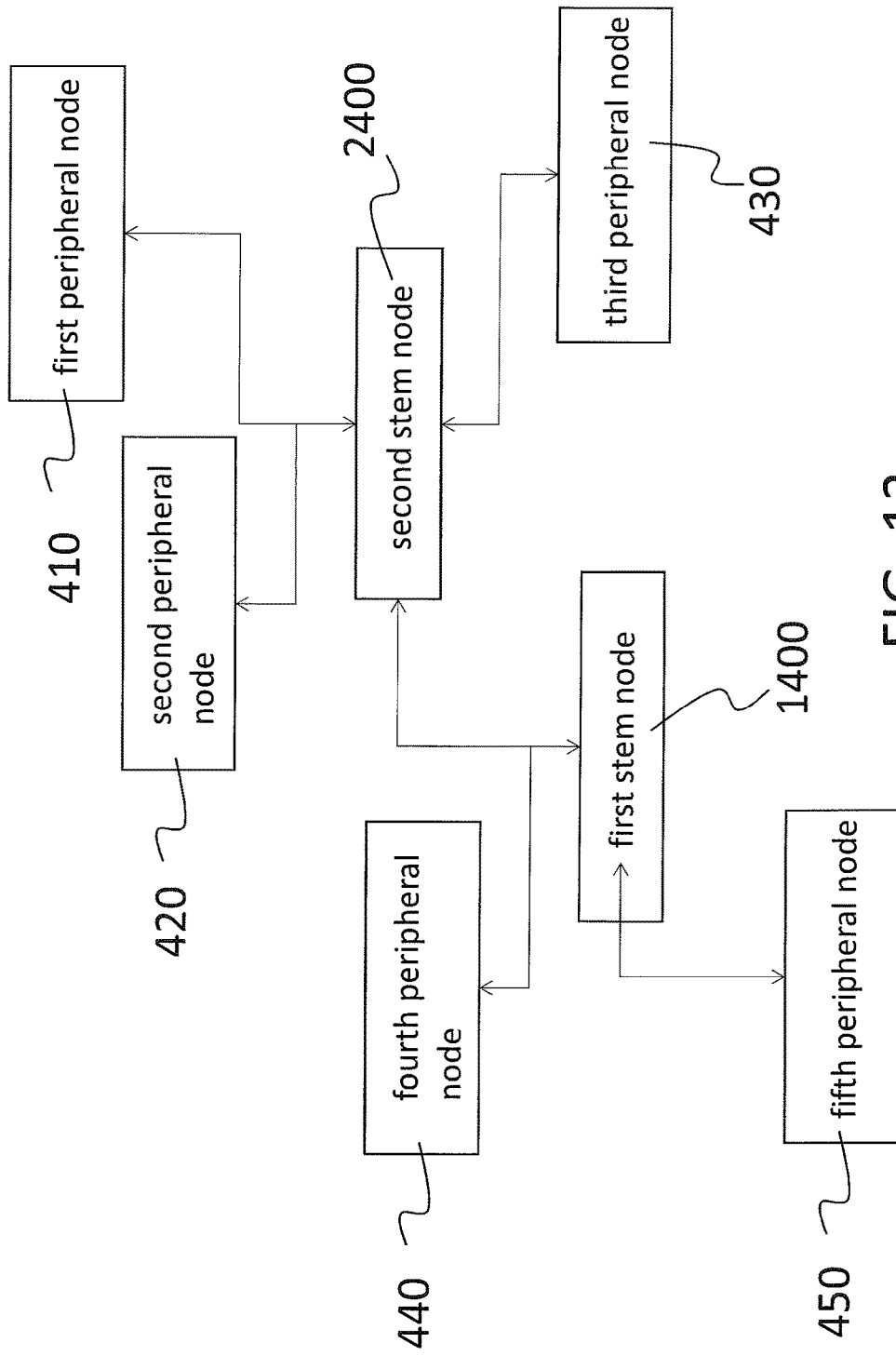
FIG. 13 is an illustration of an example of the network comprising a plurality of stem nodes divided into the first network unit and the second network unit and a plurality of peripheral nodes having the chip equipped with the chip identification device of the present disclosure, wherein the network has a topology to connect the stem servers of the first and second network units.

For example, a concrete example of FIG. 13 may be a combination of an auto-driving vehicle and a smart house. For example, one network unit comprising the first stem node 1400, the fourth peripheral node 440, and the fifth peripheral node 450 may be parts composing one auto-driving vehicle together. The other network unit comprising the second stem node 2400, the first peripheral node 410, the second peripheral node 420, and the third peripheral node 430 may be parts composing one smart house together. For example, in the case that the battery of the auto-driving vehicle compensates that of the smart house at the time of disaster, a sensor to grab the situation of the battery of the smart house (e.g., the fourth peripheral node 440) may be equipped in the auto-driving vehicle. By this way, the fourth peripheral node 440 may connect to both of the first stem node 1400 and the second stem node 2400. Or, a taxi system in which a plenty of auto-driving vehicles are linked to co-work may be also one of the examples of the present disclosure.

Figure 14:
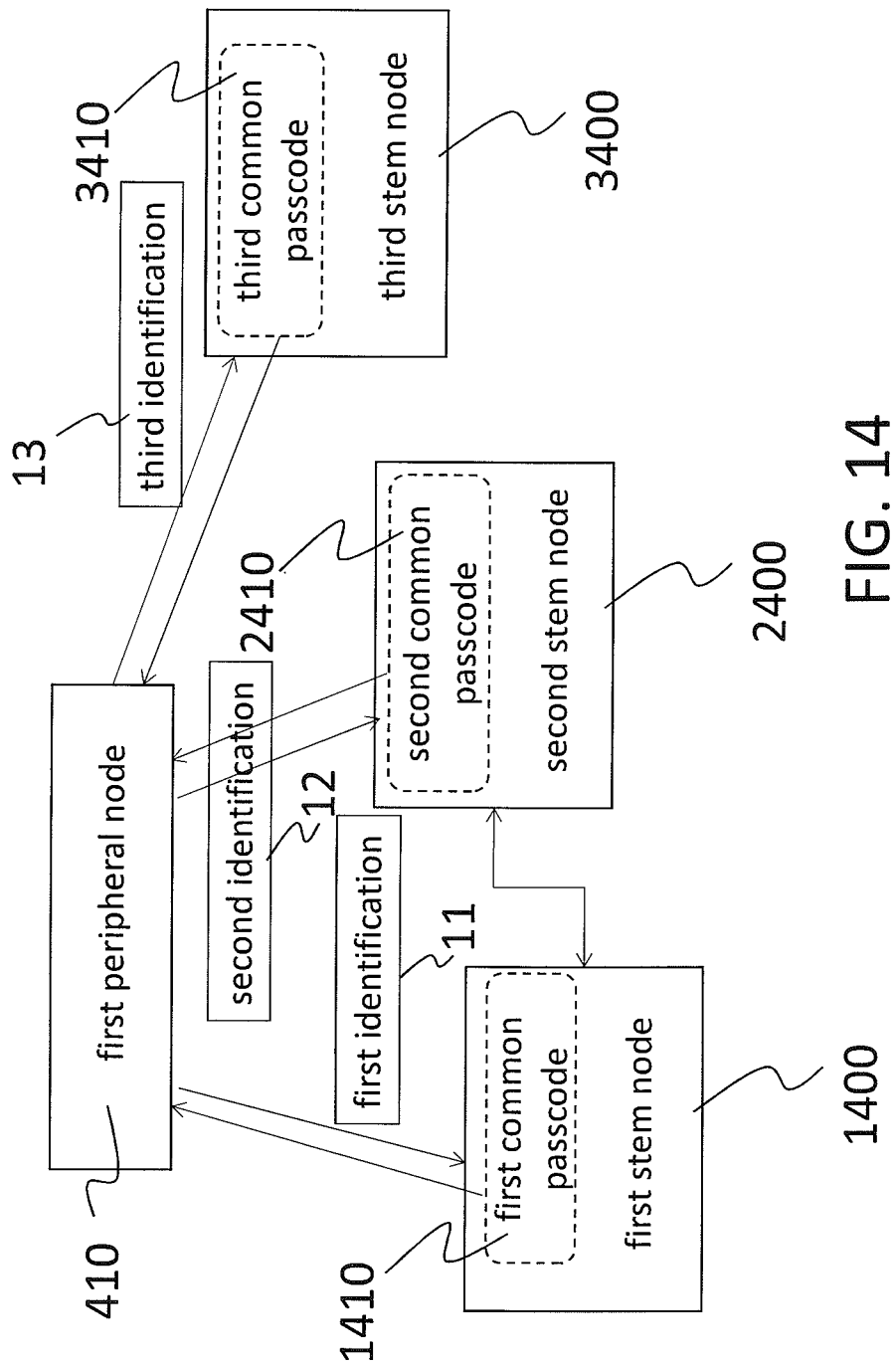
FIG. 14 is an illustration describing a topology comprising at least one of a plurality of peripheral nodes in the first network unit, wherein at least the one of the plurality of peripheral nodes are connected to a plurality of stem nodes respectively belonging to a plurality of second network units.

As shown in FIG. 14, in the network adopting the present disclosure, it may be permitted that the above-mentioned topology connects one peripheral node (e.g., the first peripheral node 410) to a plenty of stem nodes (e.g., the first stem node 1400, the second stem node 2400 and the third stem node 3400). The first stem node 1400, the second stem node 2400, and the third stem node 3400 may store the first passcode 1410, the second passcode 2410 and the third passcode 3410, respectively. In other words, the first peripheral node 410 may regard the first stem node 1400 as "inputting the first passcode 1410", the second stem node 2400 as "inputting the second passcode 2410", and the third stem node 3400 as "inputting the third passcode 3410". In response to those inputs, the first stem node 1400 may regard the first peripheral node 410 as "returning the first identification 11", the second stem node 2400 may regard the first peripheral node 410 as "returning the second identification 12", and the third stem node 3400 may regard the first peripheral node 410 as "returning the third identification 13". Hence, it may be noted that the data related to the communication authentication (passcode, identification to be returned in response to the common passcode, and so on) may be stored in stem nodes and not in peripheral nodes. In peripheral nodes, the chip identification device of the present disclosure may be equipped.

Among them, for example, the first stem node 1400 and the second stem node 2400 may directly connect to each other, while neither the first stem node 1400 nor the second stem node 2400 may directly connect to the third stem node 3400. Hence, none proves that the third stem node 3400 is not a remote attacker. Thus, it may be significant that the data related to the communication authentication is not stored in the first peripheral node 410. For example, if the first peripheral node 410 is registered to the first stem node 1400, the first stem node 1400 may be able to limit the first peripheral node 410 to connect to other stem nodes after the first stem node 1400. It may be because the external input-output of the first peripheral node 410 may transfer the received signal to the first stem node 1400, and then the first stem node 1400 may be able to monitor the entire input to the first peripheral node 410.

Hence, if a passcode coincident to the first passcode 1410 is found, the first stem node 1400 may execute an emergency treatment. For example, the first stem node may terminate the first peripheral node 410 from the network, or use the first peripheral node 410 only for monitoring the movement of the remote attacker. In the case that the second stem node 2400 registers the first peripheral node 410 next to the first stem node 1400, the second stem node 2400 may require the first stem node 1400 to permit the second stem node 2400 to register the first peripheral node 410 in advance. For this requirement, it may be necessary that the first and second stem nodes are connected to each other in advance. If the first stem node permits the second stem node 2400 to access the first peripheral node 410, the first peripheral node 410 may approve the second passcode 2410 and then return the identification 12 to the second stem node 2400. Thus, the second stem node 2400 may register the first peripheral node 410. Hereinafter, the second stem node 2400 and the first peripheral node 410 may be able to execute the authenticate connection with no permission of the first stem node 1400. Next, in order that the third stem node 3400 connects to the first peripheral node 410, the first stem node 1400, or both of the first stem node 1400 and the second stem node 2400, may be indispensable to permit the first peripheral node 410 to approve the third passcode 3410 in advance. By this way, the first stem node 1400, or both of the first stem node 1400 and the second stem node 2400, may be authorized to limit the connection of the third stem node 3400 and the first peripheral node 410. In other words, in the case that the non-permitted passcode is input to the first peripheral node 410, the connection may be denied or limited. The exercise of this authority may be granted to the regular administrators of the first stem node 1400 or those of both of the first stem node 1400 and the second stem node 2400.

Next, the requirements that the chip identification formula of the present disclosure should satisfy may be explained.

The property of output independence is descried below.

Figure 15:
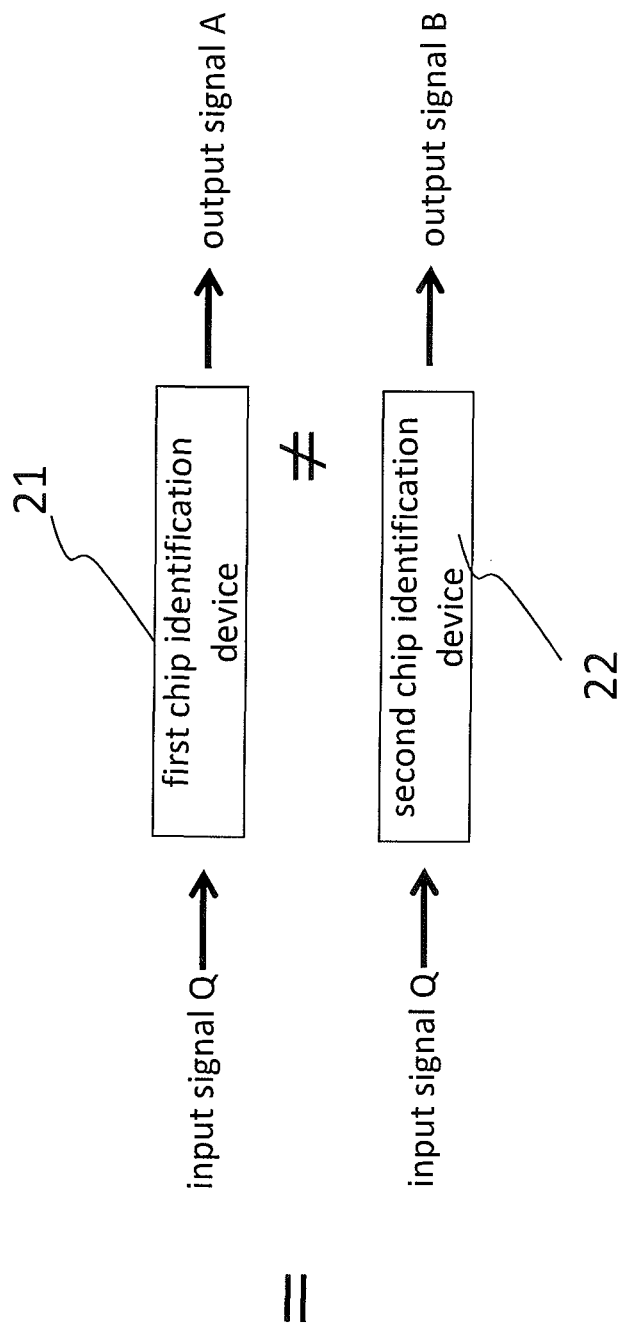
FIG. 15 is an illustration describing an example of the property of the output independence to be satisfied by the chip identification device of the present disclosure.

First, it may be supposed that the same input signal (Q) is input to two different chip identification devices (21 and 22), as illustrated in FIG. 15. The first chip identification device 21 outputs the output signal A. The second identification device 22 outputs the output signal B. In this case, the output signals A and B are different. The output signals, thus, may be different as long as chip the identification devices are different, even while the input signal is the same. This feature is necessary to the examples of using a common passcode (FIGS. 11 and 12). In other words, even though the same input signal is input to two different chip identification devices, the output signals to be output from those different chip identification devices should be different.

For example, as illustrated in FIG. 11, the first stem node 1400 may input the first passcode 1410 to the first peripheral node 410, the second peripheral node 420, and the third peripheral node 430, which may be equipped with different chip identification devices, respectively. The output signal to be output from those peripheral nodes may be, as illustrated in FIG. 12, the first identification 4101, the second identification 4201, and the third identification 4301, respectively. Here any two among the first identification 4101, the second identification 4201 and the third identification 4301 may be different each other.

The property of input independence is described below.

Figure 16:
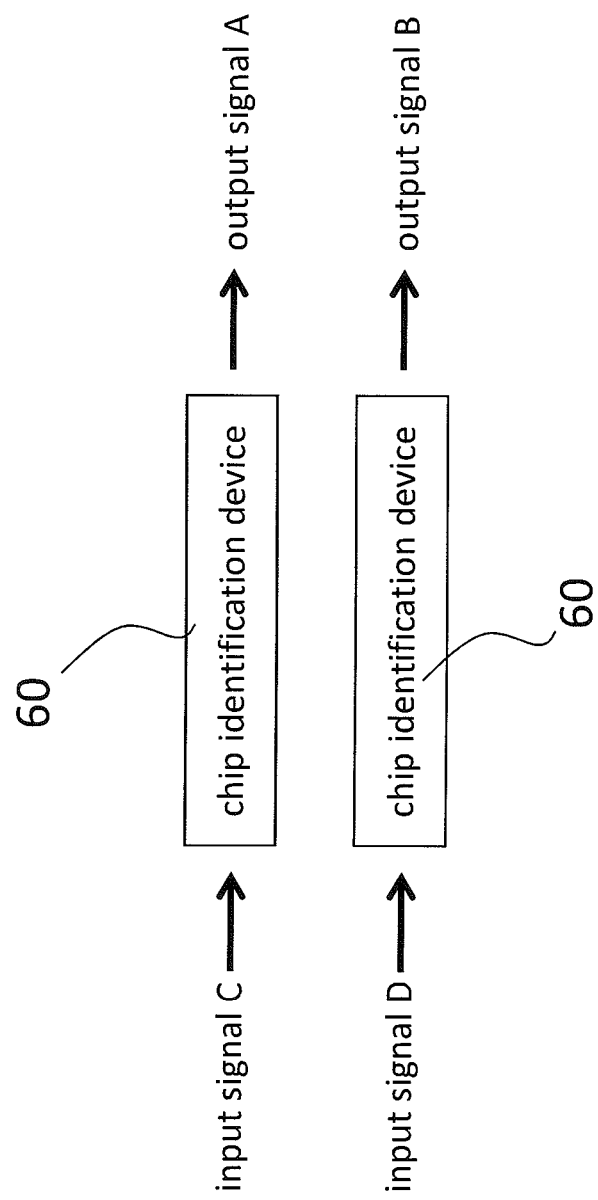
FIG. 16 is an illustration describing an example of the property of the input independence to be satisfied by the chip identification device of the present disclosure.

To the contrary, if different input signals are input to a same chip identification device, then outputs may be different with regard to input signals. For example, as illustrated in FIG. 16, if the input signal C is input to the chip identification device 60, then the output signal A is output. If the input signal D is input to the chip identification device 60, then the output signal B is output. Hence, the output signals A and B may have to be different as long as the input signals C and D are different. This feature is necessary, as illustrated in FIG. 14, in order that different stem nodes input different passcodes to a same peripheral node and then receive different identifications, as output signals from the peripheral node, respectively. More concretely, the first stem node 1400 may input the first common passcode 1410 to the first peripheral node 410, and then the first peripheral node 410 may output the first identification 11 to the first stem node 1400. The second stem node 2400 may input the second common passcode 2410 to the first peripheral node 410, and then the first peripheral node 410 may output the second identification 12 to the second stem node 2400. The third stem node 3400 may input the third common passcode 3410 to the first peripheral node 410, and then the first peripheral node 410 may output the third identification 13 to the third stem node 3400. It may not be necessary to say that any two among the above identifications 11, 12, and 13 are different from each other.

That is, FIG. 13 is an example of network structures requiring the property of input independency and the property of output independency at the same moment. Actually, the number of stem nodes may be more than two and the number of peripheral nodes may be more than five. FIG. 13 is a simplest example and not beyond.

The property of output unpredictability is described below.

Figure 17:
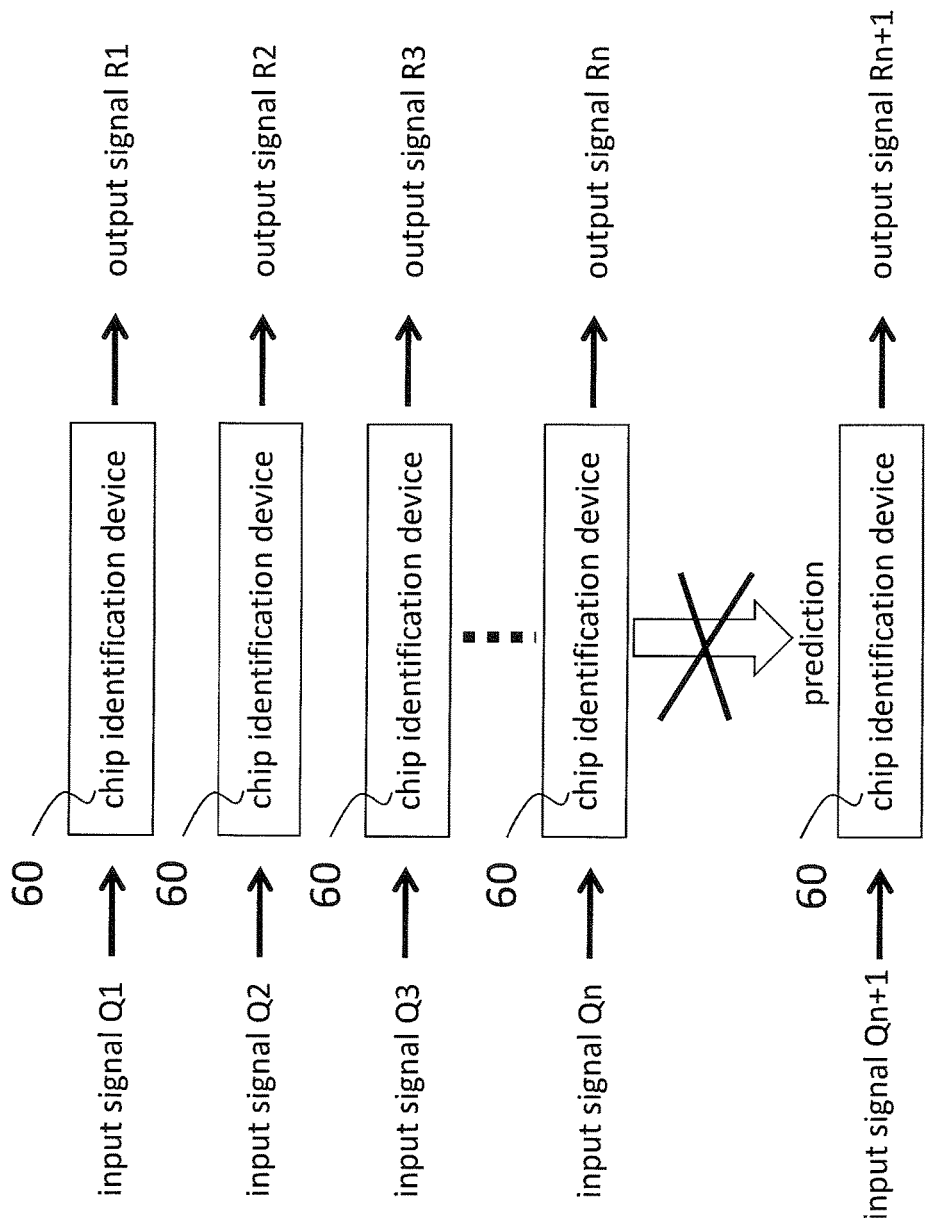
FIG. 17 is an illustration describing an example of the property of the output unpredictability to be satisfied by the chip identification device of the present disclosure.

As illustrated in FIG. 17, it may be supposed to be known that n output signals R1 to Rn are obtained in response to n input signals Q1 to Qn to be input to a same chip identification device 60, respectively. In this case, it may be impossible to predict the output signal Rn+1 from the set of (Q1, R1), (Q2, R2) . . . (Qn, Rn) without giving the input signal Qn+1 to the chip identification device 60, where Rn+1 is the output signal to be obtained in response to Qn+1 that is different from all of n input signals Q1 to Qn and n may be an integer larger than 2. In the case that the chip identification device 60 generates the output with using some kind of algorithm, that is, with using software, this requirement may be broken. Accordingly, it may be necessary that the chip identification device 60 generates the output signal with using physical randomness.

The property of input-output reliability is described below.

Figure 18:
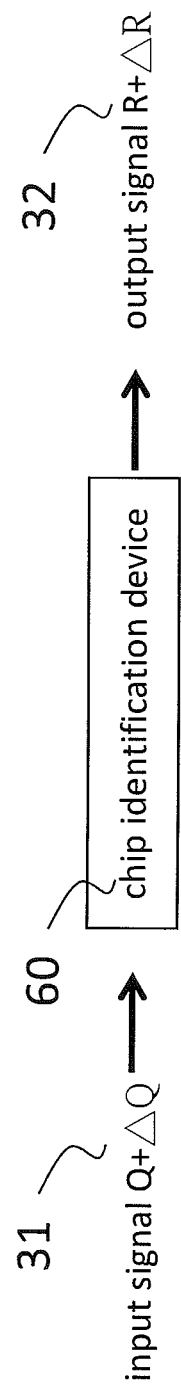
FIG. 18 is an illustration describing an example of the property of the input-output reliability to be satisfied by the chip identification device of the present disclosure.

As illustrated in FIG. 18, actually, input signal error 31 ($\Delta Q$) may mix into input signal Q due to uncontrollable noise related to controlling circuit to control the input signal Q. In response to the input signal error 31 ($\Delta Q$) and uncontrollable noise related to controlling circuit to control output signal, on the other hand, the output signal R may be mixed with output signal error 32 ($\Delta R$). Hence, it may be required that the absolute value of the difference between two different input signals (e.g., Q1 and Q2) is always larger than the absolute value of the maximum of the input signal error 31 ($\Delta Q$). Moreover, the absolute value of the difference between R1 which is the output signal to the input signal Q1 and R2 which is the output signal to the input signal Q2 must be always larger than the absolute value of the output signal error 32 ($\Delta R$).

The chip identification formula may be required to satisfy all of the above-mentioned properties of output independence, input independence, output unpredictability, and input-output reliability at the same moment.

In order to improve the existing network before the present invention so as to satisfy all requirements of the present invention, the existing peripheral nodes connected to stem nodes may have to be replaced with peripheral nodes having the chip identification devices of the present invention. Hence, it may be necessary to inspect whether or not this replacement is certainly made. Or, it may be necessary to inspect whether or not the chips without the chip identification device of the present invention is used in the network. The inspection described here may be able to be carried out as a part of periodical test of stem nodes. Moreover, it may be preferable to be carried out at the registration of the peripheral nodes.

One of the most effective method to this inspection is to actually remote-attack peripheral nodes to be inspected with using a stem node under the central control. In the case that a chip composing the peripheral node to be inspected does not involve the chip identification device of the present invention, it must store the correspondence table of the input code 42 and the registration codes 43 (See FIG. 19) in its inner memory. For example, a list composing a plurality of input codes may correspond to an input code. Those registration codes may correspond to outputs to be output from a plurality of peripheral nodes, respectively, when a common passcode is input to those peripheral nodes. In general, since the number of the passcodes may not always be one, the correspondence chart may be similar to FIG. 19. If the number of input codes is one, the corresponding chart may be only the upper half of FIG. 19. FIG. 10 may be an example of the case that the number of the input codes 402 is only one. Anyway, such codes may not be stored in the inner memory of the chip having the chip identification device of the present invention. In the network of the present invention, only stem node may regularly store such a code correspondence table shown in FIG. 19. It may be the set of input code 402 and registration code 403, as shown in FIG. 10. The input code 402 in FIG. 10 may correspond to the input code 42 in FIG. 19, while the registration code 402 may correspond to the registration code 43.

Figure 20:
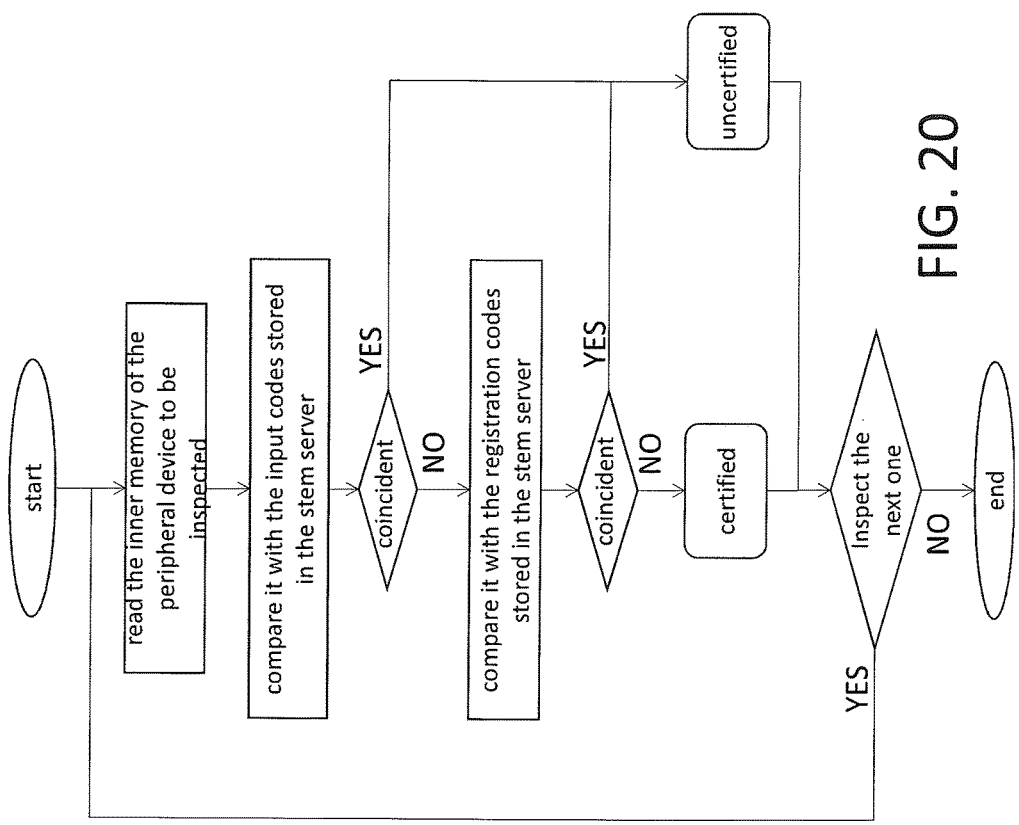
FIG. 20 is an illustration describing an example of an execution procedure for inspection of the validity of the peripheral nodes.

The concrete procedure of the inspection process may be explained by using FIG. 20. First, it may begin with the step to find a peripheral node to be inspected. Next, the inner memory of the peripheral node to be inspected may be read. Hence, it may be checked if a part of the codes read here is equivalent to at least one of the input codes stored in the stem node, e.g., the input codes 42 and 402 in FIGS. 19 and 10, respectively. If not, it may be further checked if a part of the codes read here is equivalent to at least one of the registered codes, e.g., the registration codes 43 and 403 in FIGS. 19 and 10, respectively. If not, the inspected peripheral node may be regarded as certificated. On the other hand, those not to be certified may be regarded as foul and disconnected from the network. By doing so, it may be able to automatically terminate the foul peripheral nodes without human aid. Subsequently, a next peripheral node to be inspected may be looked for. If not, the procedure may go to the end. Otherwise, the inner memory of the next peripheral node may be read. The subsequent procedures may be similar.

Figure 21:
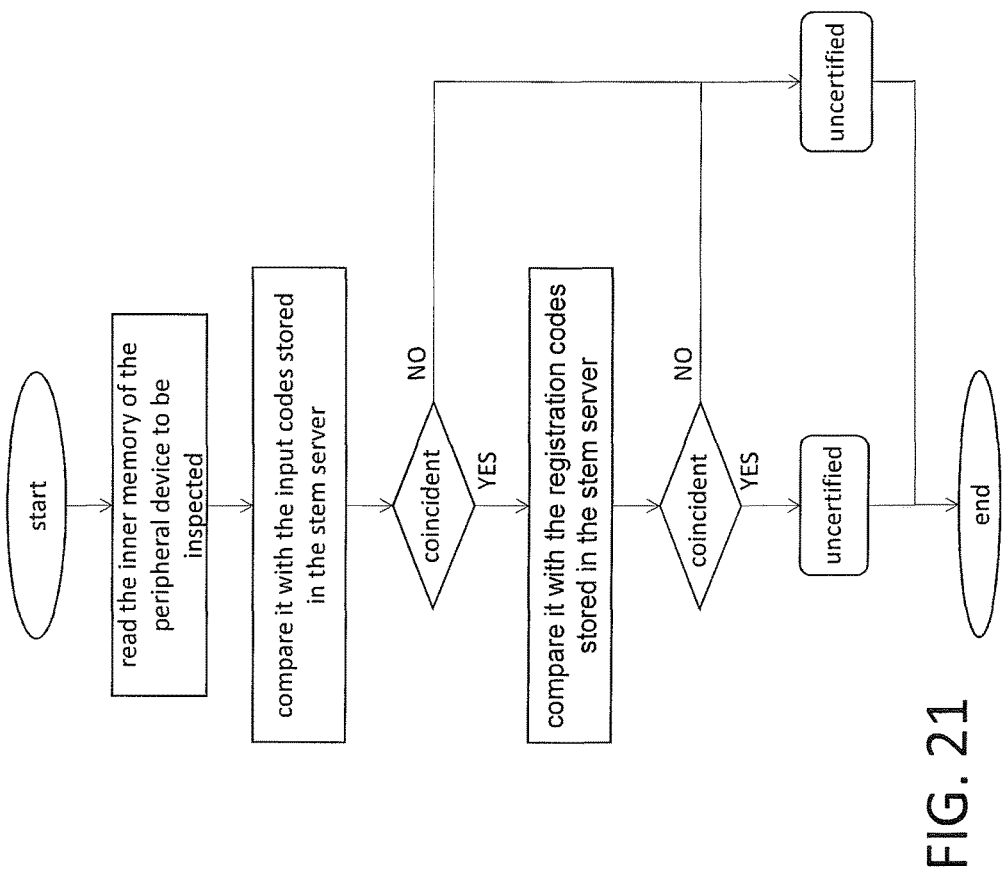
FIG. 21 is an illustration describing an example of an execution procedure for inspection of the validity of the peripheral nodes.

The concrete procedure of the examination process may be explained by using FIG. 21. First, it may begin with the step to find a peripheral node to be inspected. Next, the inner memory of the peripheral node to be inspected may be read. Hence, it may be checked if a part of the codes read here is equivalent to at least one of the input codes stored in the stem node, e.g., the input codes 42 and 402 in FIGS. 19 and 10, respectively. If not, the inspected peripheral node may be regarded as certificated. Otherwise, it may be further checked if a part of the codes read here is equivalent to at least one of the registered codes, e.g., the registration codes 43 and 403 in FIGS. 19 and 10, respectively. If it is coincide, the inspected peripheral node may be regarded as foul. Otherwise, the inspected peripheral node may be regarded as certificated. Subsequently, a next peripheral node to be inspected may be looked for. If not, the procedure may go to the end. Otherwise, the inner memory of the next peripheral node may be read. The subsequent procedures may be similar.

The inspection methods shown in FIG. 20 and FIG. 21 may differ with respect to the inspection standard. Those figures may be only two examples to be composed with association to the present disclosure. More inspection methods may be composed with respect another inspection standard. For example, the orders of comparing input codes and registration codes may be able to be exchanged.

There may be an inspection method called MAC address filtering in the Ethernet format. However, the essence of the inspection methods of the present disclosure, e.g., the inspection methods shown in FIG. 20 and FIG. 21, may be to divide peripheral nodes and stem nodes, and then inspect in stages whether or not those peripheral nodes store input and registration codes that are stored in the stem nodes. The MAC address filtering has no such a characteristics in the inspection. Accordingly, the inspection methods of the present disclosure may concretely differ from MAC address filtering.

By this way, the entire devices composing the network with the chip identification method of the present invention may be divided, for example as illustrated in FIG. 13, into the group of stem nodes (e.g., 1400, 2400) maintained and managed by trained security experts and the group of peripheral nodes (e.g., 410, 420, 430, 440, and 450) which those security experts cannot administrate. Hence, any two of those peripheral nodes may not connect to each other and each of those peripheral nodes may connect only to the stem nodes. Thus, the network unit comprising a stem node and a plurality of peripheral nodes connected directly to the stem node may be formed. A stem node may be connected to another stem node as needed, while two of the peripheral nodes may be able to connect indirectly to each other via the stem nodes. Thus, a network unit may be connected to another network unit. FIG. 13 may be an example that two network units are associated with each other via the connection of the stem node of one network unit and that of another network unit. Actually, the networks comprising more stem nodes, i.e., more network units, may be also possibly formed. Moreover, the connection of the nodes having physical substances on the network (e.g., information or electronic apparatuses) may imply the authenticate connection, in which those nodes having the physical substances identify each other with the above-mentioned authenticate procedure.

Peripheral node has a chip identification device. Any two of those chip identification devices are different from each other. As illustrated in FIG. 11 and FIG. 12, the stem node 1400 holds at least one specific common passcode 1410. As illustrated in FIG. 10, the common passcode that the stem node 1400 outputs may be strictly stored in the inner memory of the stem node 1400 as input code (e.g., 402). As illustrated in FIG. 12, the peripheral nodes (410, 420, and 430) to which the common passcode 1410 is input may output to the stem node 1400 specific identifications (4101, 4201, and 4301), respectively. Any two of the identifications to be returned here are different from each other. Accordingly, as illustrated in FIG. 15, the chip identification device of the present invention, which is embedded to the peripheral nodes, may be required to satisfy the property of output independence. As illustrated in FIG. 10, the stem node 1400 may compare the output signals returned from the peripheral nodes with the registration codes (e.g., 403) strictly stored in the inner memory with regard to the input code (e.g., 402), respectively, as necessary.

As illustrated in FIG. 14, it may be approved that a peripheral node is connected to a plurality of stem nodes. In this case, one peripheral node (e.g., 410) may receive a plurality of common passcodes (e.g., 1410, 2410, and 3410) and may be required to output different identifications (e.g., 11, 12 and 13) with regard to those common passcodes, respectively. Accordingly, the chip identification device of the present invention, which is embedded into peripheral nodes, as illustrated in FIG. 16, may be required to satisfy the property of input independence.

The Method to identify chip is described below.

Subsequently, the condition on the chip identification device of the present invention may be discussed. First, in the case that the chip identification device is formed by software, the output signal in response to the input signal may have to be generated by some kind of algorithm. Accordingly, once the remote attacker decrypts this algorithm, for example, he may be able to counterfeit the registration code as long as he knows the input code. By this way, this remote attacker may be able to hijack a part of the peripheral nodes and then to irregularly access the stem node. To avoid such an illegal access, as illustrated in FIG. 17, the chip identification device of the present invention may be required to satisfy the property of output unpredictability. However, as long as the program is designed with algorithm, any program cannot satisfy the property of output unpredictability. In other words, it may be impossible to generate perfect random number with any program. Therefore, the chip identification device may have to adopt physical randomness.

The chip identification device mentioned above may be embedded into chip with the modules of other functions, or may be produced as a standalone chip having only the chip identification function. Moreover, it may be preferable that the chip identification device generates an output code (identification code) with physical randomness, every time when receiving input code (common passcode). It may be prohibited that those common passcodes are stored in the peripheral nodes. In the case that the electric appliances are formed with a plurality of chips, as illustrated in FIG. 7, at least one chip among those chips may be required to hold the chip identification device of the present invention. Moreover, the chip identification device itself may be a chip realizing an electric appliance. By this way, in the above mentioned network, the peripheral nodes and the stem nodes may be components to form the network, and the components may comprise at least one chip.

The four requirements for the chip identification device of the present disclosure may correspond to the four requirements for PUF, mentioned above, respectively. For example, the property of input independence may be consistent to (1) different output may have to be output if different input is input to the same peripheral node. The property of output independence may be consistent to (2) different peripheral nodes may have to output different outputs even if the same input is input to them. The property of output unpredictability may be consistent to (3) it may be impossible to predict the output in response to an unknown input even though a set of known input and output is theft. The property of input-output reliability may be consistent to (4) the relation of input and output may have to be stable and reliable. Furthermore, as mentioned above, the chip identification device of the present disclosure may have to satisfy the fifth requirement (5) the number of output patterns may be limitlessly large in response to one input, and (6) the chip identification on the network may be required to be chip PUF. As long as the present disclosure is the chip identification device, it may be self-evident that (6) is satisfied. Accordingly, the chip identification device of the present disclosure may be composed to satisfy the above five requirements.

The chip identification device of the present disclosure, which may satisfies all of the above five requirements, may be able to be composed of a plurality of identification cells located on the cell array of the semiconductor device. Hence, those identification cells may be assumed to output a signal "1" or "0" for example.

Figure 22:
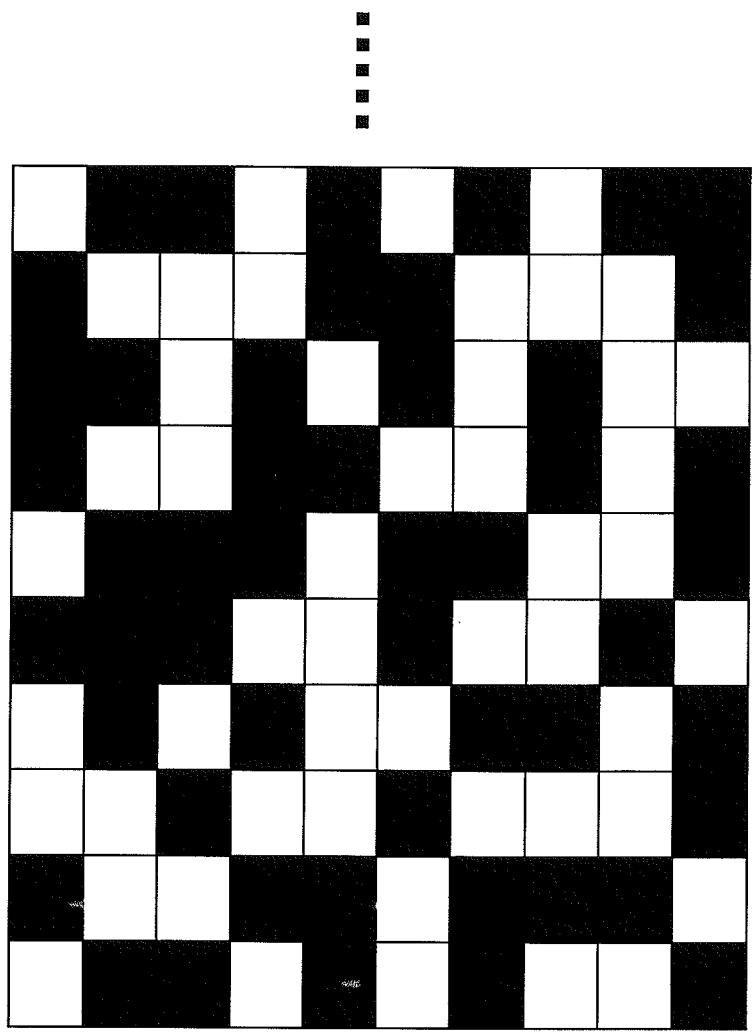
FIG. 22 is an illustration describing an example of the data allocated on the checkerboard pattern.

However, whether the signal output by each identification cell corresponds to "1" or "0" may be probabilistic and then physically random as long as the probability is free from any algorithm. In other words, random combination of "1" and "0" may be generated. By this way, the above third requirement, that is, the property of output unpredictability may be satisfied. Hence, letting "1" and "0" respectively correspond to black and white, the series of those signals may be plot on a checkerboard pattern. Thus, the white and black pattern may be randomly disposed on the checkerboard, as shown in FIG. 22.

Random combination of "1" and "0" may result in that the random digital number is generated. To be digital may be consistent to that the fourth condition, i.e., the property of input-output reliability, is satisfied.

To satisfy the fifth requirement, that is, to make the number of output patterns actually limitlessly large, the number of the cells on the cell array may be required to be as large as possible.

The first and second requirements, that is, the property of input independence and the property of output independence may be satisfied by how to utilize this white and black random checkerboard pattern. It may be concretely explained below.

Figure 23:
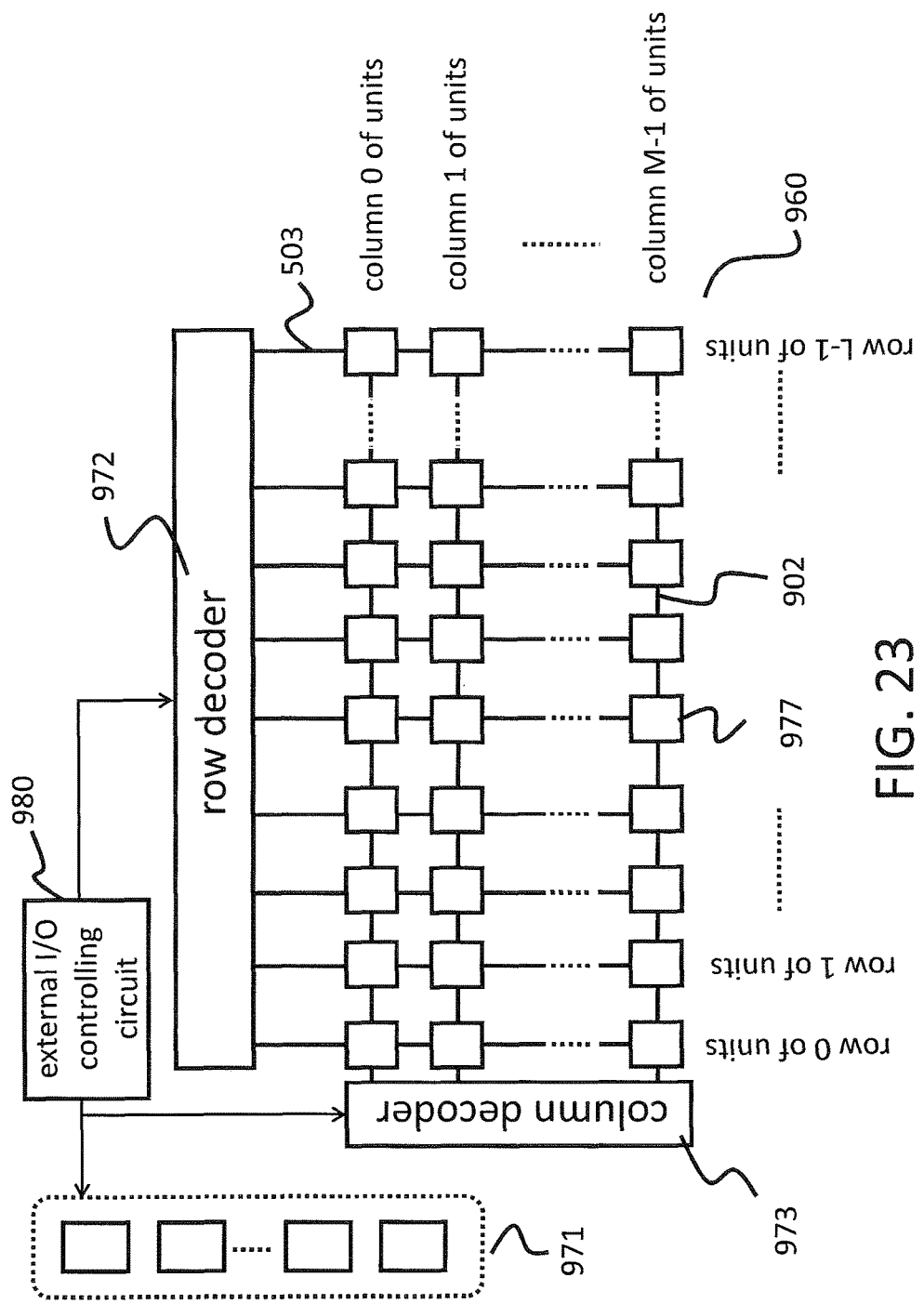
FIG. 23 is an illustration describing an example of the layout of the identification cells allocated on the checkerboard with M-rows and N-columns.

FIG. 23 may be an example of a cell array to realize FIG. 22. There may be L word lines 503 along the row direction, which is vertical in this figure. Perpendicular to those word lines, there may be M bit lines 902 along the column direction. The identification cells 977 that are elements of the chip identification device may be disposed at the crosspoints of the L word lines 503 and the M bit lines 902.

Figure 24:
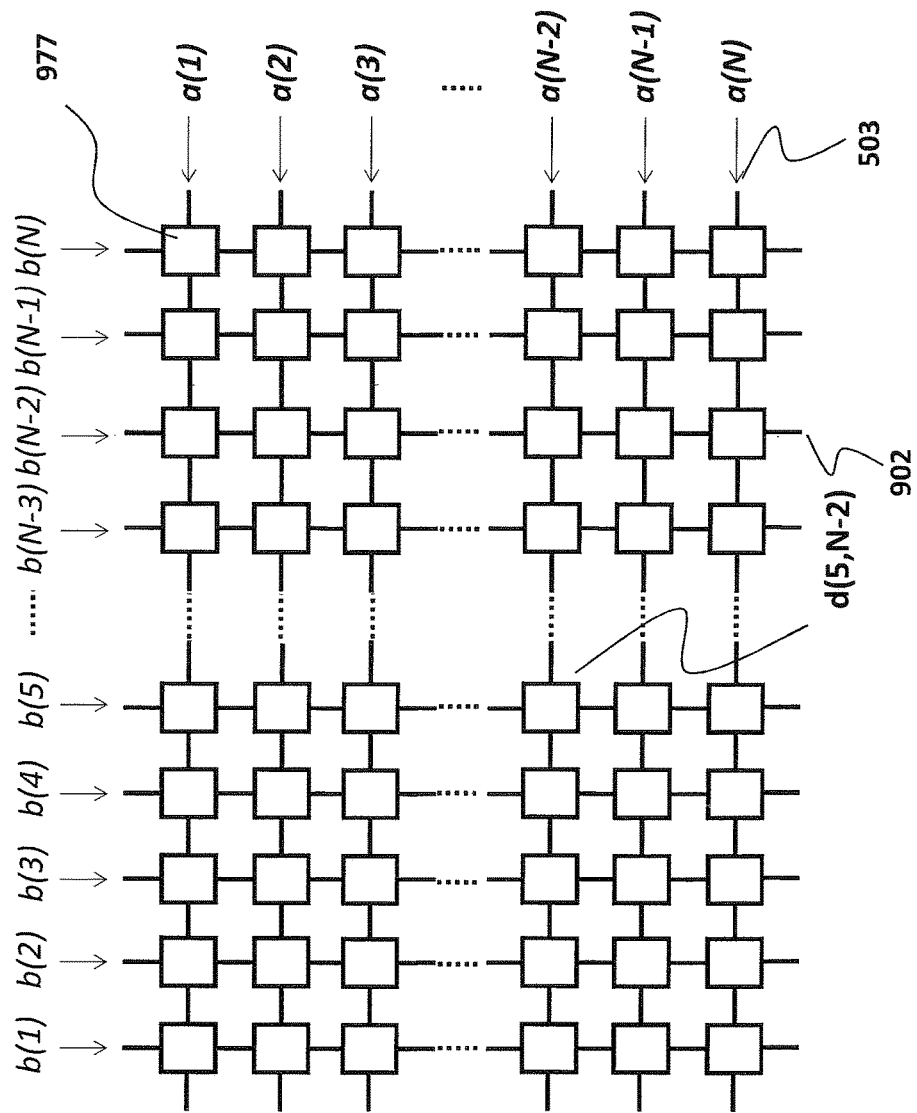
FIG. 24 is an illustration describing an example of a method to input an input code.

FIG. 24 may be a part of N word lines 503 and N bit lines 902, extracted from the array for identification cells 960 in FIG. 23. In general, N may be a natural number, smaller than L and M or equal to at least one of L and M. As an example of the input code (P, S, T . . . ), (a(1), b(1), a(2), b(2), . . . , a(N), b(N)) may be assumed. This input code may be divided into the two sequences a and b. Then, (a(1), a(2), . . . a(N)) may be made to correspond to the row numbers from the first row. Simultaneously, (b(1), b(2), . . . b(N)) may be made to correspond to the column numbers from the first column. The element of matrix data d(i,j) may be regarded as related to output signal of identification cell 977 at the i-th row and the j-th column in response to the input composed of the combination of a(i) and b(j). For example, d(i,j) may be "1" or "0", where i and j may be natural numbers from 1 to N. Hence, a combination of the natural numbers (i, j) may correspond to the address of the identification cell 977. In the example of FIG. 24, the element of d(5, N−2) may be illustrated. Hence, the ensemble {d(i,j)} of the elements d(i,j) may be random code composed of random aggregation of "0" and "1". If the value of d(i,j) is "1", it may be black. Otherwise, it may be white. Then, the white and black random pattern may be obtained on checkerboard, as shown in FIG. 22.

It may be thus possible to make the input code correspond to the addresses of the identification cells by dividing the input code into two parts and then respectively allocating those elements along row and column. The dividing method of the input code may be defined according to a predetermined formula. Of course, it may be self-evident that another example is to exchange the sequences a and b. There may be innumerable methods. The method to alternatively extract the sequences a and b from the input code, as demonstrated hence, may be an example and not beyond. Furthermore, the number of the elements of the sequences a and b may be unnecessary to be the same. However, it may be presumed that the sum of the numbers of row and column of the array for identification cells 960 may at least be larger than the number of the entire elements of the input code, in order that the entire element of the input code is able to be input. Hence, the above-mentioned input code may be represented by {a(i), b(j)}, where i and j may be independent natural numbers. Thus, the output code {c(i,j)} may be generated by compounding the random code {d(i,j)} and the sequences {a(i)} and {b(j)} with utilizing some kind of method. Accordingly, the output code {ci,j)} is a compound data from those codes. A combination of the input code {a(i), b(j)} and the output code {c(i,j)} may correspond to the communication series 80 shown in FIG. 9. The physical random number may be adopted as an example of this random code {d(i,j)}.

As an example related to the present disclosure, a method to generate the output code {c(i,j)} mainly from the first input sequence {a(i)}, the second input sequence {b(j)} and the physical random number {d(i,j)} may be illustrated with using the figures as follows.

As an example, the elements of the sequences {a(i)} and {b(j)} may be assumed to be "0" or "1", and then the remainder operation mod (x,y) may be adopted to generate the output code {c(i,j)}:

$$c(i,j)=\mod(a(i)+b(j)+d(i,j),2) \quad \text{Eq. 1.}$$

FIG. 25 may be a chart of the relationship among the sequences {a(i)} and {b(j)} and the output code {c(i,j)} to be output on the basis of Eq. 1. By using this method, it may be supposed that the ratio of "0" and "1" may be unchangeable before and after this conversion. This may be a necessary condition to stabilize the quantity of the information treated by the communication series 80. In other words, the quantity of information input to the right hand side of Eq. 1 may be almost equivalent to that to be output from the left hand side of Eq. 1. In other hand, in the case that the quantities of the information to be input and output are substantially different, the smaller one may be selected automatically as the quantity of the information of the system. As a result, the information quantity equivalent to the difference between larger and smaller ones may be lost. The lost quantity may cause an obstruction to the fifth requirement added; (5) the number of the output patterns may be limitlessly large. Accordingly, such a situation should be avoided as possible. To satisfy this requirement (5), the number of the cases of random number may be required to be as large as actually limitless.

Figure 26:
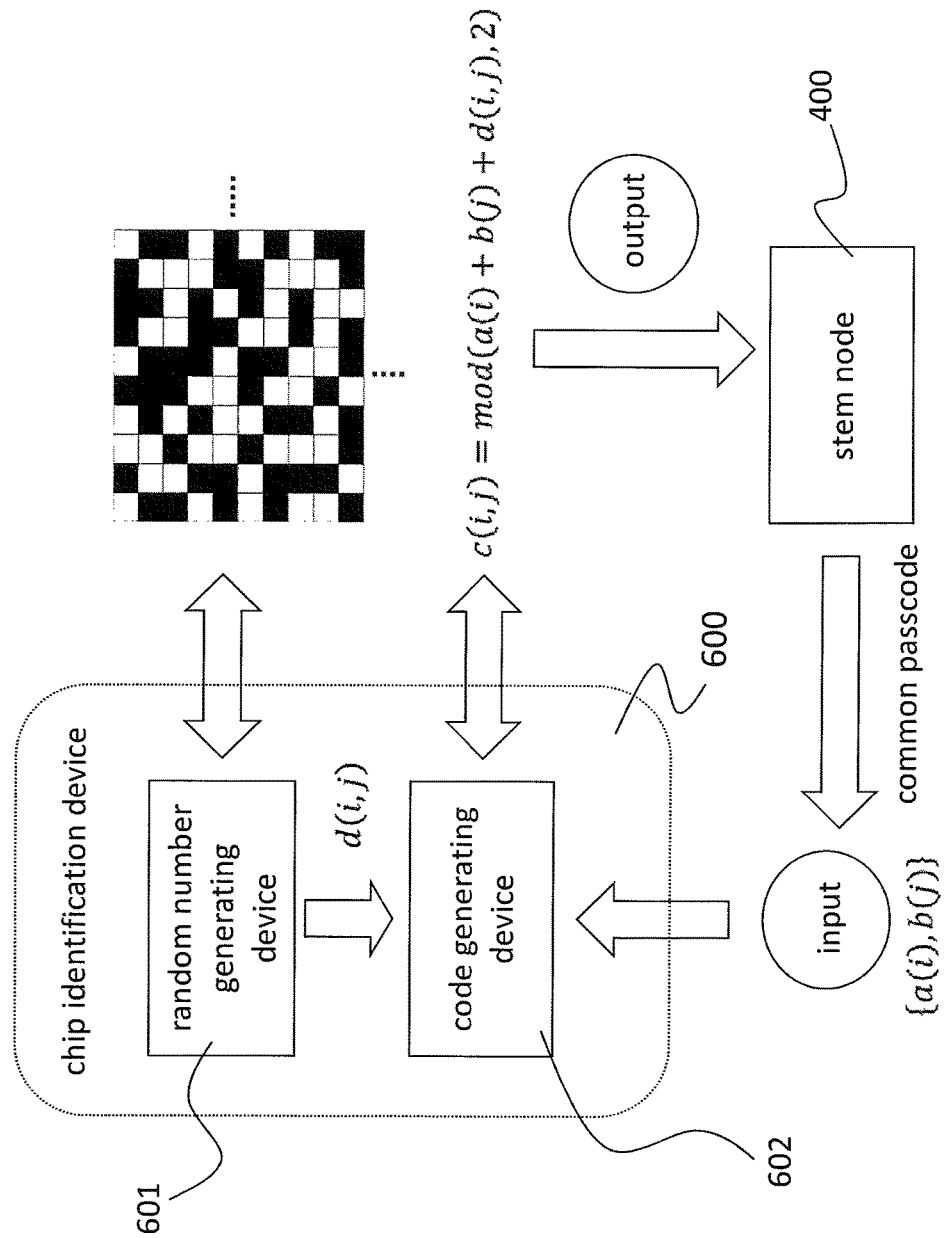
FIG. 26 is an illustration describing an example of a basic configuration to illustrate an example of a usage of the chip identification device.

FIG. 26 may be a conceptual illustration for explaining an example of the basic structure for realizing the mechanism described by Eq. 1. In other words, the physical random number {d(i,j)} may be generated by random number generating device 601. Then, the stem node 400 may input the input code {a(i),b(j)} to the code generating device 602 as a common passcode, so as to generate the output code {c(i,j)}. In this example, both of the random number generating device 601 and the code generating device 602 may be components of the chip identification device 600. On the other hand, the code generating device 602 may be located out of the chip identification device 600 in another example, while it is not to be illustrated in the drawing because it is self-evident. Anyway, the random number generating device 601 may have to be equipped in chip at least as cheap as possible. In this disclosure, the method conceptually illustrated in FIG. 22 may be adopted as an example of the random number generating device 601. As shown in Eq. 1, the code generating device 602 may adopt a kind of algorithm (e.g., the remainder), but simultaneously involve physical randomness with the physical random number {d(i,j)}. Accordingly, the above requirement (3), that is, the property of output unpredictability may be satisfied. Furthermore, to involve the entire elements of the input code, the sum of the numbers of row and column of the random number generating device 601 may be at least equal to or larger than the sum of the elements of {a(i)} and {b(j)}.

Figure 27:
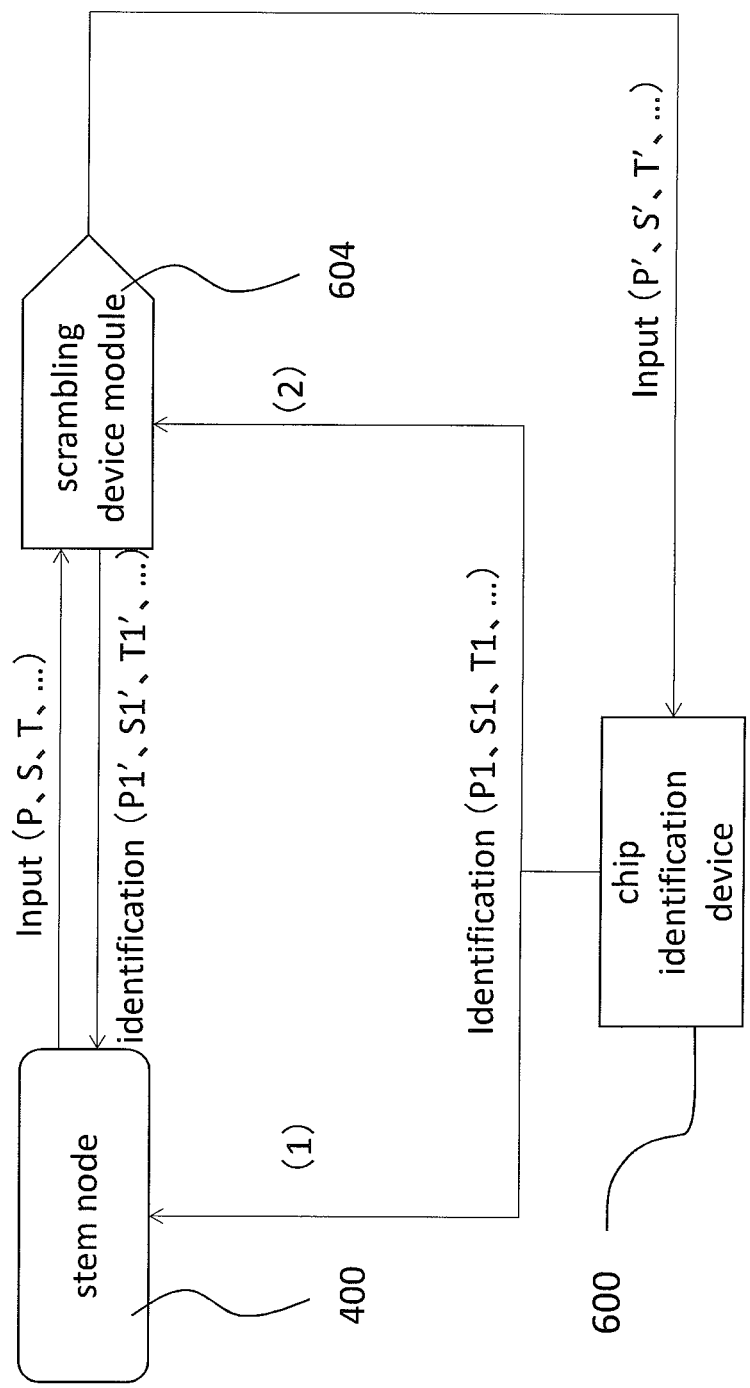
FIG. 27 is an illustration describing an example of a concept of the embodiment appended with the scrambling device.

FIG. 27 may be a drawing to illustrate another example of this disclosure. In other words, the stem node 400 may send the input code (P, S, T . . . ) to the scrambling device 604. By this way, the input code (P, S, T, . . . ) may be converted to (P', S', T', . . . ). This converted code may be regarded as an input code (P', S', T', . . . ) to be input to the chip identification device 600 mounted as a module in the peripheral node. Hence, while not specially illustrated in the drawing, the peripheral node connecting to the stem node 400 may include at least one chip equipped with the chip identification device 600. The chip identification device 600 may return the identification (P1, S1, T1, . . . ) in reply to the input code (P', S', T', . . . ). Next, (1) this identification (P1, S1, T1, . . . ) may be output to the stem node 400. Or, (2) this identification (P1, S1, T1, . . . ) may be returned to the scrambling device 604 and then the scrambled identification (P1', S1', T1', . . . ) may be returned to the stem node 400. Or, (3) while not specially illustrated in the drawing since self-evident, a second scrambling device may convert the identification (P1, S1, T1, . . . ) into the identification (P1", S1", T1", . . . ) and then return it to the stem node 400. In the method of (3), at least two independent scrambling devices may be necessary.

Figure 28:
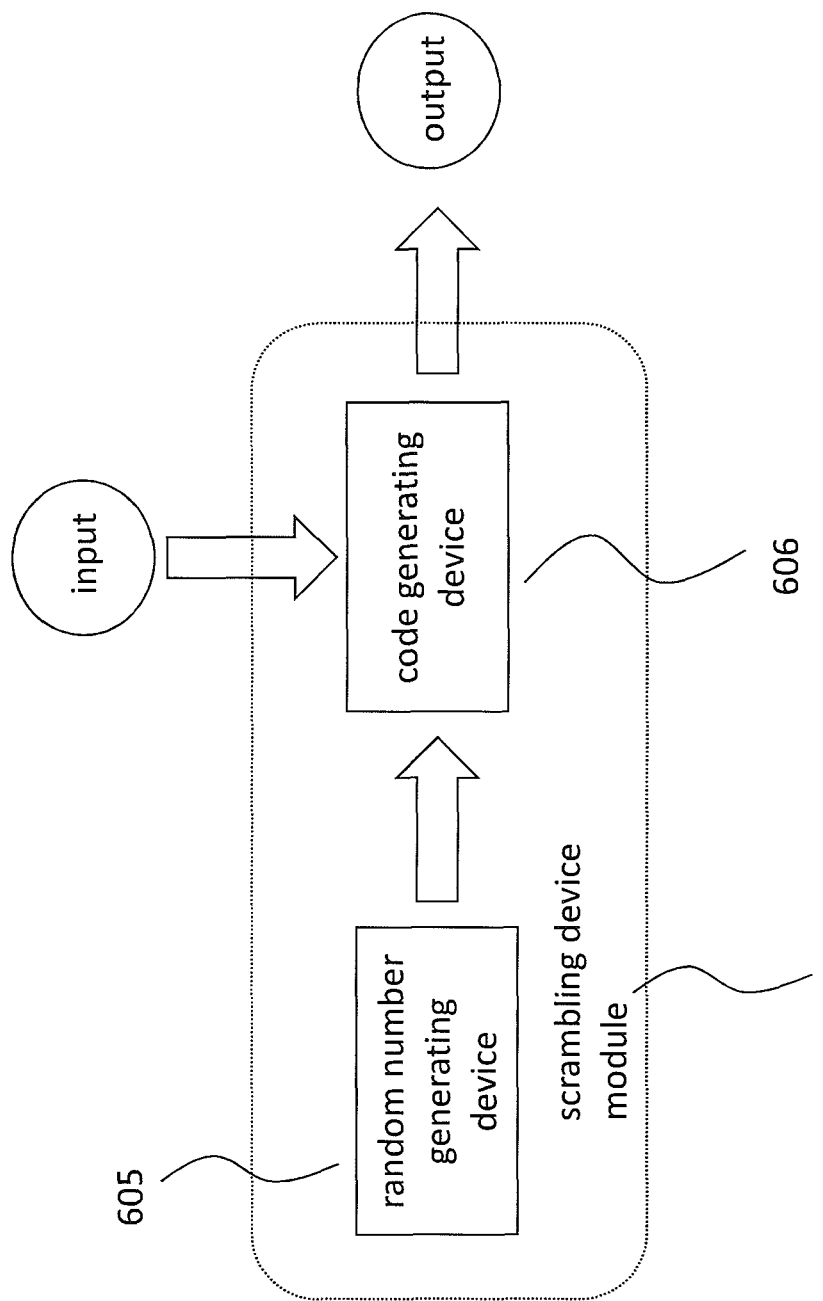
FIG. 28 is an illustration describing an example of a basic configuration of a scrambling device.

Anyway, it may be preferable that the scrambling device 604 is embedded into the same chip with the chip identification device 600 in cost. FIG. 28 may illustrate an example of the basic configuration of the scrambling device 604. In this example, the scrambling device 604 may comprise the random number generating device 605 and the code generating device 606. The detailed description of the random number generating device 605 and the code generating device 606, which comprises the scrambling device 604, may be similar to FIG. 26 and then omitted here. Furthermore, the code generating device 606 may be able to be located out of the scrambling device 604, while it may not be specially illustrated in drawing since it may be self-evident.

Figure 29:
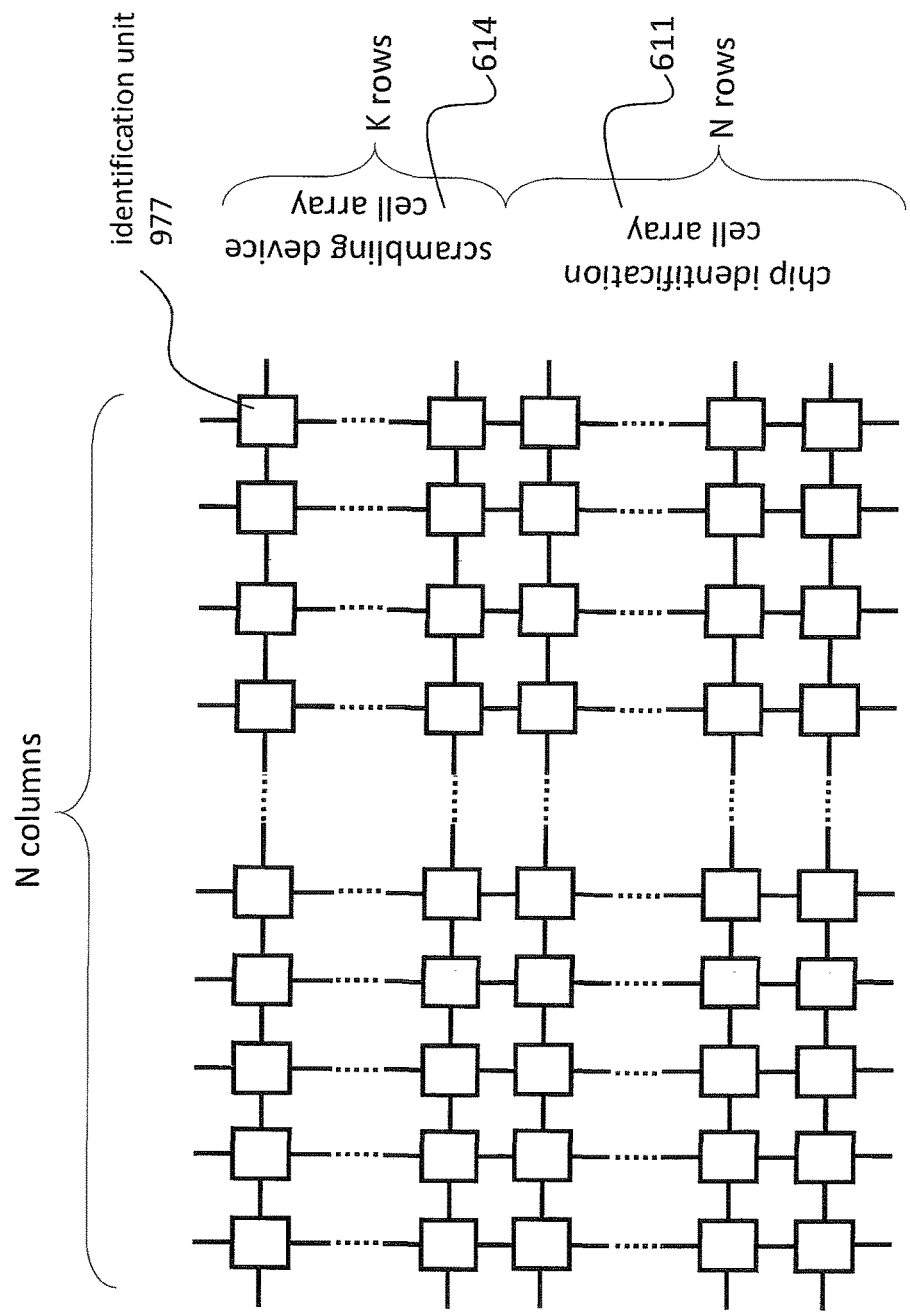
FIG. 29 is an illustration describing an example of the cell arrays having both the scrambling device and the chip identification device.

FIG. 29 may be an example or a part of the array for identification cells 960 including the identification cells 977 in FIG. 23. On contrary to FIG. 23, the row is along the horizontal direction and the column is along the vertical direction. In this example, the number of the rows is N+K and the number of the columns is N. The area composed of the upper K rows and the N column lines may be allocated to the cell array for scrambling device 614 constituting the scrambling device 604. The area composed of the lower N rows and the N columns may be allocated to the cell array 611 composing the chip identification device 600 (i.e., the cell array for chip identification device 611). Of course, the essence of the present disclosure may be unchangeable even though replacing row and column.

Figure 30:
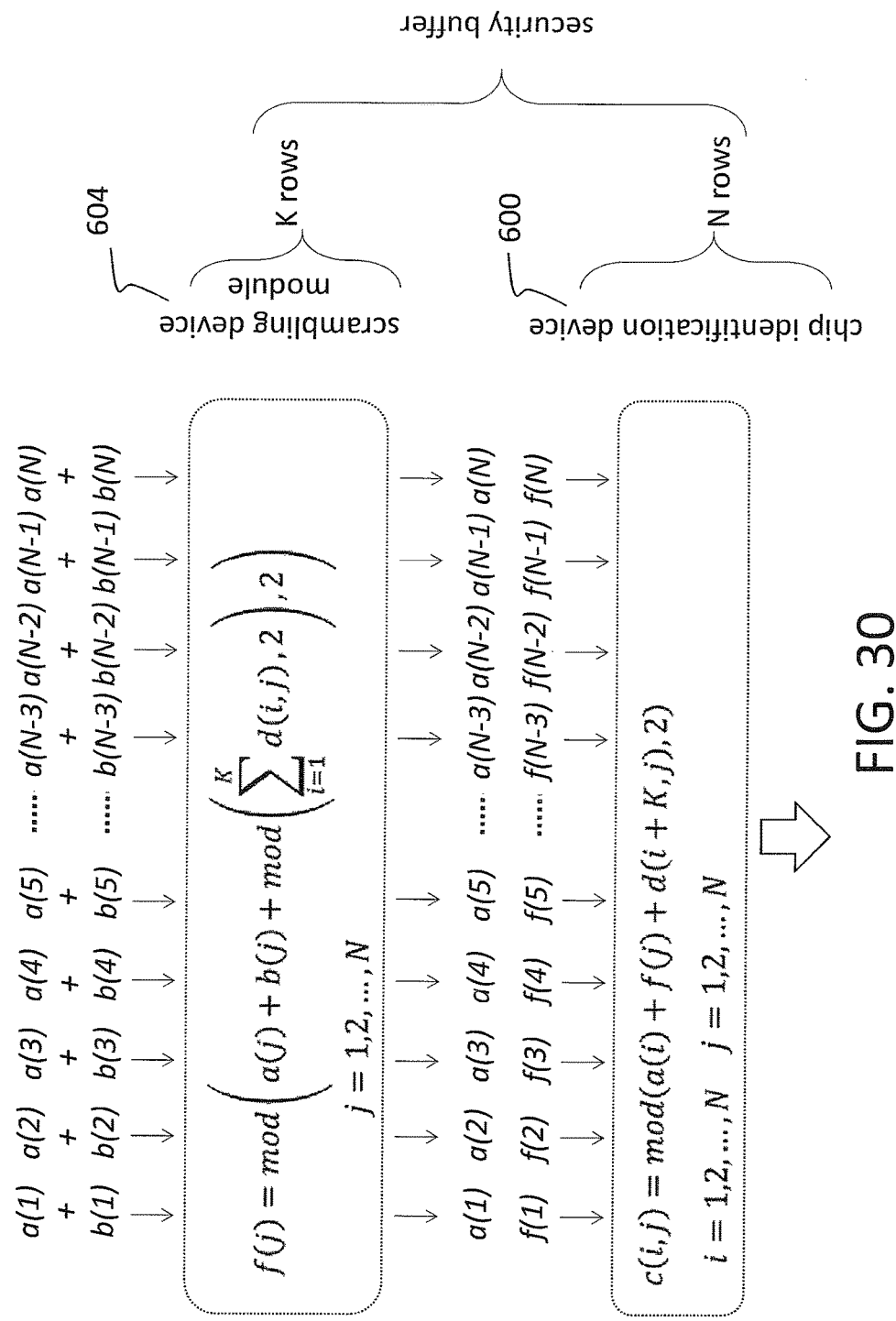
FIG. 30 is an illustration describing an example of an operation mechanism of the scrambling device and the chip identification device.

FIG. 30 may be a drawing to explain an example of another method to realize the random number generating device 605 composing the scrambling device 604. First, {a(j)+b(j)} may be input to every column, where j is the column number. Next, according to Eq. 2, the element of the physical random number d(i,j) may be summed up along the row and then divided by 2 to obtain the remainder at a given column, where i is the row number. Then, the a(j)+b(j) may be added to the remainder at a given column. The sum may be further divided by 2 to obtain a second reminder, which may be regarded as the intermediate code {f(j)} at a given column number. By this way, the input code {a(j), b(j)} may include the physical random number in the scrambling device 604 and then converted to the intermediate input {a(i), f(j)}. This {a(i), f(j)} may be input to the chip identification device 600. Then, according to Eq. 3, the output code {c(i,j)} may be output. Furthermore, while not specially illustrated since self-evident, the sequence {b(j)} may be able to be a dummy sequence.

$$f(j) = \mod\left(a(j) + b(j) + \mod\left(\sum_{i=1}^{K} d(i, j), 2\right), 2\right). \quad \text{Eq 2}$$

$$c(i, j) = \mod(a(i) + f(j) + d(i+K, j), 2). \quad \text{Eq 3}$$

Hence, it may not be always necessary that the stem node determines the row number of the scrambling device 604, K, and the row number of the chip identification device 600, N. For example, an owner or a regular administrator of the peripheral node may voluntarily determine (N, K), when the peripheral node is registered. The determined (N, K) may be stored in the inner memory of the peripheral node and so on. Or, on the contrary, the (N, K) may be able to be stored in the inner memory of the stem node.

It may not be always necessary that the stem node knows (N, K). However, after a peripheral node is registered and then connected to the network that the stem node administrates, the peripheral node may be inspected at the network maintenance by the stem node, and then (N, K) may be able to be updated as necessary. At that time, the peripheral node may be re-registered by the updated (N, K).

If (N,K) is changed, the intermediate input $\{a(i), f(j)\}$ generated by the scrambling device 604 may be different from the previous one even with the same input code $\{a(i), b(j)\}$. Accordingly, the output code $\{c(i,j)\}$ generated by the chip identification device 600 may also differ.

As an example, the stem node may recode (N, K) determined at the previous maintenance of the peripheral node. At the coming maintenance, the (N, K) stored in the inner memory of the peripheral node to be inspected may be read and then compared with (N, K) stored in the stem node. If they are inconsistent, this peripheral node may be regarded as irregularly accessed and then disconnected from the network, or the alert may be sent to the administrator. By this way, (N, K) may be able to play a role of security buffer. Moreover, since the physical random number $\{d(i,j)\}$ is adopted in the method based on Eqs. 1-3, the leakage of the security buffer (N, K) may be no problem.

The code generation is executed on the basis of Eqs. 1-3. Then, in the case that the operational processing unit equipped in the chip having the code generating device 602 is adopted to generate the codes, it may be preferable that the entire or a part of the intermediate code $\{f(j)\}$ generated between the scrambling device 604 and the chip identification device 600 is stored in the resistor inside the operational processing unit for avoiding the leakage of the intermediate code $\{f(j)\}$ to the exterior of the operational processing unit. Or, the entire or a part of the intermediate code $\{f(j)\}$ generated between the scrambling device 604 and the chip identification device 600 is removed every time according to the requirement. In other words, it may be prohibited to output the intermediate input $\{a(i), f(j)\}$, which comprises a part of the input code $\{a(i), b(j)\}$ and the intermediate code $\{f(j)\}$, to the exterior of the peripheral node.

Moreover, it may be extremely hard to extract the intermediate code $\{f(j)\}$ confined in the chip, i.e., the operational processing unit, from its register which generates codes, with using the reverse-engineering by the remote control. It may be because the register is a very small dynamical memory. For example, it may be 32 bits or at most 64 bits in a general personal computer. On the other hand, the memory capacity necessary to store the whole intermediate code $\{f(j)\}$ may be N bits. Accordingly, to generate a code, a large enough N may force the intermediate code $\{f(j)\}$ divided into a plurality of segments to be stored in register one at once. Hence, R may be the bit number of the register to be used to generate code at once. For example, in FIG. 30, the first to the R-th columns may correspond to segment-1, the R+1$^{th}$ to the R+2$^{th}$ columns may correspond to segment-2, the 2R+1$^{th}$ to the 3R$^{th}$ columns may correspond to segment-3, etc. A part of the intermediate code $\{f(j)\}$ may be generated on the basis of Eq. 2 and then stored in the register. In other words, as long as N is large enough, the memory area of the register in which the intermediate code $\{f(j)\}$ is stored may be overwritten every time the segment is updated. Accordingly, it may be hardly possible to steal the whole intermediate code $\{f(j)\}$ by remote control even during the code generation.

Or, the code generation may be executed on the basis of Eqs. 1-3. Then, in the case that the operational processing unit equipped in the peripheral node having the code generating device 602 is adopted to generate codes, it may be preferable that the whole or a part of the intermediate code $\{f(j)\}$ generated between the scrambling device 604 and the chip identification device 600 is stored in the inner memory inside the peripheral node for avoiding the leakage of the intermediate code $\{f(j)\}$ to the exterior of the peripheral node. In other words, it may be prohibited to output the intermediate input $\{a(i), f(j)\}$, which comprises a part of the input code $\{a(i), b(j)\}$ and the intermediate code $\{f(j)\}$, to the exterior of the peripheral node.

Or, the code generation may be executed on the basis of Eqs. 1-3. Then, in the case that a peripheral circuit on the same chip is adopted to generate codes, it may be preferable that the intermediate code $\{f(j)\}$ generated between the scrambling device 604 and the chip identification device 600 may not be output to the exterior of the chip. In other words, it may be prohibited to output the intermediate input $\{a(i), f(j)\}$, which comprises a part of the input code $\{a(i), b(j)\}$ and the intermediate code $\{f(j)\}$, to the exterior of the chip.

Anyway, it may be preferable that the intermediate code $\{f(j)\}$ is erased by the automatic overwriting after completing the generation of the output code $\{c(i,j)\}$. It may be also noted that the physical random number $\{d(i,j)\}$ (i=1, ... K) is adopted to generate the intermediate code $\{f(j)\}$ from the input code $\{a(i), b(j)\}$. Then, as long as the element number of $\{d(i,j)\}$ (i=1, ... K) is large enough, it may be actually impossible to predict the intermediate code $\{f(j)\}$ from the input code $\{a(i), b(j)\}$. Moreover, it may be also noted that a different physical random number $\{d(i,j)\}$ (i=K+1, ... K+N) from the previous one is adopted to generate the output code $\{c(i,j)\}$ from the intermediate input $\{a(i), f(j)\}$. As long as the element number of the physical random number $\{d(i,j)\}$ (i=K+1, ... K+N) is large enough, it may be actually impossible to predict the output code $\{c(i,j)\}$.

For example, the bit capacity of the cell array for scramble devices 614 (row number: K) and the cell array for chip identification device 611 (row number: N), as shown in FIG. 29, may be discussed as follows. First, the number of cases of input code may be 2 to the power of 2N. The number of cases of the physical random number $\{d(i,j)\}$ of the cell array for scrambling device 614 may be 2 to the power of NK. On the other hand, the number of case of the physical random number $\{d(i,j)\}$ of the cell array for chip identification device 611 may be 2 to the power of the square of N. The number of cases of the output code $\{c(i,j)\}$ may be 2 to the power of the square of N.

Next, the requirement to determine (N, K) may be discussed. The input codes, used in the usual digital cryptolines, may be 128 to 256 bits. This bit number may have been increased annually because of the encryption security, but it may transit from 256 bits to 512 bits in the coming 10 years. Then, the case of N=K=512 may be discussed as an example. In this case, the number of cases of input code may be the 2 to the power of 1,024. This may be much beyond the information quantity that the conventional calculator can deal with. In actual, the infinity may be shown on the display of the calculator. The number of cases corresponding to physical random numbers of scrambling device $\{d(i,j)\}$, the chip identification device $\{d(i+N,j)\}$, and the output code $\{c(i,j)\}$ may be further large, i.e., all to be 2 to the power of the square of 512. Of course, it may be actually infinity. Hence, since the square of 512 is 262,144, 262 k bits may be good enough for the chip identification device. This bit capacity may be smaller by 4 orders than the bit capacity per die in the conventional DRAM product (4G bit), i.e., less than one-to-10,000.

In the case of N=K=128, the number of cases of input code may be 2 to the power of 256, i.e., about 10 to the power of 77. As mentioned above, it may be regarded that the number of the communication nodes is more than one trillion (10 to the power of 12) all over the world in the period of Internet of Things. Although 10 to the power of 77 is not the infinity, it may be much larger than the number of the nodes all over the world. Then, the possibility that two input codes are accidentally the same may be about 10 to the power of −65, extremely small, and then actually zero. The number of cases corresponding to the physical random numbers of the scrambling device {d(i,j)}, the chip identification device {d(i+N,j)}, and the output code {c(i,j)} may be further large, i.e., all to be 2 to the power of the square of 128. Of course, it may be actual infinity. Hence, since the square of 128 is 16,384, 16 k bits may be good enough for the chip identification device. This bit capacity may be smaller by 5 orders than the bit capacity per die in the conventional DRAM product (4 G bit), i.e., less than one-to-100,000.

By this way, even though the intermediate code {f(j)} was stolen, the physical randomness {d(i,j)} (j=K+1, . . . K+N) would disable for predicting the output code {c(i,j)}. Furthermore, since the security buffer (N, K) may be able to be updated as required, the intermediate code to be generated in response to the same input code {a(j),b(j)} may be updated as required.

Figure 31:
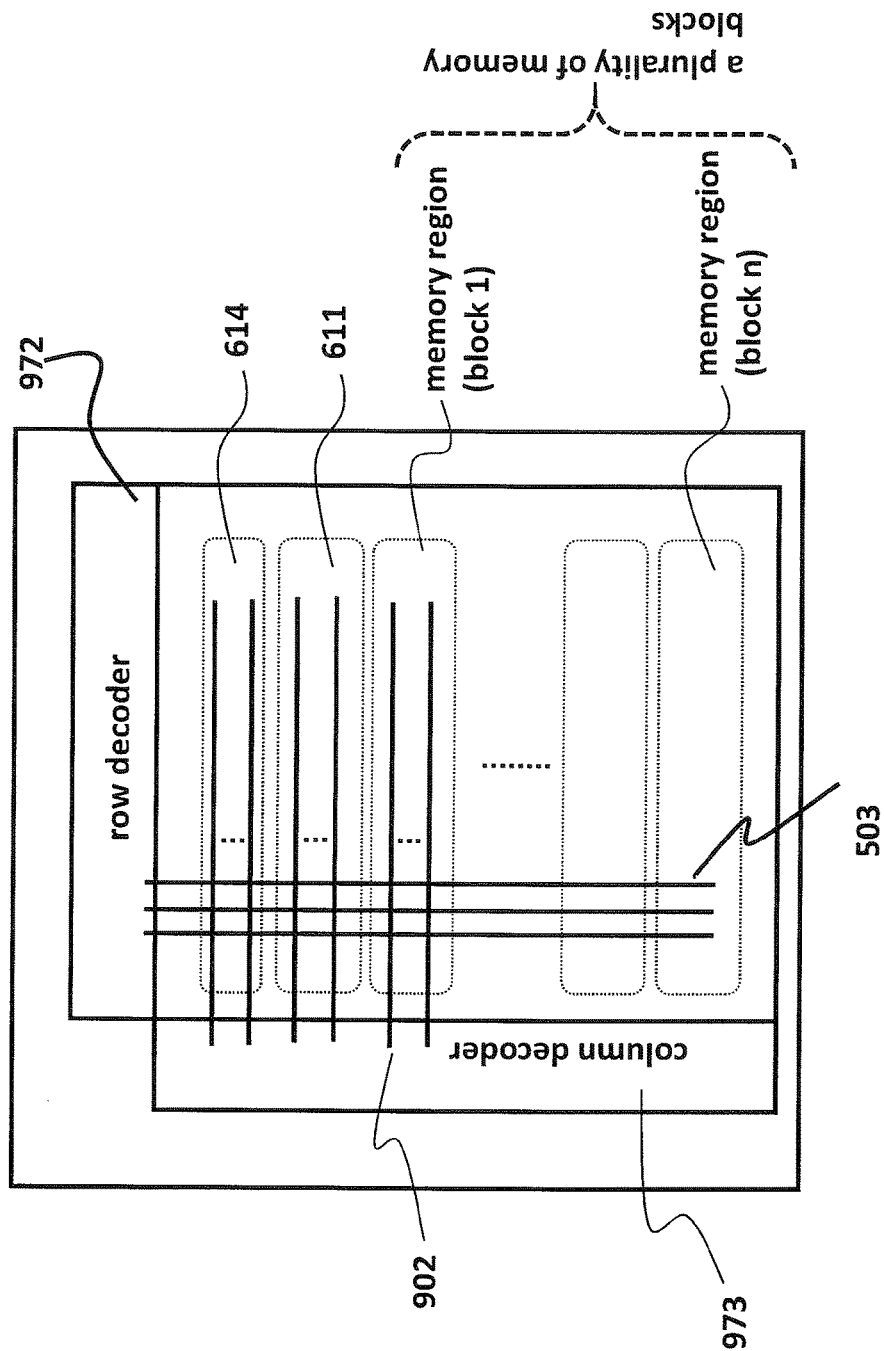
FIG. 31 is an illustration describing an example of a structure of a block array.

FIG. 31 may be an illustration describing an example of a memory chip including the cell array for scrambling device 614 and the cell array for chip identification device 611. Those areas and memory area may be configured together along the direction of word line 503 that they share.

Figure 32:
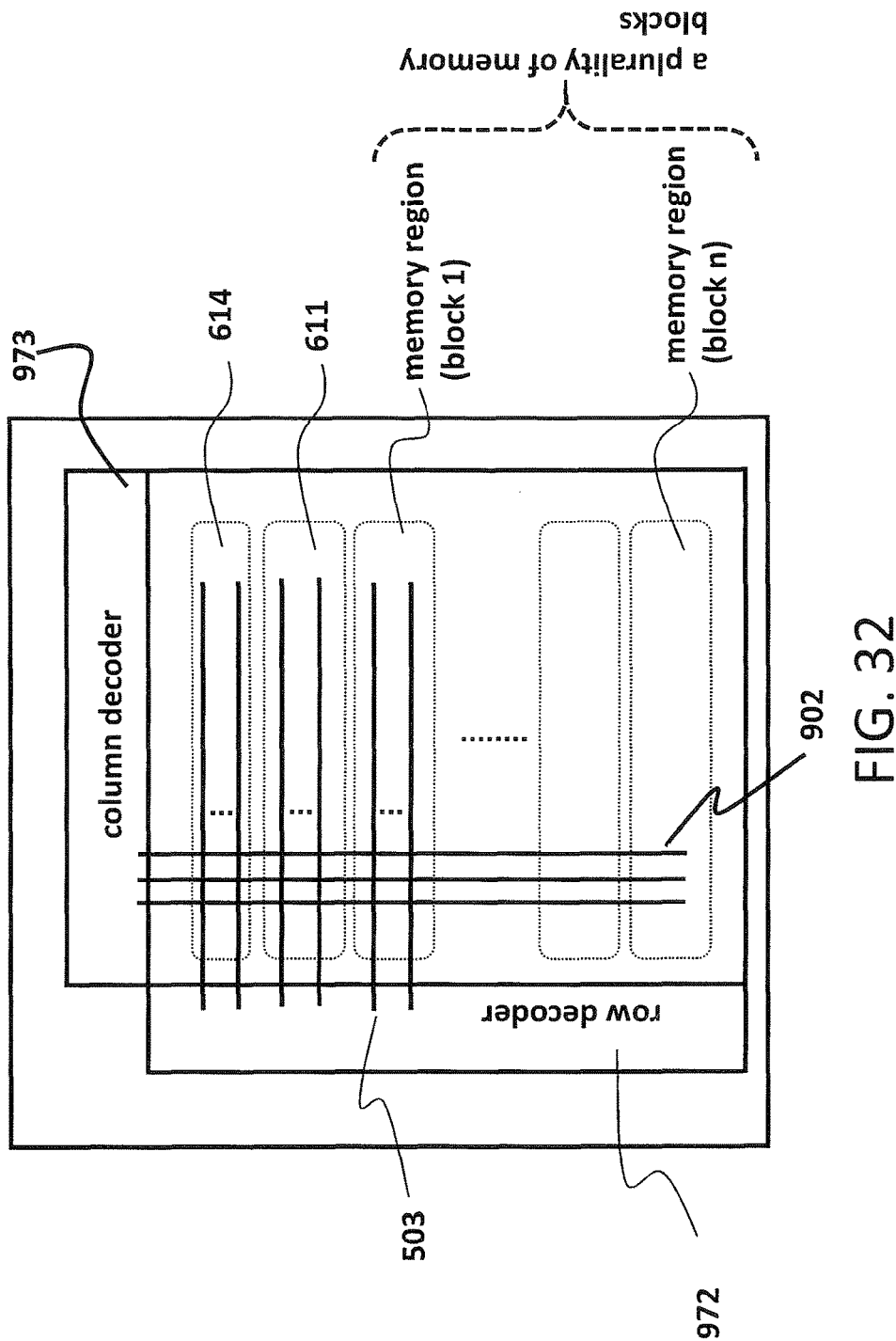
FIG. 32 is an illustration describing an example of a structure of a block array.

FIG. 32 may be an illustration describing another example of a memory chip including the cell array for scrambling device 614 and the cell array for chip identification device 611. Those areas and the memory area may be configured together along the direction of the bit line 902 that they share. By this way, the essence of the present disclosure may be unchangeable even by replacing the word line 503 and the bit line 902.

Figure 33:
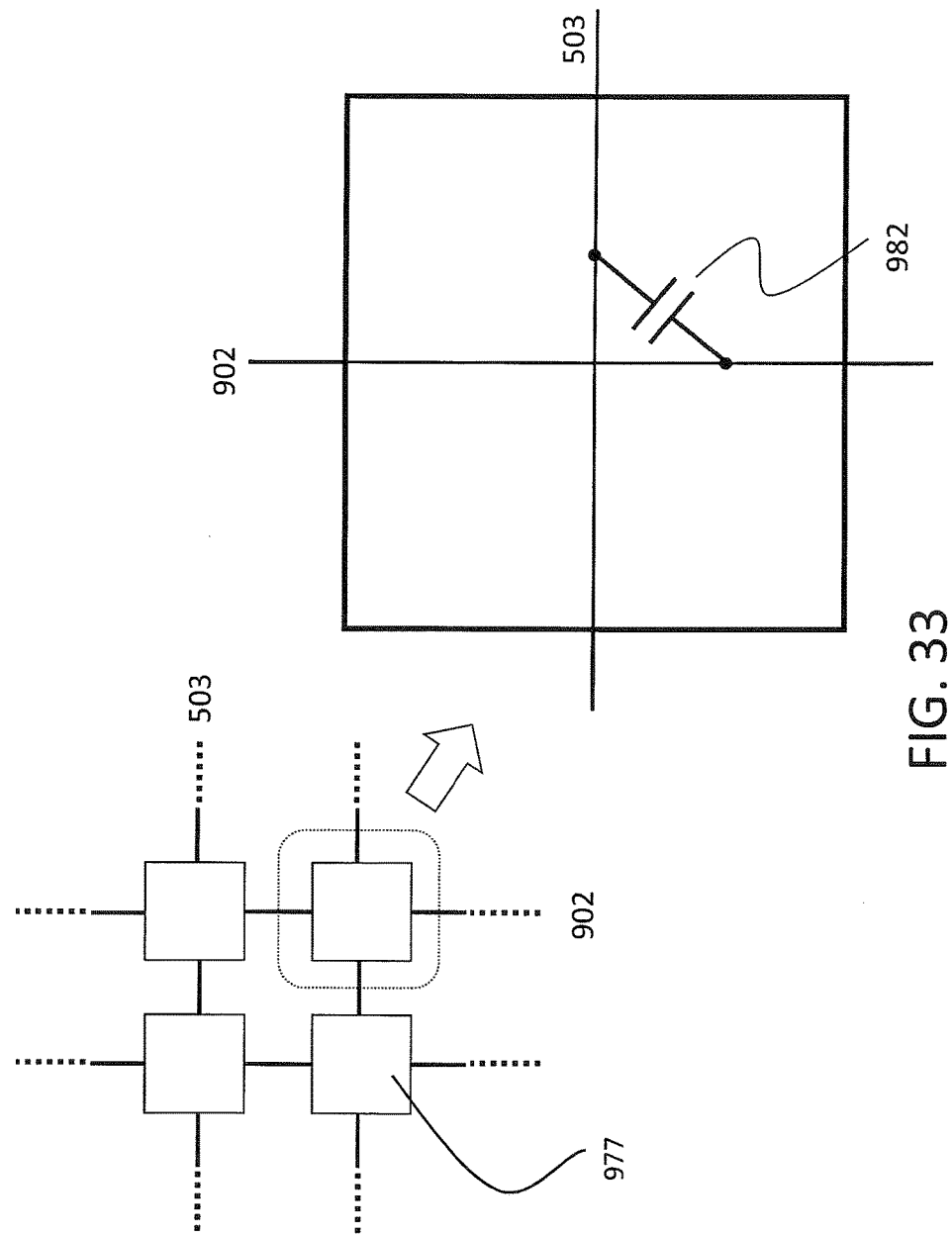
FIG. 33 is an illustration describing an example of an identification cell (capacitor).

FIG. 33 may be an illustration describing an example of the identification cell 977. The capacitors 982 may be configured at cross-points of word lines 503 and bit lines 902. In general, the capacitor may comprise an insulating film sandwiched by two ends, which stores charge by applying an electric field therebetween. Usually electric current may not flow as long as the applied electric field is DC. However, if the applied electric field is very high even though that is DC, the insulating film may be broken and then the electric current may flow. It may be possible to apply the electric field on capacitor 982 at the selected cross-point by applying voltage between word line 503 and bit line 902. Furthermore, both DC and AC voltages may be capable of breaking the insulating film.

This breakdown may occur probabilistically and then cause physical randomness. The electric current may be easy to flow through the broken identification cell even at a small electric field, e.g., "1" in terms of semiconductor memory. It may correspond to black in FIG. 22. On the contrary, it may be difficult that electric current flows through the unbroken identification cell at a small electric field, e.g., 0" in terms of semiconductor memory. It may correspond to white in FIG. 22. It may be possible to roughly control this possibility by tuning the applied electric field and the detailed condition of the capacitor (physical property, structure, size and so on) for breaking the insulating film. If the possibility is tuned to be about 50%, white and black random checkerboard pattern may be obtained, as shown in FIG. 22.

Figure 34:
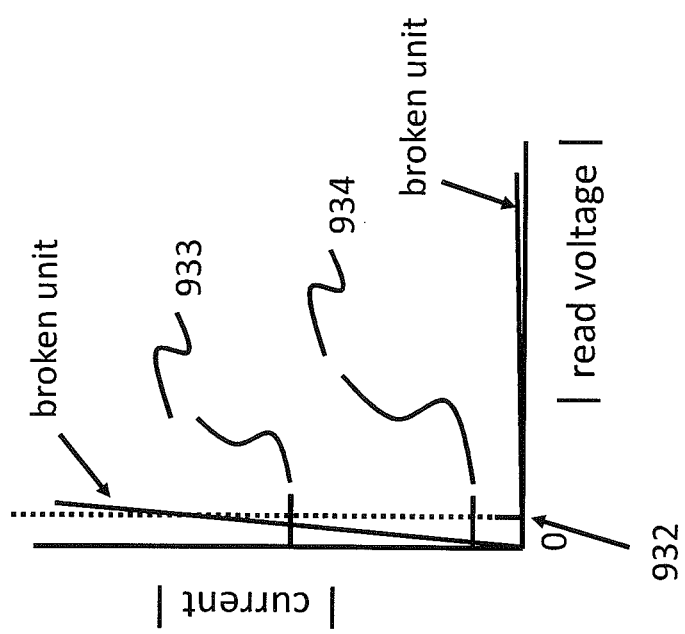
FIG. 34 is an illustration describing an example of a method to read the data from the identification cell.

FIG. 34 may be an example of a current-voltage characteristic to be used for the inspection of breakdown. The horizontal axis may be an absolute value of a read voltage to be applied to the identification cell 977 (capacitor 982 in the example of FIG. 33) for read. The vertical axis may be an absolute value of an electric current flowing through the identification cell 977 in response to the read voltage. Hence, the electric field applied on identification cell may be high if the voltage is high and may be low if the voltage is low. In a broken identification cell, very high electric current may flow even at a low voltage. On the other hand, in an unbroken identification cell, least electric current may flow even at a high voltage. To distinguish this difference, it may be preferable to introduce the breakdown judge current value 933 and the non-breakdown judge current value 934 at the breakdown judge voltage 932. In other words, when the read voltage whose absolute value is equivalent to the breakdown judge voltage 932 is applied on an identification cell 977, the cell may be regarded as broken if the absolute value of the electric current flowing though the cell is higher than the breakdown judge current value 933. The cell may be regarded as non-broken if the absolute value of electric current flowing though the cell is lower than the non-breakdown judge current value 934.

Actually to read, first of all, the address of the cell to be read may have to be selected. To select the address, as shown in FIG. 23, the row of the cell may be selected by the row decoder 972 and the column of the cell may be selected by the column decoder 973. The combination of the row number and the column number of the cell may be the address. In an example of FIG. 35, this address may be represented in binary at the first line. By this way, the read voltage may be applied between the word line 503 and the bit line 902 which correspond to the selected address in a manner explained in FIG. 34, and then the data at the corresponding address may be read ("1" or "0"). After reading, the address to be selected may be changed and then data of the next identification cell may be read. This procedure may be repeated until the entire identification cells in the array for identification cells 960 are read.

Figure 35:
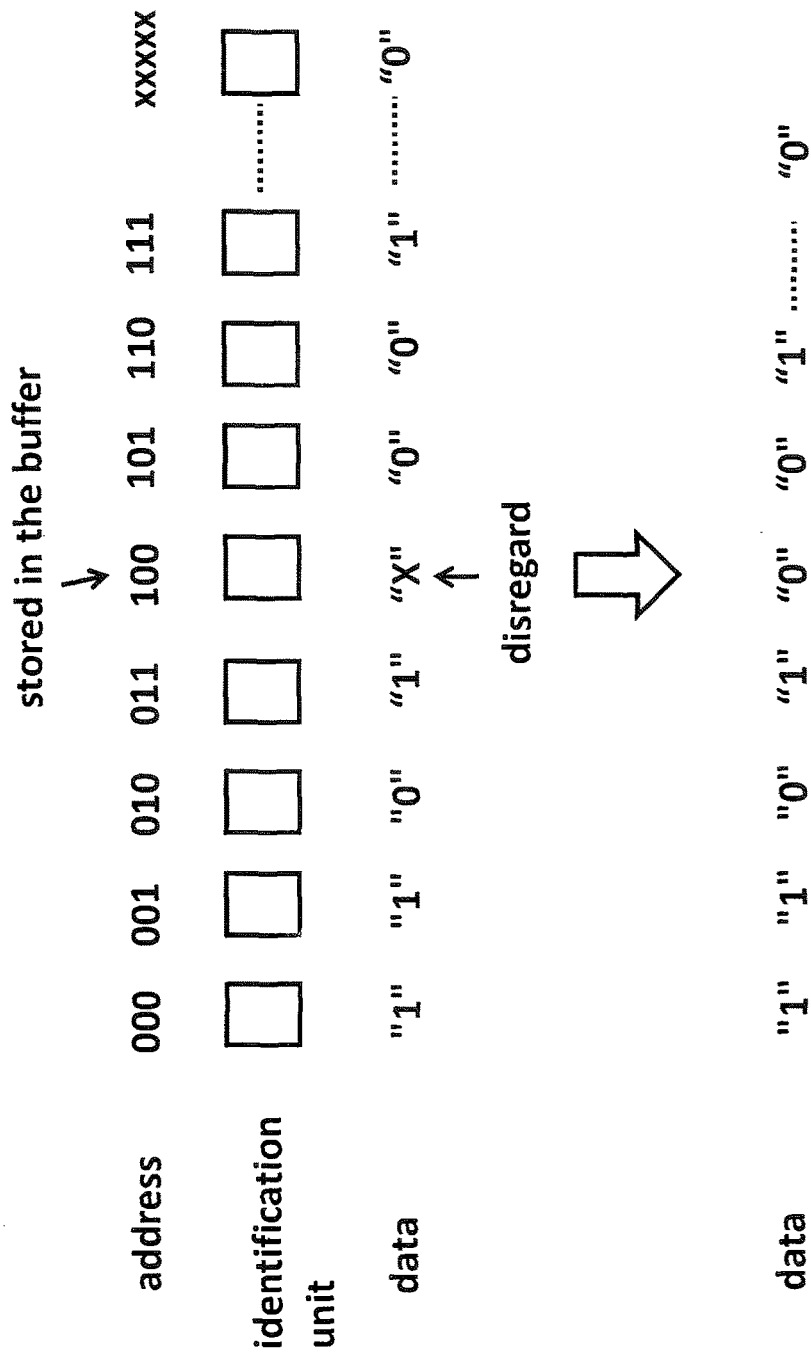
FIG. 35 is an illustration describing an example of a method of correcting data read from the identification cell.

There may be a definite gap between the breakdown judge current value 933 and the non-breakdown current value 934. Thus, the cells through which the read current flowing is in this gap may be regarded as neither broken nor unbroken. The identification cells like this may be neither "0" nor "1" in terms of semiconductor memory and then represented by "X". FIG. 35 illustrates an example of the binary addresses and the corresponding data of the identification cells. At the third line, as example, there may be "1", "1", "0", "1", "X", "0", "0", "1" . . . "0" from the left. Thus, the data of the fifth identification cell from the left may be "X".

Next, it may be expected that the plot of "0" and "1" at cross-points on checkerboard, which respectively correspond to the addresses, forms the white and black pattern shown in FIG. 22. Hence, "0" may be converted into white and "1" into black. However, "X" which is neither "0" nor "1" may disable for generating white and black pattern on checkerboard, as shown in FIG. 22. Then, it may be required to exclude the identification cells corresponding to "X" before plotting on checkerboard.

For example, the addresses of the identification cells corresponding to "X" (e.g., 100 in binary in the example of FIG. 35) may be stored in a buffer. The data of the identification cell corresponding to each address may then be compared with the addresses stored in the buffer. If the corresponding address is found in the buffer, the data at the corresponding address may not be read. Through such a procedure, the data of the identification cell corresponding to "X", as shown in the fourth line of FIG. 35, may be excluded. Then, a combination of address and data comprising only "0" and "1" may be obtained. The white and black checkerboard patter like FIG. 22 may be thus obtained.

Meanwhile, there may be, in general, two modes of soft breakdown and hard breakdown in the above mentioned breakdown phenomena of the insulating film. The soft breakdown mode may occasionally occur as a previous step to hard breakdown mode. The electric current in the soft breakdown mode at a read voltage may be lower than in the hard breakdown mode and higher than in the non-breakdown mode. Furthermore, the soft breakdown mode may sometimes transit to a non-breakdown mode or a hard breakdown mode during the repetition of the voltage applying, that is, unstable. However, once transiting to the hard breakdown mode, the state may be returned to neither non-breakdown mode nor soft breakdown mode. By the method illustrated in FIG. 34 and FIG. 35 of the present disclosure, the hard breakdown mode which is more stable may be regarded as "1" in terms of semiconductor memory and the soft breakdown mode as "X". That is, the gap between the breakdown judge current value 933 and the non-breakdown judge current value 934 may be for labeling the soft breakdown mode "X". Thus, by excluding data of cells in the soft breakdown mode with the above-mentioned method, the white and black pattern on checkerboard shown in FIG. 22 may be stable (unchangeable) even through the repetition of voltage applying, and then the pattern may be reproducible. By this way, the fourth requirement (4) the relation of input and output may have to be stable and reliable may be satisfied.

In general, it may be difficult to artificially make preponderate either of transition from soft to hard breakdown modes or from non-breakdown to soft breakdown modes by applying electrical stress. Accordingly, in some case the ratio of the soft breakdown mode labeled "X" may be lower than a predetermined level, or in other case, this ratio may be higher than it. However, if the number of the identification cells of the soft breakdown is higher than a definite amount, the quantity of data may be decreased and then the reduction of pattern may cause the lack of information quantity. Furthermore, in terms of information entropy, it may be preferable that the ratio of "0" and "1" is about 50% in order to maximize the physical randomness. Then, a method may be necessary, i.e., the voltage pulse for applying the electrical stress on the cell may be repeated to reduce the ratio of the soft breakdown mode "X", and make the ratio of "0" and "1" close to a predetermined level. The method like this may be illustrated as following.

Figure 36:
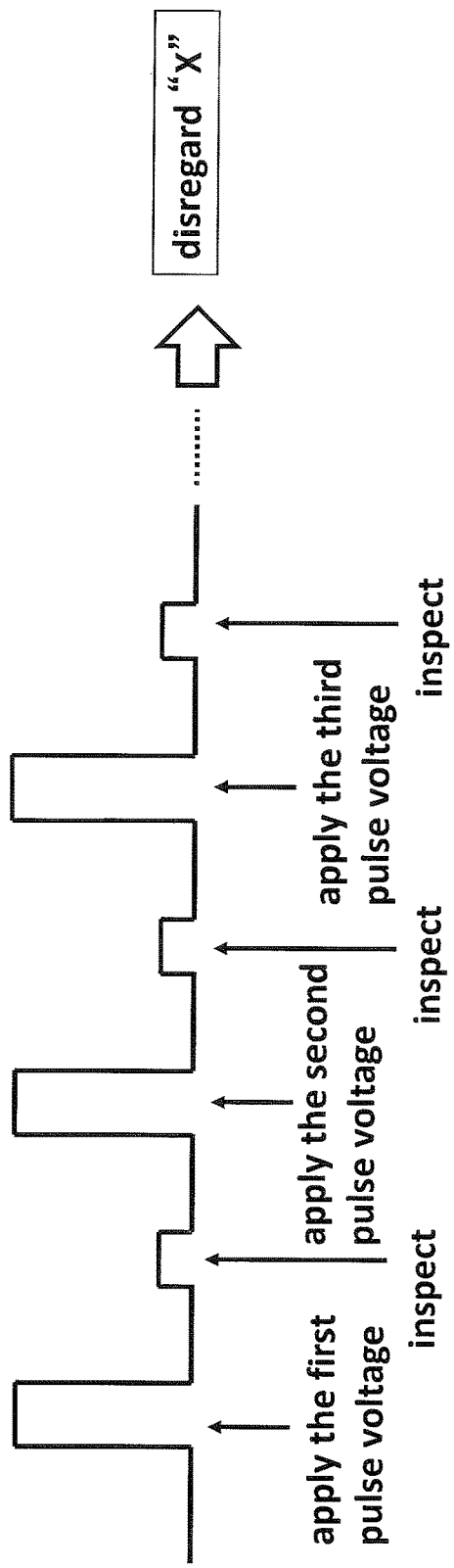
FIG. 36 is an illustration describing an example of a method of applying a breaking pulse.

As an example, the method of FIG. 36 may be illustrated. After the breaking pulse is applied, the breakdown inspection may be executed with the method illustrated in FIG. 34. If the ratio of "X" is higher than a definite amount, the second breakdown pulse may be subsequently applied and the breakdown inspection may be executed again with the method illustrated in FIG. 34. If the ratio of "X" is still higher than a definite amount, the third breakdown pulse may be subsequently applied and the breakdown inspection may be executed again with the method illustrated in FIG. 34. This procedure may be repeated until the ratio of "X" becomes lower than a predetermined value. It may be also necessary to define the upper bound of the repetition number of this procedure. In the case that the ratio of "X" cannot be lower than a definite amount even though the number of the repetition reaches the upper bound, the corresponding chip identification device may be regarded as failing in the inspection. In this case, the corresponding chip may be regarded as defective and then disposed. Otherwise, the addresses of the identification cell labeled "X" may be stored in the buffer, as mentioned above, and then the data of the corresponding identification cells may be excluded. However, if the number of the identification cells is large enough, it may be possible to assure physical randomness having large enough quantity of information, even while there may be some amount of soft breakdown ratio. In this case, the process to inspect the ratio of "X" may be omitted.

Hence, some of "X" may transit to hard "1" while a plurality of pulse is applied, since "X" corresponds to the soft breakdown. If the ratio of the transition from "0" to "X" is not low, the ratio of "0" may become lower and the ratio of "1" may become higher in total. In other words, even though the ratio of "0" is higher just after the first pulse, the ratio of "1" may be gradually increased while a plurality of pulses is applied. By this way, it may be possible to make the ratio of "0" and "1" close to 50% while decreasing the ratio of data to be excluded ("X") by optimizing the number of pulses, the period of pulse, and the method to increase the amplitude of pulse. The cells that fail in the inspection may be disposed as defective, as mentioned above. By this way, only confirming articles may be forwarded as certified products having the physical randomness having enough quantity of information and stable data of "0" and "1".

Figure 37:
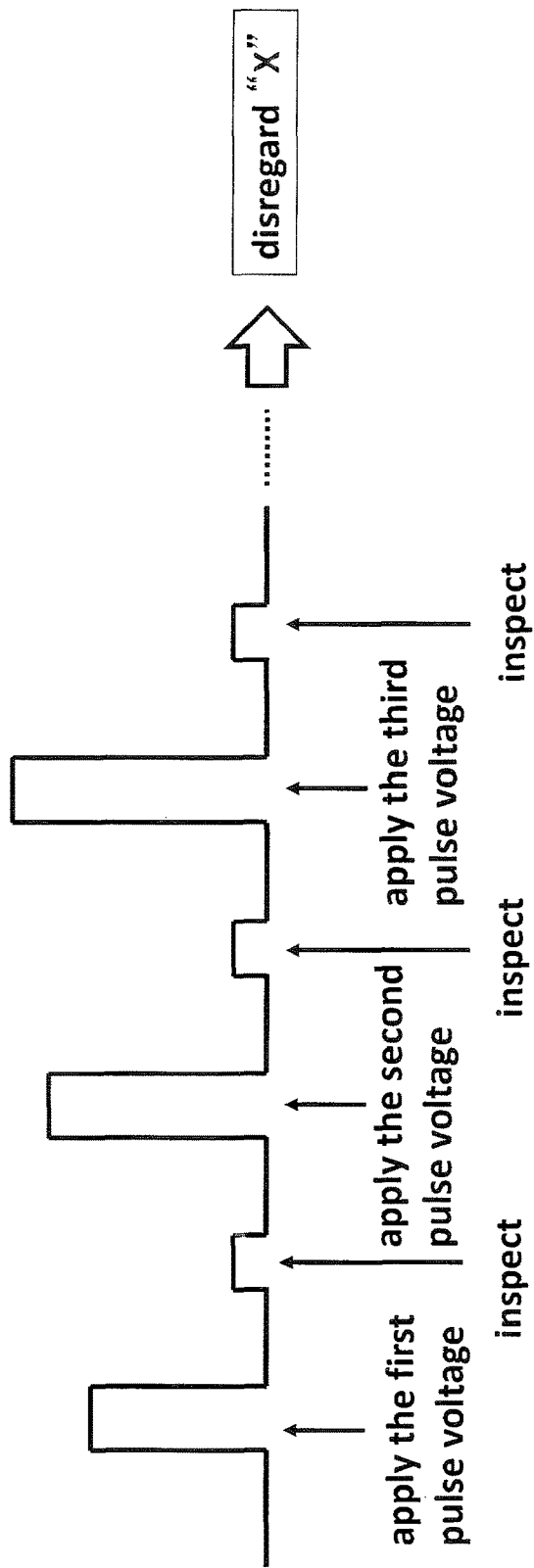
FIG. 37 is an illustration describing an example of a method of applying a breaking pulse.

As another example of repeating the application of the breaking pulse, FIG. 37 may be illustrated. Different from the example of FIG. 36 may be that the breaking pulse is incremented in every pulse. The other illustrations may be similar to FIG. 36 and then omitted.

Another method to exclude the soft breakdown mode of "X" may be to select only the identification cells of "X" and then repeat the application of the pulse voltage thereto until they may transit to the hard breakdown mode of "1". The method to apply breakdown voltage may be, for example, those of FIG. 36 and FIG. 37. It may be preferable that this method may be executed while the ratio of "0" is higher than that of "1" by a definite amount.

Figure 38:
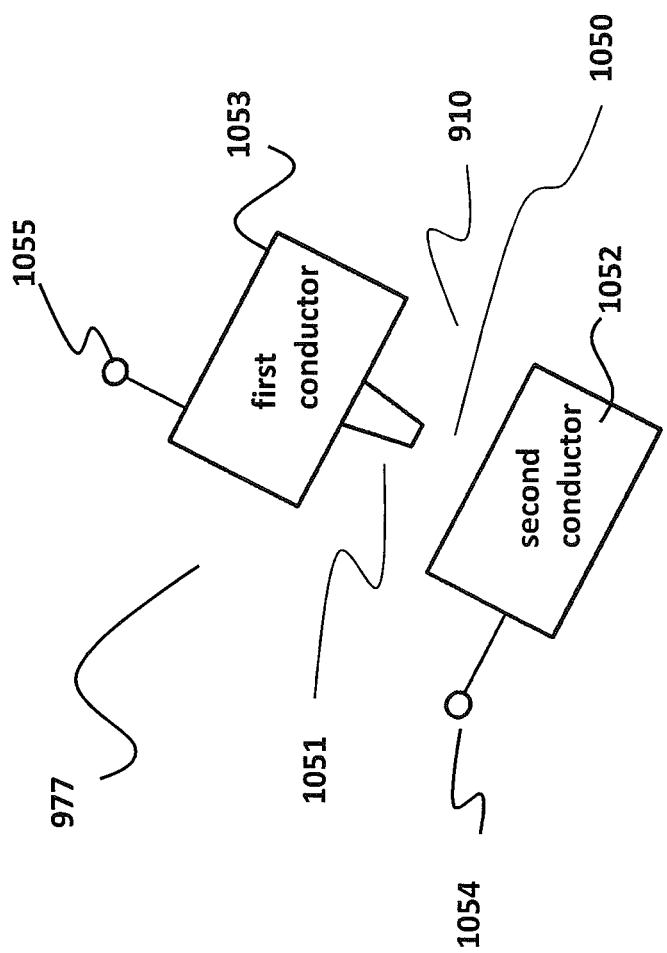
FIG. 38 is an illustration describing an example of an identification cell (conductive tip).

In another example, it may be possible that the hard breakdown is made superior than the soft breakdown by tuning the cell structure. For example, as shown in FIG. 38, the cell structure comprising the first conductor 1053, the second conductor 1052, the insulating film 910 and the conductive tip 1051 may be assumed. The first conductor 1053 may be connected to the first electrode 1055, and the second conductor 1052 may be connected to the second electrode 1054. The first electrode 1055 may connect to one of word line 502 and bit line 902, and the second electrode 1054 may connect to the other. The molecular structure of the insulating film 1050 around the conductive tip 1051 may be unstable due to mechanical stress, and then is easy to break. Furthermore, the electric field may be easy to concentrate around the conductive tip 1051 when the breaking pulse is applied, which may more likely lead to the hard breakdown. However, since the depth of the conductive tip 1051 may vary in the manufacturing, the possibility of the breakdown of the insulating film 1050 between the conductive tip 1051 and the second conductor 1052 may be fluctuated. Hence, it may be possible to maximize the physical randomness of "0" and "1" by further optimizing the above-mentioned application of the breaking pulse.

Figure 39:
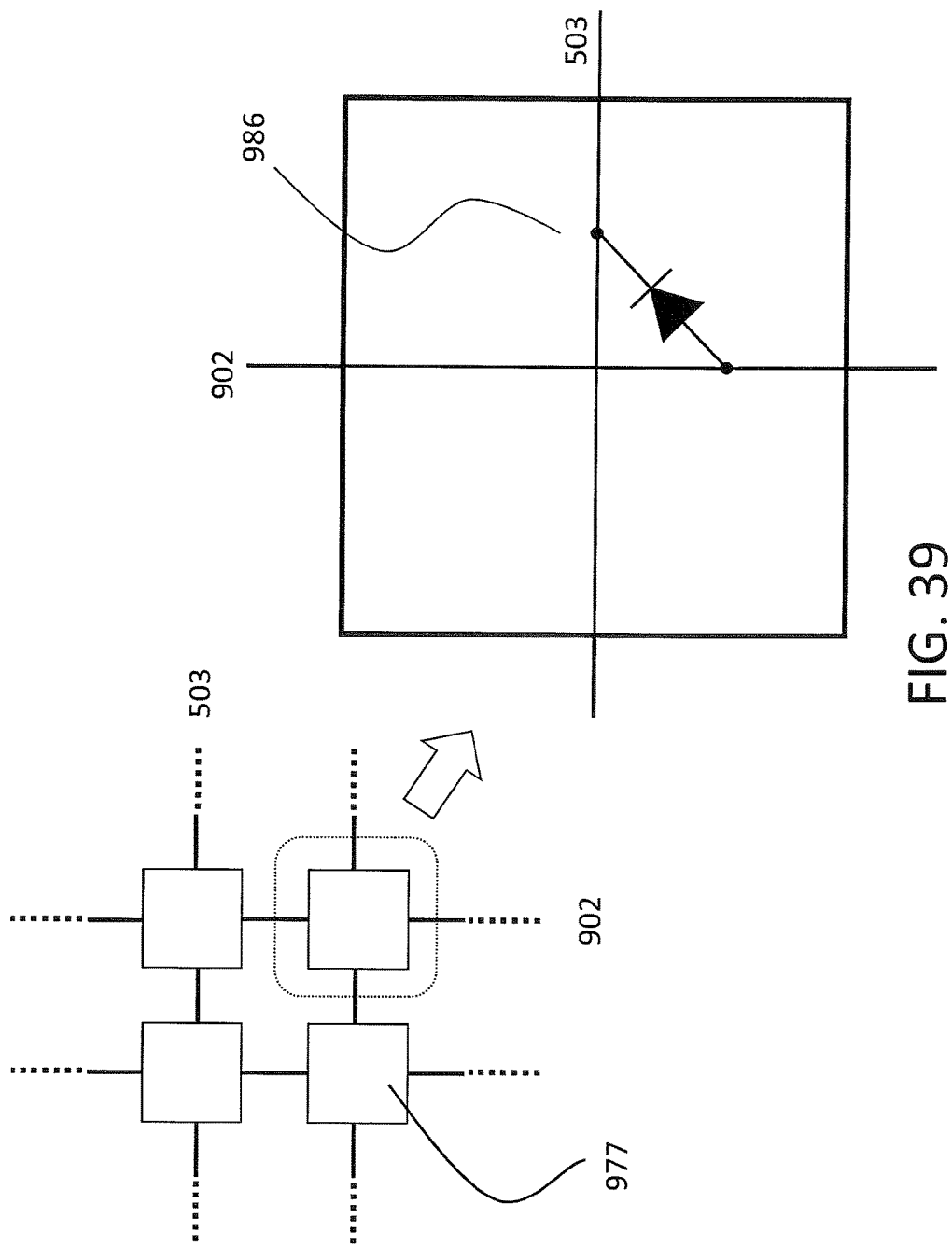
FIG. 39 is an illustration describing an example of an identification cell (PN junction).
Figure 40:
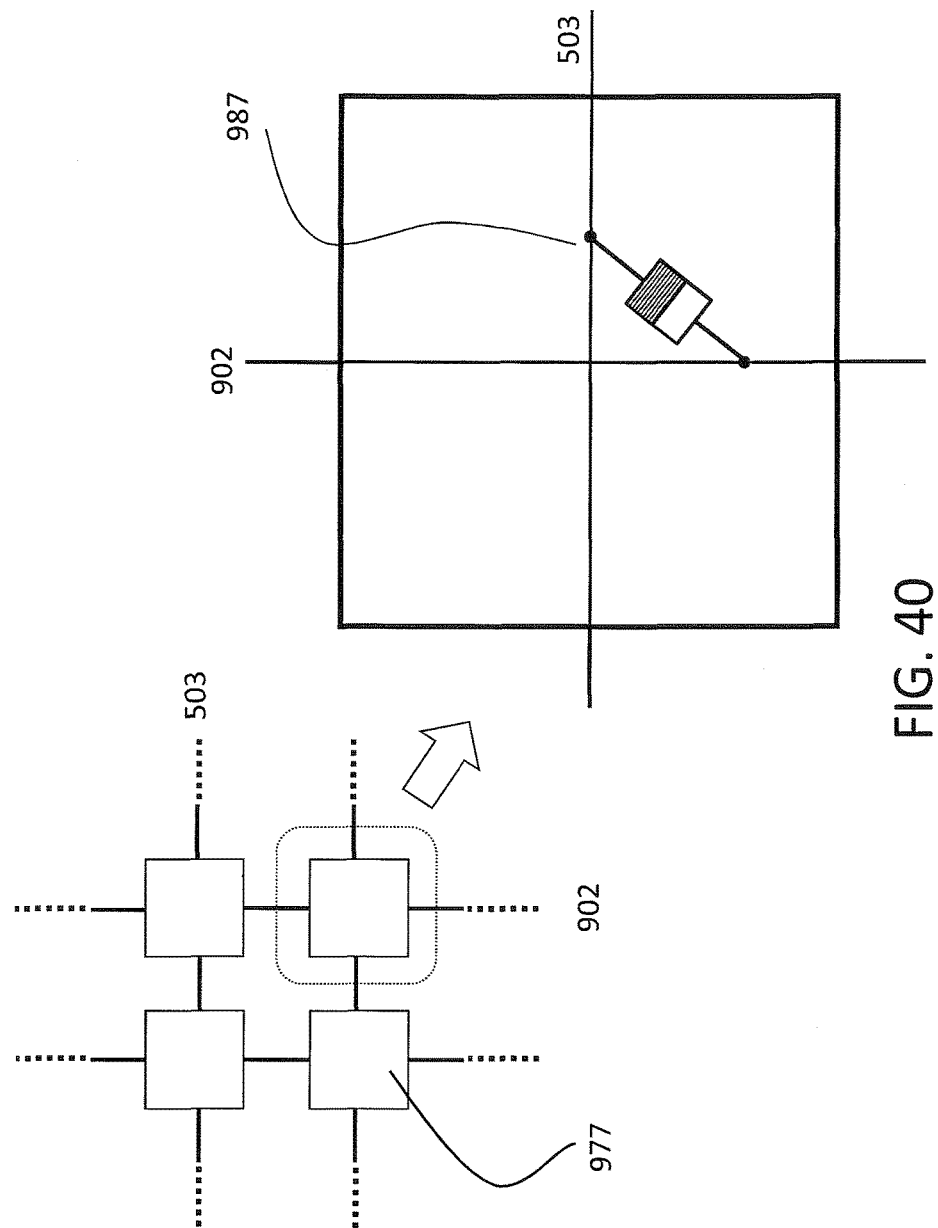
FIG. 40 is an illustration describing an example of an identification cell (Schottky junction).

FIG. 39 may be an illustration to describe another example of the identification cell 977. There may be diode elements at cross-points of word lines 503 and bit lines 902. More concretely, an example may be PN junction 986 (in FIG. 39). Another example may be Schottky junction 987 (in FIG. 40). If a high voltage stress is applied to those junctions (diodes), they may be probabilistically broken. Whether or not broken may be physically random and determined by applying the read voltage in the reverse direction. In a broken cell, the electric current may be easy to flow if a reverse read voltage is applied to the diode, which may, for example, correspond to "1" in terms of semiconductor memory. In a non-broken cell, the electric current may not be easy to follow even if a reverse read voltage is applied, which may, for example, correspond to "0" in terms of semiconductor memory. The voltage (both stress and read) may be applied between the word line 503 and the bit line 902 which are selected.

As mentioned above, in the case that the elements composing the identification cells 977 respectively connected to word lines 503 and bit lines 902 are diodes such as the PN junction 986 and the Schottky junction 987, the read voltage may be a reverse bias. On the other hand, in the case that the elements composing the identification cells 977 respectively connected to word lines 503 and bit lines 902 are the capacitor 982, the direction of the read voltage may either be forward or reverse. Considering this view point, the breakdown inspection of the diode may be illustrated, as similar to FIG. 34. Hence, the read voltage to be applied between two electrodes sandwiching the diode may be absolute value, the electric current through the diode may be also absolute value when the reverse voltage is applied. In other words, in the case of PN junction and Schottky junction, those absolute values may be the reverse voltage and the reverse current. Besides, the detailed illustration may be similar to that of capacitor and then omitted.

Figure 41:
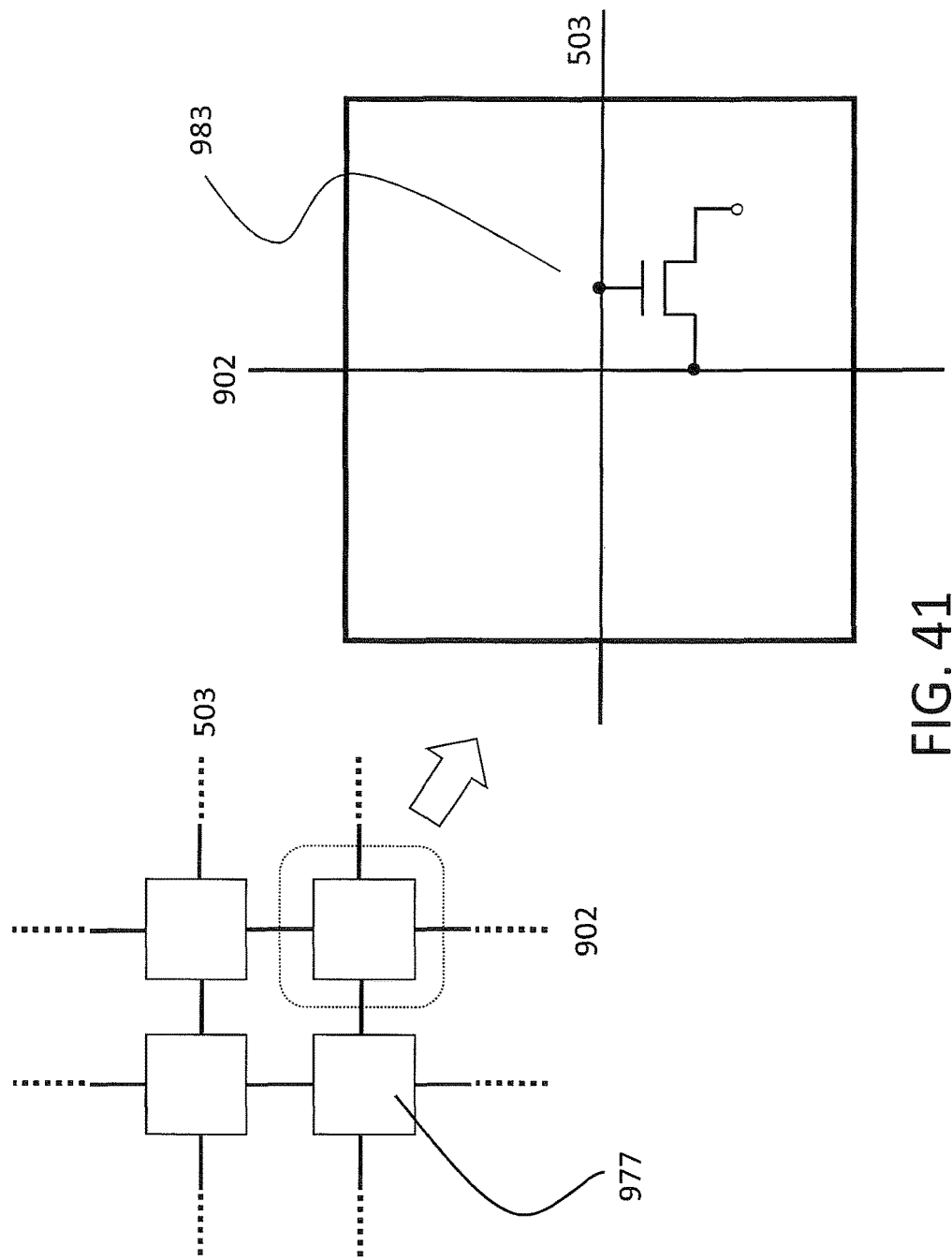
FIG. 41 is an illustration describing an example of an identification cell (field effect transistor).

FIG. 41 may be an illustration describing the case that the identification cell 977 is a transistor 983. In general, the transistors may comprise two adjoining diffusion layers on the surface of the semiconductor substrate and the gate capacitor. The gate capacitor may be formed of a lamination comprising the gate electrode and the gate insulating film on the semiconductor substrate. In this example, one of those two diffusion layers may be connected to bit line 902. The gate electrode may be connected to word line 503. In other words, in this example, it may be possible to adopt a factor of physical randomness, i.e., the breakdown of gate insulating film. In the case of dielectric breakdown (i.e., breakdown of gate insulating film), for example, a voltage stress may be applied to the word line 503 while the bit line 902 is set as voltage reference. This voltage stress, for example, may be a pulse, as shown in FIG. 36. As another example, it may be pulse, as shown in FIG. 37. The read, as shown in FIG. 34, may be executed to sense the electric current flowing between the bit line 902 and the word line 503 by applying the breakdown judge voltage 932 between the bit line 902 and the word line 503.

Figure 42:
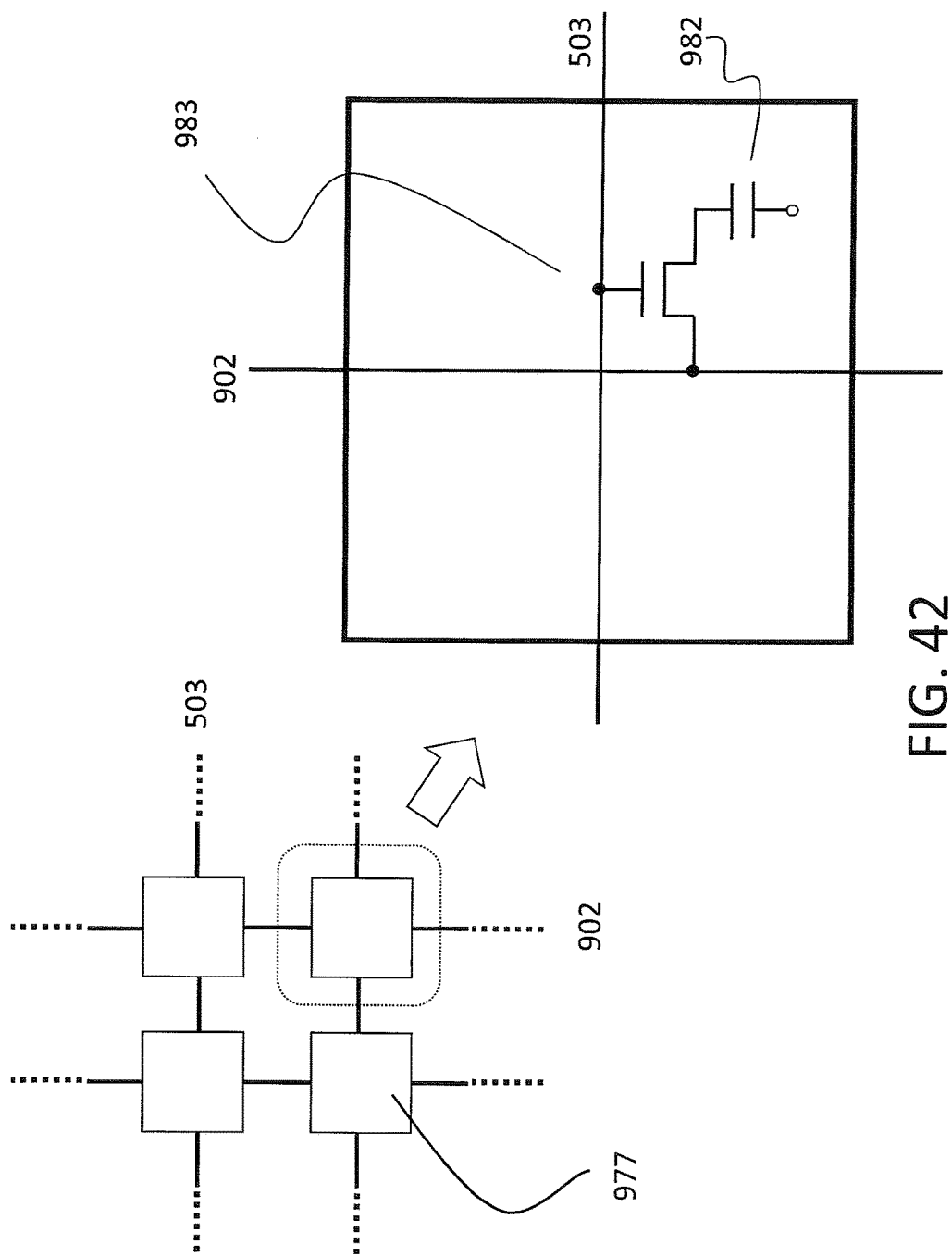
FIG. 42 is an illustration describing an example of an identification cell (DRAM).

FIG. 42 illustrates the case that the identification cell 977 may be a DRAM cell which comprises the transistor 983 and the capacitor 982. Hence, the method adopting the dielectric breakdown of the capacitor 982 may be illustrated. More concretely, a transfer voltage to turn the transistor 983 on may be applied between the word line 503 and the bit line 902. In that interval, a high voltage stress may be applied on the bit line 902. As an example, this high voltage stress may be the pulses shown in FIG. 36 and FIG. 37. To read, as shown in FIG. 34, the electric current flowing through the bit line 902 may be sensed while the transfer voltage is applied to the word line 503 while the bit line 902 is set as voltage reference. The absolute value of the transfer voltage may be higher than the absolute value of the voltage applied to the bit line 902, and the voltage difference between them may be sufficient to turn the transistor 983 on. In the case of breaking the transistor 983, a method similar to FIG. 41 may be possible. Thus, the gate insulating film may be broken at the side connected to the bit line 902. Anyway, the breakdown may probabilistically occur and then cause physical randomness.

Important here may be that a conventional DRAM cell is adopted as identification cell 977 with no change. In other words, in the case that the chip identification device of the present disclosure is appended to DRAM chip, a part of the memory cell area may be sufficient for the chip identification device and then no additional cost in the manufacturing may be necessary. The bit capacity necessary for the chip identification device may be much smaller than the bit capacity of general memories as well as DRAM.

As mentioned above, a necessary bit capacity may be roughly evaluated with the case of N=K=512 in the example of FIG. 29. It may be thus found that 262 kb is sufficient for the chip identification device. This capacity may be smaller by 4 orders, i.e., one-to-10,000, than the bit capacity per die of the conventional DRAM product (4 Gb). In the case of N=K=128, 16 kb may be sufficient for the chip identification device. This capacity may be smaller by 6 orders, i.e., one-to-100,000, than the bit capacity per die of the conventional DRAM product.

The price of DRAM, currently, may transit from 2.5 US$ to 3 US$. Since it may be possible that the DRAM cell is adopted as the identification cell 977 with no change, the price of the chip identification device may be at most 0.03 US cents per chip with the sufficient quantity of information of physical random number while the property of input-output reliability is ensured by excluding the soft breakdown mode "X".

Figure 43:
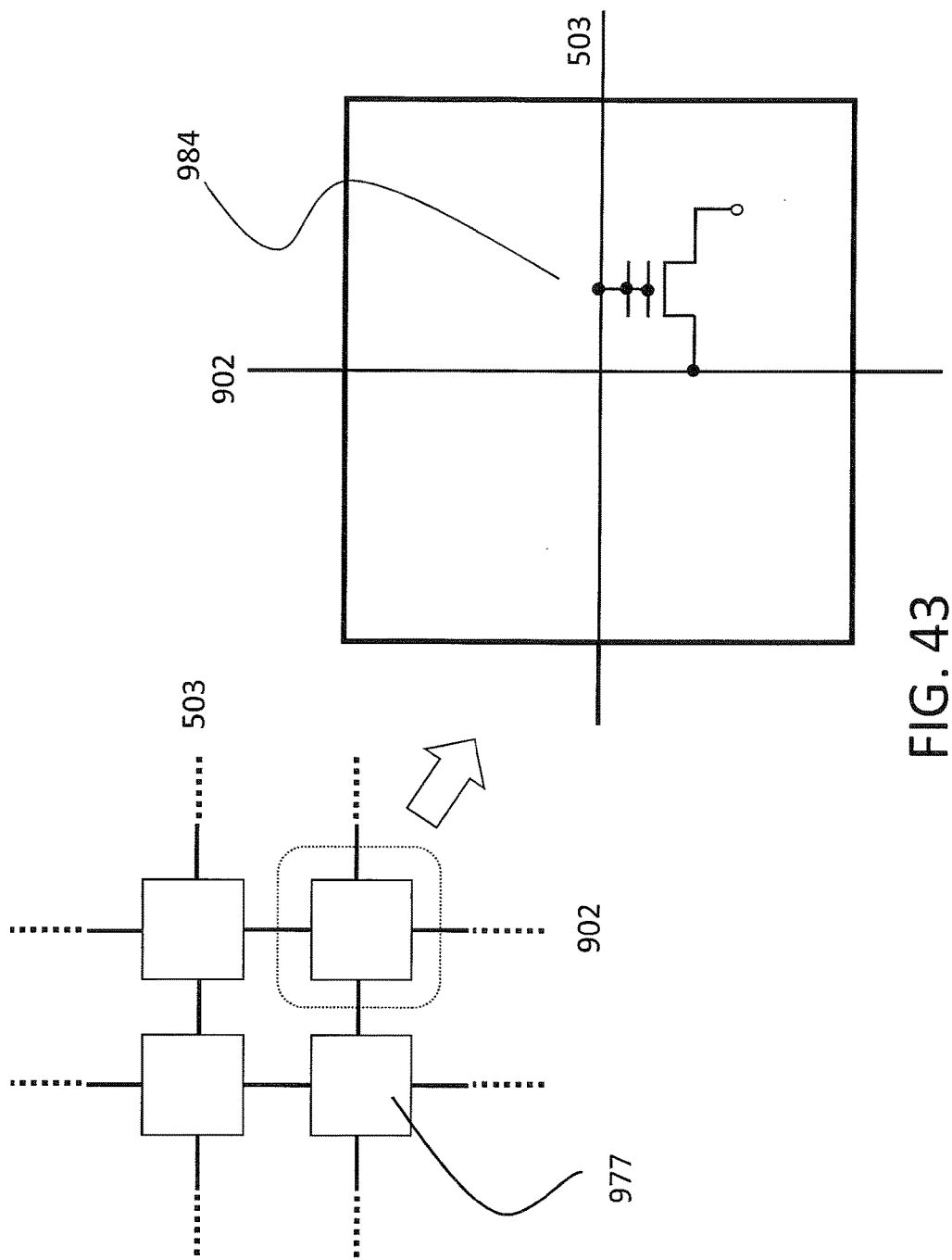
FIG. 43 is an illustration describing an example of an identification cell (select transistor).

FIG. 43 may be an illustration describing another example of the identification cell 977. There may be select transistors 984 having usually used to control the nonvolatile memory system at the cross-points of word line 503 and bit line 902. The nonvolatile memory cell may be the gate lamination structure comprising silicon, tunnel film, charge storage layer, inter-layer dielectric, and control gate between two diffusion layers on a first conductive type semiconductor substrate or a first conductive type well. The select transistor 984 may be formed by replacing the whole or a part of the inter-layer dielectric of this memory cell with inter-layer conductor. Or, it may be also formed with conductive via implanted into a hole through the inter-layer dielectric. Anyway, it may be possible to apply the high electric stress on the tunnel film of the select transistor 984 at the cross-points selected by applying the high voltage on the selected word line connecting to the control gate. Hence, the read and the breakdown of tunnel film may be executed similar to those of gate insulating film of transistor 983. Furthermore, the breakdown of the tunnel film probabilistically occurs, and then causes the physical randomness. In other words, since the illustration may be the same if replacing the tunnel film with the gate insulating film of transistor 983, it may be omitted here.

Figure 44:
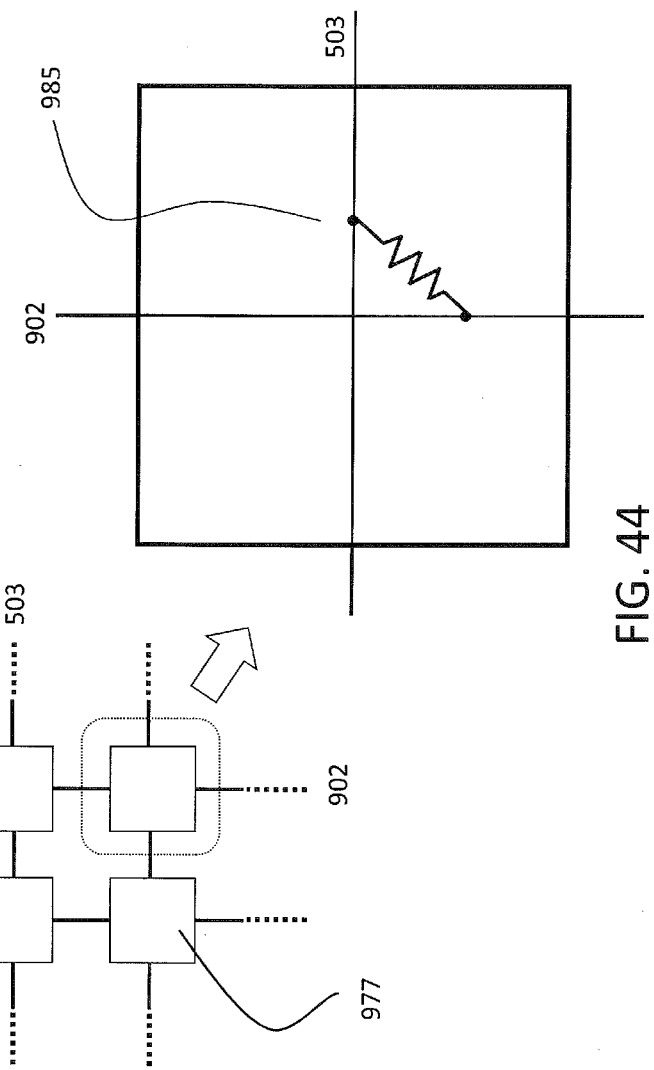
FIG. 44 is an illustration describing an example of an identification cell (resistor).

FIG. 44 may be an illustration of another example of the identification cell 977. There may be resistors 985 at cross-points of word line 503 and bit line 902. The electrical stress may be applied to the resistors 985 at selected cross-points by applying a high voltage between word lines 503 and bit lines 902.

In general, a resistor may be formed by sandwiching a high resistive conducting material with two terminals. It may be probabilistically disconnected by applying a high electric field on it, and then the corresponding cross-point between word line 503 and bit line 902 may be non-conductive (short). In the case that it is not short (non-short), the cross-point between word line 503 and bit line 902 may be conductive. Which address is short or non-short may be decided by physical randomness. By this way, a random pattern on checkerboard like FIG. 22 may be obtained.

It may be able to be determined whether or not the resistor 985 is broken by applying a read voltage thereto. In an identification cell which is short, the electric current may hardly flow, which may correspond to "0" in terms of semiconductor memory. In an identification cell which is not short, the electric current may be easy to flow, which may correspond to "1" in terms of semiconductor memory. Such a short of resistor may be similar to the breakdown of conductor, which may be caused by electromigration and so on, for example. In other words, the electromigration may probabilistically occur. The cells with electromigration may correspond to "0" in terms of semiconductor memory. The other cells may correspond to "1" in terms of semiconductor memory.

Figure 45:
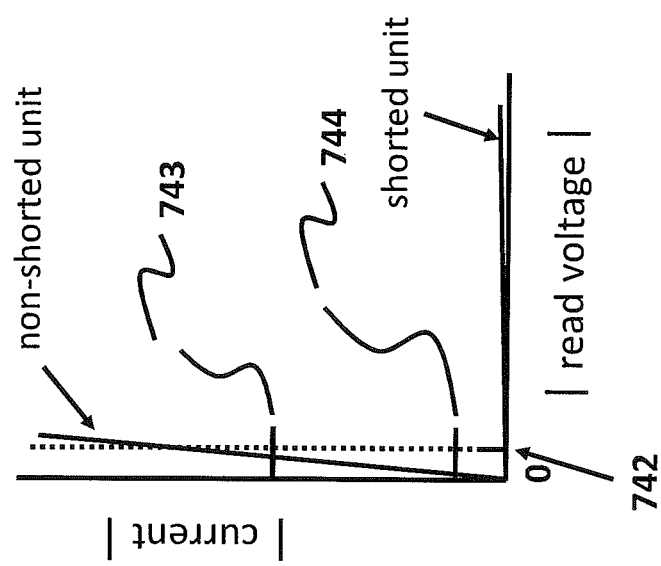
FIG. 45 is an illustration describing an example of a method to read the data from the identification cell.

FIG. 45 may be a current-voltage characteristic to be used to inspect short. The horizontal axis may be an absolute value of the read voltage to be applied on the resistor 985 for the read. The vertical axis may be an absolute value of the electric current to flow through resistor 985 in response to the read voltage. In cells which are not short, a high electric current may flow even at a low voltage. On the other hand, in a cell which is short, the electric current may hardly flow even at a high voltage. To distinguish this difference, the non-short judge current value 743 and the short judge current value 744 at the short judge voltage 742 may be introduced. In other words, it may be judged as non-short if the absolute value of the electric current flowing through the resistor 985 is higher than the non-short judge current value 743 when the read voltage, whose absolute value is equivalent to the short judge voltage 742, is applied on the resistor 985. It may be judged as short if the absolute value of the electric current is lower than the short judge current value 744.

There may be a definite gap between the non-short judge current value 743 and the short judge current value 744 in the inspection method of FIG. 45. Thus, the identification cell 977 through which the absolute value of the read electric current is in this gap may be regarded as neither short nor non-short. The identification cells 977 like this may be represented by "X" because it may be neither "0" nor "1" in terms of semiconductor memory. Thus, an example of the binary addresses and the corresponding data of the identification cells 977 may be FIG. 35, as similar to the case that the identification cell 977 is capacitor 982. At the third line, as an example, there may be "1", "1", "0", "1", "X", "0", "0", "1" . . . "0" from the left. Thus, the data of the fifth identification cell from the left may be "X". Hence, the method to obtain white and black checkerboard pattern like FIG. 22 may be similar to the case of capacitor 982. Then, the illustration may be omitted here.

To actually read, first of all, the address of the cell to be read may have to be selected. To select the address, as shown in FIG. 23, the row number of the cell may be selected by the row decoder 972 and the column number of the cell may be selected by the column decoder 973. The combination of the row number and the column number of the cell may be the address. In the example of FIG. 35, this address may be represented in binary. The read voltage may be applied between the word line 503 and the bit line 902 which correspond to the selected address in a manner explained in FIG. 45, and then the data at the corresponding address may be read ("1" or "0"). After reading, the address to be selected may be changed and then the data of the next identification cell may be read. This procedure may be repeated until the entire identification cells in the array for identification cells 960 are read.

Figure 46:
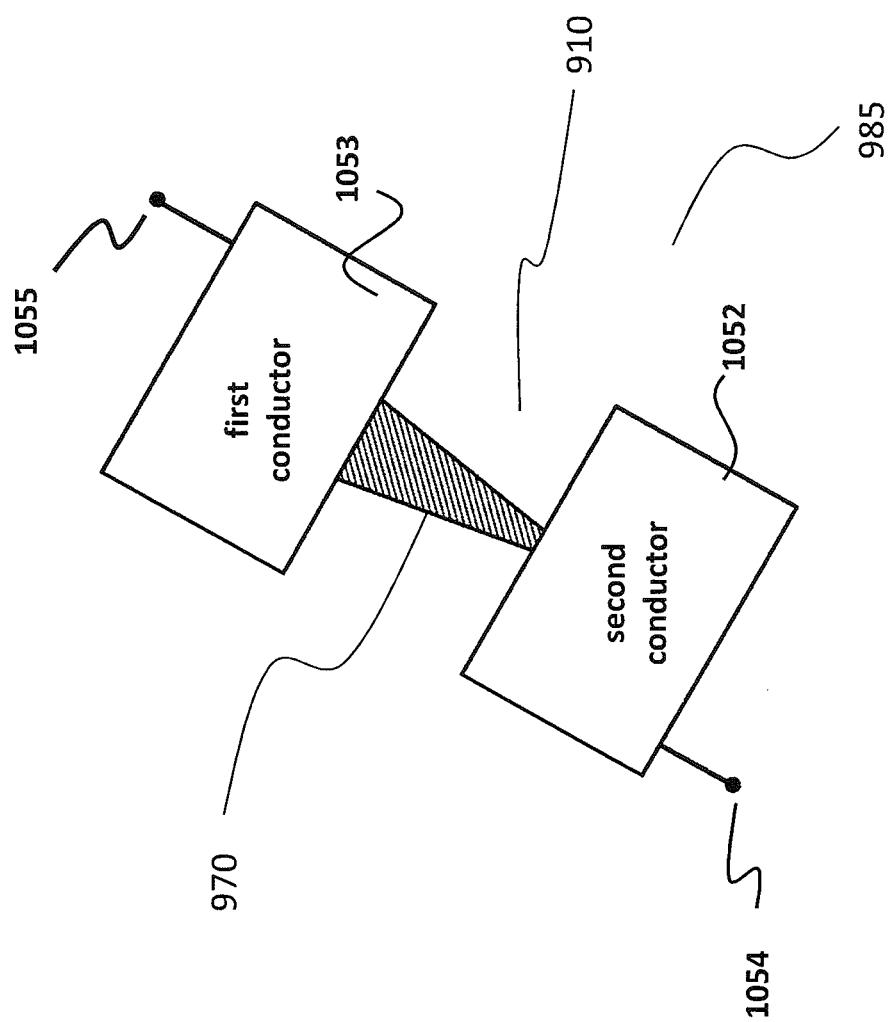
FIG. 46 is an illustration describing an example of an identification cell (conductive junction).

FIG. 46 may be an illustration describing an example of the resistor 985. It may be the cell structure comprising the first conductor 1053, the second conductor 1052, the insulating film 910, and the conductive junction 970. The first conductor 1053 may be connected to the first electrode 1055. The second conductor 1052 may be connected to the second electrode 1054. The first electrode 1055 may be connected to one of word line 503 and bit line 902. The other may be connected to the second electrode 1054. The thickness of the conductive junction 970 may vary in the manufacturing. Then, the resistance may be fluctuated and then the possibility of short may vary. Accordingly, it may be preferable to make the possibilities of short and non-short 50%-to-50% by repeating the voltage stress. Hence, the concrete method of the repetition of pulse application may be, for example, similar to the methods of FIG. 36 and FIG. 37.

In general, the high resistive portion of the conductive junction 970 may be heated by electrical stress. This may cause the electromigration easy to occur. Once the electromigration occurs, the corresponding portion of the conductive junction 970 may disconnect (short). After the disconnection, for example, the conductive junction 970 may be reformed to be like the conductive tip 1051, as shown in FIG. 38. In addition, the oxidation may be advanced at a high temperature, the insulating film may come into the portion of short, just like between the conductive tip 1051 and the second conductor 1052. By this way, the non-short (conductive) state may transit to short one.

If the repetition of the electric stress may be further continued, the short portion of the oxide film may cause the dielectric breakdown. Thus, the short state may transit to non-short one.

It may be difficult to artificially manipulate the priority of the case of the transition from non-short to short and the case of the transition from short to non-short. The intermediate state between short and non-short may be represented by "X". Accordingly, in some case the ratio of the intermediate state labeled "X" may be lower than a predetermined level, or in other case, this ratio may be higher than it. However, if the number of identification cells of the intermediate state is higher than a definite amount, the quantity of data may be decreased and then the reduction of pattern may cause the lack of information quantity. Then, the method for repeating the voltage pulse to apply the electric stress on the cell may be necessary. As an example, after the first pulse voltage is applied, the breakdown inspection may be executed by the method illustrated in FIG. 45. Thus, if the ratio of "X" is higher than a definite amount, the second pulse voltage may be applied subsequently and then the breakdown inspection may be executed again with the method of FIG. 45. If the ratio of "X" is still higher, the third pulse voltage may be applied and then the breakdown inspection may be executed with the method of FIG. 45. This procedure may be repeated until the ratio of "X" becomes less than a predetermined value. The upper bound number of the repetition of this procedure may be determined in advance. In the case that the ratio of "X" is not less than a predetermined value even at the upper bound number of the repetition of the procedure, the corresponding chip identification device may be regarded as defective and then may be disposed. In the case that the chip identification device passes the inspection, as mentioned above, the addresses of the cells labeled "X" may be stored in the buffer and then the data of the corresponding cells may be excluded. However, if the number of the cells is large enough, it may be possible to ensure large enough physical randomness even though the ratio of intermediate state is large to some extent. In this case, the process to inspect the ration of "X" may be omitted.

On the other hand, to optimize the use of the physical randomness as possible, it may be preferable that the ratios of "0" and "1" may respectively be about 50% and 50%. The cells labeled "X" may probabilistically transit to "0" during the repetition of applying pulse voltage. Accordingly, even though the number of "1" is large at the first pulse, the ratio of "0" may gradually increase while a plurality of pulses is applied. Hence, the concrete method of the repetition of applying pulse may be, for example, similar to the method of FIG. 36 and FIG. 37.

It may be thus possible that the ratios of "0" and "1" may respectively become close to about 50% and 50% while reducing the ratio of data to be excluded ("X") by optimizing the number of applying pulse, the period of pulse, and the magnification method of the pulse amplitude. In the case of failure, as mentioned above, the corresponding chip with the chip identification device may be disposed as defective. Thus, it may be possible to forward only the confirming chips having enough physical randomness and stable data of "0" and "1".

Figure 47:
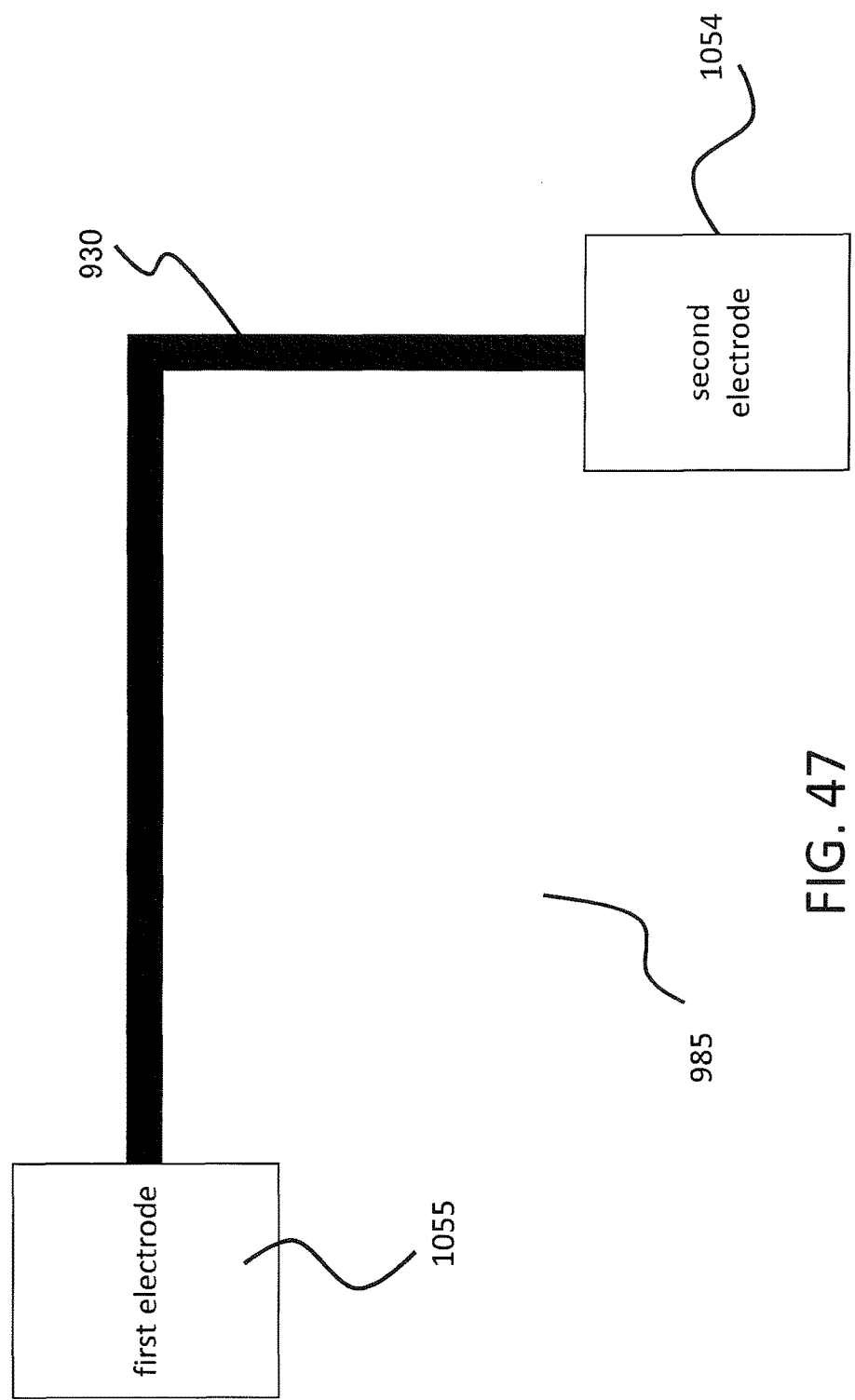
FIG. 47 is an illustration describing an example of an identification cell (conductor).

FIG. 47 may be another example of the resistor 985 adopted in FIG. 44. This may be able to be formed simultaneously with metal wiring pattern. Accordingly, it may be preferable that the conductor 930 is as same material as the conventional metal wiring, and at least a part of the pattern shape is like a corner of a rectangle, as shown in FIG. 47. This bended portion like a corer of rectangular may be easy to collect heat and then to be disconnected due to the electromingraion. For example, the first electrode 1055 may connect to the word line 503 and the second electrode 1054 may connect to the bit line 902.

Furthermore, it may be preferable that the portion bended like a corner of a rectangle as shown in FIG. 47 may be thinner than the conventional metal wire. For example, such a structure may be formed by masking the portion other than the bended like a corner of a rectangle with resist and then sliming the bended portion through the oxidation process.

Figure 48:
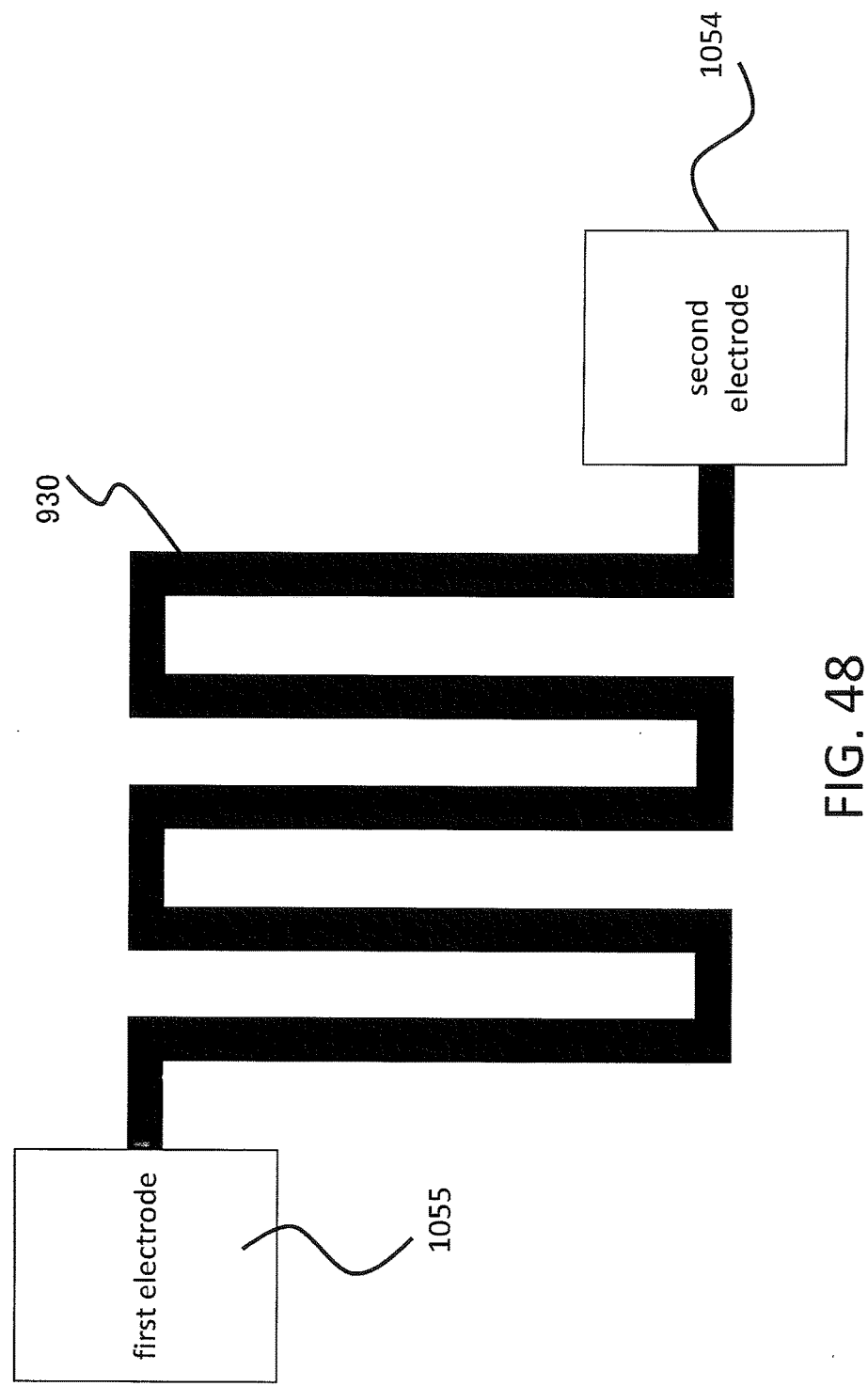
FIG. 48 is an illustration describing an example of an identification cell (conductor).

It may be possible to bend a plurality of portions of the conductor 930. FIG. 48 may be an example of that with 9 portions bended like corners of a rectangle. Thus, it may be possible to tune the possibility of short with the wiring pattern. However, the first electrode 1055 may connect to the word line 503 and the second electrode 1054 may connect to the bit line 902.

Figure 49:
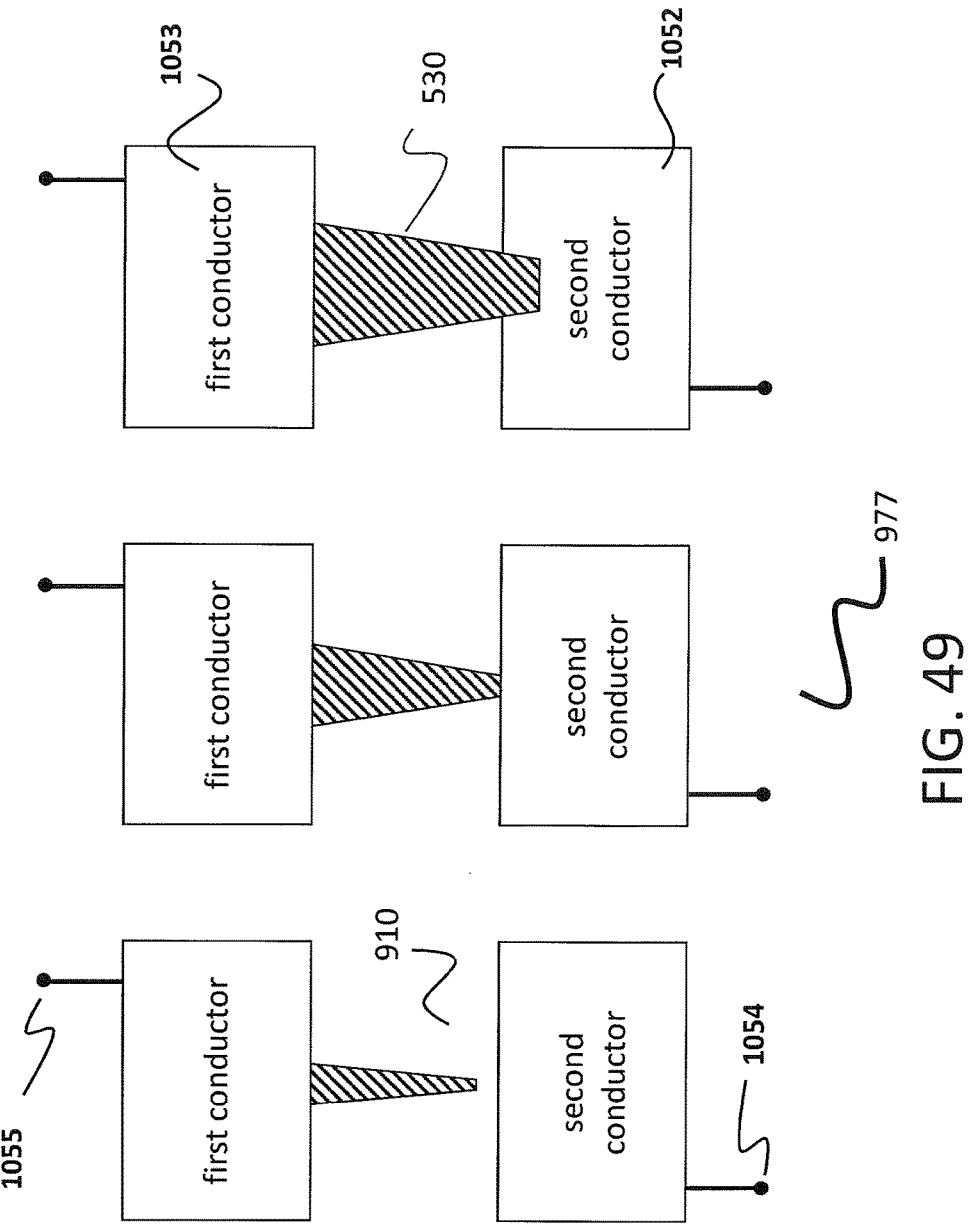
FIG. 49 is an illustration describing an example of an identification cell (conductive via).

FIG. 46 may be, for example, formed by making a hole through the insulating film 910 (via) from the side of the first electrode 1053 and then burying conductive material therein. By this way, the conductive via 530 may be formed, as shown in FIG. 49. This may be an example of the conduction junction 970 shown in FIG. 46. Hence, it may be considered that the process of forming via is optimized to make the target depth of via equivalent to the distance between the first conductor 1053 and the second conductor 1052. If it may be formed on target by chance, via may be fit to between the first conductor 1053 and the second conductor 1052, as the cell in the center of FIG. 49.

Figure 50:
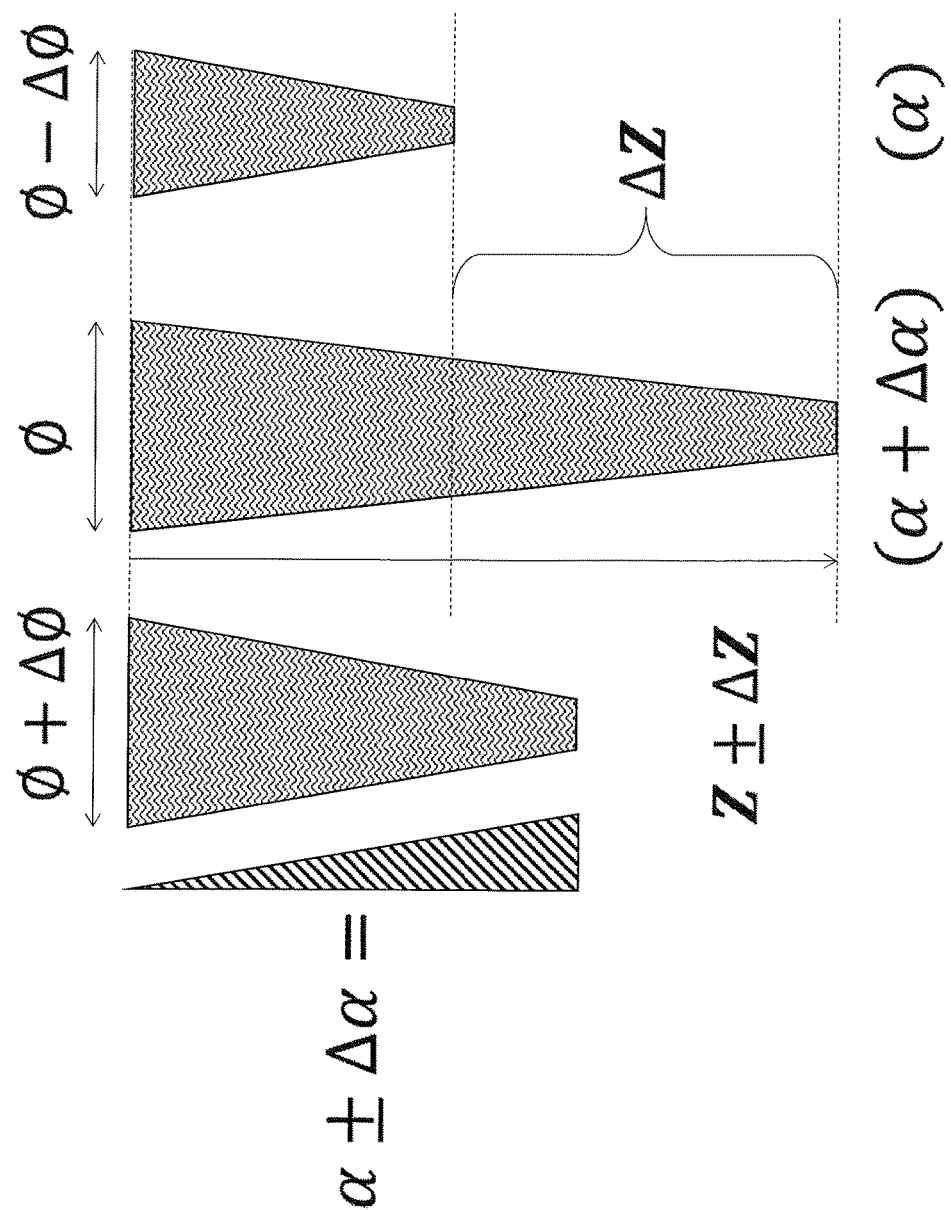
FIG. 50 is an illustration describing a mechanism that an example of the identification (conductive via) generates physical randomness.

However, in general, the aspect ratio and hole's diameter of via may unavoidably vary in the manufacturing, as illustrated in FIG. 50. This variance may cause the depth of via to vary. Thus, the length of the conductive junction 970 may be short in some cell, and then the via may disconnect (short) between the first conductor 1053 and the second conductor 1052, as shown in FIG. 38. In other cells, those conductors may connect each other (non-short), as shown in FIG. 46. For example, there may be short, connecting (non-short), connecting (non-short) from the left in the example of FIG. 49.

If the conductive junction 970 of the identification cells 977 selected by word lines 503 and bit lines 902 is short, the electric current may not flow, e.g., the data may correspond to "0" in terms of semiconductor memory. On contrary, if non-short, the electric current may flow, e.g., the data may correspond to "1" in terms of semiconductor memory. Regarding "0" as white and "1" as black, the white and black random pattern may be obtained like FIG. 22.

Hence, since the variance of via depth may be a manufacturing variance in the mass-production process, it may be free from any algorithm. Accordingly, it may be regarded as physical randomness. Furthermore, the electrical stress may not be always necessary to obtain the white and black random checkerboard pattern like FIG. 22.

However, the ratio of short and non-short may be inspected after forming the conductive via. Then, if it may be far from a predetermined value, it may be possible to expect the recovery of the ratio by applying electrical stress. For example, in the case of short (e.g., the identification cell at the left end of FIG. 49), a part of insulating film between the bottom of via and the second conductor 1052 (e.g., the insulating film 1050 in FIG. 38) may be broken while repeating the electrical stress, and the state may then transit from short to non-short due to the dielectric breakdown. On contrary, in the case of non-short (e.g., the center of FIG. 49), the electromigration may occur while repeating the electrical stress, and then the state may transit from non-short to short.

However, it may be difficult to artificially manipulate the priorities of the dielectric breakdown and the electromigration. Then, in the case that data "1" is superior, only the cell of data "1" may be selected to apply the electrical stress thereto. On the contrary, in the case that data "0" is superior, only the data of "0" may be selected to apply the electrical stress thereto. By this way, it may be preferable that the electrical stress like this is repeated while inspecting this ratio until the ratio of "1" and "0" becomes close to a predetermined value. Hence, the stress pulse to be repeatedly applied to a group of selected cells may be, for example, like FIG. 36 and FIG. 37.

To actually read, first of all, the addresses of the cells to be read may have to be selected. To select the addresses, as illustrated in FIG. 23, the row numbers may be selected by the row decoder 972 and the column numbers may be selected by the column decoder 973. The combination of those numbers of row and column may be the address. In the example of FIG. 35, this address may be represented in binary. Thus, the read voltage may be applied with the method illustrated in FIG. 45 between the word line 503 and the bit line 902 which connect to the cell corresponding to the selected address and then the data of the corresponding address ("1" or "0") may be read. After reading, the address of the identification cell to be selected may be changed, and then the next identification cell may be read with a similar method. Thus, this procedure may be repeated until the data of the whole identification cells in the array for identification cells 960 shown in FIG. 23 is read.

Figure 51:
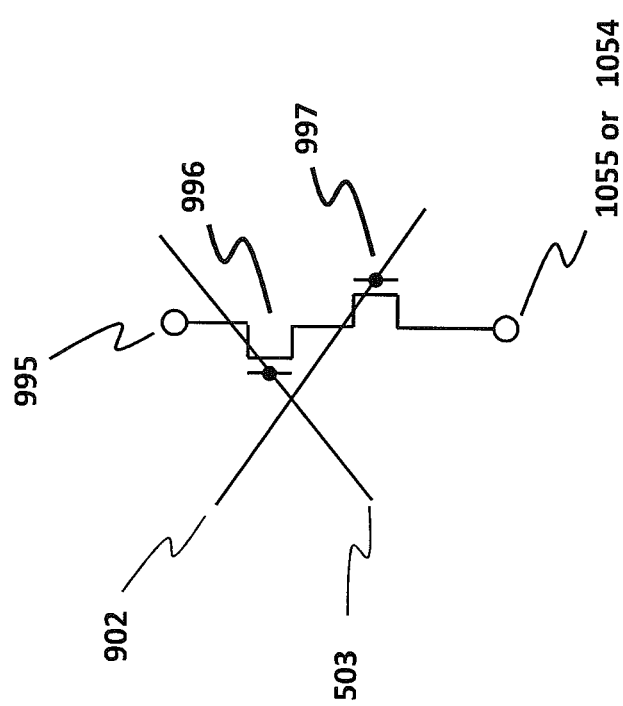
FIG. 51 is an illustration describing an example of a method to select the identification cell.
Figure 52:
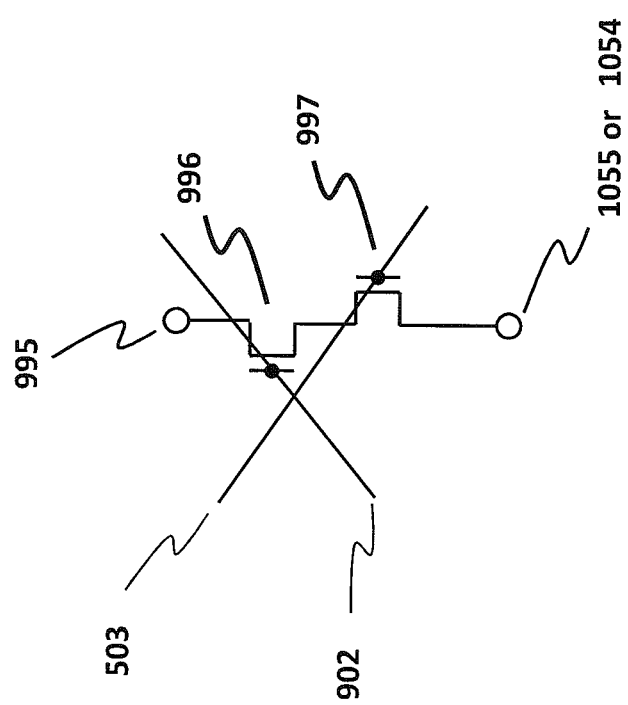
FIG. 52 is an illustration describing an example of a method to select an identification cell.

In the above-mentioned example, in FIG. 38 or FIG. 46 for example, the first electrode 1055 may connect to one of the bit line 902 and the word line 503. The second electrode 1054 may connect to the other. However, it may be possible that the construction related to the present disclosure may be not only this but also as follows. As illustrated in FIG. 51 for example, one of the first electrode 1055 and the second electrode 1054 may connect to the gate electrode 955 through two control gates (the first control gate 996 and the second control gate 997). The other of the first electrode 1055 and the second electrode 1054 may be grounded, connected to source line, or connected to an arbitral terminal linked to another circuit. The bit line 902 may connect to the second control gate 997 and the word line 503 to the first control gate 996. Or, as illustrated in FIG. 52, one of the first electrode 1055 and the second electrode 1054 may be grounded, connected to the source line, or connected to the arbitral terminal linked to another circuit. The other may connect to the gate electrode 955 through two control gates (the first control gate 996 and the second control gate 997). The bit line 902 may connect to the first control gate 996 and the word line 503 to the second control gate 997.

Figure 53:
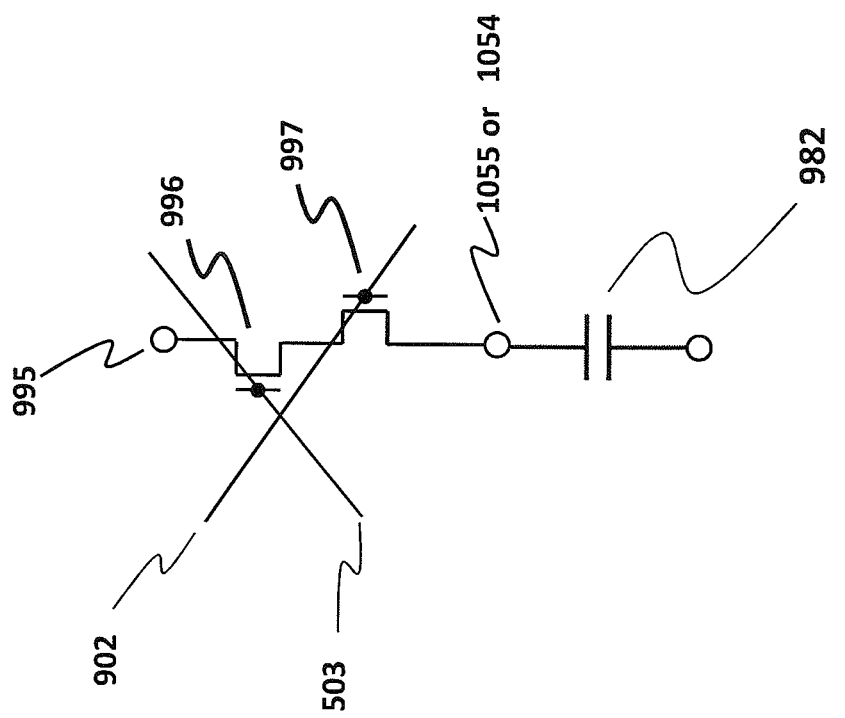
FIG. 53 is an illustration describing an example of an identification cell (capacitor).
Figure 54:
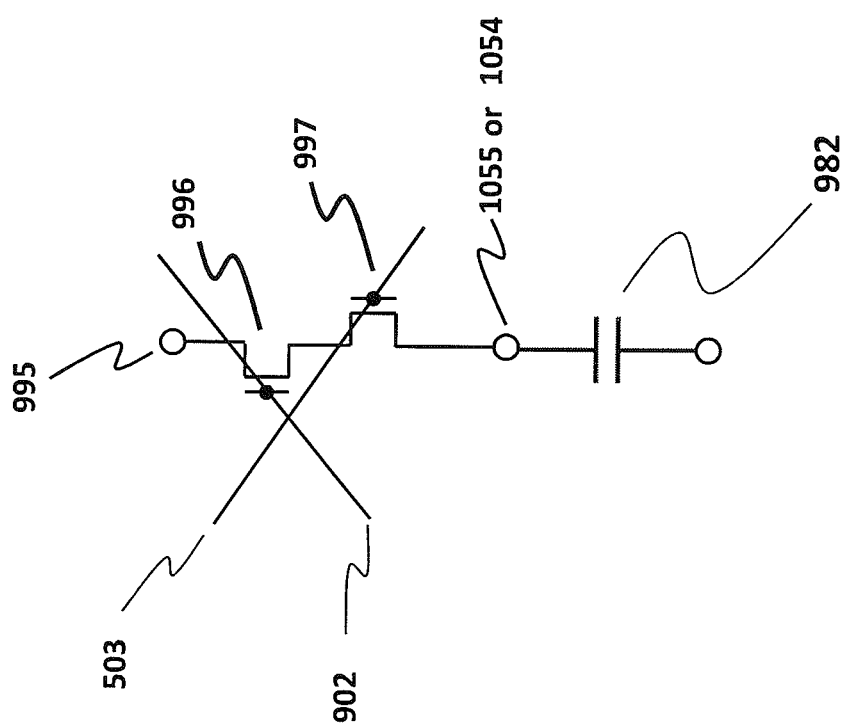
FIG. 54 is an illustration describing an example of an identification cell (capacitor).

FIG. 53 and FIG. 54 may be illustrations describing the case that the capacitor 982 is adopted as an identification cell. As illustrated in FIG. 53 for example, one of the first electrode 1055 and the second electrode 1054 may connect to the gate electrode 955 through two control gates (the first control gate 996 and the second control gate 997). The other of the first electrode 1055 and the second electrode 1054 may be grounded, connected to the source line, or connected to the arbitral terminal linked to another circuit. The bit line 902 may connect to the second control gate 997 and the word line 503 to the first control gate 996. Or, as illustrated in FIG. 54, one of the first electrode 1055 and the second electrode 1054 may be grounded, connected to the source line, or connected to the arbitral terminal linked to another circuit. The other may connect to the gate electrode 955 through two control gates (the first control gate 996 and the second control gate 997). The bit line 902 may connect to the first control gate 996 and the word line 503 to the second control gate 997.

Figure 55:
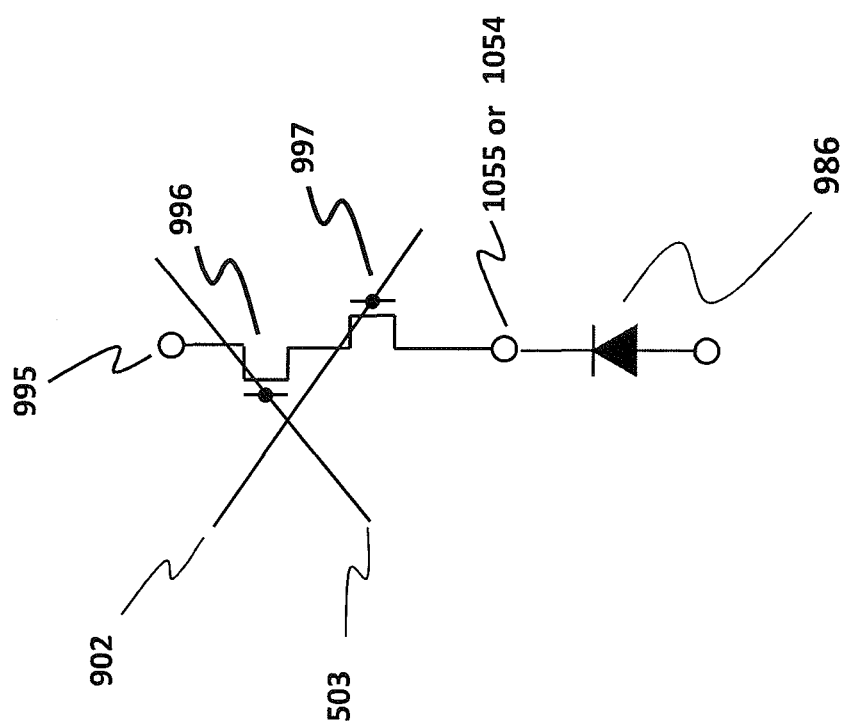
FIG. 55 is an illustration describing an example of an identification cell (PN junction).
Figure 56:
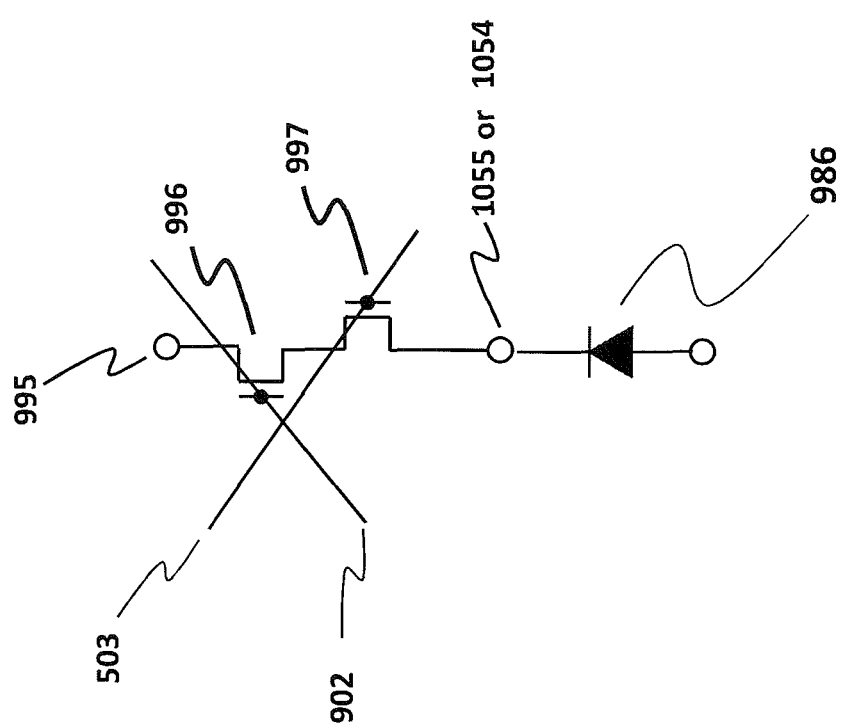
FIG. 56 is an illustration describing an example of an identification cell (PN junction).

FIG. 55 and FIG. 56 may be illustrations describing an example that the PN junction 986 is adopted as an identification cell. As illustrated in FIG. 55 for example, one of the first electrode 1055 and the second electrode 1054 may connect to the gate electrode 955 through two control gates (the first control gate 996 and the second control gate 997). The other of the first electrode 1055 and the second electrode 1054 may be grounded, connected to the source line, or connected to the arbitral terminal linked to another circuit. The bit line 902 may connect to the second control gate 997 and the word line 503 to the first control gate 996. Or, as illustrated in FIG. 56, one of the first electrode 1055 and the second electrode 1054 may connect to the gate electrode 955 through two control gates (the first control gate 996 and the second control gate 997). The other may be grounded, connected to the source line, or connected to the arbitral terminal linked to another circuit. The bit line 902 may connect to the first control gate 996 and the word line 503 to the second control gate 997.

Figure 57:
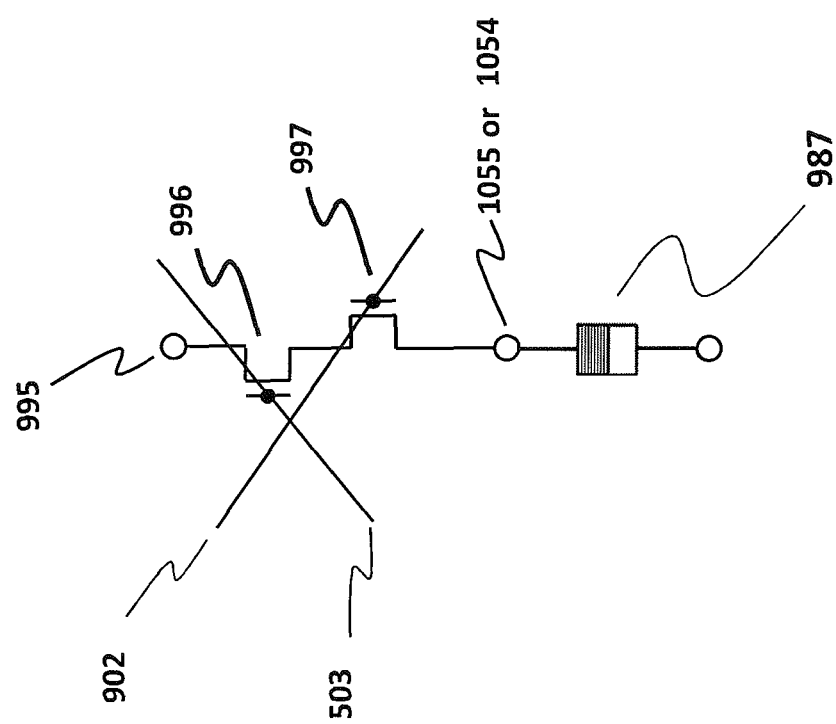
FIG. 57 is an illustration describing an example of an identification cell (Schottky junction).
Figure 58:
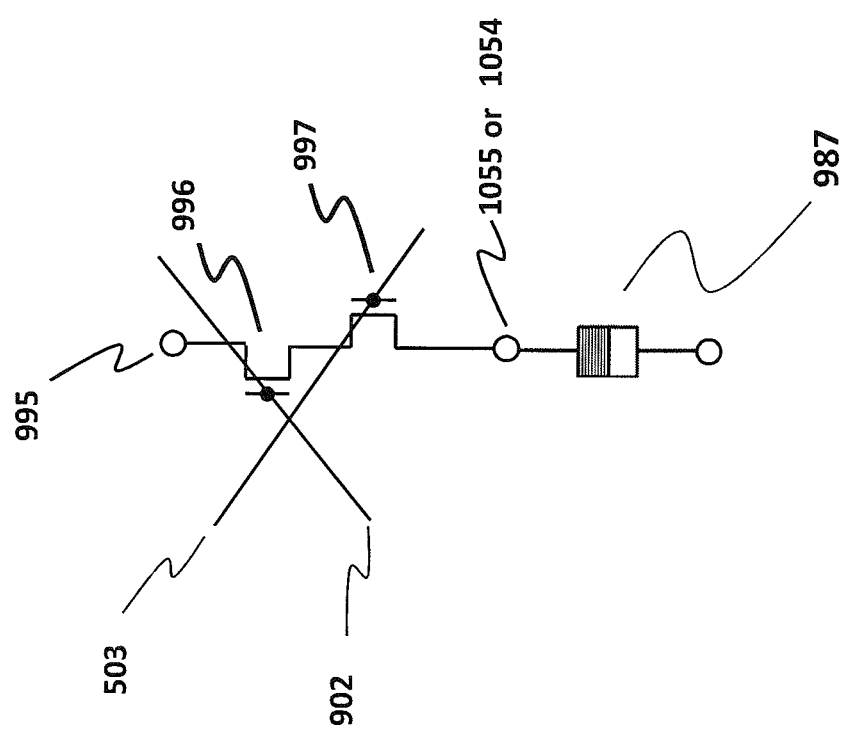
FIG. 58 is an illustration describing an example of an identification cell (Schottky junction).

FIG. 57 and FIG. 58 may be illustrations describing an example that Schottky junction 987 is adopted as an identification cell. As illustrated in FIG. 57 for example, one of the first electrode 1055 and the second electrode 1054 may connect to the gate electrode 955 through two control gates (the first control gate 996 and the second control gate 997). The other of the first electrode 1055 and the second electrode 1054 may be grounded, connected to the source line, or connected to the arbitral terminal linked to another circuit. The bit line 902 may connect to the second control gate 997 and the word line 503 to the first control gate 996. Or, as illustrated in FIG. 58, one of the first electrode 1055 and the second electrode 1054 may connect to the gate electrode 955 through two control gates (the first control gate 996 and the second control gate 997). The other may be grounded, connected to the source line, or connected to the arbitral terminal linked to another circuit. The bit line 902 may connect to the first control gate 996 and the word line 503 to the second control gate 997.

Figure 59:
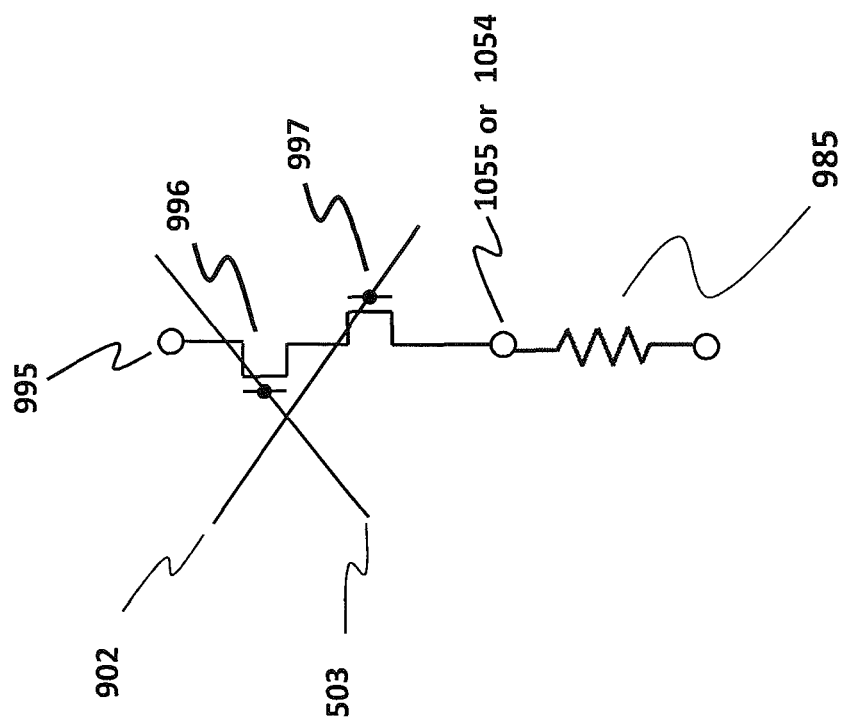
FIG. 59 is an illustration describing an example of an identification cell (resistor).
Figure 60:
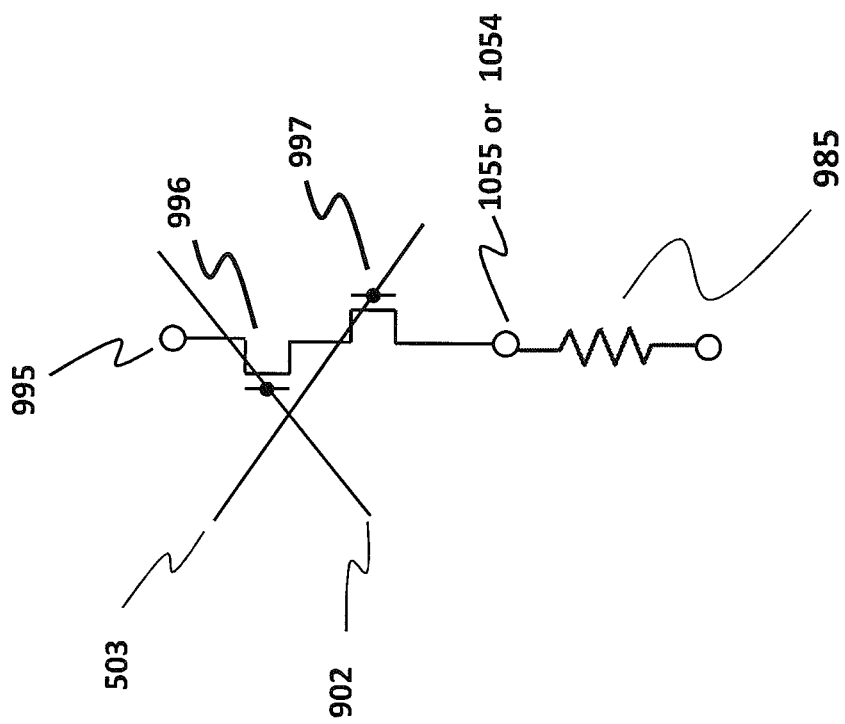
FIG. 60 is an illustration describing an example of an identification cell (resistor).

FIG. 59 and FIG. 60 may be illustrations describing an example that the resistor 985 is adopted as an identification cell. As illustrated in FIG. 59 for example, one of the first electrode 1055 and the second electrode 1054 may connect to the gate electrode 955 through two control gates (the first control gate 996 and the second control gate 997). The other of the first electrode 1055 and the second electrode 1054 may be grounded, connected to the source line, or connected to the arbitral terminal linked to another circuit. The bit line 902 may connect to the second control gate 997 and the word line 503 to the first control gate 996. Or, as illustrated in FIG. 60, the bit line 902 may connect to the first control gate 996 and the word line 503 to the second control gate 997. Furthermore, another example of the resistor 985 may be the conductor 930 shown in FIG. 47 and FIG. 48. It may be possible to adopt conductor manipulated to be thin or bended like a corner of a rectangle as a resistor or a fuse. Or, it may be also possible to adopt the conductive junction 970 as the conductor 930.

Figure 61:
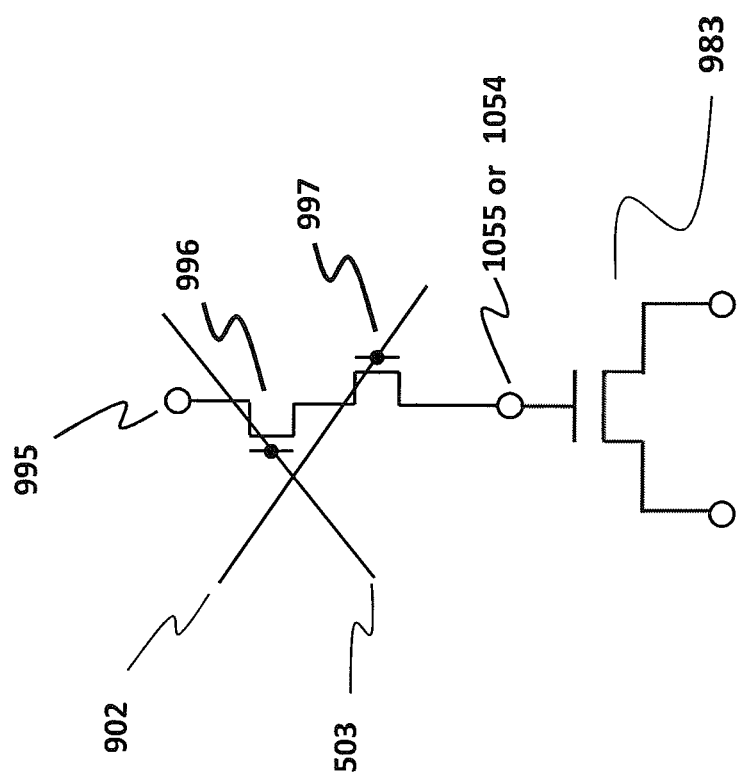
FIG. 61 is an illustration describing an example of an identification cell (field effect transistor).
Figure 62:
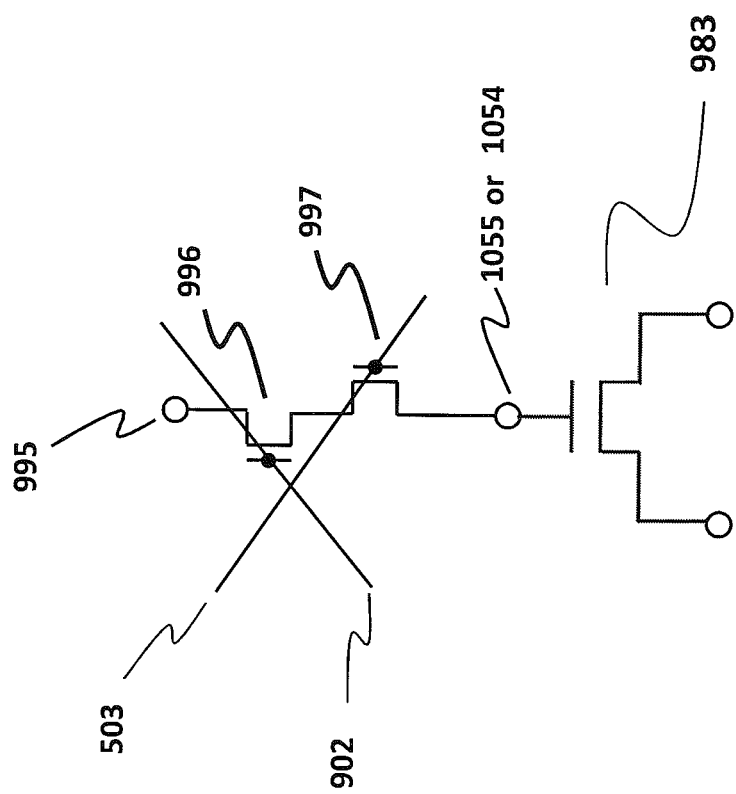
FIG. 62 is an illustration describing an example of an identification cell (field effect transistor).

FIG. 61 and FIG. 62 may be illustrations describing an example that the transistor 983 is adopted as an identification cell. As illustrated in FIG. 61 for example, the gate of the transistor 983 may connect to the gate electrode 955 through two control gates (the first control gate 996 and the second control gate 997). The source and drain of the transistor 983 may be grounded, connected to the source line, or connected to the arbitral terminal linked to another circuit. Hence, the bit line 902 may connect to the second control gate 997 and the word line 503 to the first control gate 996. Or, as illustrated in FIG. 62, the bit line 902 may connect to the first control gate 996 and the word line 503 to the second control gate 997.

Figure 63:
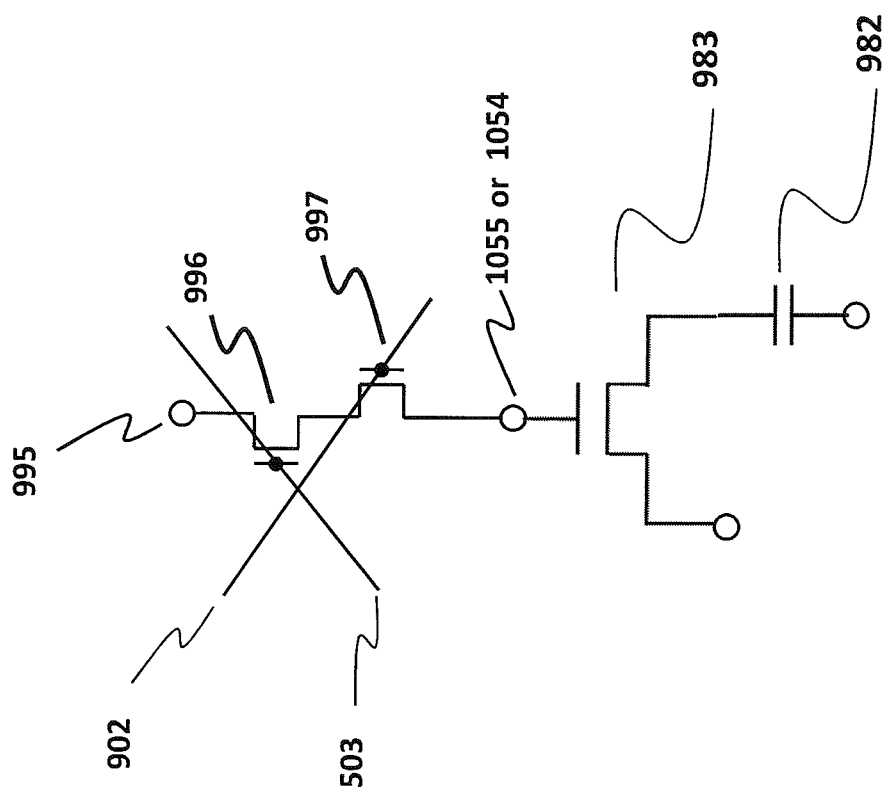
FIG. 63 is an illustration describing an example of an identification cell (DRAM).
Figure 64:
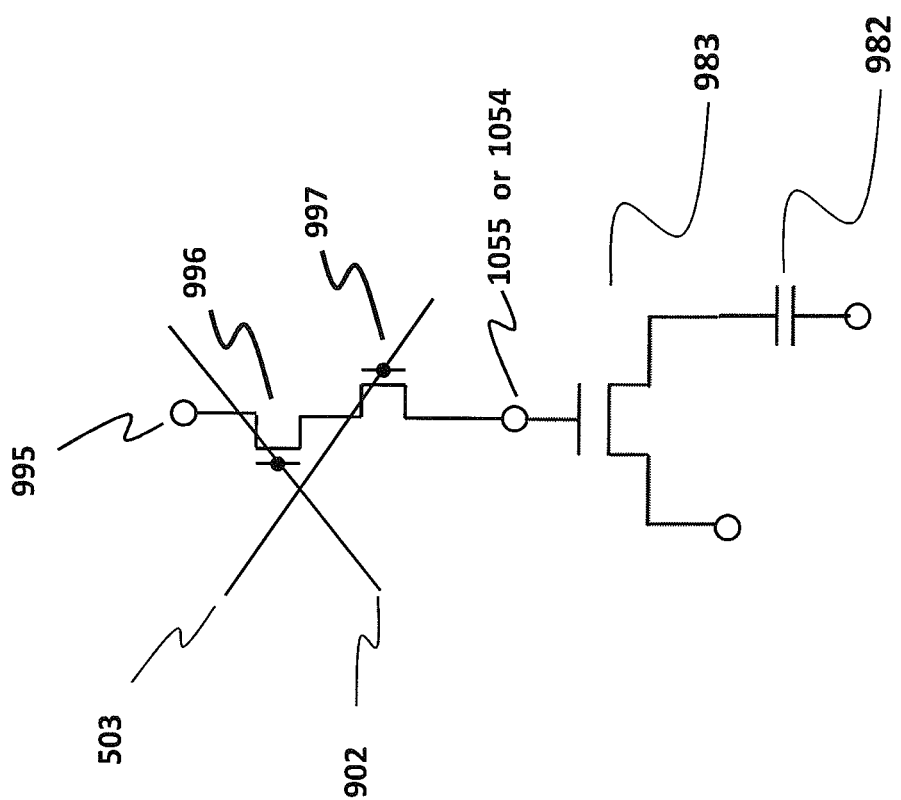
FIG. 64 is an illustration describing an example of an identification cell (DRAM).

FIG. 63 and FIG. 64 may be illustrations describing an example that a DRAM cell comprising a transistor 983 and a capacitor 982 is adopted as an identification cell. As illustrated in this FIG. 63, the gate of the transistor 983 may connect to the gate electrode 955 through two control gates (the first control gate 996 and the second control gate 997). One of the source and drain of the transistor 983 may be grounded, connected to the source line, or connected to the arbitral terminal linked to another circuit. The other may connect to one of two terminals of the capacitor 982. The other terminal of the capacitor 982 may be grounded, connected to the source line, or connected to the arbitral terminal linked to another circuit. Hence, the bit line 902 may connect to the second control gate 997 and the word line 503 to the first control gate 996. Or, as illustrated in FIG. 64, the bit line 902 may connect to the first control gate 996 and the word line 503 to the second control gate 997.

Figure 65:
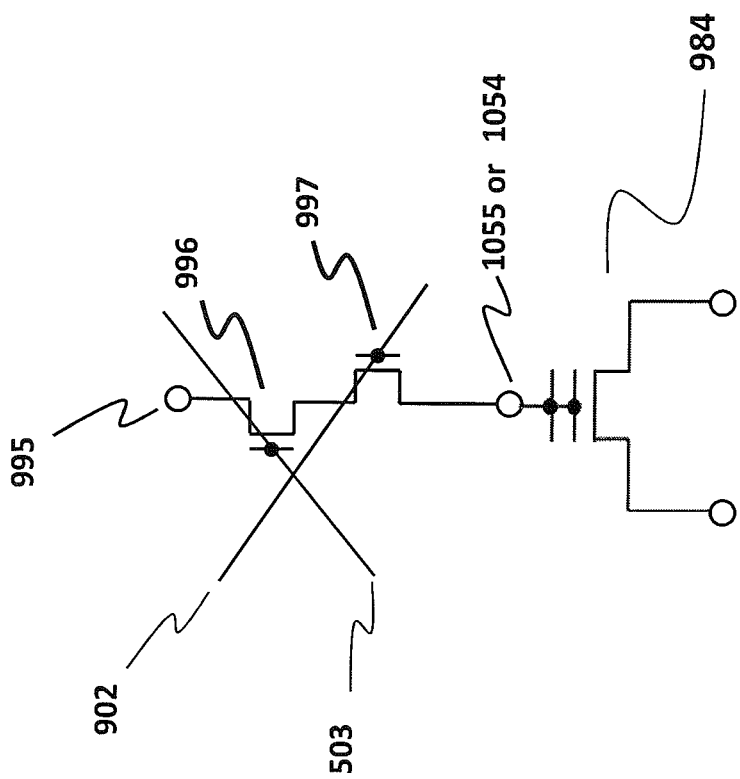
FIG. 65 is an illustration describing an example of an identification cell (select transistor).
Figure 66:
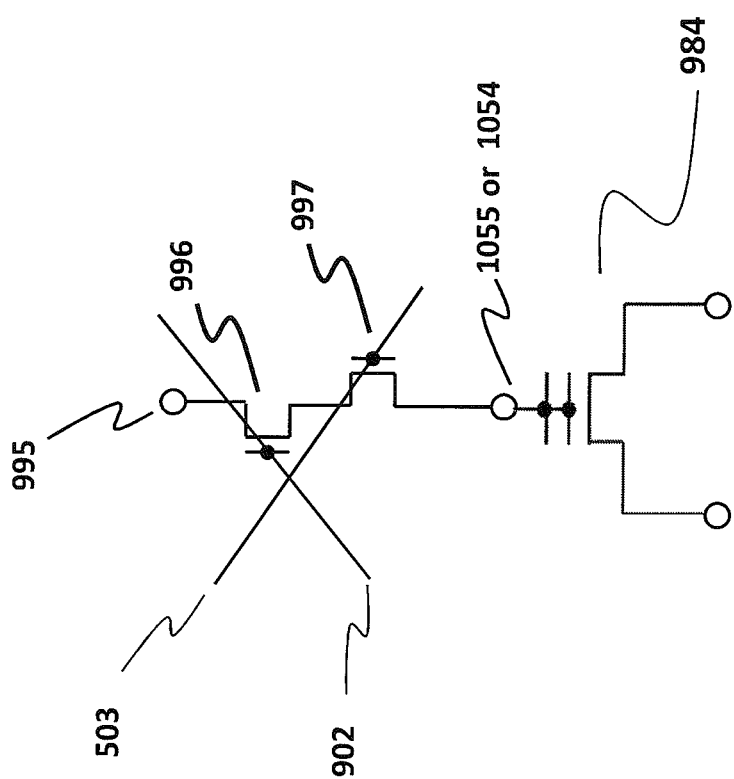
FIG. 66 is an illustration describing an example of an identification cell (select transistor).

FIG. 65 and FIG. 66 may be illustrations describing an example that the select transistor 984 is adopted as an identification cell. As illustrated in FIG. 65 for example, the gate of the select transistor 984 may connect to the gate electrode 955 through two control gates (the first control gate 996 and the second control gate 997). The source and drain of the select transistor 984 may be grounded, connected to the source line, or connected to the arbitral terminal linked to another circuit. Hence, the bite line 902 may connect to the second control gate 997 and the word line 503 to the first control gate 996. Or, as illustrated in FIG. 66, the bit line 902 may connect to the first control gate 996 and the word line 503 to the second control gate 997.

Figure 67:
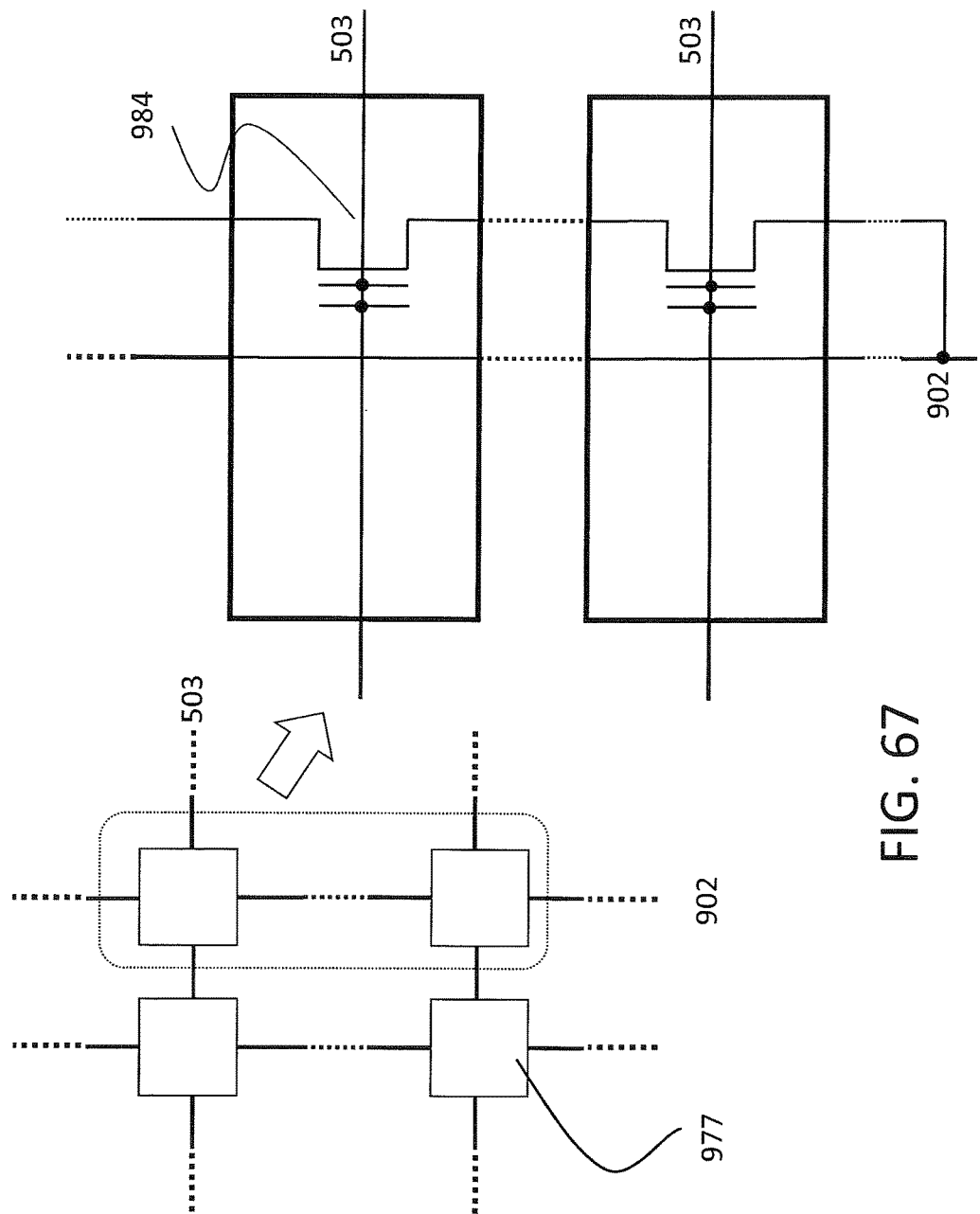
FIG. 67 is an illustration describing an example of an identification cell (select transistor).
Figure 68:
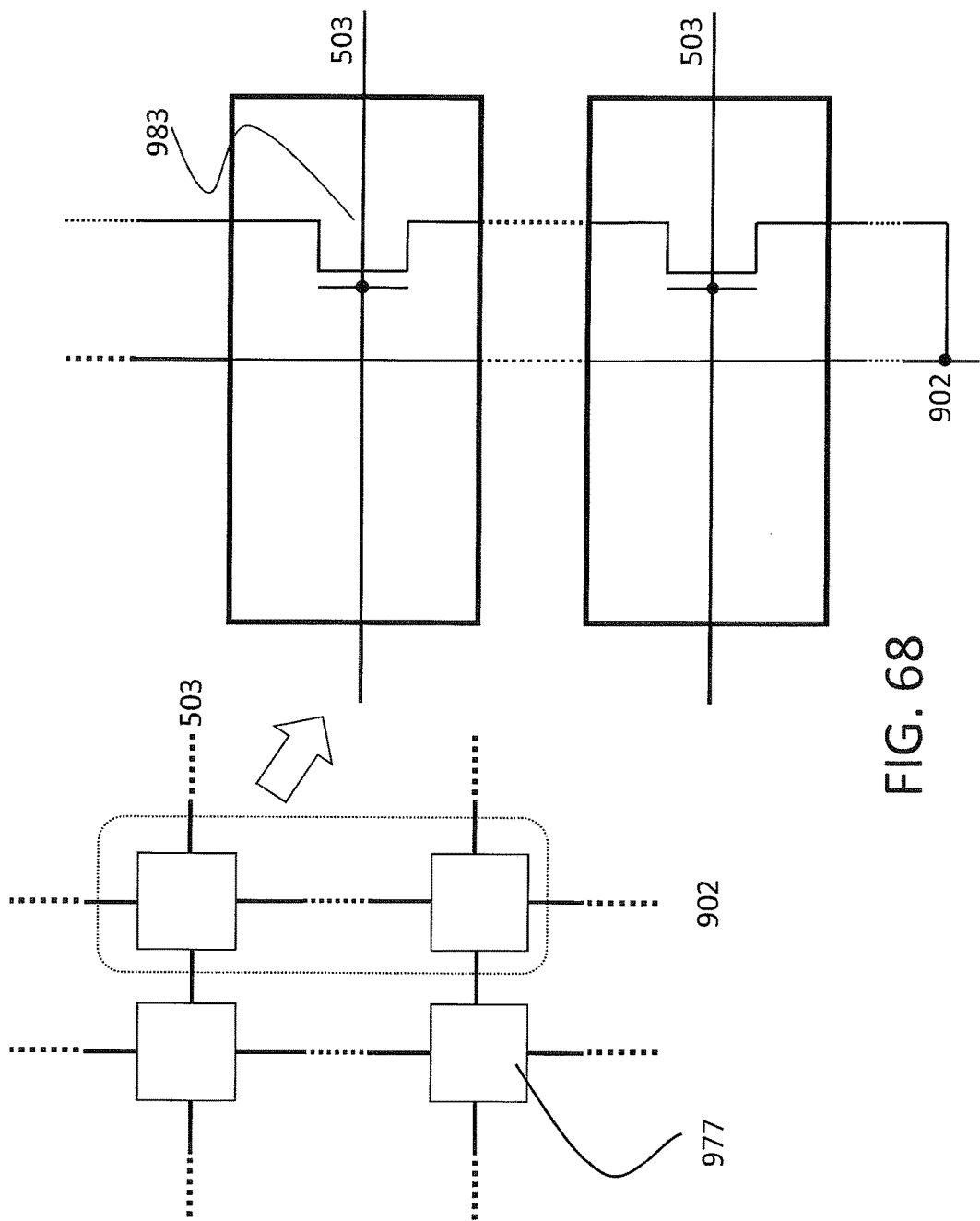
FIG. 68 is an illustration describing an example of a layout in the case that the identification cells are arrayed in a NAND-type layout.

FIG. 67 may be an example of the case that the diffusion layers of adjoining select transistors 984 along a bit line direction are connected in series. This may be called NAND type configuration, and then the bit line contacts are excluded from between the cell transistors. However, since those cell transistors are identification cells 977 and not nonvolatile memory cells, it may be different from so-called NAND flash, that is, NAND-type identification cell array. Hence, since the identification cell is a select transistor 984, in particular, the breakdown of the capacitor comprising the tunnel film may be adopted. FIG. 68 may be another example of a NAND-type identification cell array. In this example, transistor 983 may be adopted as an identification cell. Hence, in particular, the breakdown of the capacitor comprising the gate insulating film may be adopted. Anyway, the breakdown of the capacitor (or, dielectric breakdown) may be adopted. Accordingly, the operation method may be similar and then outlined below.

Figure 69:
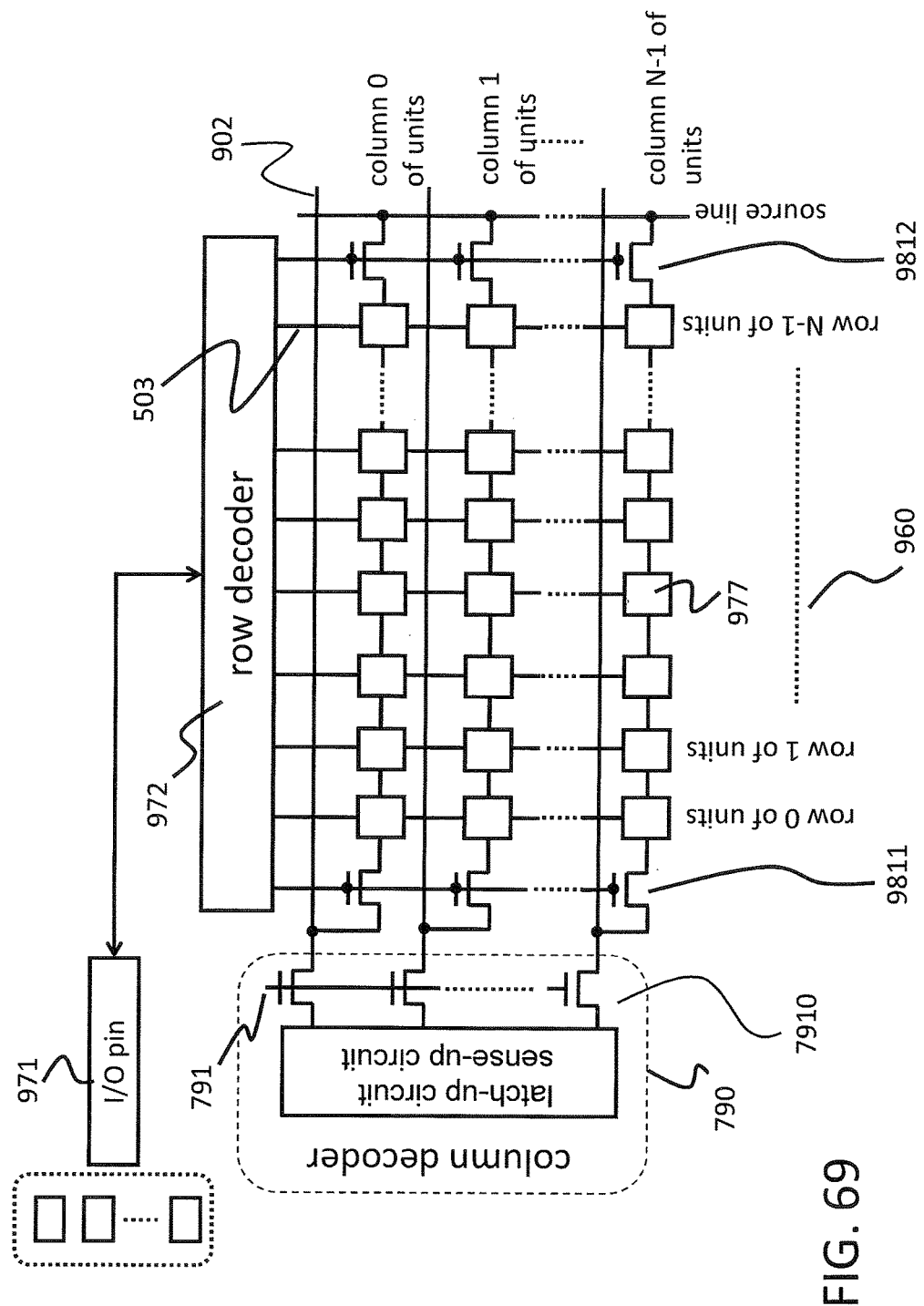
FIG. 69 is an illustration describing an example of a layout in the case that the identification cells are arrayed in a NAND-type layout.

FIG. 69 may be an example of the array for the identification cells 960. The page buffer 790 may also play a role of the page buffer for the array of a NAND-type nonvolatile memory cells. The page buffer 790 may include a bit line connection gate 791. Furthermore, the page buffer 790 may include the circuits to govern the sense-amplifier, latch up and so forth inside.

The present disclosure may be equipped with a memory cell of a NAND flash. However, it may be also possible that the present disclosure is equipped with volatile memories such as a DRAM, a SRAM and so on, or different kinds of nonvolatile memories such as a NOR flash, a MRAM, a PRAM, a RRAM and so on. Any memory cells to be equipped with, whereas the essence of the present disclosure may not be revised. In other words, the memories to be equipped with the array for identification cells 960 related to the present disclosure may share at least one of bit line or word line for addressing as necessary, and not beyond. It may be independent of kind of memories.

As an example, to apply a voltage pulse on the identification cell 977, the following method may be executed. First, a positive potential may be applied to the select gate in the side of bit line, and then the drain select transistor (SGD) 9811 may be turned on. In the case that there are word lines between the word line linking to a cell to be broken and the drain select transistor 9811, a positive voltage may be similarly applied to those word lines and then all of the corresponding cell transistors (identification cell 977) may be turned on. Hence, a potential of bit line linking to the cell to be applied with the breaking pulse may be zero volt.

Next, a word line linking to the cell to be applied with the breaking pulse may be selected and then the breaking pulse may be applied thereto. An example of the method to apply the breaking pulse may be, for example, those illustrated in FIG. 36 or FIG. 37. In addition, in the case that there may be a plurality of chip identification codes, a plurality of blocks of chip identifications (identification block) may be allocated to those identification codes, respectively.

In this case, the method of FIG. 36 or FIG. 37 may be tested with one of chip identification devices to determine the frequency of the pulses, and then this frequency may be stored in a memory area on the chip (or a buffer). The breaking pulse may thus be applied in another area of chip identification with the frequency to be stored here. In this case, the inspection of breaking ratio between pulses may be omitted.

Figure 70:
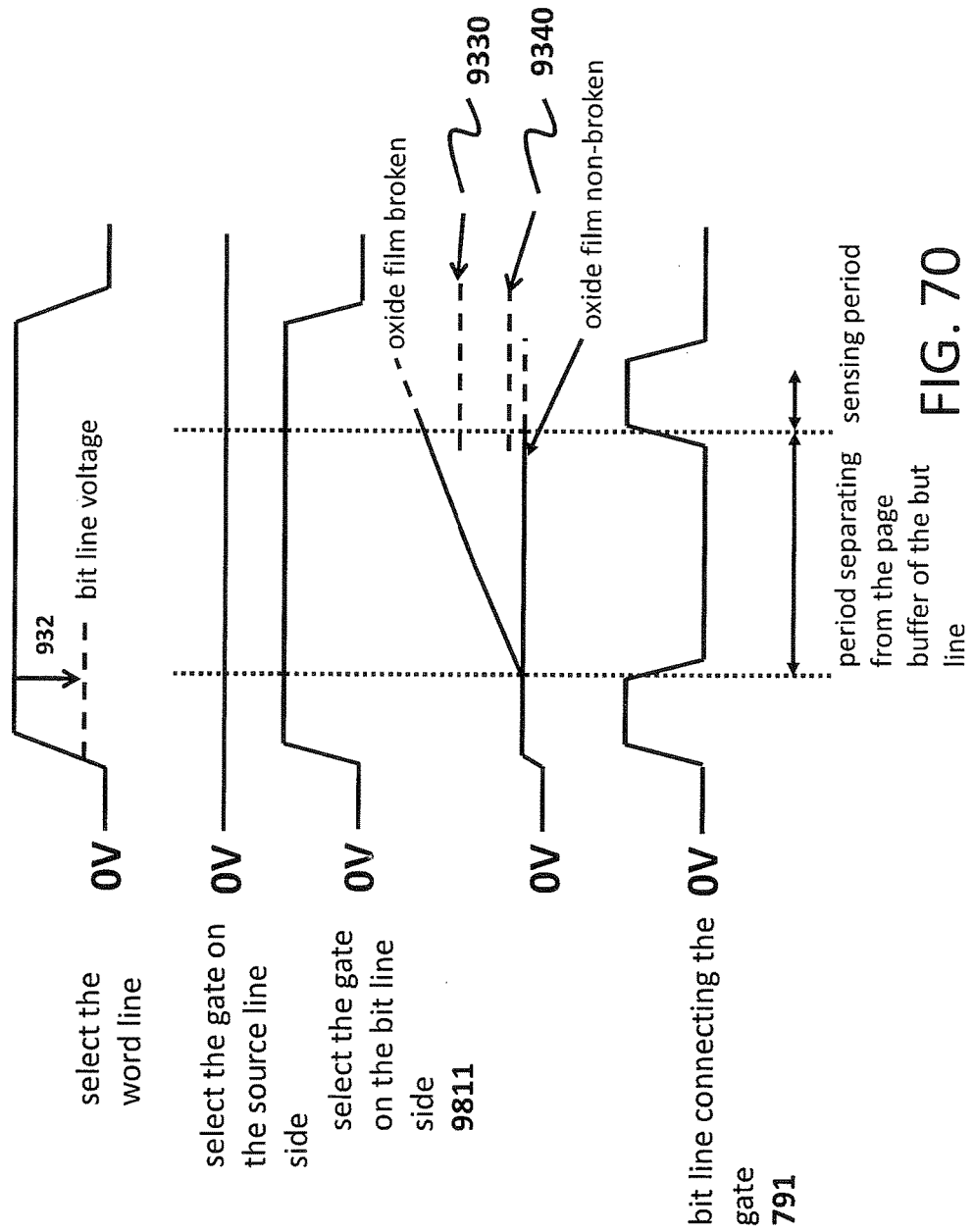
FIG. 70 is an illustration describing an example of a method to read the identification cell.

FIG. 70 may be an illustration of an example of a voltage pulse to be applied when the breakdown inspection related to the present disclosure is executed. First of all, a word line associated to an identification cell 977 (cell transistor) to be read may be selected and then a voltage higher than zero volt may be applied thereto. In the case that there are other word lines between the selected word line and drain select transistor (SGD) 9811, a positive potential may be applied to those word lines and then the associated identification cells (cell transistors) may be turned on. A predetermined positive potential which is lower than that to the selected word line or zero volt may be applied to the bit line.

The potential difference between the selected word line and the bit line may be, for example, about the breakdown judge voltage 932 of FIG. 34. Simultaneously, a positive potential may be applied to the gate of the drain select transistor (SGD) 9811, and then the drain select transistor (SGD) 9811 may be turned on. Next, the potential of the bit line connection gate 791 may be reduced to zero volt. Thus, the bit line connection transistor 7910 may be turned off, and then the bit line may be disconnected from the inspection circuit in the page buffer 790.

If the insulating film of the selected identification cell 977 is broken and then conductive, the potential of the bit line may increase. On the contrary, if not conductive, the potential of the bit line may remain unchanged. Next, a positive potential may be applied to the bit line connection gate 791 and then the bit line connection transistor 7910 may be turned on. Subsequently, the potential change of the bit line may be inspected inside the page buffer 790. The potential difference due to the conductive and non-conductive states of the insulating film of the identification cell 977 may be amplified in the page buffer 790 and then stored as data of high and low in latch up circuit.

In other words, the insulating film of the selected identification cell 977 may be regarded as broken if the potential of the bit line is higher than a predetermined potential (e.g., the breakdown judge voltage value 9330). The insulating film of the selected identification cell 977 may be regarded as non-broken if the potential of the bit line is lower than a predetermined potential (e.g., the non-breakdown judge voltage value 9340). Hence, the breakdown judge voltage value 9330 and the non-breakdown judge voltage value 9340 may respectively correspond to the breakdown judge current value 933 and the non-breakdown judge current value 934 in FIG. 34. In this example, however, the breakdown may correspond to conductive state while the non-breakdown may correspond to non-conductive.

Figure 71:
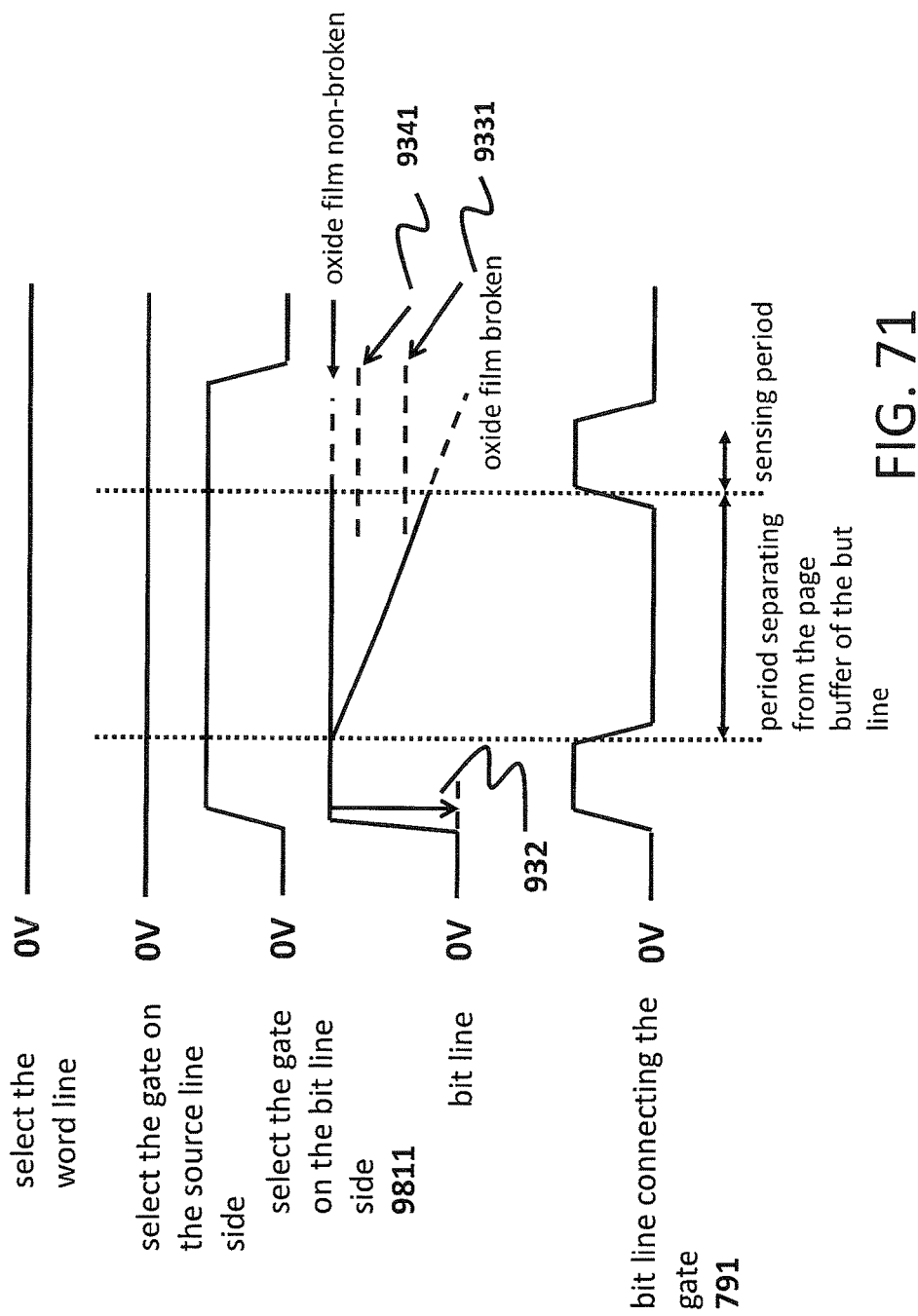
FIG. 71 is an illustration describing an example of a method to read the identification cell.

Another example of a voltage pulse to be used in the breakdown inspection related to the present disclosure may be illustrated with FIG. 71. First, one of the word lines, which links to an identification cell 977 (cell transistor) to be read, may be selected and then zero voltage may be given thereto. In the case that there may be other word lines between the selected word line and the drain select transistor 9811, a positive voltage may be similarly applied to those word lines, and then the corresponding identification cells (cell transistors) may be turned on. A predetermined positive potential may be applied to the bit line.

The potential difference between this selected word line and the bit line may be, for example, about the breakdown judge voltage 932 of FIG. 34. A positive potential may be applied to the gate of the drain select transistor 9811 and then the drain select transistor 9811 may be turned on. Next, the potential of the bit line connection gate 791 may be reduced to zero volt. Thus, the bit line connection transistor 7910 may be turned off, and then the bit line may be disconnected from the inspection circuit inside the page buffer 790. If the insulating film of the selected identification cell 977 may be broken and then conductive, the potential of the bit line may decrease. On the contrary, if not conductive, the potential of the bit line may remain unchanged. Next, a positive potential may be applied to the bit line connection gate 791 and then the bit line connection transistor 7910 may be turned on again.

Subsequently, the potential change of the bit line may be inspected in the page buffer 790. The potential difference of the bit line due to the conductive and non-conductive states of the insulating film of the identification cell 977 may be amplified in the page buffer 790 and then stored as data of high and low in the latch up circuit. In other words, the insulating film of the selected identification cell 977 may be regarded as broken if the potential of the bit line is lower than a predetermined potential (e.g., the breakdown judge voltage value 9331). The insulating film of the selected identification cell 977 may be regarded as non-broken if the potential of the bit line is higher than a predetermined potential (e.g., the non-breakdown voltage value 9341). Hence, the breakdown judge voltage value 9331 and the non-breakdown judge voltage value 9341 may respectively correspond to the breakdown judge current value 933 and the non-breakdown judge current value 934 of FIG. 34. Hence, the breakdown may be conductive state and the non-breakdown may be non-conductive state.

It may be possible to allocate one memory block next to a plurality of memory blocks of nonvolatile memory as a chip identification device array. For example, the layout shown in FIG. 31 and FIG. 32 may be possible. Like this, although the chip identification device and the nonvolatile memory device may differ from each other, the chip area may be saved by sharing the bit lines 902 or the word lines 503.

In the example of physically random combination generated on the semiconductor cell array, as shown in FIG. 22, the number of "1" and "0" may be counted at each row and then the rows having more cells of "1" may be regarded as black. The rows having more cells of "0" may be regarded as white. Or, if the binary sum of "1" and "0" at each row is "1", the corresponding row may be regarded as black. On the contrary, if the binary sum is "0", the corresponding row may be regarded as white. Or, it may be possible to determine "1" or "0" at each row with regard to some kind of property related to each row.

Like this, a value related to each row ("1" or "0") may be determined according to some kind of operations. The result related to each row may be recorded in an alternation cell 979. For example, any kind of binary bit operation may be possible. Or, it may be preferable that only the last digit of the summation of "0" and "1" at each row is recorded to the corresponding alternation cell 979. Or, it may be possible that the numbers of "0" and "1" may be compared at each row and then the superior may be recorded to the corresponding alternation cell 979. The alternation cell 979 may be memory cell, fuse and so on. However, the memory cell may be either nonvolatile or volatile. For example, in the case of nonvolatile memory, it may be preferable that the memory cell has floating gate. Or, it may be preferable that the memory cell adopts the change of magnetoresistance, the phase transition, and the resistivity change of the resistive layer. In the case of volatile memory, the memory cell may adopt the charge quantity stored in the capacitor or specially designed circuit.

Figure 73:
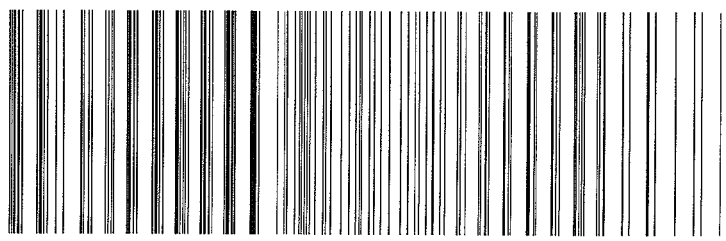
FIG. 73 is an illustration describing randomness of the data by alternation cells.

Anyway, the white and black random checkerboard pattern of FIG. 22 may be converted into random pattern of horizontal lines as shown in FIG. 73. This may be similar to the conversion from QR code to barcode. The information quantity per a same row number may be decreased by this conversion. However, enough randomness may be ensured, as long as the number of rows is large enough and one of ratios of white and black does not dominate the other.

Hence, FIG. 23 may be formed to reproduce FIG. 22 by configuring some kind of identification cell 977 on each cross-point of the checkerboard lattice. As mentioned above, the identification cell 977 may be anyone to be able to at least output the first and second signals such as a memory cell, a resistor, a capacitor, a diode, a switching cell, and some kind of transistor. Hence, the row number may be N and the column number may be M, where both N and M may be required to be large integers for FIG. 22 to ensure enough randomness.

Figure 74:
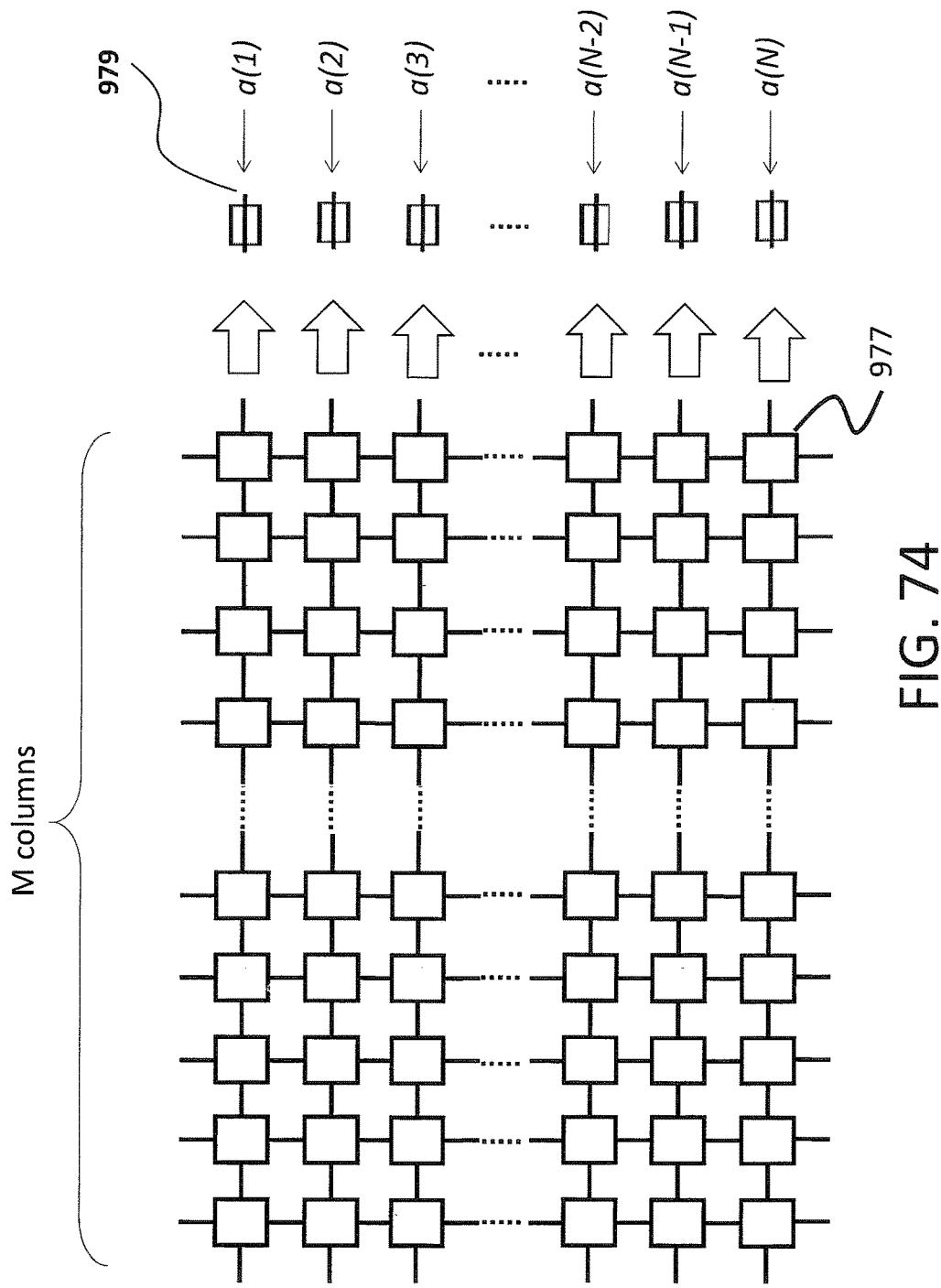
FIG. 74 is an illustration describing an example of a method to input an input code.

Subsequently, (a(1), a(2), ..., a(N)) may be assumed as an example of input code (P, S, T ...). As shown in FIG. 74, the input code (a(1), a(2), ..., a(N)) may be linked to alternation cell 979 from the first row in the order of row. Hence, the i-th data (I/O) may be represented by an element d(i). And, {d(i)}, an ensemble of element d(i), may be a random code formed by a random aggregation of 0 and 1. In a similar manner, the above input code may be represented by {a(i)}, where i is an integer ranging from 1 to N. Subsequently, the output code {c(i)} may be generated from the input code {a(i)} and the output code {d(i)} by some kind of method. The pair of the input code {a(i)} and the output code {c(i)} may correspond to the communication series 80 of FIG. 9.

As mentioned above, however, as long as FIG. 22 is a physical random pattern of white and black, the requirement that {d(i)} is a random code formed by a random aggregation of 0 and 1 may be satisfied. Of course, in the above-mentioned example, the essence of the present disclosure may be unchanged even by replacing row and column.

Figure 75:
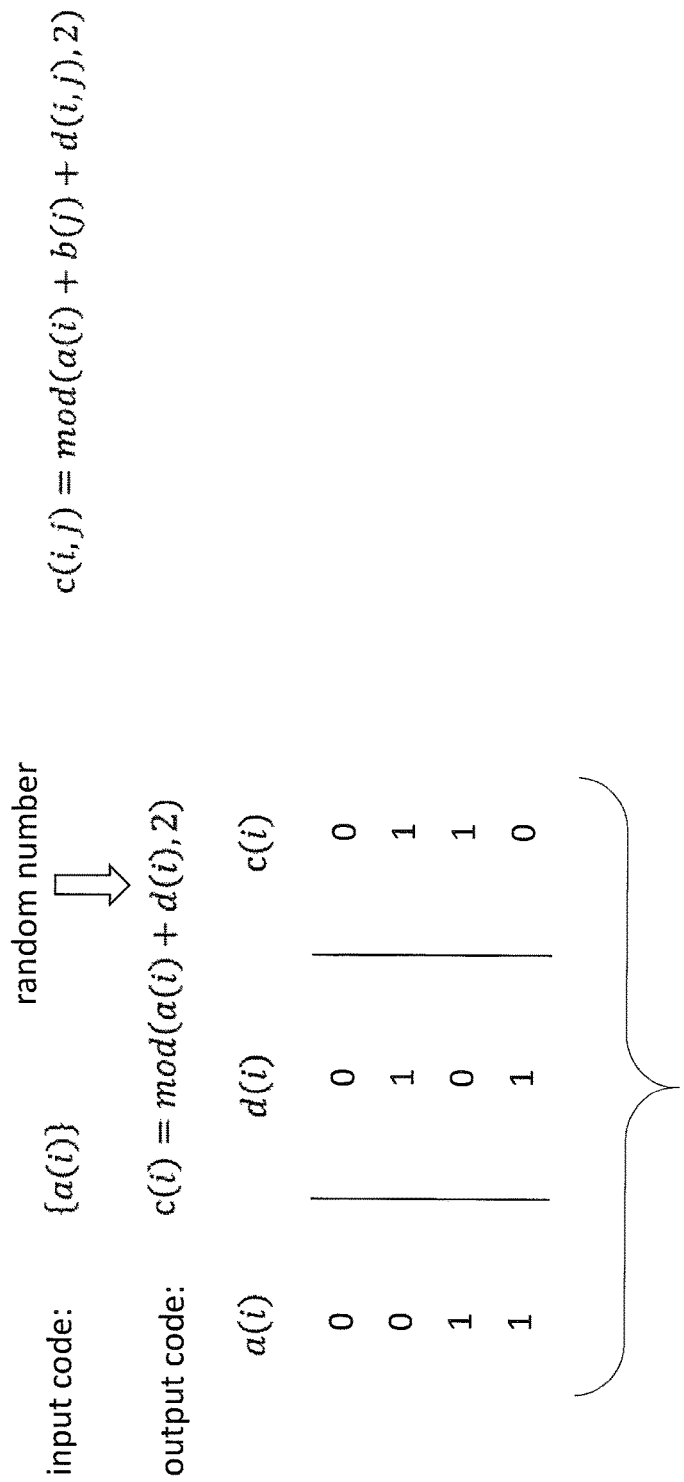
FIG. 75 is an illustration describing an example of a correspondence chart of an input code, an output code, and a random number.

As an example, hence, the remainder operation mod (x,y) may be adopted to generate the output code {c(i)}. This may be a reminder to be obtained by dividing x by y. FIG. 75 may be a chart illustrating the relation of sequence {a(i)}, physical random code {d(i)} and output code {c(i)}.

$$c(i)=\mod(a(i)+d(i),2) \qquad \text{Eq. 4.}$$

This may be similar to but simpler than Eq. 2 because of no column element j. Moreover, it may be easily supposed that this method causes no change of ratios of 1 and 0 before and after the conversion by Eq. 4. This may be a necessary requirement to stabilize the quantity of data to be dealt with the communication series 80. In other words, it may be required that the quantity of information to be input to the right hand side of Eq. 4 and the quantity of information to be output from the left hand side of Eq. 4 may be almost equivalent. In other words, in the case that the quantities of input and output information substantially differ from each other, the quantity of information determined by Eq. 4 may be fit to a smaller, and as a result, information entropy (physical randomness) may be lost by at least the difference due to this reduction.

Figure 76:
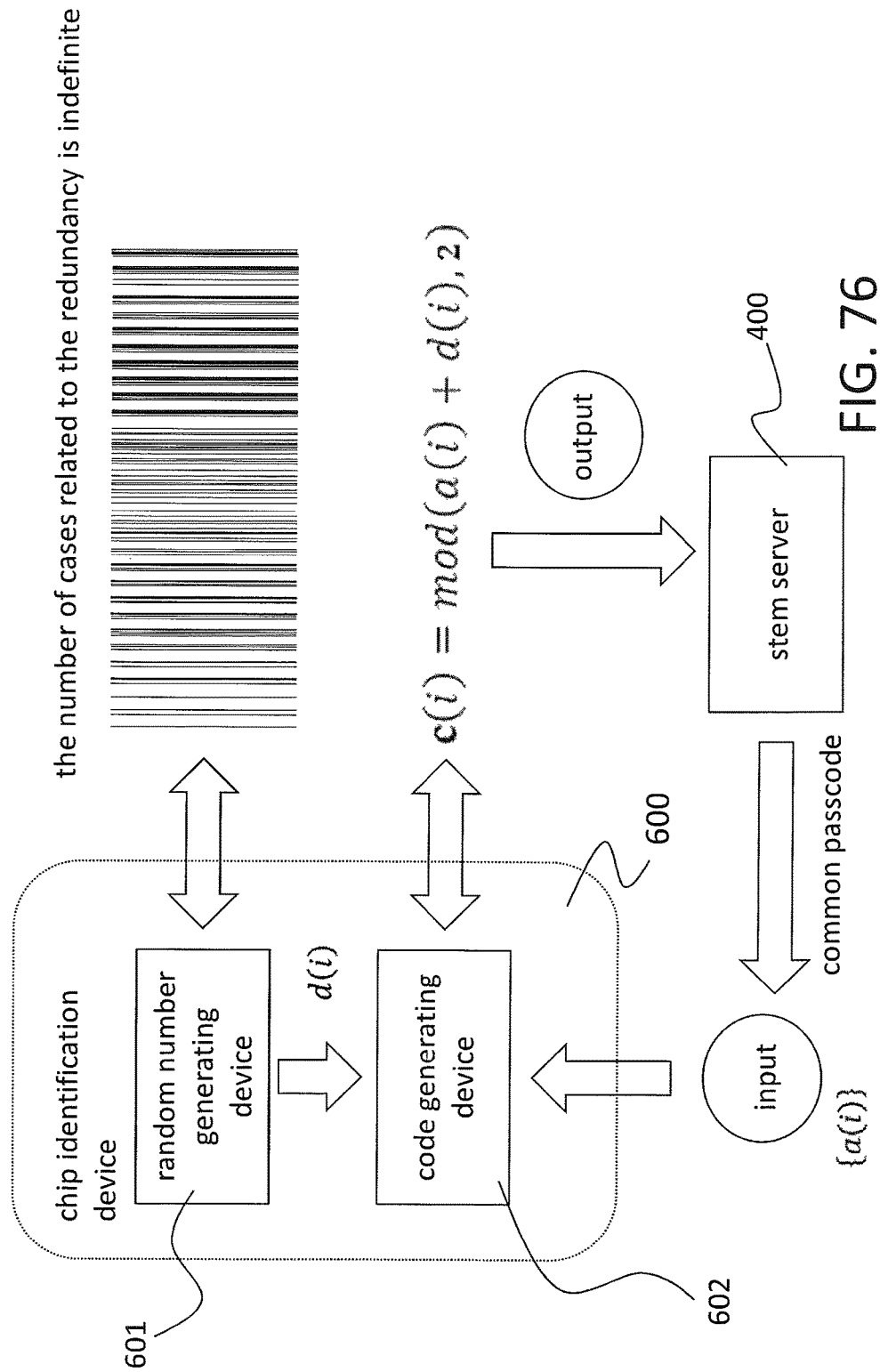
FIG. 76 is an illustration describing an example of a basic configuration for describing an example of the utilization of the chip identification device.

FIG. 76 may be a conceptual illustration for an example of basic configuration to realize the mechanism described in Eq. 4. In other words, the physical random number {d(i)} may be generated by the random number generating device 601, the input code {a(i)} may be input as a common passcode from the stem node 400, and then the output code {c(i)} may be generated by the code generating device 602. In this example, both of the random number generating device 601 and the code generating device 602 may be components of the chip identification device 600. On the other hand, while not particularly noted since self-evident, it may be possible in another example that the code generating device 602 may be configured out of the chip identification device 600. Anyway, it may be required that the random number generating device 601 is configured on chip at as low cost as possible. As an example of the random number generating device 601 in the present disclosure, the method conceptually illustrated in FIG. 73 and FIG. 74 may be adopted. It may be possible to configure the code generating device 602 with program, as conceptually illustrated in Eq. 4. Hence, although some kind of algorithm is adopted, it may be the characteristics of the present disclosure that the physical randomness is involved with the physical random number {d(i)}. However, it may be presumed that the row number of the random number generating device 601 may be at least equal to or larger than the element number of {a(i)}, in order to input the whole element of the input code.

FIG. 27 may be an illustration of an example of the utilization method of the scrambling device 604 to operate according to Eq. 4. Hence, the input code (P, S, T, . . . ) may be sent from the stem node 400 to the scrambling device 604. Thus, the input code (P, S, T, . . . ) may be converted into (P', S', T', . . . ). This converted code (P', S', T', . . . ) may be input to the chip identification device 600 equipped in the peripheral node as a module. As mentioned in FIG. 7, hence, the peripheral node connecting to the stem node 400 may mount at least one chip having the chip identification device 600. The chip identification device 600 may return the identification (P1, S1, T1, . . . ). Next, (1) this identification (P1, S1, T1, . . . ) may be output to the stem node. Or, (2) this identification (P1, S1, T1, . . . ) may be returned to the scrambling device and then the converted identification (P1', S1', T1', . . . ) may be returned to the stem node 400. Or, while not particularly noted since self-evident, (3) the identification (P1, S1, T1, . . . ) may be converted into the identification (P1", S1", T1", . . . ) with a second and different scrambling device, and then this converted identification may be returned to the stem node 400. In the method (3), at least two independent scrambling devices may be necessary.

Figure 72:
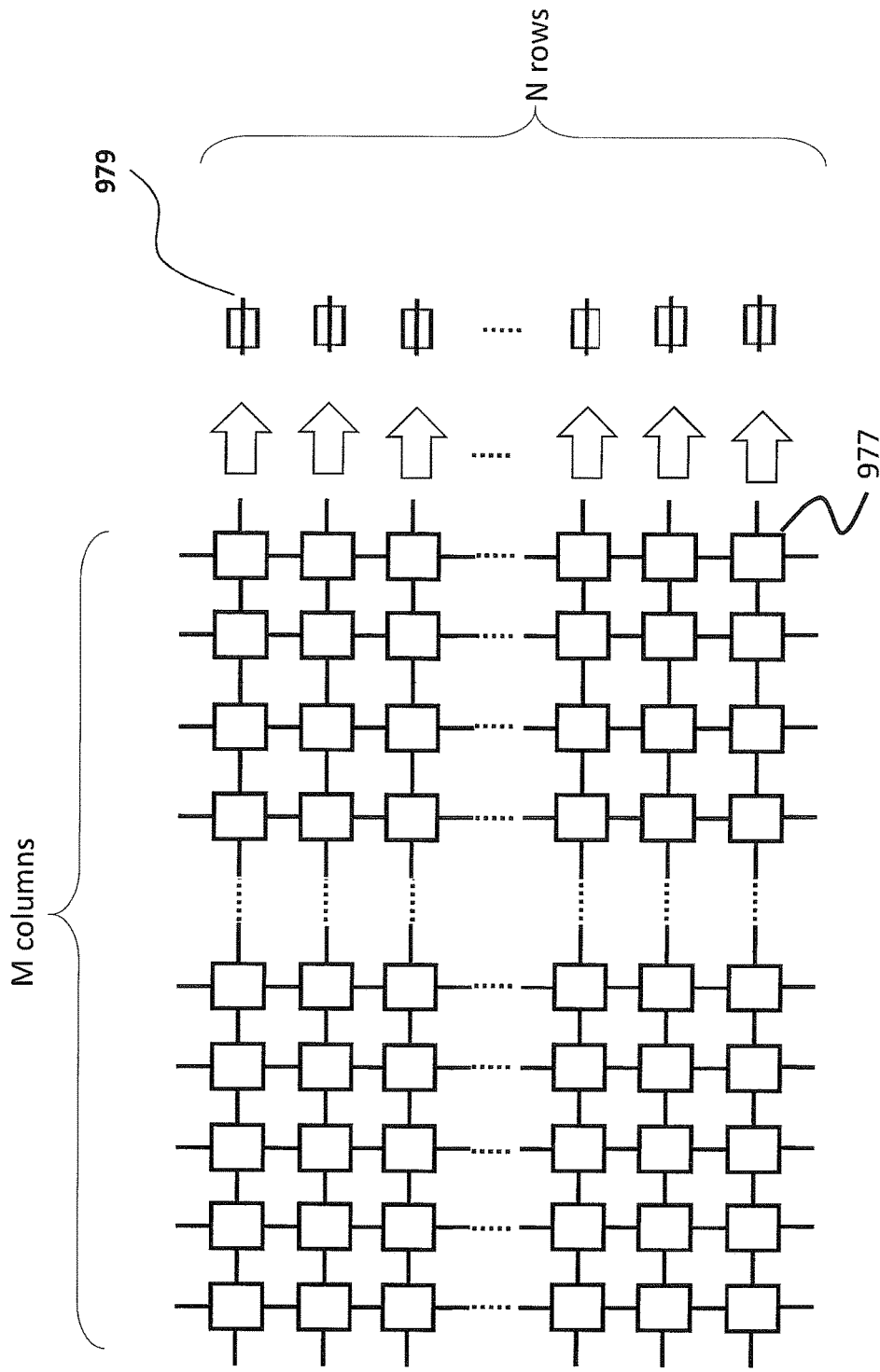
FIG. 72 is an illustration describing an example of an alternation cell.
Figure 77:
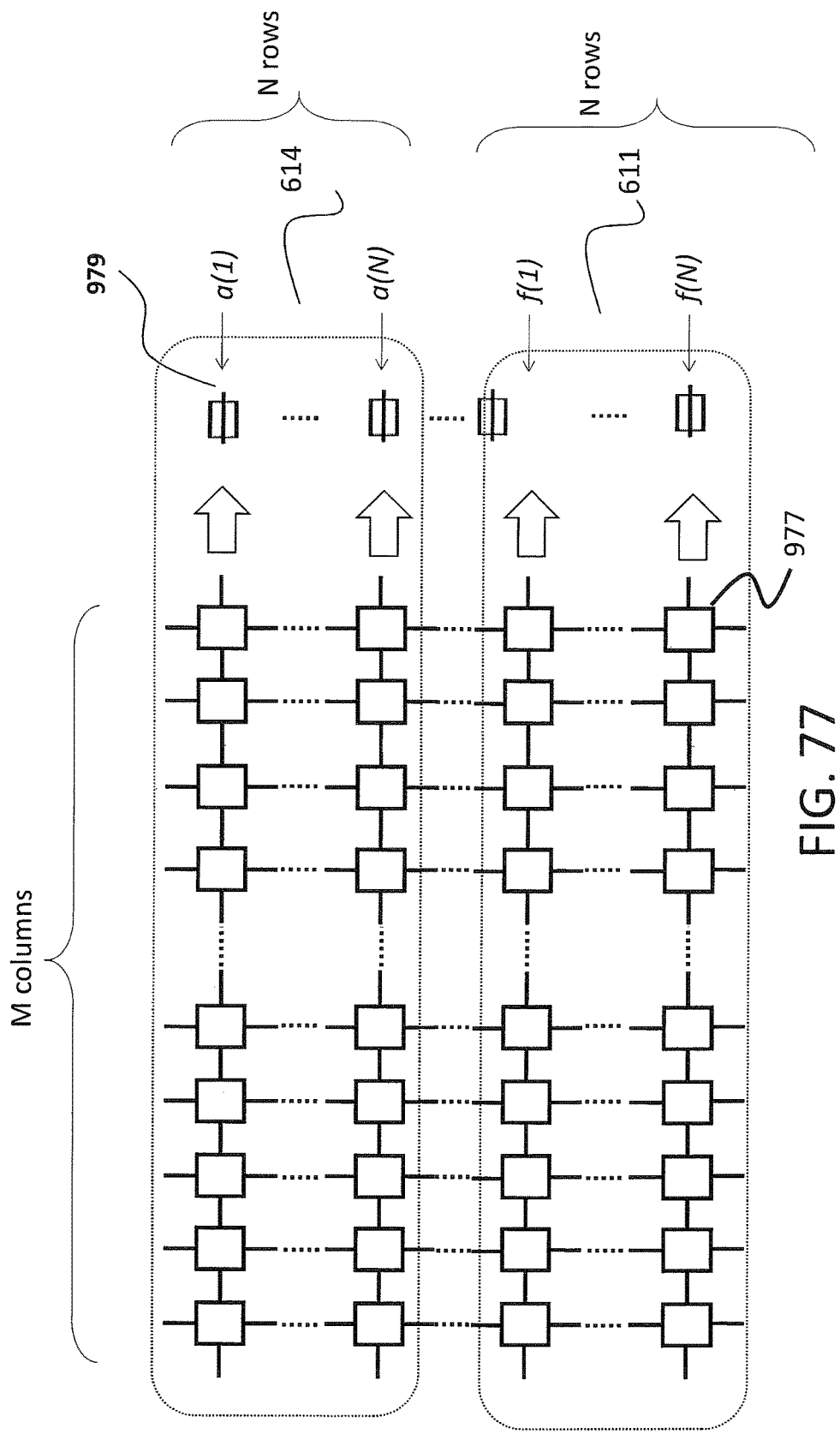
FIG. 77 is an illustration describing an example of the cell array having both the scrambling device and the chip identification device.

FIG. 77 illustrates a part or the whole of the cell array comprising the identification cells 977 and the alternation cells 979 of FIG. 72, where the number of rows is N+K. This N+K may be less than or equal to the number of the whole bit lines on chip, or less than or equal to the number of the whole word lines on chip. Hence, the upper area of K rows may be allocated to the cell array for scrambling device 614 and the bottom area of N rows to the cell array for chip identification device 611. The set of (N, K) may be able to be used as a security buffer, similar to the examples related to FIG. 29.

First of all, the summation of {a(i)} and {d(i)} may be divide by 2 and the remainder may be output as the intermediate code {f(i)}, as illustrated in Eq. 5. The element f(i) is given by the equation 5.

$$f(i)=\mathrm{mod}(a(i)+d(i),2) \qquad \text{Eq. 5.}$$

Hence, {f(i)} may be the output related to the cell array for scrambling device 614, where i is an integer ranging from 1 to K.

Subsequently, the intermediate code {f(i)} is replaced by the sequence {a(i)} in Eq. 5 as the output {c (i)} of the code generating device 602. Actually, the corresponding element a(i) is replaced as f(i) to form the Eq. 6.

$$c(i)=\mathrm{mod}(f(i)+d(i),2) \qquad \text{Eq. 6.}$$

In the case that the alternation cell 979 is a fuse, for example, FIG. 73 may be really formed by configuring fuse at each row of FIG. 72. For example, the disconnected fuses may be regarded as a black row, and the non-disconnected fuses as a white row. This white and black random horizontal pattern may respectively be replaced by the pattern of non-disconnection and disconnection of fuses configured along the vertical direction. Moreover, the non-disconnection and disconnection may be determined by some kind of property related to each row.

The determination method of non-disconnection and disconnection of fuses may be not only to count the number of white and black at each row. It may be possible to disconnect the fuses corresponding to rows wherein irreversible errors occur due to circumstances beyond control, and not to otherwise. This example may be sufficient as long as the occurrence of those irreversible errors is physically random. Furthermore, in the case of the present example, it may be approval that the ratio of disconnection to non-disconnection is far from 50%.

The rows wherein irreversible errors occur due to circumstances beyond control may be replaced by other rows called redundancy rows, and then not to be used in the semiconductor device. On the contrary, the other rows may be used as a part of the semiconductor device product. This may be a method having been widely used to suppress the erroneous forwarding of defectives. However, it may be noted that the combination of the rows to be and not to be replaced by the redundancy rows is physically random. That is, it may be possible to output physical randomness without additional load on chip area by using the part having been replaced for suppressing the forwarding of defectives (the region of redundancy rows).

Meanwhile, it may be unusual that the fuses are allocated to all rows of memory cell array. Therefore, in the case that an irreversible error occurs in a certain row due to circumstances beyond control, the corresponding row (row number) may be stored in an independently prepared memory area (redundancy memory). To access a memory cell, it may be inspected whether or not the cell to be accessed belongs to the redundancy memory. If belonging to the redundancy memory, the row involving the cell may not be accessed and then replaced with a redundancy row. Otherwise, the cell may be accessed. Thus, in the case that the occurrence of irreversible errors due to circumstances beyond control is adopted to generate physical randomness, it may be possible to adopt the memory area for the redundancy (redundancy memory) instead of the alternation cells 979 shown in FIG. 72.

However, it may be required that the row number N is large enough, in order to output enough physical randomness with this method. Hence, if L is the number of the rows belonging to the redundancy memory, L may have to be an integer substantially larger than 1 and much smaller than N.

The semiconductor products satisfying the above-mentioned requirements may be, for example, the dynamic random access memory (DRAM). In the case of a typical DRAM product of 4 Gb, for example, since the total number of the bit lines is about 6,550,000, the number of the rows to be saved in advance for replacing rows with cell wherein irreversible errors occur may be, for example, about 153,000 (e.g., the number of bit line related to the redundancy). Hence, the bit line direction has been fit to the row direction of FIG. 72. On the contrary, the word lines may be also able to fit to the row direction of FIG. 72. Anyway, the number of cases related to the redundancy may be the permutation of 153,000 among 6,550,000 as a simple evaluation, and then be about 5.6E+1,042,102 by the calculation. This is a tremendously large number and then regarded as infinity in actual.

Next, if the word line direction is fit to the row direction of FIG. 72, in the case of a typical 4 Gb DRAM product, the number of the redundancy rows may, for example, comprises 3,044, while there are about 4,400,000 word lines. The permutation of 3,044 among 4,400,000 may be turned out about 1.6E+20222. Even though the number of cases may be substantially smaller than in the case of bit line redundancy, the number of case of the word line redundancy may be still tremendously large. Anyway, it may be possible to obtain actually infinite physical randomness without additional area for the chip identification devices by adopting an independent area for the redundancy memory, which has been installed for the product management of an universal DRAM.

Thus, in the universal DRAM products, the fuse memory may be installed as the redundancy memory in advance for the product management, both of the total number of bit lines and the number of redundancy bit lines may be large enough, and as a result the obtained physical randomness may also be large enough. Accordingly, it may be possible that the chip identification device adopts the whole redundancy area on chip, whereas it may be also possible that the chip identification device adopts a part of redundancy area on chip. In this case, the number of row N may be smaller than the total number of bit lines or word lines on chip.

Figure 78:
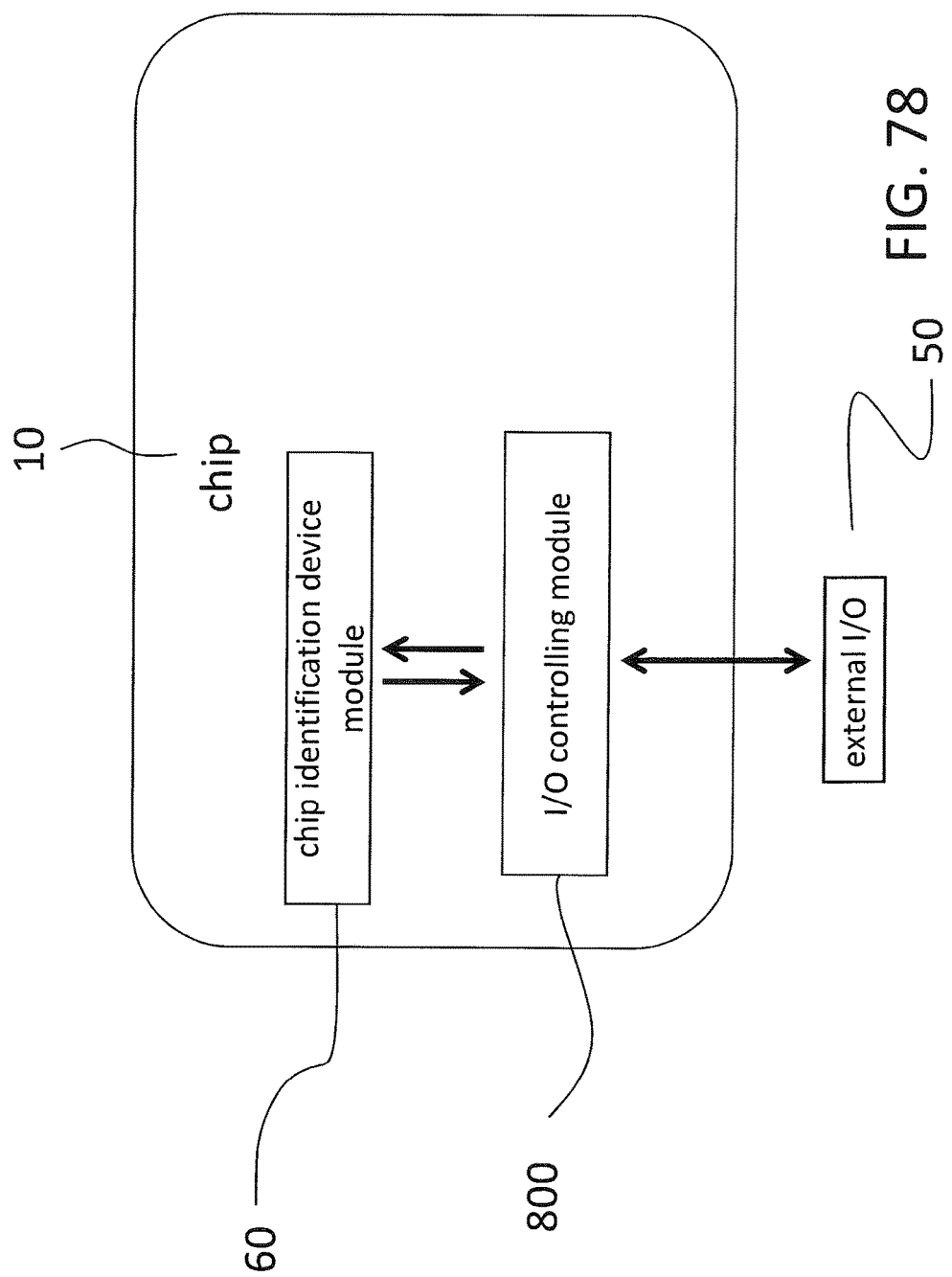
FIG. 78 is an illustration describing an example of a semiconductor chip having the chip identification device.

In the chip identification device related to the present disclosure, as shown in FIG. 78 for example, at least the chip identification module 60 and the input-output control module 800 may be equipped into chip 10. This input-output control module 800 may comprise the input-output control circuit, the word line control circuit, the bit line control circuit, the buffer for data input-output and so on.

Figure 79:
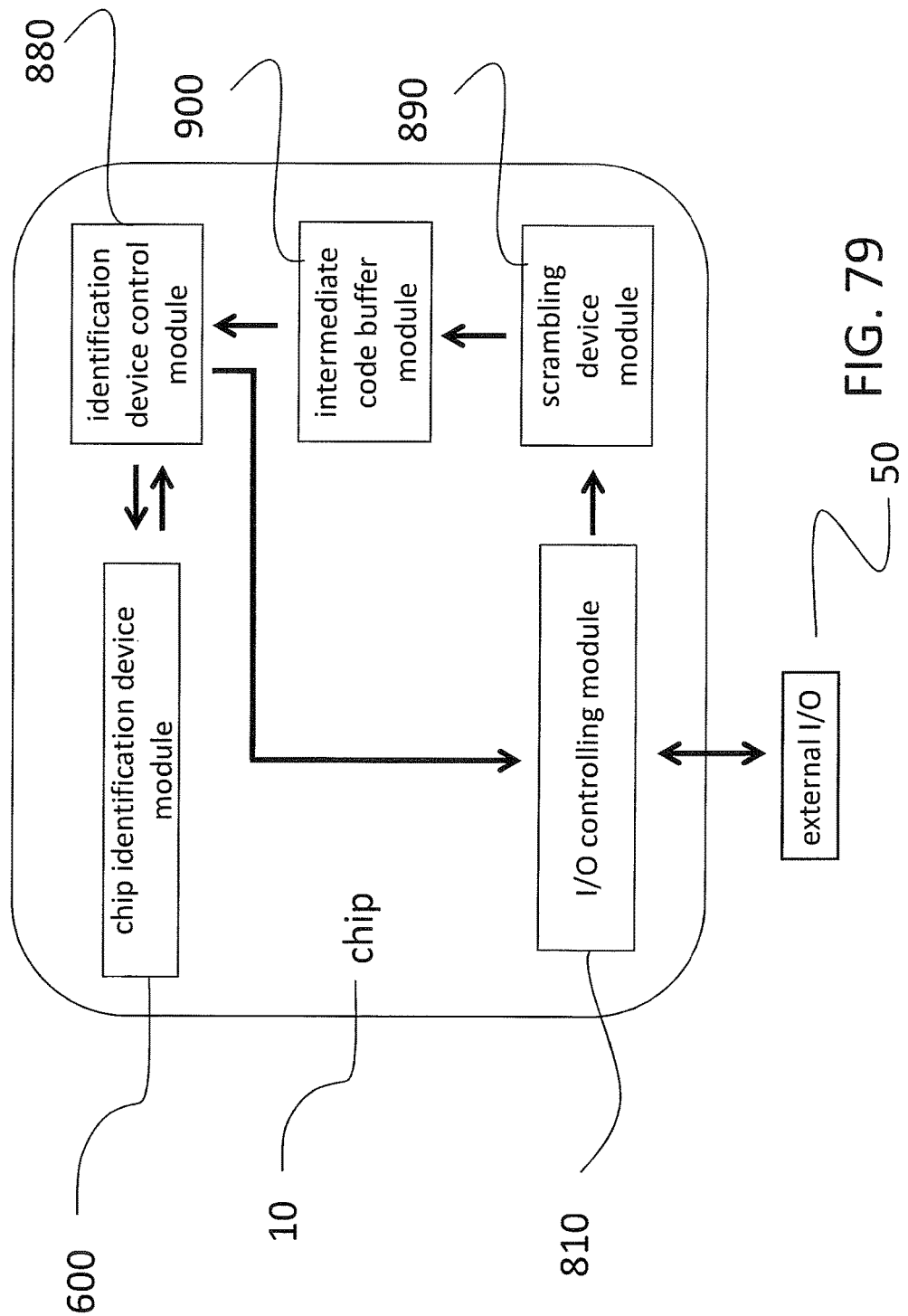
FIG. 79 is an illustration describing an example of the semiconductor chip having both the scrambling device and the chip identification device.

Furthermore, the chip identification device related to the present disclosure, as shown in FIG. 79 for example, may comprise at least the chip identification module 600, the identification device control module 880, the input-output control module 810, the scrambling device module 890, and the intermediate code buffer module 900, and then be equipped into chip 10. This input-output control module 810 may comprise the input-output control circuit and the buffer for data input-output but neither the word line control circuit nor the bit line control circuit. The scrambling device module 890 may involve the scrambling device 604 of FIG. 27. The intermediate code generated by the scrambling device 604 may be stored in the intermediate code buffer module 900, which is independent from the input-output control module 810 and then the data may not be output to the exterior of the chip 10. This may be for confining the intermediate code inside the chip. The identification device control module 880 may include the word line control circuit, the bit line control circuit, and the data buffer. Furthermore, the identification device control module 880 may also include the inner memory to record the addresses corresponding to mode "X" described in FIG. 35. A similar memory area may also be included in the scrambling device module 890 as necessary.

The input-output control module 810 may transfer the input code ensemble of $\{a(i)\}$ and $\{b(j)\}$ to the scrambling device module 890, once the input code ensemble of $\{a(i)\}$ and $\{b(j)\}$ is input from the external input-output (I/O) 50. Hence, the intermediate code $\{f(i,j)\}$ generated according to Eq. 2 may be temporarily stored in the intermediate code buffer module 900, and then transferred to the identification device control module 880. The identification device control module 880 may command the word line control circuit, the bit line control circuit, and the data buffer inside, to generate the output code $\{c(i,j)\}$ from the random code $\{d(i,j)\}$ received from the chip identification module 600 and the intermediate code $\{f(i,j)\}$ according to Eq. 3. Then, the generated output code may be temporarily stored in the inner data buffer. The input-output control module 810 may output the output code $\{c(i,j)\}$ to the exterior of the chip 10 via the external input-output (I/O) 50. By this way, it may be possible that the intermediate code $\{f(i,j)\}$ may be confined inside the chip.

Or, if the input code $\{a(i)\}$ is input from the external input-output (I/O) 50, the input-output control module 810 may transfer the input code $\{a(i)\}$ to the scrambling device module 890. Hence, the intermediate code $\{f(i)\}$ generated according to Eq. 5 may be temporarily stored in the intermediate code buffer module 900, and then transferred to the identification device control module 880. The identification device control module 880 may command the word line control circuit, the bit line control circuit, the data buffer and so on inside, to generate the output code $\{c(i)\}$ in response to the random number code $\{d(i)\}$ received from the chip identification module 600 and the intermediate code $\{f(i)\}$ according to Eq. 6. Then, the generated output code $\{c(i)\}$ may be temporarily stored in the inner data buffer. The input-output control module 810 may output the output code $\{c(i)\}$ to the exterior of the chip 10 via the external input-output (I/O) 50. Thus, it may be possible to confine the intermediate code $\{f(i)\}$ inside the chip.

The identification cell 977 may be anyone of the devices simultaneously manufactured in the generic semiconductor fabrication process and their parts such as MOS-type transistors, DRAM cells, nonvolatile memory cell transistors, phase change memory cells, resistivity change memory cells, magnetoresistance change memory cells, PN junctions, Schottky junction, capacitors, insulating films, resistors and so on. Or, specially designed microstructures may also be possible to be adopted for the identification cell 977.

In the case that the identification cell 977 may be probabilistically broken, the breaking method may be executed by applying the electrical stress to the selected cell. In this case, the whole addresses on chip may be selected or only a part of the addresses is selected as necessary, and then the breaking pulse may be applied thereto.

If the ratios of "1" and "0" become almost the same in FIG. 22, the randomness of the horizontal pattern in FIG. 73 may be increased. Thereby, in the case that the cell array to be used for the chip identification device is limited due to circumstances beyond control, or in the case that the chip identification device for a small bit capacity product is manufactured, it may be required to make the ratios of "1" and "0" as the same as possible in FIG. 22. For example, it may be supposed that the breaking pulse is applied in stages to tune the ratios of "1" and "0", as shown in FIG. 36 or FIG. 37. First of all, the first pulse voltage may be applied and then the inspection may be done. Thus, if the number of non-broken cells is larger, the second pulse may be applied. If the number of non-broken cells is still larger after the inspection, the third pulse voltage may be further applied and then the inspection may be done. Thus, by applying the breaking pulse in stages, as shown in FIG. 36 or FIG. 37, the number of non-broken cells may be gradually decreased and then the number of broken cells may be gradually increased. If the difference between them becomes less than a definite quantity, the application of the breaking pulse may be stopped.

Or, the pulse voltage may be applied to the whole cells of the chip identification device, and then the inspection may be executed. Thus, if the number of the non-broken cells is larger, only the non-broken cells may be selected and then the pulse voltage may be applied thereto. If the number of the non-broken cells is still larger after the inspection, only the non-broken cells may be selected again and then the pulse voltage may be applied thereto. In this case, it may be preferable that the repetition of the breaking pulse may be on only the non-broken cells. With or without the increase of the amplitude of the breaking pulse, the non-broken cells may be broken in stage and then the ratios of "0" and "1" may be gradually closed to each other. If the difference between them becomes less than a definite quantity, the application of the breaking pulse may be stopped.

After the end of the breaking pulse, there may be "X" that is neither "0" nor "1". In the case like this, "X" may be excluded by the method illustrated in FIG. 35.

In general, it may not be always true that only one chip is included in electronic apparatus. It may be assumed that the first, second . . . fifth peripheral nodes, which constitute an example of the network of FIG. 13, comprise at least one chip. As an example, in FIG. 7, the information apparatus 140, which is a peripheral node, may comprise the first chip 110, the second chip 120 . . . the N-th chip 130. It may not be always necessary that all chips are equipped with the chip identification of the present disclosure. In the example of FIG. 7, only the first chip 110 may be equipped with related modules of the chip identification.

Below, the most preferable embodiments are described concretely.

As stated above, the physically unclonable function can realize individual identifications of the semiconductor chips by various methods. On the other hand, the semiconductor chip is the core component of an electronic apparatus or an information apparatus, and can be regarded as the most basic component. Therefore, it can be used for the physical identification of the electronic apparatus or the information apparatus.

Figure 89:
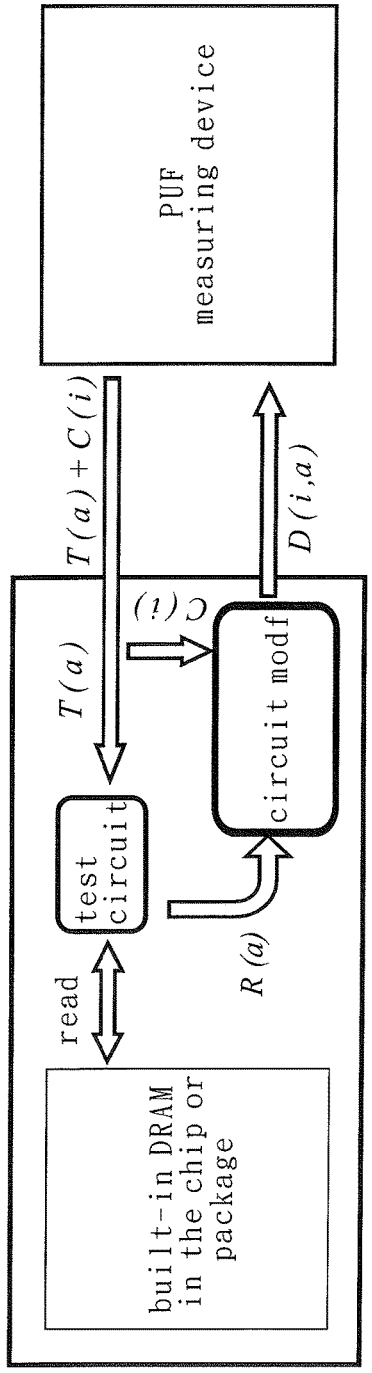
FIG. 89 is an illustration describing an example of the method to generate an output identification code from an input identification code with regard to a PUF measuring device of the present disclosure and the chip to be identified.

FIG. 89 illustrates an identification method that a PUF measuring device identifies a chip. An input identification code and an output identification code are included. The input identification code is input to the PUF measuring device included in the chip to be identified. The output identification code is generated by the identified chip in response to the input. First, the semiconductor device to be identified at least includes the identified chip. Then, the chip to be identified includes a memory cell array (e.g., DRAM), a peripheral memory area and a modular area. The memory cell array includes redundant bit lines. The peripheral memory area stores the redundancy addresses and other codes necessary to the memory control (e.g., a voltage regulation code and so on). The peripheral memory area may be, for example, a fuse memory. The chip to be identified may also include a test circuit to measure the redundant addresses of the bit lines of the DRAM. In addition, the chip to be identified includes a circuit "modf" that outputs the output identification code from the input identification code and the redundant addresses of the bit lines of DRAM.

The PUF measuring device sends a special test mode {T(a)} and an input identification code {C(i)} to the chip to be identified, in order to detect the redundant address. The {C(i)} may hold an argument which is a variable chip identification code {i}. The {T(a)} may hold an argument which is a specification code {a} to specify a reading area of the redundant addresses of bit line or a reading mode. The test circuit may read the data of the redundant addresses and then send the read result {R(a)} to the circuit "modf". {R(a)} may be the output of a random number generated from the physical properties intrinsic to the chip to be identified with respect to the specification code {a}. The circuit "modf" generates an output identification code {D(i,a)} based on {C(i)} and {R(a)} as expressed below:

$$D(i,a)=modf(C(i)+R(a)) \qquad \text{Eq. 7.}$$

Figure 90:
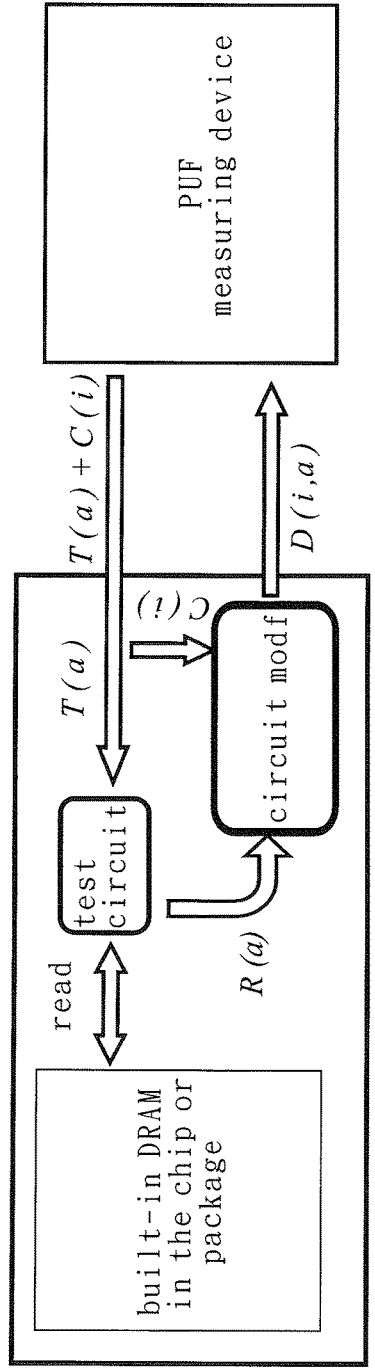
FIG. 90 is an illustration describing an example of the method to generate an output identification code from an input identification code with regard to a PUF measuring device of the present disclosure and the chip to be identified.

FIG. 90 illustrates an identification method that a PUF measuring device identifies a chip. An input identification code and an output identification code are included. The input identification code is input to the PUF measuring device included in the chip to be identified. The output identification code is generated by the identified chip in response to the input. First, the semiconductor device to be identified at least includes the identified chip. Then, the chip to be identified includes a memory cell array (e.g., DRAM), a peripheral memory area and a modular area. The memory cell array includes redundant bit lines. The peripheral memory area stores the redundancy addresses and other codes necessary to the memory control (e.g., a voltage regulation code and so on). The peripheral memory area may be, for example, a fuse memory. The chip to be identified may also include a test circuit to measure the redundant addresses of the bit lines of the DRAM. In addition, the chip to be identified includes a circuit "modv" that outputs the output identification code from the input identification code and the redundant addresses of the bit lines of DRAM. The program of the circuit "modv" is modifiable.

The PUF measuring device may send a special test mode {T(a)} and an input identification code {C(i)} to the chip to be identified, in order to detect the redundant address. The {C(i)} may hold an argument which is a variable chip identification code {i}. The {T(a)} may hold an argument which is a specification code {a} to specify a reading area of the redundant addresses of the bit lines or a reading mode. The test circuit may read the data of the redundant addresses and then send the read result {R(a)} to the circuit "modv". {R(a)} may be the output of a random number generated from the physical properties intrinsic to the chip to be identified with respect to the specification code {a}. The circuit "modv" may generate an output identification code {D(i,a)} from {C(i)} and {R(a)} according to the equation 8 below, and then send the {D(i,a)} to the PUF measuring device. The PUF measuring device executes the identification of the chip to be identified by checking {a}, {C(i)}, and {D(i,a)}.

$$D(i,a)=modv(C(i)+R(a)) \qquad \text{Eq. 8.}$$

Figure 91:
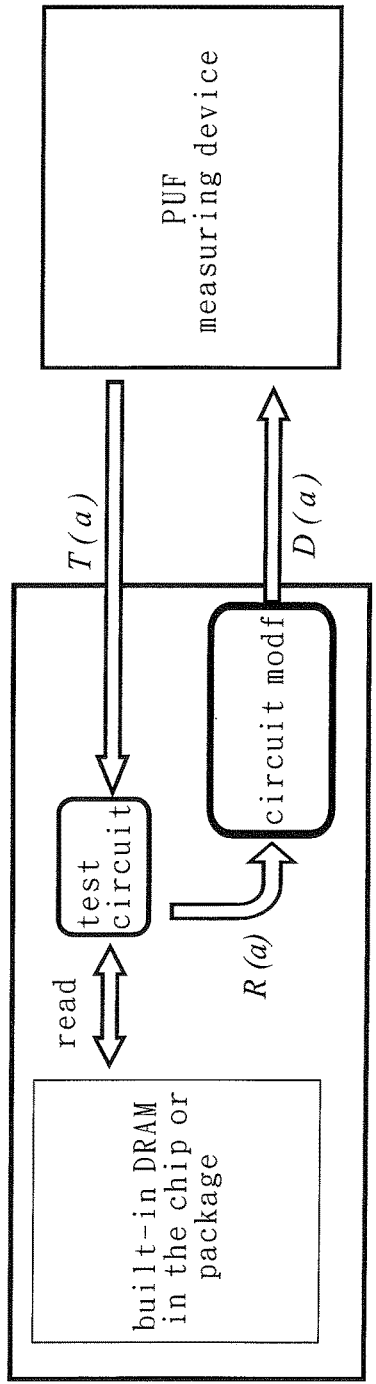
FIG. 91 is an illustration describing an example of the method to generate an output identification code from an input identification code with regard to a PUF measuring device of the present disclosure and the chip to be identified.

FIG. 91 illustrates an identification method that a PUF measuring device identifies a chip. An input identification code and an output identification code are included. The input identification code is input to the PUF measuring device included in the chip to be identified. The output identification code is generated by the identified chip in response to the input. First, the semiconductor device to be identified at least includes the identified chip. Then, the chip to be identified includes a memory cell array (e.g., DRAM), a peripheral memory area and a modular area. The memory cell array includes redundant bit lines. The peripheral memory area stores the redundancy addresses and other codes necessary to the memory control (e.g., a voltage regulation code and so on). The peripheral memory area may be, for example, a fuse memory. The chip to be identified may also include a test circuit to measure the redundant addresses of the bit lines of the DRAM. In addition, the chip to be identified includes a circuit "modf" that outputs the output identification code from the input identification code and the redundant addresses of the bit lines of DRAM.

The PUF measuring device may send a special test mode {T(a)} to the chip to be identified, in order to detect the redundant address. The {T(a)} may hold an argument which is a specification code {a} to specify a reading area of the redundant addresses of the bit lines or a reading mode. The specification code {a} may be used as an input identification code as well. The test circuit may read the data of the redundant addresses and then send the read result {R(a)} to the circuit "modf". {R(a)} may be the output of a random number generated from the physical properties intrinsic to the chip to be identified with respect to the specification code {a}. The circuit "modf" may generate an output identification code {D(a)} from {R(a)} according to the equation 9 below, and then send the {D(a)} to the PUF measuring device. The PUF measuring device executes the identification of the chip to be identified by checking {a} and {D(a)}.

$$D(a)=\mathrm{mod}f(R(a)) \qquad \text{Eq. 9.}$$

Figure 92:
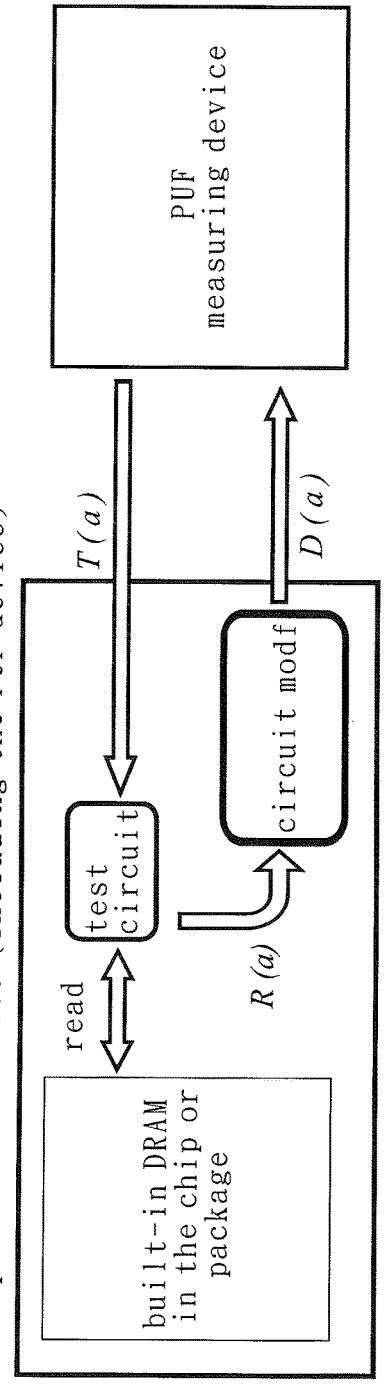
FIG. 92 is an illustration describing an example of the method to generate an output identification code from an input identification code with regard to a PUF measuring device of the present disclosure and the chip to be identified.

FIG. 92 illustrates an identification method that a PUF measuring device identifies a chip. An input identification code and an output identification code are included. The input identification code is input to the PUF measuring device included in the chip to be identified. The output identification code is generated by the identified chip in response to the input. First, the semiconductor device to be identified at least includes the identified chip. Then, the chip to be identified includes a memory cell array (e.g., DRAM), a peripheral memory area and a modular area. The memory cell array includes redundant bit lines. The peripheral memory area stores the redundancy addresses and other codes necessary to the memory control (e.g., a voltage regulation code and so on). The peripheral memory area may be, for example, a fuse memory. The chip to be identified may also include a test circuit to measure the redundant addresses of the bit lines of the DRAM. In addition, the chip to be identified includes a circuit "modv" that outputs the output identification code from the input identification code and the redundant addresses of the bit lines of DRAM. The program of the circuit "modv" is modifiable.

The PUF measuring device may send a special test mode {T(a)} to the chip to be identified, in order to detect the redundant address. The {T(a)} may hold an argument which is a specification code {a} to specify a reading area of the redundant addresses of the bit lines or a reading mode. The specification code {a} may be used as an input identification code as well. The test circuit may read the data of the redundant addresses and then send the read result {R(a)} to the circuit "modf". {R(a)} may be the output of a random number generated from the physical properties intrinsic to the chip to be identified with respect to the specification code {a}. The circuit "modf" may generate an output identification code {D(a)} from {R(a)} according to the equation 10 below, and then send the {D(a)} to the PUF measuring device. The PUF measuring device executes the identification of the chip to be identified by checking {a} and {D(a)}.

$$D(a)=\mathrm{mod}v(R(a)) \qquad \text{Eq. 10.}$$

Figure 93:
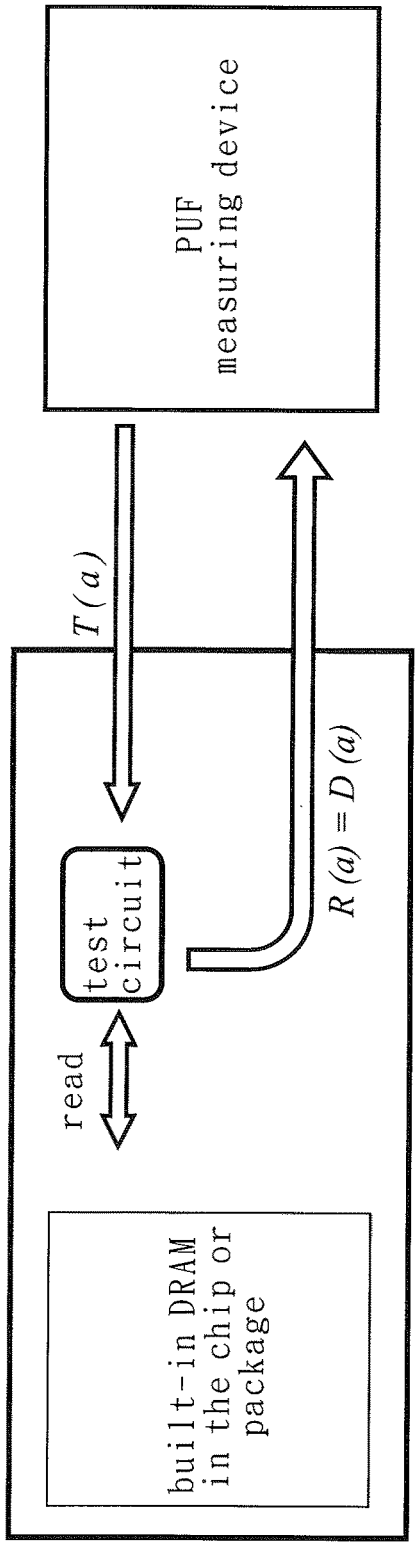
FIG. 93 is an illustration describing an example of the method to generate an output identification code from an input identification code with regard to a PUF measuring device of the present disclosure and the chip to be identified.

FIG. 93 illustrates an identification method that a PUF measuring device identifies a chip. An input identification code and an output identification code are included. The input identification code is input to the PUF measuring device included in the chip to be identified. The output identification code is generated by the identified chip in response to the input. First, the semiconductor device to be identified at least includes the identified chip. Then, the chip to be identified includes a memory cell array (e.g., DRAM), a peripheral memory area and a modular area. The memory cell array includes redundant bit lines. The peripheral memory area stores the redundancy addresses and other codes necessary to the memory control (e.g., a voltage regulation code and so on). The peripheral memory area may be, for example, a fuse memory. The chip to be identified may also include a test circuit to measure the redundant addresses of the bit lines of the DRAM.

The PUF measuring device may send a special test mode {T(a)} to the chip to be identified, in order to detect the redundant address. The {T(a)} may hold an argument which is a specification code {a} to specify a reading area of the redundant addresses of the bit lines and a reading mode. The {a} may be used as a PUF identification code as well. The test circuit may read the data of the redundant addresses, regard the read result {R(a)} as the output identification code {D(a)} according to the equation 11 below, and send it to the PUF measuring device. The PUF measuring device may execute the identification of the chip to be identified by checking {a} and {D(a)}.

$$D(a)=R(a) \qquad \text{Eq. 11.}$$

As mentioned above, it may be possible that the physically unclonable function (PUF) realizes the individual authentication of semiconductor chip with physical substance by using various methods. On the other hand, the semiconductor chip may play a central part of electronic or information apparatuses like the heart in a human body, and further regarded as a smallest component. Accordingly, it may be expected that the physical authentication of electronic and information apparatuses is realized with the physically unclonable function (PUF) to realize the chip authentication.

Figure 80:
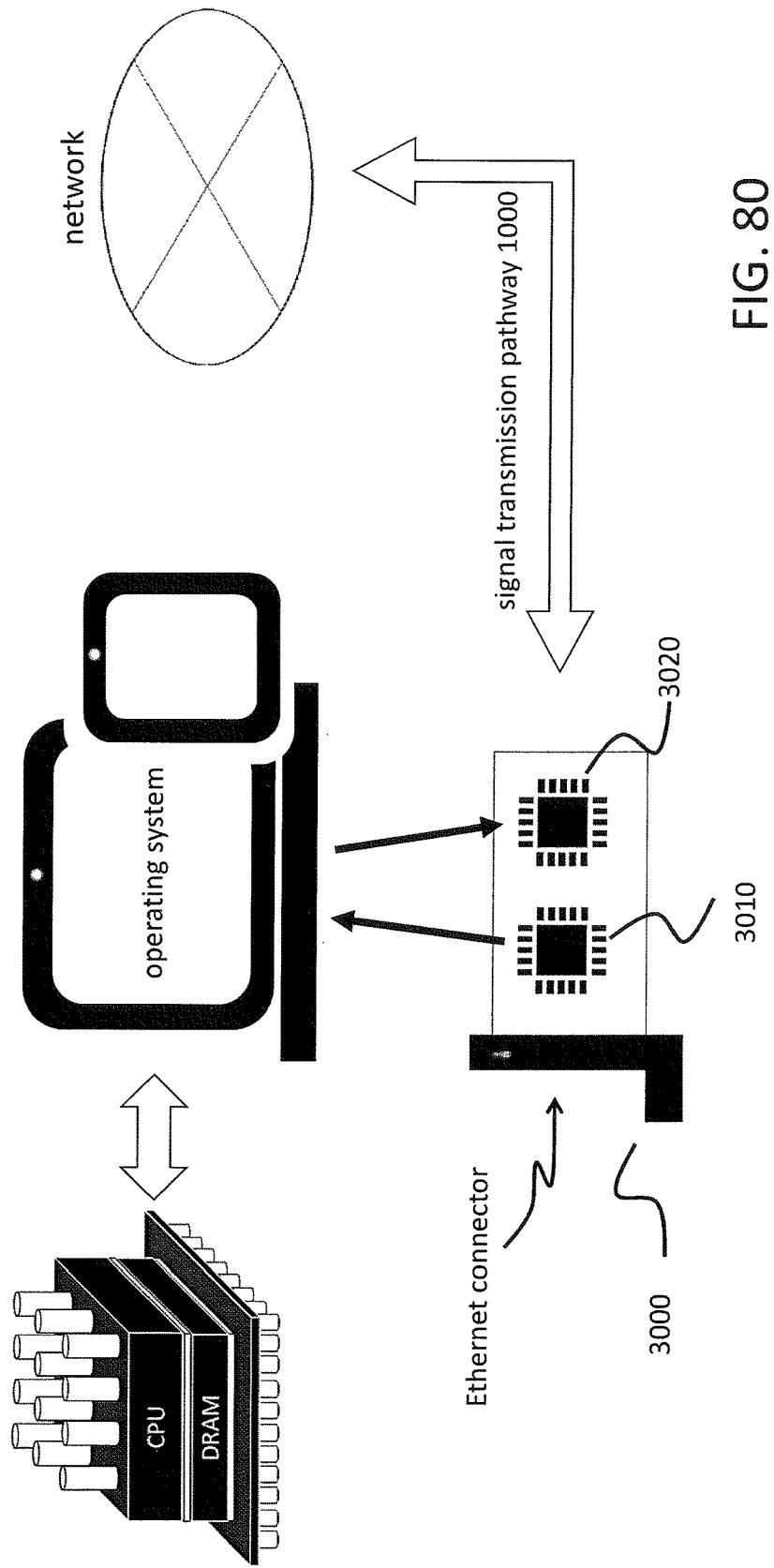
FIG. 80 is an illustration describing an example of a communication method of Ethernet format.

On the other hand, as mentioned above, the identification of the nodes with some kind of physical substances in the network communication may be currently executed by using physical address included in the Ethernet header (MAC address and so on). FIG. 80 may be an example of a typical usage of the MAC address. The Ethernet card 3000 may comprise a memory chip (e.g., nonvolatile memory chip 3010) recording MAC address and a chip of an operational processing unit for the media access controller (MAC) 3020. The backside of the card may have the Ethernet connector (LAN connector). The Ethernet card may also be called LAN card and equipped mainly in the backside of the personal computer and so on. Then, by connecting the LAN cable to the Ethernet connector, it may be possible that the personal computer and so on may be connected to the local area network (LAN). This LAN cable may be a part or the whole of the signal transmission pathway 1000 which may form the Internet.

When the personal computer is turned on, the information necessary to boot the operation system may be loaded, while the central processing unit (CPU) may boot the operating system. If the operating system finds that the Ethernet card is equipped in the personal computer, the operating system may read the MAC address stored in the memory chip of the Ethernet card. This MAC address may be written to the chip of the operational processing unit for media access controller (MAC) 3020.

The Ethernet card may have a physical substance. Accordingly, the MAC address stored in the inner memory (e.g., nonvolatile memory chip 3010) of the Ethernet card may be regarded as intrinsic to the Ethernet card having the physical substance. The media access controller (MAC) may append this MAC address of the sender, the MAC address of the receiver, and the frame check sequence (FCS) to a packet to form a frame. Then, this frame may be sent to the receiver through the local area network via the LAN connector comprising the signal transmission pathways. In other words, the frame may be sent and received via the signal transmission pathways. However, as mentioned above, the MAC address may be problematic because of irregular edition, inappropriate edition, depletion or duplication.

Figure 81:
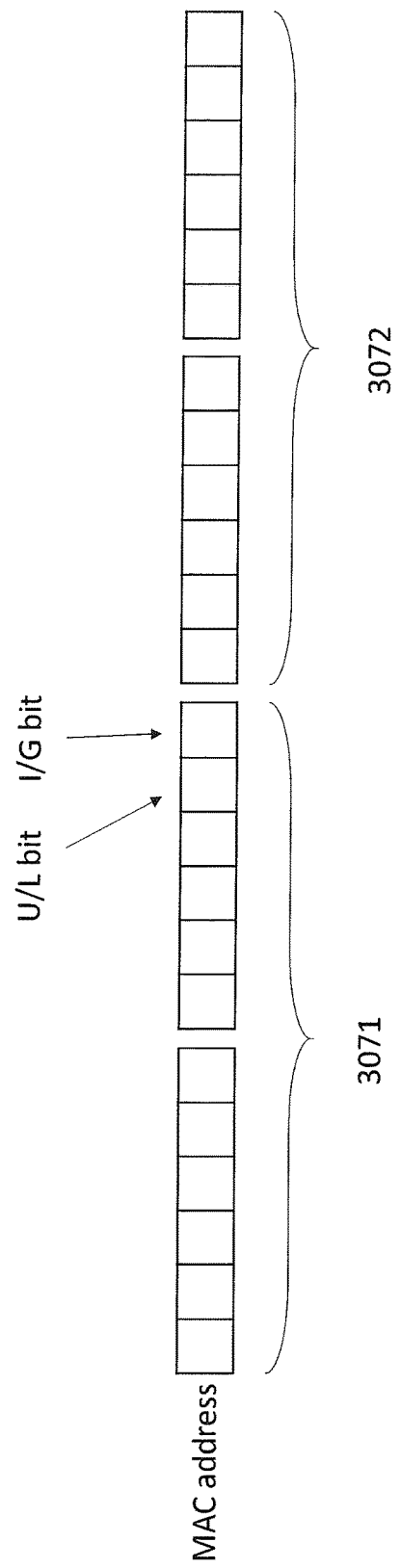
FIG. 81 is an illustration describing an example of the MAC address format.

As an example is illustrated in FIG. 81, the MAC address may be a binary sequence of 48 bits. The upper 24 bits (left half in the example of FIG. 81) may be called vendor code 3071, and then allocated to each vendor. The last 2 bits of the vendor code 3071 may be UL bit and IG bit. The UL bit is 1 if the MAC address is a global address, and is 0 otherwise. In other words, in the case of the global address (UL bit=1), the MAC address may be administrated by the Institute of Electrical and Electronical Engineers (IEEE), in order not to duplicate any MAC address all over the world. In the case of IG bit=0, it may correspond to unicast communication. In the case of IG bit=1, it may correspond to multicast communication. In the unicast communication, the address of a unique receiver may be selected in the network of the information apparatuses and then the data (frame) may be sent to the uniquely selected receiver. In the multicast communication, in contrast, the addresses of a plurality of receivers may be selected in the network of information apparatuses and then the data (frame) may be sent to those selected addresses. The bottom 24 bits (right half in the example of FIG. 81) may be called serial number 3072 and then each vendor may allocate with no duplication.

Below is the first embodiment.

Figure 82:
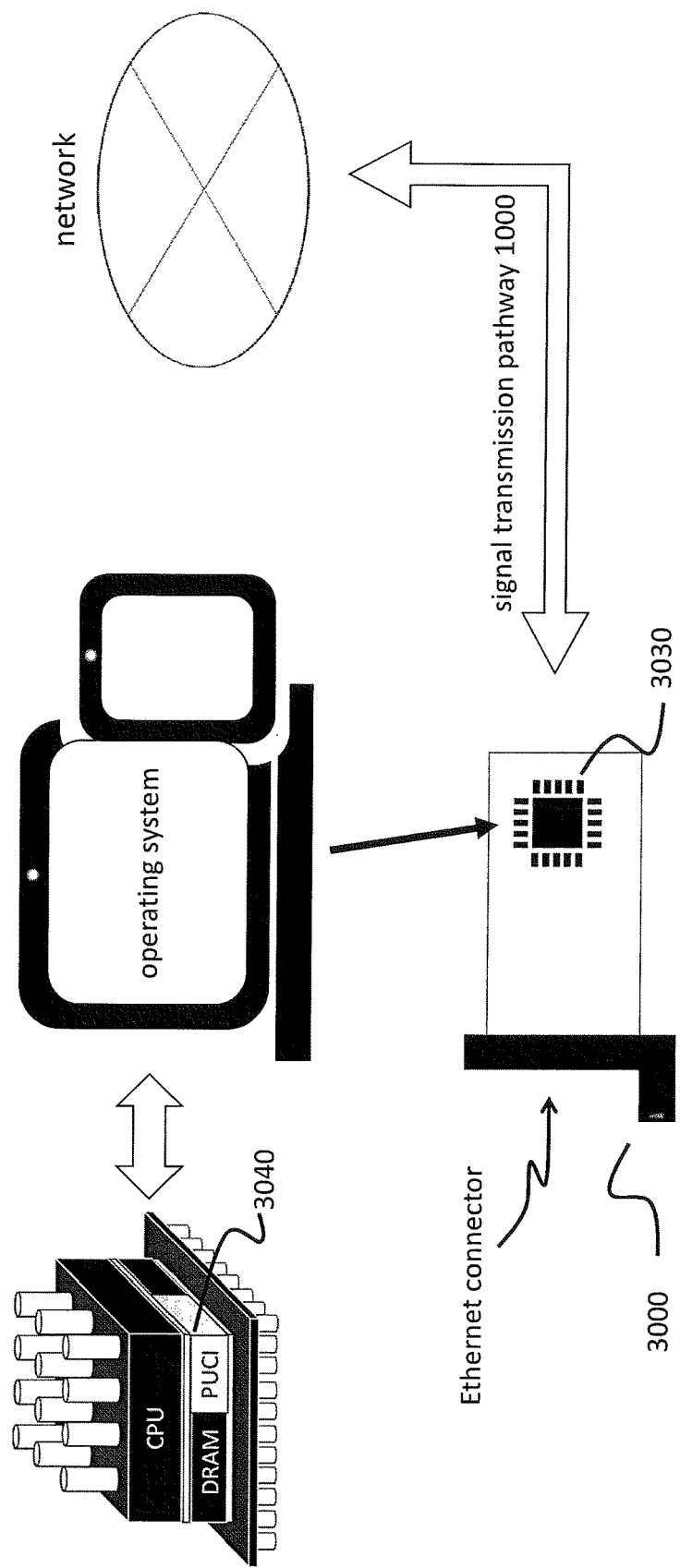
FIG. 82 is an illustration describing an example of a communication method adopting physically unclonable chip identification (PUC-I) of the present disclosure.

FIG. 82 may be an example of the embodiment adopting the physically unclonable function (PUF) related to the present disclosure. Instead of recording the MAC address in the inner memory of Ethernet card, the chip identification device 3040 of the present disclosure (labeled PUC-I in this figure) may be equipped in the main memory cooperating with the CPU (e.g., DRAM). In this case, it may be unnecessary to record the MAC address in the Ethernet card and then possible to exclude nonvolatile memory chip from the Ethernet card. In the case that the main memory is DRAM, for example, it may be preferable that the DRAM cell is adopted as an identification cell, as similar to FIG. 42, FIG. 63 or FIG. 64. As an example, hence, the QR code type random number code may be able to be adopted, as similar to FIG. 22. Or, in the example of FIG. 74 having alternation cells 979, it may be preferable that the DRAM cell is adopted as an identification cell and the barcode type random number code of FIG. 73 is then adopted. Or, it may be preferable that the barcode type random number code of FIG. 73 is adopted with the utilization of the redundancy memory of DRAM. In the present embodiment, in contrast with the MAC address, the identification generated by the chip identification device 3040 may be regarded as physically unclonable chip identification (PUC-I). In general, the PUC-I may not always be a format of Ethernet type. For example, it may be preferable that PUC-I generated by the peripheral node as mentioned above is generated in response to the input code from the stem node. Or, it may be preferable that the chip identification device generates the PUC-I in response to the input code configured in the operating system of the peripheral node in advance. In this case, the input code to be input to the chip identification device may be a passcode typed to boot the operating system or made related to the passcode. Or, the input code may be a passcode for recovering from a sleep mode, or others such as PIN code and so on, or made related to them. Thus, the chip of the operational processing unit for media access controller (MAC) 3020 of the Ethernet card may be replaced by the PUC-I controlling device 3030.

Figure 83:
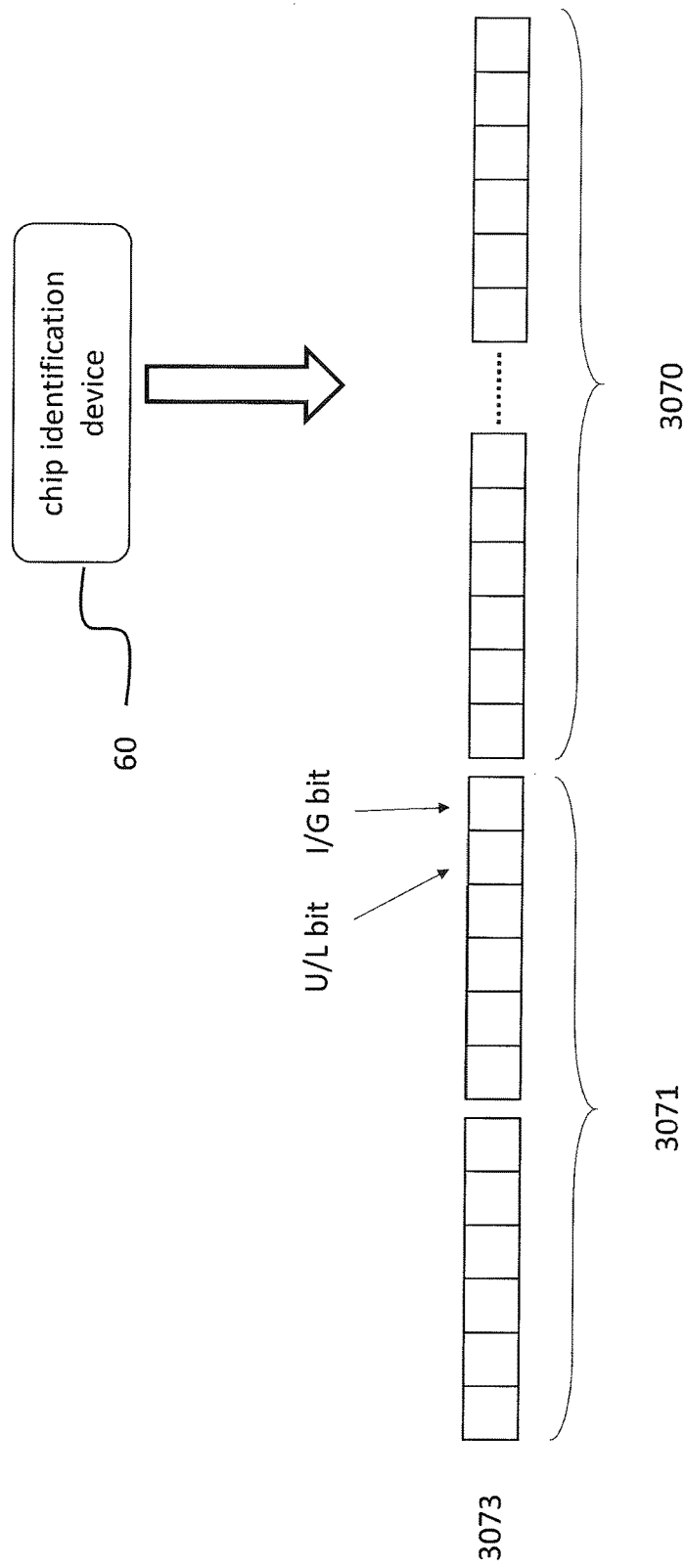
FIG. 83 is an illustration describing an example of format of PUC address adopting physically unclonable chip identification (PUC-I) of the present disclosure.

As illustrated in FIG. 83, as an example, it may be preferable that the PUC-I 3070 may be generated by the chip identification device related to the present disclosure, and then replace the bottom 24 bits of the MAC address (serial number 3072 in FIG. 81). In other words, the vendor code 3071 having been widely used may be used with PUC-I with no revision. Thus, the PUC address 3073 may be generated, as shown in FIG. 83. It may be possible that the receiving node determines whether the received frame adopts MAC address or PUC-I of the present disclosure with checking the indication bit in advance, which may be described in detail below.

In general, the bit number of PUC-I 3070 may be determined by the number of the identification cells 977 comprising the chip identification device. For example, in the case that the array for identification cells 960 is similar to FIG. 23, the bit number of PUC-I may be the product of the row number L and the column number M. Accordingly, the bit number of the PUC address may be the sum of the product of L and M, and 24. Or, in the case of the configuration similar to FIG. 29, the number of bits of PUC-I may be determined by the square of N. Accordingly, the bit number of PUC address may be the sum of the square of N and 24. Or, in the case of the configuration similar to FIG. 74, the number of the bits of the PUC-I may be N. Or, in the case of the configuration similar to FIG. 77, the number of the bits of the PUC-I may be N. Or, in the case that the redundancy memory of DRAM is adopted, the bit number of the PUC-I may be determined by the bit number of the memory area for the redundancy. In other words, if the quantity of information obtained by the calculation of permutation may be converted into binary, then the number of bits to be necessary may be turned out at once.

However, in the case of the configuration similar to the above-mentioned FIG. 23 and FIG. 29, the number of bits of the PUC-I may be smaller than in the ideal case due to the inclusion of the soft breakdown mode "X", as shown in FIG. 35. In the case that the upper bound of the possibility of such a breakdown mode is known in advance by the pre-inspection or some kind of another method, it may be preferable that the number of bits of the PUC-I is revised taking into account the additional bit numbers converted from the margin corresponding to this upper bound. Thus, the bit number of the PUC-I may be defined with regarded to the number of the cross-points of white and black checkerboard pattern shown in FIG. 22.

Figure 84:
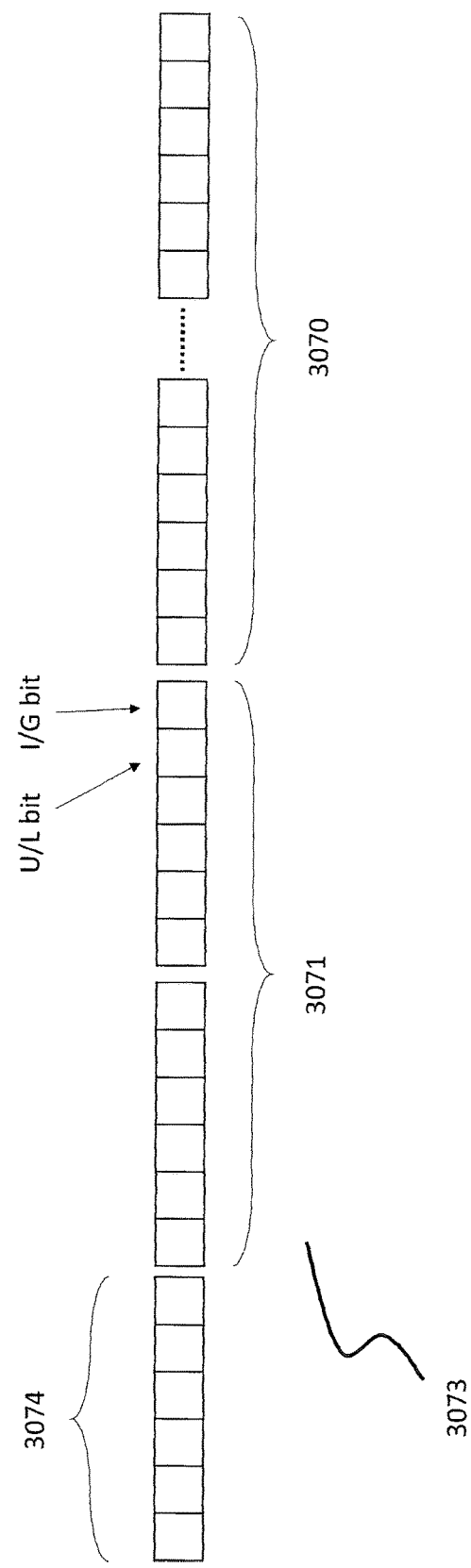
FIG. 84 is an illustration describing an example of format of PUC address adopting physically unclonable chip identification (PUC-I) of the present disclosure.
Figure 85:
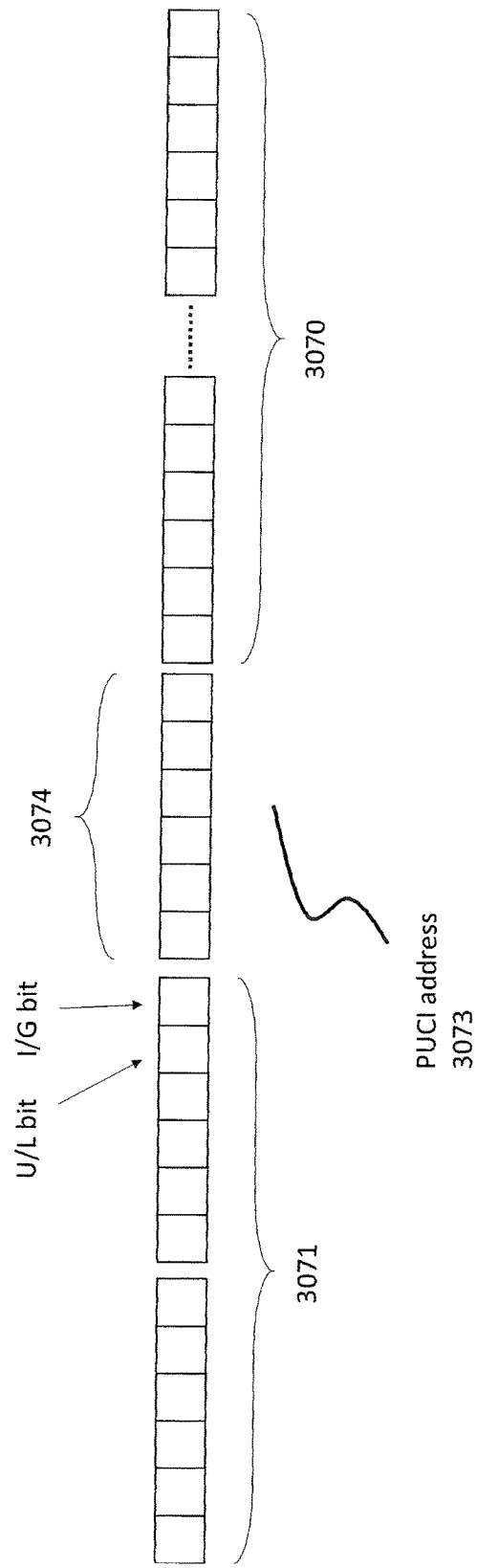
FIG. 85 is an illustration describing an example of format of PUC address adopting physically unclonable chip identification (PUC-I) of the present disclosure.

The bit number of PUC-I may be either larger or smaller than 24 bits of the serial number. Or, it may be possible to be equal to 24 bits of the serial number. In the case that it is smaller than 24 bits, it may be preferable that the utilization of PUC-I is restricted inside closed physical networks. For example, the PUC-I may be used for administrating the manufacturing line in the factory instead of serial number. By this way, the bit number of PUC-I may not be always determined as a definite bit. Accordingly, it may be preferable that several bits are appended for indicating the number of bits of PUC-I after the preamble. Those bits to indicate the bit number of the PUC-I (indication bit 3074) may be before (upper) or after (lower) the vendor code 3071. FIG. 84 may illustrate an example of the case that the indication bit 3074 is appended before (upper) the vendor code 3071. FIG. 85 may illustrate an example of the case that the indication bit 3074 is appended after (lower) the vendor code 3071. In both FIG. 84 and FIG. 85, the length of the indication bit 3074 may be assumed to be 6 bits. However, in general, the length of the indication bit 3074 may not always be 6. Anyway, it may be determined whether or not the received frame is subject to the PUC-I formula by inspecting with or without the indication bit 3074.

With the indication bit 3074, the number of the addresses that PUC address can deal with may be variable. Accordingly, it may be possible that the arbitrary administrator can configure a closed physical network with using a short PUC address and then save the bit numbers to be allocated to data area for the contents of the protocol data unit. As a result, the quantity of the information to be carried by one protocol data unit may be increased. This means that the quantity of the information to be carried at one data communication is increased. Or, in the case that an arbitrary vendor forwards a limited number of products, it may be possible that a short PUC address is used and then the saved bits may be allocated to the data area for the contents of the protocol data unit.

In the case of the Internet of Things, the number of the global addresses may be extremely large. To cope with this problem, the indication bit 3074 may increase the bit number of the PUC address and then the number of the addresses to be dealt with may be increased. Thus, as the bit number of PUC address is increased, the quantity of the information to be carried by one protocol data unit may be decreased. This means that the quantity of the information to be carried at one data communication is decreased. However, in the future that the Internet of Things, which demands innumerable physical addresses, may come, the standard of the protocol data unit may be revised to deal with the progress of the network technology. Thus, it may be quite probable that the bit number to be allocated to one protocol data unit is increased. In the case that the MAC address continues to be used, it may be difficult to flexibly deal with such a change. However, in the case of the PUC address with the indication bit of the present disclosure, it may be possible to deal with a drastic increase of the number of the physical addresses.

When turning on the personal computer, the information necessary to boot the operation system may be loaded to the main memory (e.g., DRAM), while the central processing unit (CPU) may boot the operating system. Hence, in the case that the operating system finds the Ethernet card or the chip identification device 3040, the operation system may read physically unclonable chip identification (PUC-I) from the chip identification device 3040, and then write it to the PUC-I controlling device 3030 equipped on the Ethernet card 3000. The PUC-I controlling device 3030 may send and receive frames attached with the PUC addresses shown in FIGS. 83-85 via the signal transmission pathway 1000 in the data link layer.

The second embodiment is described below.

Figure 86:
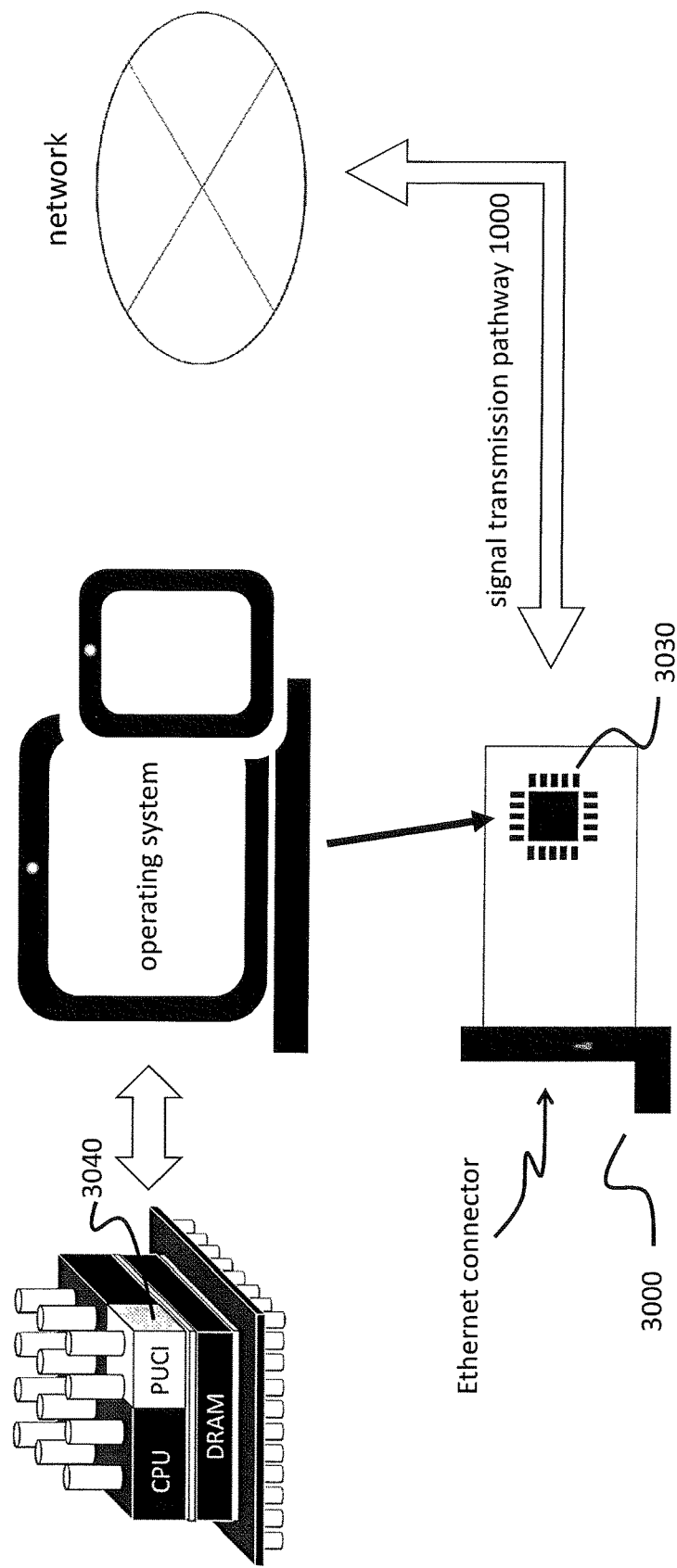
FIG. 86 is an illustration describing an example of a communication method adopting physically unclonable chip identification (PUC-I) of the present disclosure.

FIG. 86 may be an example of another embodiment adopting the physically unclonable function (PUF) related to the present disclosure. Instead of recording the MAC address in the inner memory of the Ethernet card, the chip identification device 3040 of the present disclosure (labeled PUC-I in this figure) may be equipped in the central processing unit (CPU). In this case, it may not be necessary to record the MAC address in the Ethernet card, and then it may be possible to exclude nonvolatile memory from the Ethernet card. In the case that the PUC-I is embedded into the central processing unit (CPU), as mentioned above, it may be preferable that the identification cells configuring physically unclonable function (PUF) is compatible to standard CMOS process. For example, the formula that the field-effect transistor 983 shown in FIG. 41 plays a role of identification cell may be preferable. Additionally, the PN junction 986 in FIG. 39, the Schottky junction 987 in FIG. 40, or the configuration of wiring patterns in FIGS. 47 and 48 may be possible. In the present embodiment, in contrast with the MAC address, the identification generated by the chip identification device 3040 may be particularly regarded as physically unclonable chip identification (PUC-I). The PUC-I may not be generally subject to the Ethernet format. For example, as mentioned above, it may be preferable that PUC-I generated by the peripheral nodes is generated in response to the input from the stem node. Or, it may be preferable that the chip identification device generates the PUC-I in response to the input code configured in the operating system of the peripheral node in advance. In this case, the input code to be input to the chip identification device may be a passcode to be typed to boot the operating system, or, may be made related to the passcode. Or, the input code may be a passcode for recovering from a sleep mode, or others such as PIN code and so on, or made related to them. By doing so, the chip of the operational processing unit for media access controller (MAC) 3020 may be replaced by PUC-I controlling device 3030.

When turning on the personal computer, the information necessary to boot the operating system may be loaded to the main memory (e.g., DRAM), while the operating system may be booted by the central processing unit (CPU). Hence, in the case that the operating system finds the Ethernet card or the chip identification device 3040, the operating system may read the physically unclonable chip identification (PUC-I 3070) from the chip identification device 3040 and then write it into the PUC-I controlling device 3030 included in the Ethernet card. The PUC-I controlling device 3030 may send and receive the frames attached with PUC-I addresses shown in FIGS. 83-85 via the signal transmission pathway 1000 in the data link layer.

The third embodiment is descried as follow.

In the above-mentioned embodiment, the chip of the operational processing unit for the media access controller (MAC) 3020 may be replaced with the PUC-I controlling device 3030. However, the format may be necessary to be changed from the Ethernet, since MAC address is not used in this embodiment. Such a sudden change in the format may cause confusion. Then, the converter from physically unclonable chip identification (PUC-I) to MAC address, that is, the PUC/MAC converting device 3050 may be necessary in the period of transition. To deal with this demand intrinsic to such a transition period, typical examples may be mentioned below.

Figure 87:
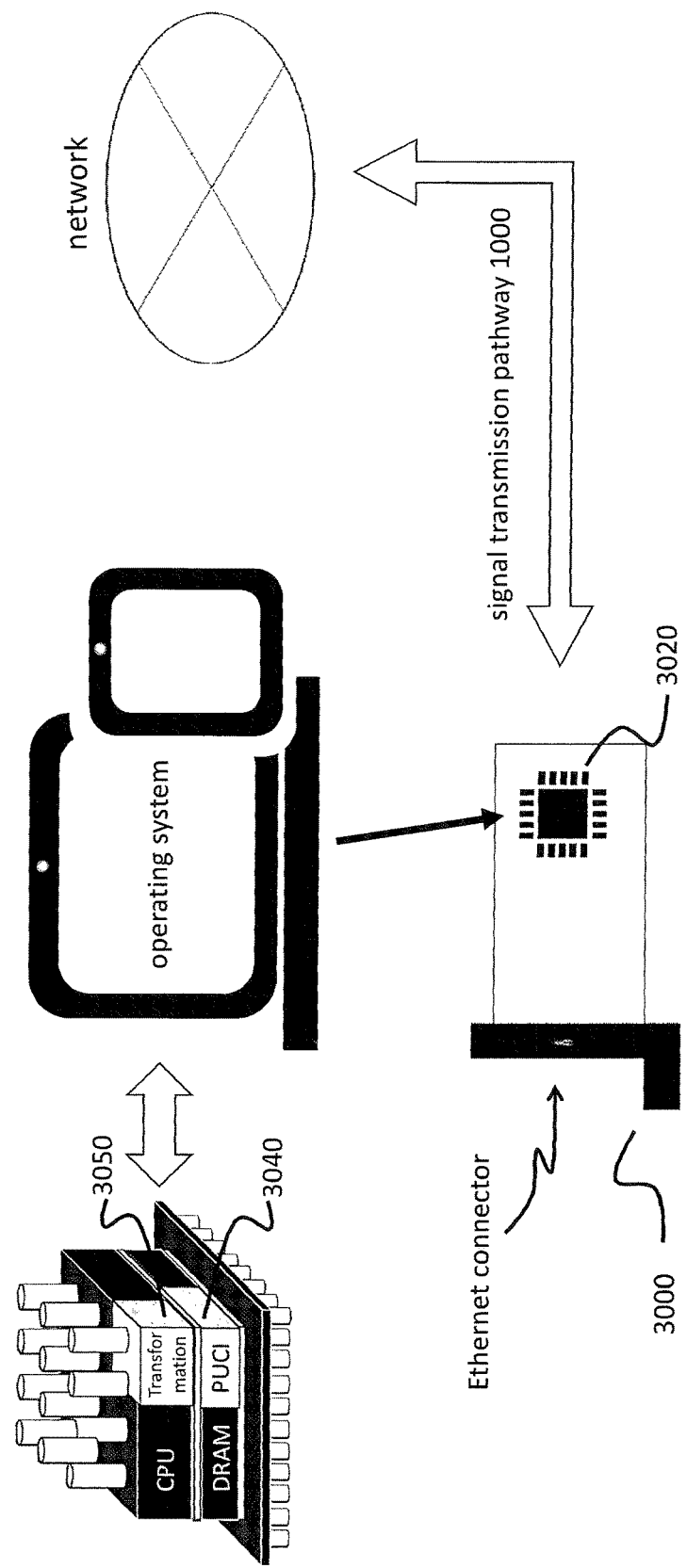
FIG. 87 is an illustration describing an example of a communication method adopting physically unclonable chip identification (PUC-I) of the present disclosure.

FIG. 87 may be another example of the embodiment adopting the physically unclonable function (PUF) related to the present disclosure. Instead of recording the MAC address into the inner memory of the Ethernet card, the chip identification device 3040 of the present disclosure (labeled PUC-I in this figure) may be equipped in the main memory. This chip identification device 3040 may generate the physically unclonable chip identification (PUC-I). Additionally, the central processing unit (CPU) may also play a role of the PUC/MAC converting device 3050 to execute the transition from PUC address 3073 generated from PUC-I to MAC address. In this case, it may be unnecessary to record the MAC address in the Ethernet card and then is possible to exclude the nonvolatile memory chip from the Ethernet card. In the case that the main memory is a DRAM, for example, it may be preferable that the DRAM cell is adopted as an identification cell, as similar to FIG. 42, FIG. 63 and FIG. 64. As an example, hence, the QR code type random number code may be adopted, as similar to FIG. 22. Or, in the example of FIG. 74 having the alternation cells 979, it may be preferable that the DRAM cell is adopted as an identification cell and the barcode type random number code of FIG. 73 is then adopted. Or, it may be preferable that the barcode type random number code of FIG. 73 is adopted with the utilization of the redundancy memory of the DRAM. In contrast with the MAC address in the present embodiment, the identification generated by the chip identification device 3040 may be particularly regarded as physically unclonable chip identification (PUC-I). The PUC-I 3070 may not generally be the identification of the Ethernet format. For example, it may be preferable that the PUC-I generated by the peripheral nodes is generated in response to the input from the stem node, as mentioned above. Or, it may be preferable that the chip identification device generates PUC-I in response to the input code configured in the operating system of the peripheral node in advance. In this case, the input code to be input to the chip identification device may be a passcode to be typed when booting the operating system, or may be related to the passcode. Or, the input code may be a passcode for recovering from the sleep mode, or others such as PIN code and so on, or made related to them. However, as mentioned above, the present embodiment may hold a function of PUC/MAC converting device 3050, which converts the PUC address generated from PUC-I into MAC address. Thus, instead of replacing the operational processing unit for media access controller (MAC) 3020 with the PUC-I controlling device 3030, the chip of MAC 3020 may be mounted in the Ethernet card. Additionally, it may not be always necessary that the PUC/MAC converting device 3050 is an apparatus having a physical substance. It may be also approval to be a kind of program to operate by being loaded to CPU at the booting. Or, it may be also approval to be a firmware to execute a similar operation. Of course, it may be also embedded into the CPU as a module.

When turning on the personal computer, the information necessary to boot the operating system may be loaded to the main memory (e.g., DRAM), while the operating system may be booted by the central processing unit (CPU). Hence, in the case that the operating system finds the Ethernet card or the chip identification device 3040, the operating system may read the physically unclonable chip identification (PUC-I) from the chip identification device 3040 and then transfer it to the PUC/MAC converting device 3050 equipped on the CPU. The PUC/MAC converting device 3050 may convert the PUC address generated from this PUC-I to MAC address. The operating system may write the MAC address generated by this conversion into the chip of the operational processing unit for media access controller (MAC) 3020. By this way, the media access controller (MAC) may send and receive frames via the signal transmission pathway 1000 in the conventional Ethernet format. While not specially illustrated since self-evident, the chip identification device 3040 may also be equipped in the CPU, similar to FIG. 86, while the PUC/MAC converting device 3050 is equipped in the CPU.

The fourth embodiment is described.

Figure 88:
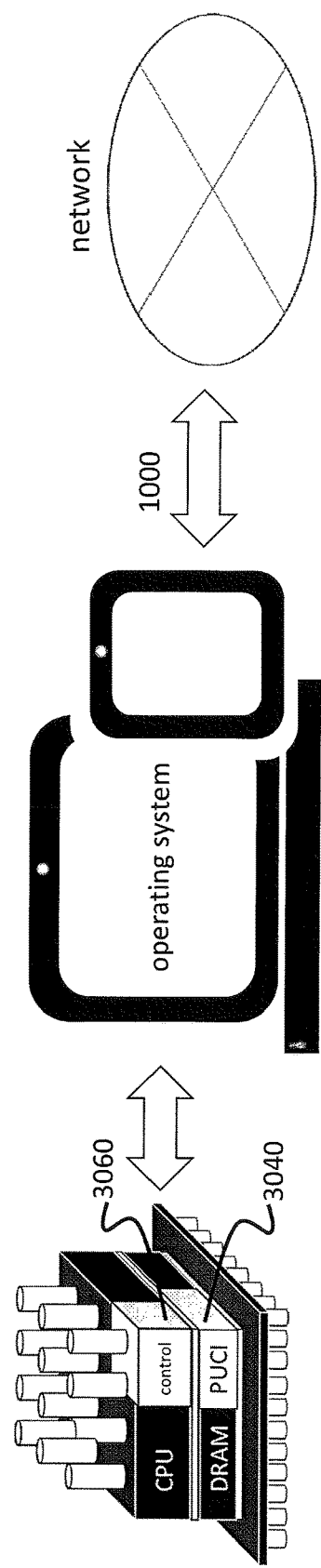
FIG. 88 is an illustration describing an example of a communication method adopting physically unclonable chip identification (PUC-I) of the present disclosure.

FIG. 88 may be an example of another embodiment adopting the physically unclonable function (PUF) related to the present disclosure. Instead of recording the MAC address in the inner memory of the Ethernet card, the chip identification device 3040 (PUC-I labeled in this figure) may be equipped in the main memory. This chip identification device 3040 may generate the physically unclonable chip identification (PUC-I). Additionally, the central processing unit (CPU) may play a role of the PUC-I controlling device 3060 to generate the PUC address from this PUC-I and to form the frame in the method of FIGS. 83-85. In this case, it may not be necessary to record the MAC address in the Ethernet card and is also possible to exclude the nonvolatile memory chip from the Ethernet card. The chip of the operational processing unit for media access controller (MAC) 3020 may not be necessary due to the PUC-I controlling device 3060. For example, it may be preferable that the PUC-I generated by the peripheral node is generated in response to the input code from the stem node, as mentioned above. Or, it may be preferable that the chip identification device generates PUC-I in response to the input code predetermined by the operating system of the peripheral node. In this case, the input code to be input to the chip identification device may be (or is related to) a passcode to be typed when booting the operating system. Or, the input code may be a passcode for recovering from a sleep mode, or others such as a PIN code and so on, or is made related to them. It may be thus preferable to exclude the Ethernet card. In the case that the main memory is a DRAM, for example, it may be preferable that the DRAM cell is adopted as an identification cell, as similar to FIG. 42, FIG. 63 and FIG. 64. As an example, hence, the QR code type random number code may be adopted, as similar to FIG. 22. Or, in the example of FIG. 74 having alternation cells 979, it may be preferable that the DRAM cell is adopted as an identification cell and the barcode type random number code of FIG. 73 is then adopted. Or, it may be preferable that the barcode type random number code of FIG. 73 is adopted with the utilization of the redundancy memory of DRAM. In contrast with the MAC address in this embodiment, the identification generated by the chip identification device 3040 may be regarded as physically unclonable chip identification (PUC-I). Moreover, it may be unnecessary that the PUC-I controlling device 3060 is an apparatus having physical substance. It may be a kind of program to operate after being loaded at the booting. Or, it may be a firmware to realize a similar execution. Of course, it may also be possible to be embedded in the CPU as a module.

When turning on the personal computer, the information necessary to boot the operating system may be loaded to the main memory (e.g., DRAM), while the operating system may be booted by the central processing unit (CPU). Hence, in the case that the operating system finds the chip identification device 3040, the operating system may read the physically unclonable chip identification (PUC-I) from the chip identification device 3040 and then transfer it to the PUC-I controlling device 3060 embedded in the CPU. The PUC-I controlling device 3060 may send and receive the frames generated from this PUC-I with the above-mentioned method via the signal transmission pathway 1000. While not specially illustrated since self-evident, the chip identification device 3040 may also be equipped in the CPU, similar to FIG. 86, while the PUC/MAC converting device 3050 is equipped in the CPU.

In these days, the communication chip with a function of Ethernet card as well as Ethernet card (or LAN card) may appear in the market. Those communication chips may be mounted in electronic or information apparatuses which are smaller than the personal computers. Or, it may not be impossible to be embedded into SIM card. It may be noted that the chip identification device of the present disclosure may be equipped in the chip to generate physically unclonable chip identification (PUC-I). Accordingly, it may be possible that the present disclosure is adopted to a communication chip or a SIM card, as well as an Ethernet card (or LAN card).

In the above-mentioned embodiments, the MOS-type transistor adopted for the illustration, as an example, may comprise two independent second conductive type diffusion layers formed on the first conductive type semiconductor substrate, gate insulating film on the first conductive type semiconductor substrate, and gate electrode on the gate insulating layer. Likewise, the nonvolatile memory cell transistor adopted for the illustration, as an example, may comprise two independent second conductive type diffusion layers formed on the first conductive type semiconductor substrate, tunnel film on the first conductive type semiconductor substrate, charge storage layer on the tunnel film, inter-poly dielectric layer on the charge storage layer, control gate electrode on the inter-poly dielectric layer. Likewise, the select transistor 984 adopted for the illustration may be formed by replacing the whole or a part of the inter-layer dielectric of this nonvolatile memory cell transistor with inter-layer conductor. Or, it may be also formed with conductive via implanted into a hole through the inter-layer dielectric. In a NOR-type cell array, one of the two second conductive type diffusion layers may connect to bit line at each cell. On the other hand, in a NAND-type cell array, the two second conductive type diffusion layers may be shared with adjoining cells and then those cells may form a serial structure on the substrate. One of the excess diffusion layers at both ends of a plurality of cells connected in series may connect to the bit line through the drain select gate, and the other may connect to the source line through the source select gate. Moreover, in the NAND-type cell array, it may be possible to replace the second type conductive diffusion layers with dilute first conductive type diffusion layers, or to omit the second type conductive diffusion layers.

In the above-mentioned embodiments, PN junction 986 adopted for the illustration may be formed by making the first conductive type and second conductive type semiconductors be in contact with each other. As an example, if forming the second conductive type diffusion layer on the surface of the first conductive type semiconductor substrate, it may be automatically formed at those interface. Accordingly, it may also be automatically formed in the MOS-type transistor, the nonvolatile memory transistors, and the select transistors.

In the above-mentioned embodiments, Schottky junction 987 adopted for the illustration may be formed by making the semiconductor and the metal be in contact with each other. Both of the PN junction and the Schottky junction may be a kind of diode junctions.

In the above, the first conductive type semiconductor substrate adopted to illustrate the configurations of the MOS-type transistors, the nonvolatile memory cell transistors and the PN diode may be replaced by the first conductive type diffusion layer (usually called well) formed on the wide area of the semiconductor substrate.

The identification cell may be semiconductor cell to be fabricated on chip that are mass-produced in the front end process of the semiconductor manufacturing.

It may be preferable that the physically unclonable chip identification (PUC-I) generated by the chip identification device 3040 may be temporarily stored in the cash memory and so on before being transferred to the signal transmission pathway 1000. Furthermore, as an example of the present disclosure, in order to make the authenticate communication between a stem node and a peripheral node, first, it may be necessary that the stem node sends a predetermined passcode to the peripheral node, and then registers the output returned from the peripheral node (e.g., PUC address or PUC-I) in advance. After this pre-registration, this stem node may use the set of the predetermined passcode and the corresponding PUC address (or PUC-I) in order to make the authenticate communication with the peripheral node. In the present disclosure, it may not be necessary to store the PUC address (or PUC-I) in the memory region of the peripheral nodes. This makes it very difficult to regularly obtain or manipulate the PUC address (or PUC-I) of the peripheral nodes by remote control. Moreover, in another example, it may be possible that the PIN code owned by the user of the peripheral node serves as an input to the peripheral node instead of the passcode owned by the stem node. In addition, this PIN code may be able to work by the linkage with the operating system of the peripheral node. For example, the PIN code may also serve as a password to, boot the operating system or to recover from a sleep mode.

It may become possible by the present disclosure that the network of electronic apparatuses is divided into peripheral nodes and stem nodes which administrate the registration status of those peripheral nodes. Those stem nodes may be put under central control. Those peripheral nodes out of central control may be mounted with a semiconductor chip having the physical chip identification devices fabricated in the front end process of the semiconductor manufacturing. The remote-attack on those peripheral nodes may be sufficiently prevented by using the physically unclonable chip identification generated by those chip identification devices. The security of the whole network may be thus improved, and then the physical addresses of the nodes on the Internet of Things having the physical substances may be flexibly operated. Hence, the network may be regarded as the communication connection among all electronic apparatuses (nodes) administrated by the above-mentioned authentication communication. Then, the network may be defined by the communication connection among any electronic apparatuses (node) to be connected to each other with the above-mentioned authenticate communication regardless of inside or outside of system to be specially considered.

The physically unclonable chip identification (PUC-I) generated by the chip identification device of the present disclosure may be used for the authentication of the chips having the physical substance. It may be then possible to be adopted for making the traceability of the chips which circulate in the supply chain, ensuring the measure to the chip counterfeit, simplifying the LAN administration to compensate the MAC address, or producing the new physical address to replace the MAC address. In addition, the bit number of the address area may be variable and then can flexibly deal with the coming progress of the network technology.

Furthermore, the technical field of the present disclosure is not limited to the above-mentioned embodiments and various modifications can be added within the field of the present disclosure. It may be particularly effective to a business model that somewhat like a SIM card of a mobile phone is adapted to the peripheral node of the Internet of Things.

It may become possible that the authentication among apparatuses is securely administrated in the network having countlessly peripheral nodes out of the central control by adopting the chip identification generated on the basis of physical randomness.

Although the disclosure has been described in detail with reference to its presently preferable embodiments, it will be understood by one of ordinary skill in the art that various modifications can be made without departing from the spirit and the scope of the disclosure, as set forth in the appended claims.

What is claimed is:

1. A network of electronic appliances comprising:

a plurality of network units of electronic appliances comprising a first network unit and a plurality of second network units, wherein the first network unit is connected to at least one of the plurality of second network units in a topology;

wherein each of the plurality of network units comprises a stem server and a plurality of peripheral devices connected to the stem server;

wherein, in the first network unit, the stem server comprises at least one passcode and at least one list of a plurality of registration codes, wherein each list is associated to a respective one of the at least one passcode, wherein each of the plurality of registration codes of one list associating to one passcode corresponds to a respective one of the plurality of peripheral devices connecting to the stem server;

wherein, in the first network unit, each of the plurality of registration codes is generated in response to a respective one of the at least one passcode using physical randomness of a respective one of the plurality of peripheral devices in correspondence to the passcode, wherein the plurality of registration codes is stored in the stem server in advance in correspondence to the passcode;

wherein, in the first network unit, each of the plurality of peripheral devices comprises a plurality of components, wherein at least one of the plurality of components is a chip including at least one chip identification device, wherein the chip identification devices of the plurality of peripheral devices are different from each other;

wherein, in the first network unit, the chip identification device sends a different output signal to the stem server, wherein the output signal is generated using physical randomness of the chip identification device according to the respective one of the at least one passcode received from the stem server;

wherein, in the first network unit, the stem server compares the output signal with the list of the plurality of registration codes, and then determines the validity of the peripheral device;

wherein, in the first network unit, the chip identification device comprises a plurality of identification cells;

wherein, in the first network unit, the plurality of identification cells is semiconductor device cells which are made simultaneously in a same manufacturing process with the at least one chip;

wherein, in the first network unit, each of the at least one chip comprises at least one module area;

wherein, in the first network unit, the plurality of identification cells is distributed in one or more of the at least one module area;

wherein, in the first network unit, an address of each of the plurality of identification cells is defined by a word line group including a plurality of word lines and a bit ling group including a plurality of bit lines, wherein the word line group and the bit ling group form the one or more of the at least one module area;

wherein, in the first network unit, each of the plurality of identification cells electrically outputs at least a first value and a second value in response to a predetermined electrical input, and comprises at least two terminals;

wherein, in the first network unit, if an electric current flowing between the at least two terminals with regard to a read voltage of the predetermined electrical input has a higher value than a value of a first threshold current, then the first value is regarded as being output, or if the electric current has a lower value than a value of a second threshold current, then the second value is regarded as being output;

wherein, in the first network unit, the value of the first threshold current is higher than the value of the second threshold current;

wherein, in the first network unit, if the electric current has a value higher than the value of the second threshold current and lower than the value of the first threshold current, then a third value is regarded as being output; and wherein, in the first network unit, the address of each of the plurality of identification cells outputting the third value is stored in a part of an inner memory of the peripheral device, wherein, in the first network unit, an operating system booting one of the plurality of peripheral devices regards the output signal that the chip identification device outputs in response to the passcode received from the stem server, or regards the password to be used for booting the operating system, as physically unclonable chip identification intrinsic to the peripheral device, and wherein the physically unclonable chip identification attached to a predetermined format is regarded as a physical address intrinsic to the peripheral device.

2. The network of electronic appliances as claimed in claim 1, wherein the physical address is generated by appending at least a vendor code and an indication bit to the physically unclonable chip identification, wherein the vendor code is indicative of a vendor of the peripheral node, and wherein the indication bit indicates a bit quantity allocated to represent the physically unclonable chip identification.

3. The network of electronic appliances as claimed in claim 1, wherein the topology comprises the stem server of the first network unit, wherein the stem server of the first network unit connects to one or more of the stem servers of the plurality of second network units.

4. The network of electronic appliances as claimed in claim 1, wherein the topology comprises at least one of the plurality of peripheral devices of the first network unit, wherein the at least one of the plurality of peripheral devices of the first network unit connects to one or more of the stem servers of the plurality of second network units.

5. The network of electronic appliances as claimed in claim 1, wherein the topology comprises the stem server and at least one of the plurality of peripheral devices of the first network unit, wherein the stem server of the first network unit connects to one or more of the stem servers of the plurality of second network units, and wherein the at least one of the plurality of peripheral devices of the first network unit is respectively connected to one or more of the stem servers of the plurality of second network units.

6. The network of electronic appliances as claimed in claim 1, wherein the chip identification device generates a signal using physical randomness in response to an input signal, and receives the passcodes from the stem servers, wherein the passcodes are different from each other, wherein the chip identification device further outputs a plurality of different signals in response to the passcodes, and respectively returns the plurality of different signals to the stem servers, wherein at least one of the stem servers which is connected to the plurality of peripheral devices monitors input signals that each of the plurality of peripheral devices receives from arbitrary media and controls the access of each of the plurality of peripheral devices and the media.

7. An electronic appliance comprising at least one chip identification device, wherein the chip identification device comprises a plurality of identification cells, wherein the plurality of identification cells is semiconductor device cells which are made simultaneously in a same manufacturing process with at least one chip, wherein each of the at least one chip comprises at least one module area, wherein the plurality of identification cells is distributed in one or more of the at least one module area, wherein an address of each of the plurality of identification cells is defined by a word line group including a plurality of word lines and a bit ling group including a plurality of bit lines, wherein the word line group and the bit ling group form the one or more of the at least one module area, wherein each of the plurality of identification cells electrically outputs at least a first value and a second value in response to a predetermined electrical input, and comprises at least two terminals,
 wherein, if an electric current flowing between the at least two terminals with regard to a read voltage of the predetermined electrical input has a higher value than a value of a first threshold current, then the first value is regarded as being output, or if the electric current has a lower value than a value of a second threshold current, then the second value is regarded as being output,
 wherein, the value of the first threshold current is higher than the value of the second threshold current,
 wherein, if the electric current has a value higher than the value of the second threshold current and lower than the value of the first threshold current, then a third value is regarded as being output,
 wherein, the address of each of the plurality of identification cells outputting the third value is stored in a part of an inner memory,
 wherein, the address of each of the plurality of identification cells is defined by a row number allocated to one of the plurality of word lines and the plurality of bit lines, as well as a column number allocated to another of the plurality of word lines and the plurality of bit lines,
 wherein, if the row numbers include irreversible errors in some of the plurality of identification cells, the row numbers serve as physically unclonable chip identification of the chip identification device, and wherein the physically unclonable chip identification is converted according to a predetermined format and is regarded as a physical address intrinsic to the electronic appliance.

8. The electronic appliance as claimed in claim 7, wherein each of the plurality of identification cells comprises a first conductor region, a second conductor region and an insulating film sandwiched between the first and second conductor regions;
 wherein at least one of the first and second conductor regions is selected by one of the plurality of word lines and one of the plurality of bit lines which define the address of each of the plurality of identification cells;
 wherein the insulating film of each of the plurality of identification cells of the chip identification device is probabilistically broken by applying a pulse voltage at least one time to either of the first and second conductor regions, wherein an electrical property of the plurality of identification cells of the chip identification device is made physically random.

9. The electronic appliance as claimed in claim 7, wherein each of the plurality of identification cells comprises a first conductor region, a second conductor region, and a diode region sandwiched between the first and second conductor regions;
 wherein at least one of the first and second conductor regions is selected by one of the plurality of word lines and one of the plurality of bit lines which define the address of each of the plurality of identification cells;
 wherein the diode region of each of the plurality of identification cells of the chip identification device is probabilistically broken by applying a pulse voltage at least one time to either of the first and second conductor regions, wherein an electrical property of the plurality of identification cells of the chip identification device is made physically random;
 wherein the diode region comprises a junction including at least two conductive regions having different electrical properties from each other;
 wherein the first conductive region forming the junction is a first conductive type semiconductor, and the second conductive region forming the junction is either a second conductive type semiconductor or a metal type conductor.

10. The electronic appliance as claimed in claim 7, wherein each of the plurality of identification cells comprises a first conductor region, a second conductor region, an insulating film sandwiched between the first and second conductor regions, and a conductive junction element piercing through the insulating film from the first conductor region to the second conductor region;
 wherein at least one of the first and second conductor regions is selected by one of the plurality of word lines and one of the plurality of bit lines which define the address of each of the plurality of identification cells;
 wherein the conductive junction element of each of the plurality of identification cells of the chip identification device is probabilistically broken by applying a pulse voltage at least one time to either of the first and second conductor regions, and wherein an electrical property of the plurality of identification cells of the chip identification device is made physically random.

11. The electronic appliance as claimed in claim 7, wherein each of the plurality of identification cells comprises a first conductor region, a second conductor region, an insulating film sandwiched between the first and second conductor regions, and a conductor tip extending from either of the first and second conductor regions into the insulating film;
 wherein at least one of the first and second conductor regions is selected by one of the plurality of word lines and one of the plurality of bit lines which define the address of the identification cell;
 wherein the insulating film of each of the plurality of identification cells of the chip identification device is probabilistically broken around the conductor tip by applying a pulse voltage at least one time to either of the first and second conductor regions, and wherein an electrical property of the plurality of identification cells of the chip identification device is made physically random.

12. The electronic appliance as claimed in claim 7, wherein each of the plurality of identification cells comprises a first conductor region, a second conductor region, an insulating film sandwiched between the first and second conductor regions, and a metal via formed by a hole forming step and a conductive material filling step;
   wherein the hole forming step comprises forming a hole penetrating the insulating film from the first conductor region to the second conductor region, and the conductive material filling step comprises filling the hole with a conductive material;
   wherein at least one of the first and second conductor regions is selected by one of the plurality of word lines and one of the plurality of bit lines which define the address of each of the plurality of identification cells;
   wherein a manufacturing target value of a length of the metal via equals to a distance between the first and second conductor regions;
   wherein the length of the metal via formed by the hole forming step and the conductive material filling step is probabilistically larger or smaller than the distance between the first and second conductor regions, and wherein an electrical property of the plurality of identification cells of the chip identification device is made physically random.

13. The electronic appliance as claimed in claim 7, wherein each of the plurality of identification cells comprises a first conductor region, a second conductor region, a conductive thin wire bridging the first and second conductor regions, and an insulating film sandwiched between the first and second conductor regions and covering the conductive thin wire;
   wherein at least one of the first and second conductor regions is selected by one of the plurality of word lines and one of the plurality of bit lines which define the address of each of the plurality of identification cells;
   wherein the conductive thin wire is probabilistically broken with regard to a manufacturing fluctuation that occurs in a manufacturing process of the conductive thin wire or a manufacturing process of the insulating film covering the conductive thin wire, and wherein an electric property of the plurality of identification cells of the chip identification device is made physically random.

14. The electronic appliance as claimed in claim 7, wherein each of the plurality of identification cells is a Metal-Oxide-Semiconductor (MOS) type transistor manufactured in the same manufacturing process with the at least one chip, wherein said transistor includes at least a first terminal, a second terminal and a third terminal, wherein the first terminal is connected to one of the plurality of word lines, wherein the second terminal is connected to one of the plurality of bit lines, wherein the third terminal is grounded, wherein said transistor includes two independent second conductive type diffusion layers formed on a first conductive type semiconductor substrate or a first conductive type well, wherein the second and third terminals are respectively connected to the two independent second conductive type diffusion layers, wherein the first terminal is formed on a gate insulating film on the first conductive type semiconductor substrate or the first conductive type well, wherein the gate insulating film is probabilistically broken by applying a pulse voltage to the one of the plurality of word lines, wherein a value of a current flowing through the one of the plurality of word lines or the one of the plurality of bit lines is compared with the values of the first and second threshold currents by applying the read voltage to the one of the plurality of word lines.

15. The electronic appliance as claimed in claim 7, wherein each of the plurality of identification cells is a Metal-Oxide-Semiconductor (MOS) type transistor and a capacitor manufactured in the same manufacturing process with the at least one chip, wherein the capacitor includes an insulating film sandwiched by first and second terminals, wherein the second terminal is grounded, wherein said MOS type transistor includes at least a third terminal, a fourth terminal and a fifth terminal, wherein the third terminal is connected to one of the plurality of word lines, wherein the fourth terminal is connected to one of the plurality of bit lines, wherein the fifth terminal is connected to the first terminal, wherein said transistor includes two independent second conductive type diffusion layers formed on a first conductive type semiconductor substrate or a first conductive type well, wherein the fourth and fifth terminals are respectively connected to the two independent second conductive type diffusion layers, wherein the third terminal is formed on a gate insulating film on the first conductive type semiconductor substrate or the first conductive type well, wherein, during an internal where a transfer voltage is applied between the one of the plurality of word lines and the one of the plurality of bit lines to turn on said MOS type transistor, the insulating film of the capacitor is probabilistically broken by applying a pulse voltage to the one of the plurality of bit lines, and wherein, during the internal where the transfer voltage is applied, a value of a current flowing through the one of the plurality of bit lines is compared with the values of the first and second threshold currents by applying the read voltage to the one of the plurality of bit lines.

16. The electronic appliance as claimed in claim 7, wherein each of the plurality of identification cells comprises a select transistor of a nonvolatile memory manufactured in the same manufacturing process with the at least one chip, wherein the select transistor includes at least a first terminal, a second terminal and a third terminal, wherein the first terminal is connected to one of the plurality of word lines, wherein the second terminal is connected to one of the plurality of bit lines, wherein the third terminal is grounded, wherein said select transistor includes two independent second conductive type diffusion layers formed on a first conductive type semiconductor substrate or a first conductive type well, wherein the second and third terminals are respectively connected to the two independent second conductive type diffusion layers, wherein the select transistor comprises a tunnel film, a charge storage layer, an interlayer insulating film and a control gate, which are laminated in order on the first conductive type semiconductor substrate or the first conductive type well, wherein the first terminal is connected to the control gate, wherein the tunnel film is probabilistically broken by applying a pulse voltage to the one of the plurality of word lines, and wherein a value of a current flowing through the one of the plurality of word lines or the one of the plurality of bit lines is compared with the values of the first and second threshold currents by applying the read voltage to the one of the plurality of word lines.

17. The electronic appliance as claimed in claim 7, wherein each of the plurality of identification cells comprises a plurality of select transistors manufactured in the same manufacturing process with the at least one chip, wherein the plurality of select transistors is connected in series on a semiconductor substrate, wherein each of the plurality of select transistors connected in series at least includes a plurality of gate contacts and a bit line contact, wherein the gate contacts are respectively connected to the plurality of word lines, wherein the bit line contact is connected to one of the plurality of bit lines, wherein each of the plurality of select transistors comprises a tunnel film, a charge storage layer, an interlayer insulating film and a control gate laminated in order on the semiconductor substrate, wherein the plurality of gate contacts is on the control gate, wherein the tunnel film is probabilistically broken by applying a pulse voltage to the one of the plurality of word lines, and wherein a value of a current flowing through the one of the plurality of word lines or the one of the plurality of bit lines is compared with the values of the first and second threshold currents by applying the read voltage to the one of the plurality of word lines.

18. The electronic appliance as claimed in claim 7, wherein one or more identification blocks and one or more memory blocks are disposed in one or different module areas,
- wherein each of the one or more identification blocks comprise some of the plurality of word lines and some of the plurality of bit lines,
- wherein at least one of the some of the plurality of word lines and the some of the plurality of bit lines is included in at least one of the one or more memory blocks,
- wherein an address of each of the plurality of identification cells in the one or more identification blocks and the one or more memory blocks is defined by one of the plurality of word lines and one of the plurality of bit lines.

19. The electronic appliance as claimed in claim 7, wherein, if a number of the identification cells in a first state outputting the first value is larger than a number of the identification cells in a second state outputting the second value, then a part of or all of the identification cells in the first state is selected to be applied with an electrical stress, wherein, if the number of the identification cells in the first state outputting the first value is smaller than the number of the identification cells in the second state outputting the second value, then a part of or all of the identification cells in the second state is selected to be applied with the electrical stress.

20. The electronic appliance as claimed in claim 7, wherein the chip identification device comprises an aggregate of the plurality of identification cells disposed at cross-points of the plurality of word lines and the plurality of bit lines,
- wherein the cross-points are respectively pointed by a set of column numbers and row numbers,
- wherein one of each of said column numbers and each of said row numbers corresponds to a respective one of the plurality of word lines and another of each of said column numbers and each of said row numbers corresponds to a respective one of the plurality of bit lines,
- wherein said cross-points are respectively addressed by the column numbers and the row numbers,
- wherein an external input is divided into a first sequence and a second sequence, wherein components of the first sequence are aligned in an order of said column numbers, wherein components of the second series are aligned in an order of said row numbers,
- wherein a random number code is an aggregation of output data from the plurality of identification cells,
- wherein an output code is an aggregation of compound data generated by respectively compounding said components of the first sequence, said components of the second sequence, and components of said random number code in a predetermined method at sets of said bit line numbers and said word line numbers.

21. An inspection method performed by each of the stem servers of the plurality of network units as claimed in claim 1, comprising:
- reading an inner memory of each of the plurality of peripheral devices connecting to the stem server;
- comparing the read data with the at least one passcode stored in the stem server;
- determining whether the compared result is inconsistent; and
- checking whether the read data is a same as each of the plurality of registration codes in one of the lists stored in the stem server if the determined result is inconsistent, wherein the one of the list corresponds to the passcode, wherein the peripheral device is regarded as being certified if the checked result is inconsistent.

* * * * *